Figure 2:
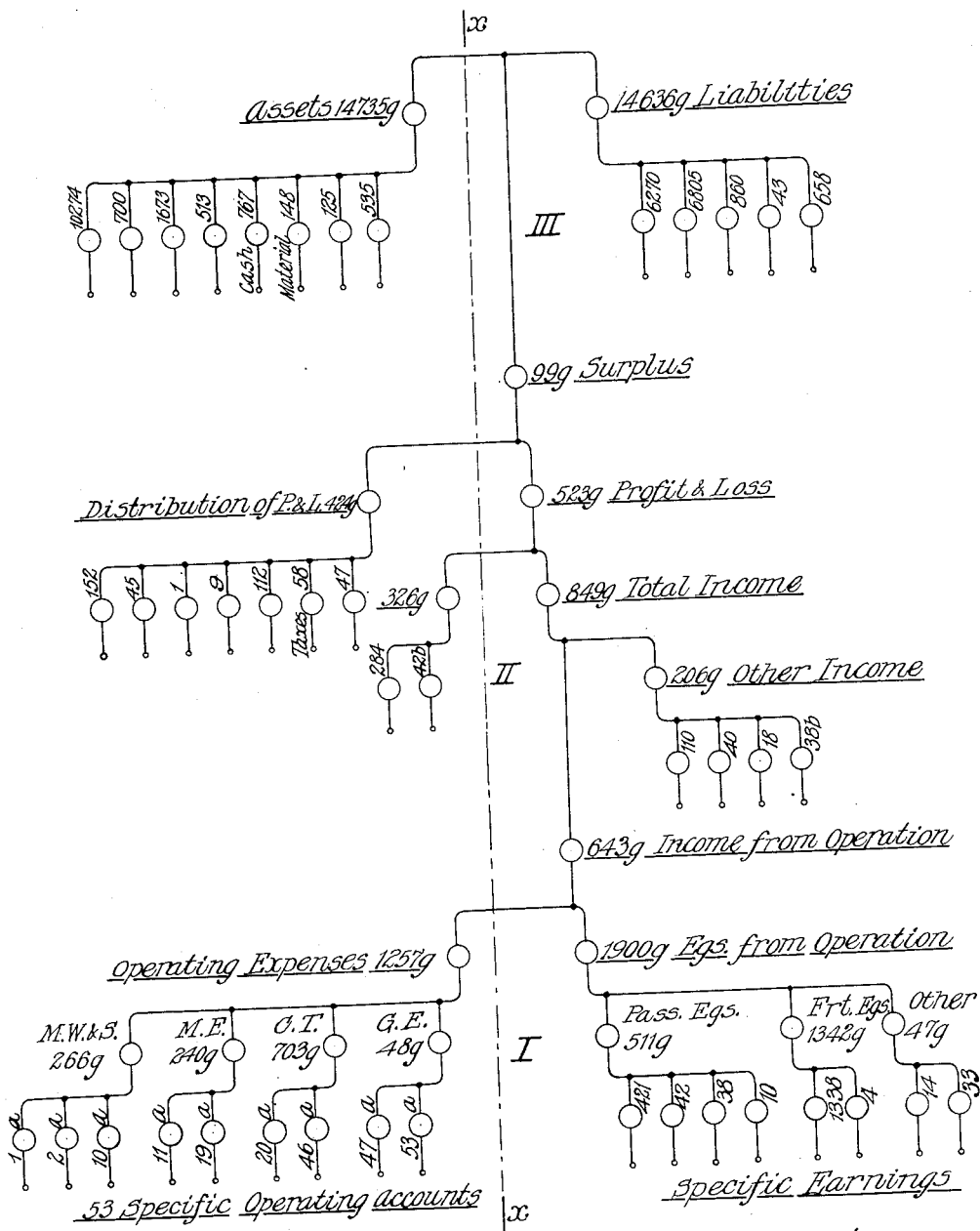

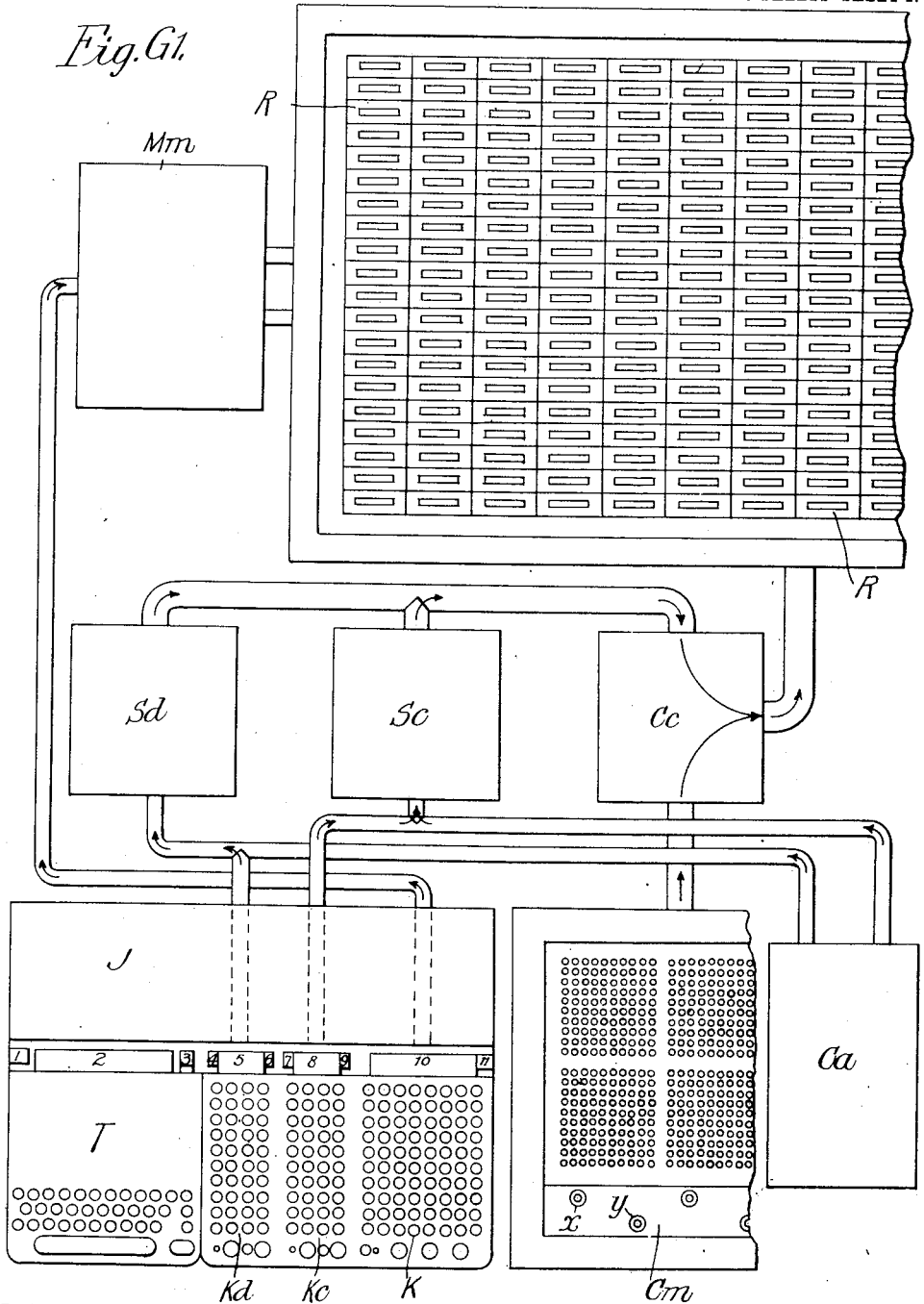

C. H. TALLMADGE.
ACCOUNTING MECHANISM.
APPLICATION FILED SEPT. 7, 1906.
1,084,667.
Patented Jan. 20, 1914.
58 SHEETS—SHEET 2.
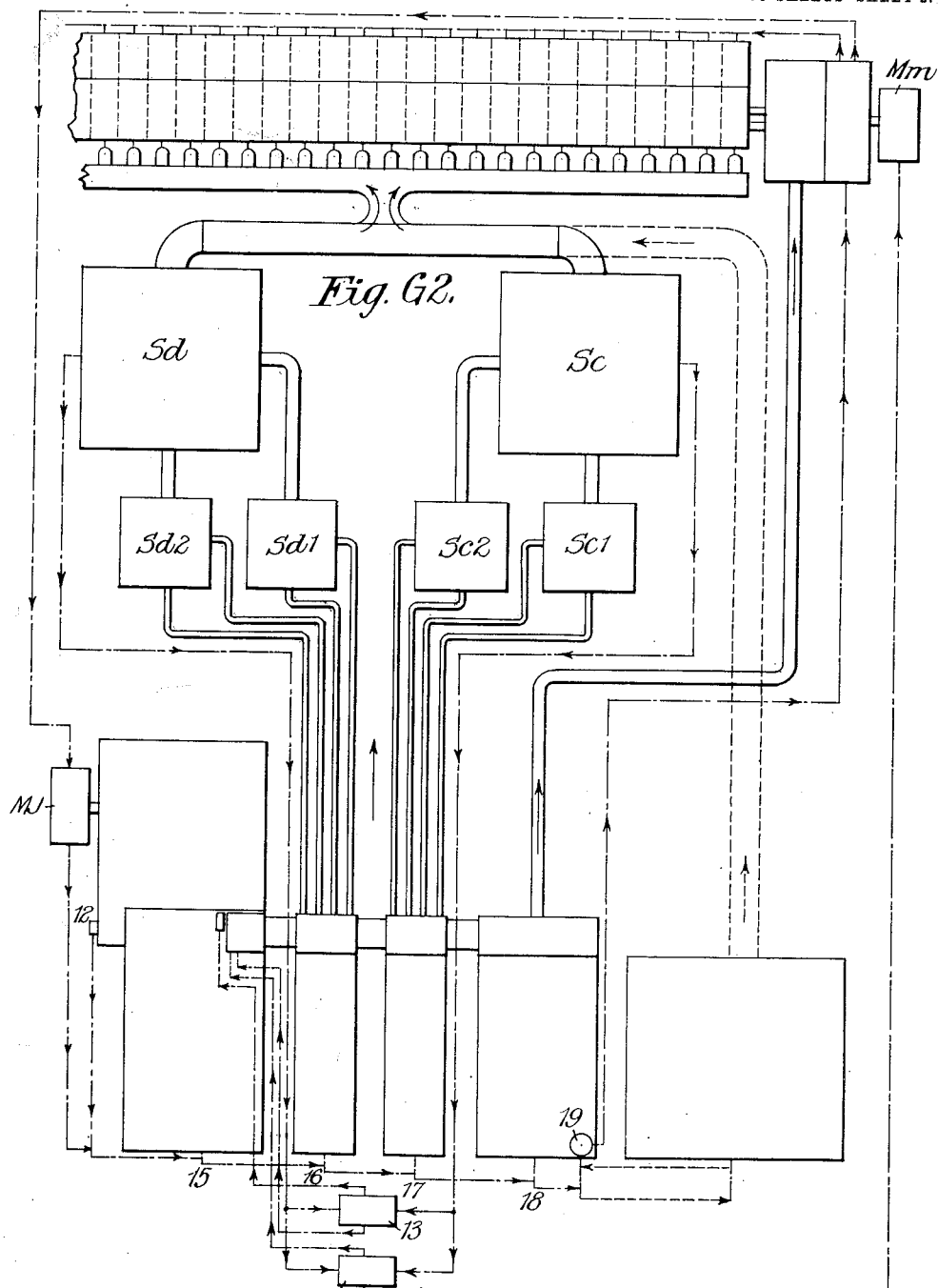
Fig. G2.
Witnesses:
Leonard W. Novander
George E. Higham
Inventor
Charles H. Tallmadge
By Brown Williams Bell Hanson & Bottche
Attorneys

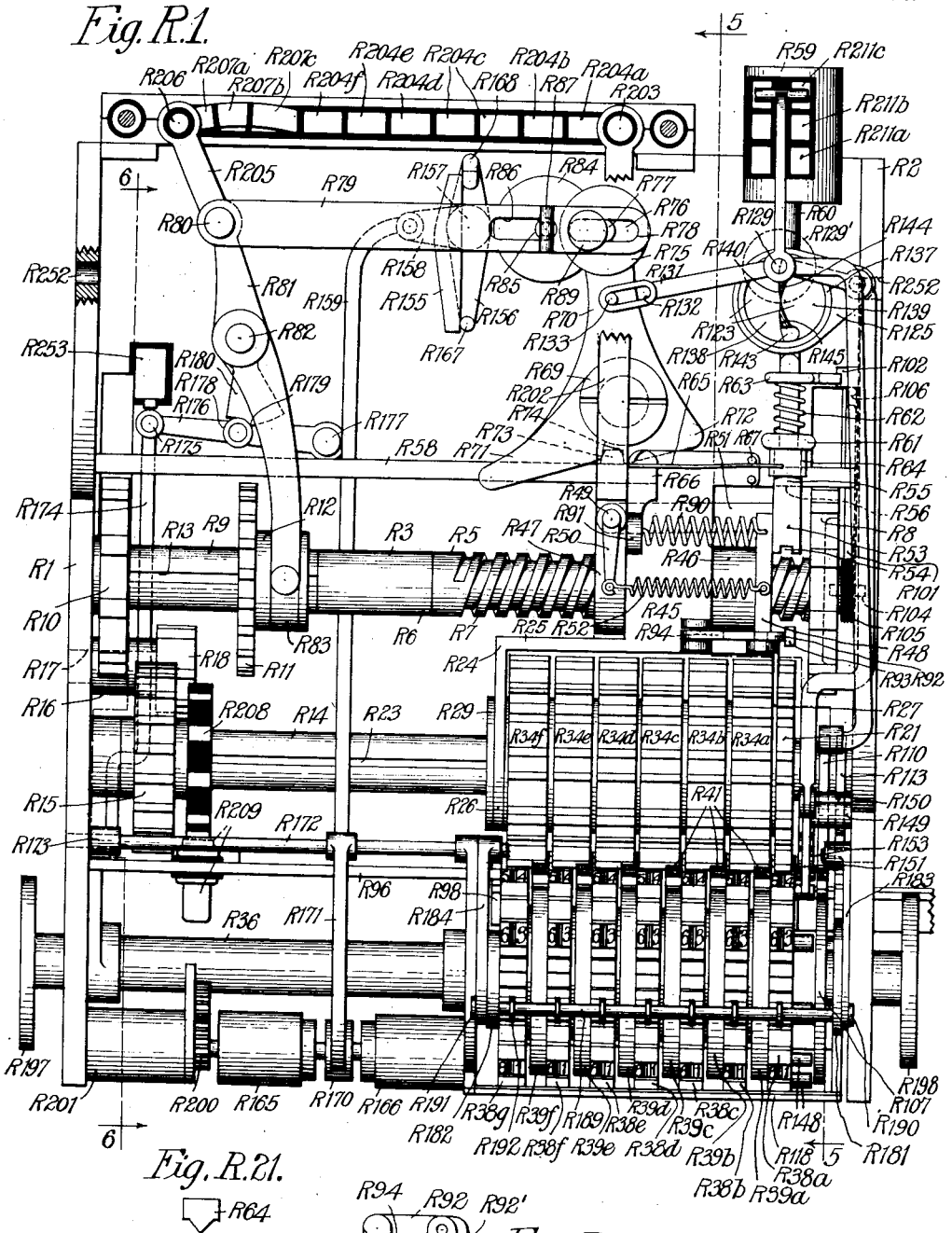
C. H. TALLMADGE.
ACCOUNTING MECHANISM.
APPLICATION FILED SEPT. 7, 1906.
1,084,667.
Patented Jan. 20, 1914.
58 SHEETS—SHEET 3.
Fig. R.1.
Fig. R.21.
Fig. R.20.
Witnesses:
Leonard W. Novander
George E. Higham
Inventor
Charles H. Tallmadge
By Brown, Williams, Bell, Hanson & Boettcher
Attorneys C. H. TALLMADGE.
ACCOUNTING MECHANISM.
APPLICATION FILED SEPT. 7, 1906.
1,084,667.
Patented Jan. 20, 1914.
58 SHEETS—SHEET 4.
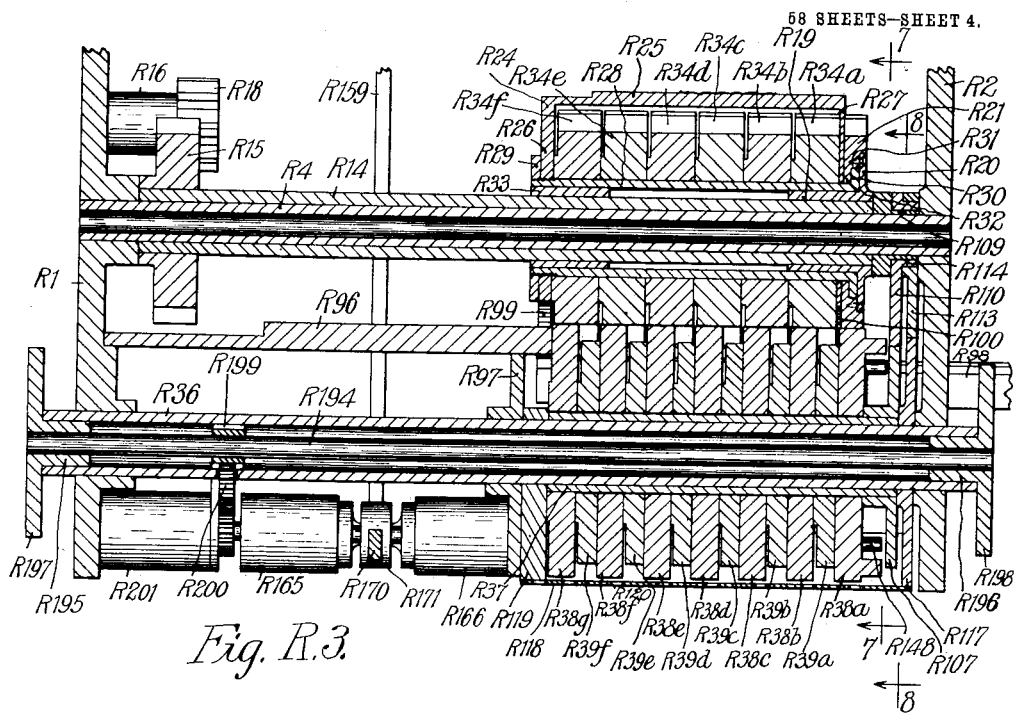
Fig. R.3.
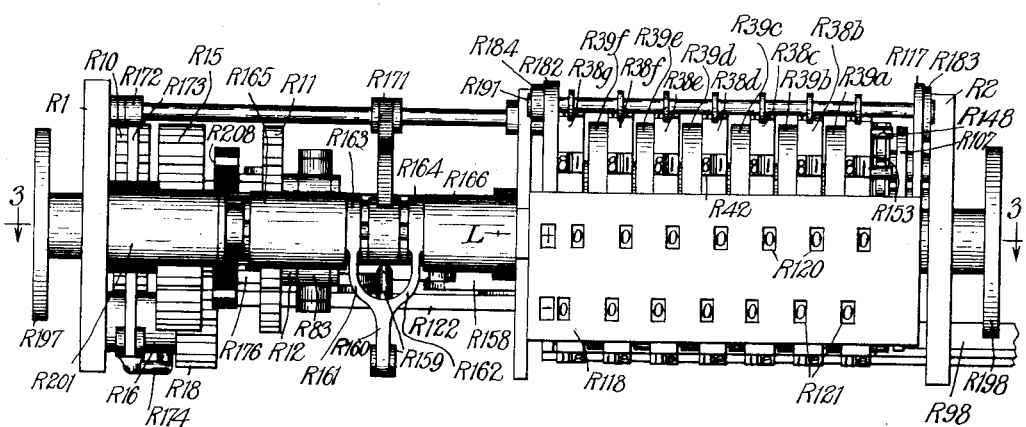
Fig. R.2.
Witnesses:
George E. Higham.
Leonard W. Novander.
Inventor
Charles H. Tallmadge
By Brown Williams Bell Hanson & Boettcher
Attorneys C. H. TALLMADGE.
ACCOUNTING MECHANISM.
APPLICATION FILED SEPT. 7, 1906.
1,084,667.
Patented Jan. 20, 1914.
58 SHEETS—SHEET 5.
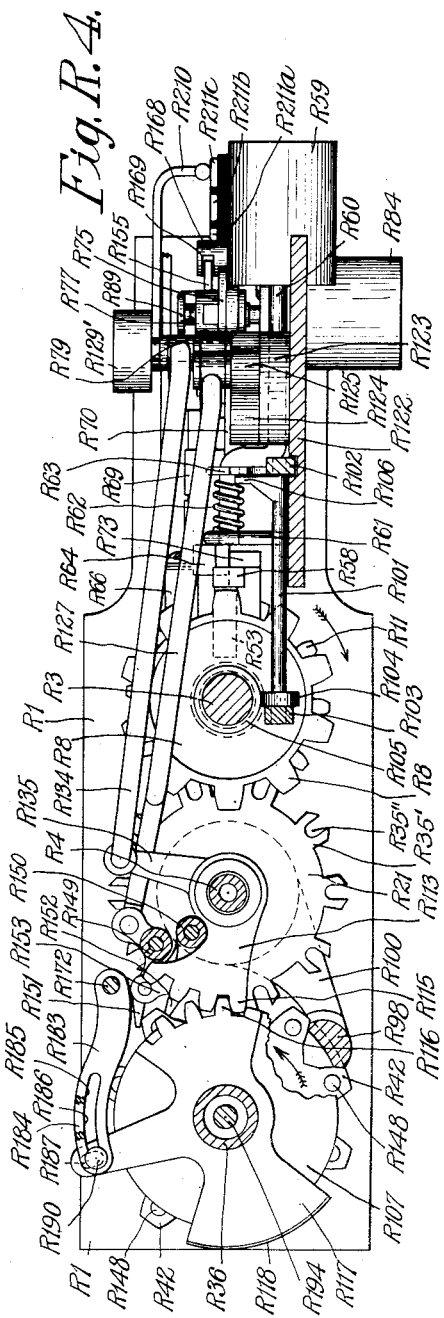
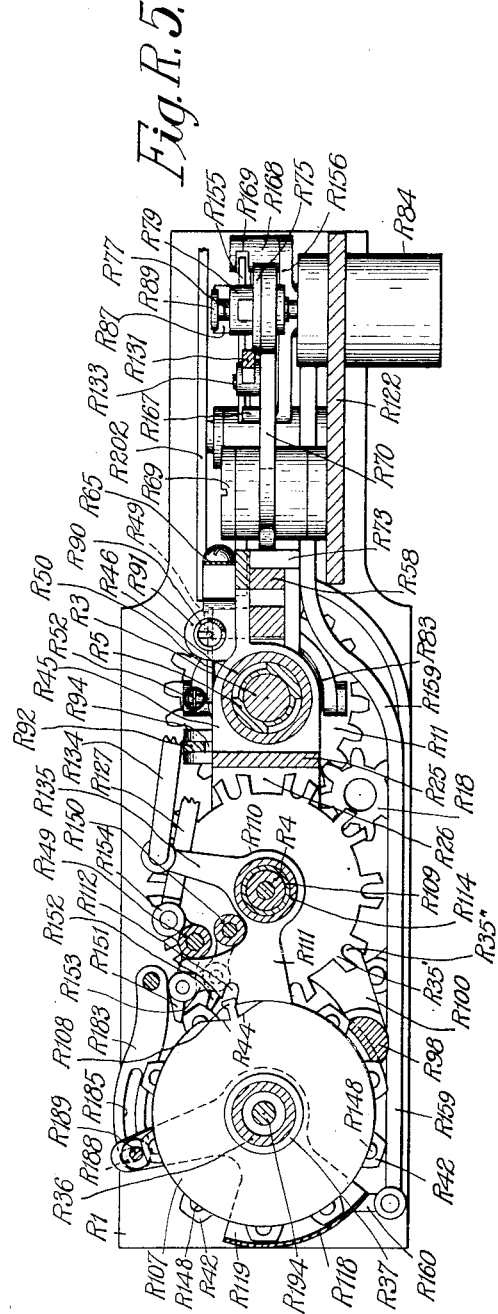
Inventor
Charles H. Tallmadge C. H. TALLMADGE.
ACCOUNTING MECHANISM.
APPLICATION FILED SEPT. 7, 1906.
1,084,667.
Patented Jan. 20, 1914.
58 SHEETS—SHEET 6.
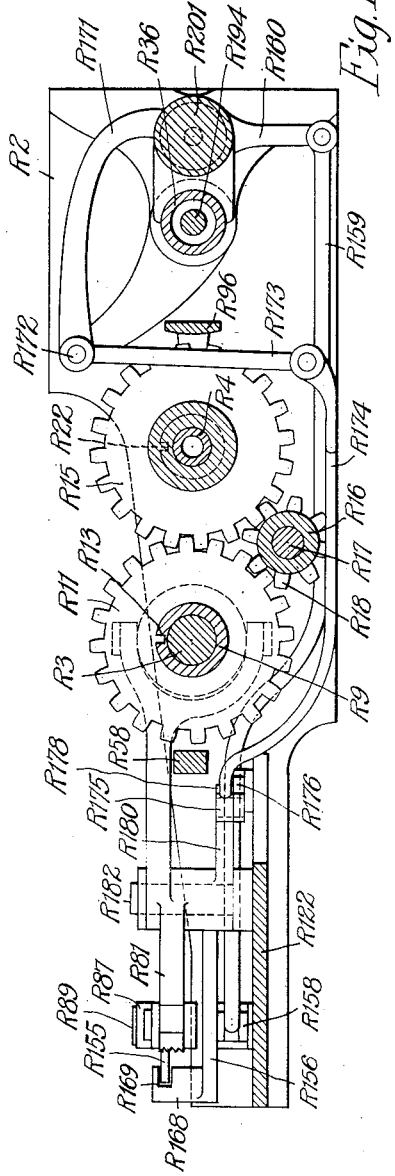
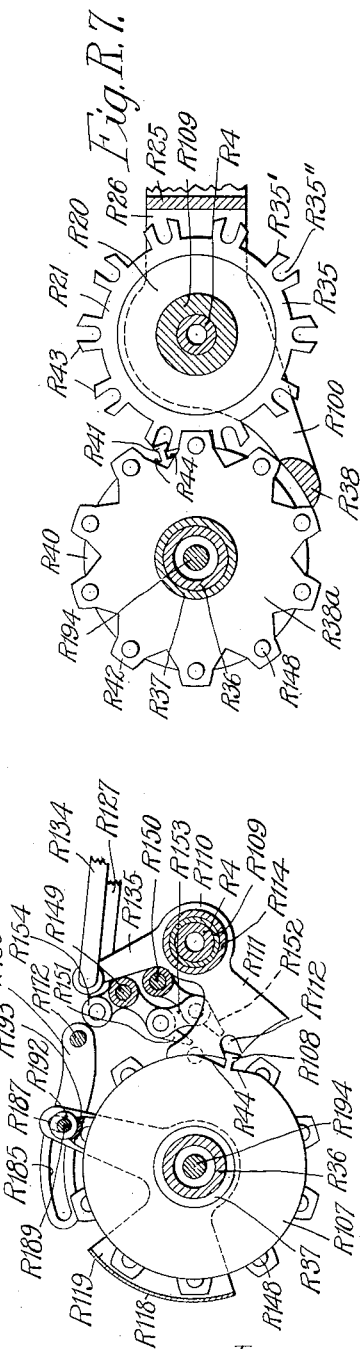
Witnesses:
Leonard W. Novander.
George C. Higham.
Inventor
Charles H. Tallmadge
By Brown Williams Bell Hanson & Boettcher
Attorneys C. H. TALLMADGE.
ACCOUNTING MECHANISM.
APPLICATION FILED SEPT. 7, 1906.
1,084,667.
Patented Jan. 20, 1914.
58 SHEETS—SHEET 7.
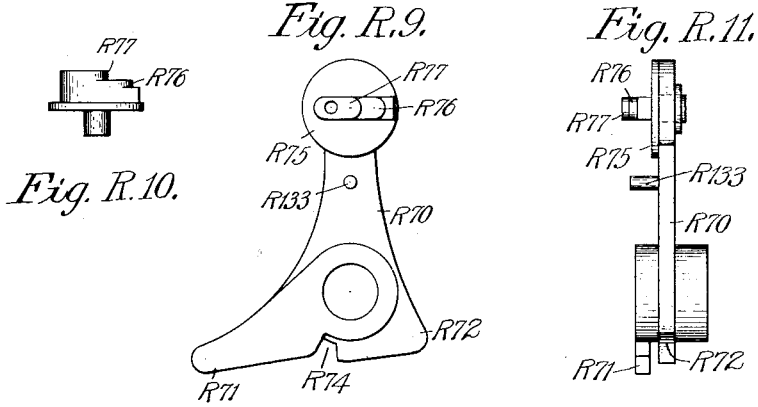
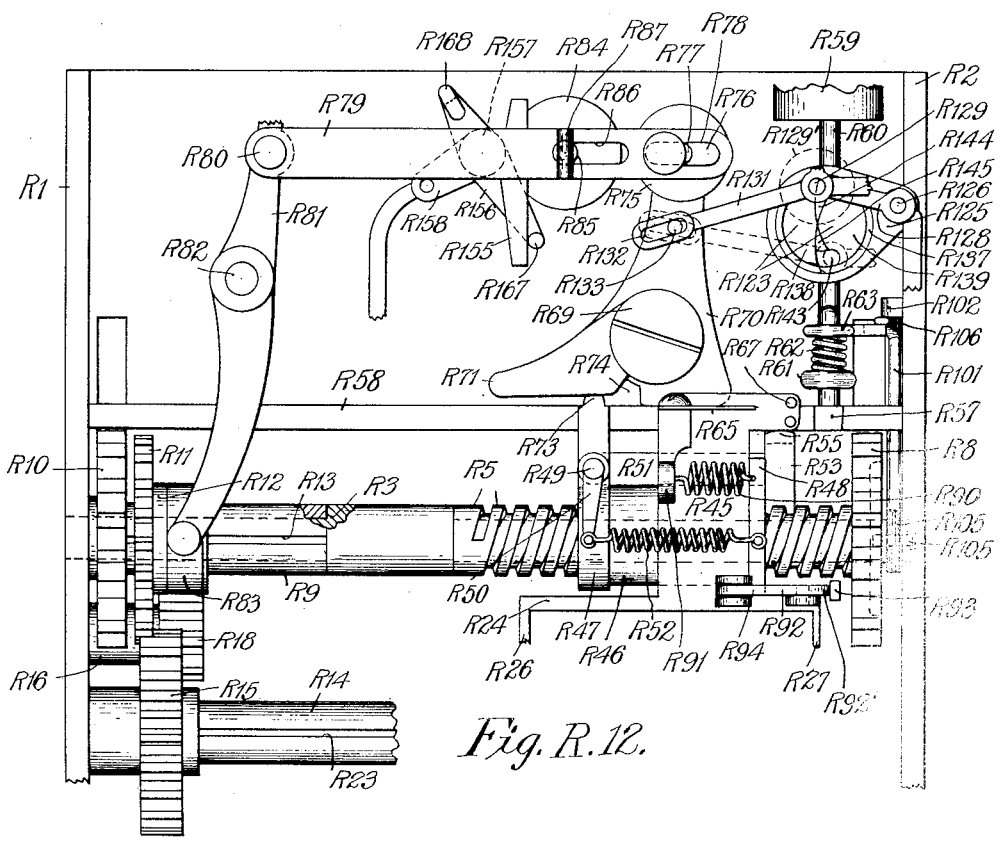
Witnesses:
George C. Higham.
Leonard W. Novander.
Inventor
Charles H. Tallmadge
By Brown Williams
Attorneys C. H. TALLMADGE.
ACCOUNTING MECHANISM.
APPLICATION FILED SEPT. 7, 1906.
1,084,667.
Patented Jan. 20, 1914.
58 SHEETS—SHEET 8.
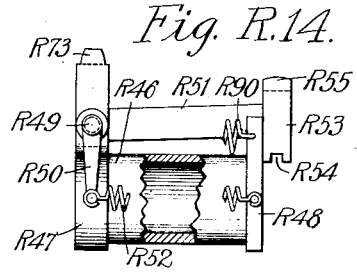
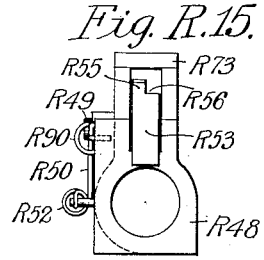
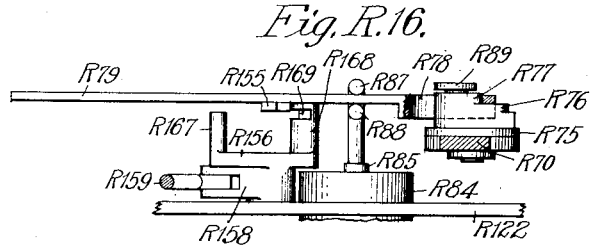
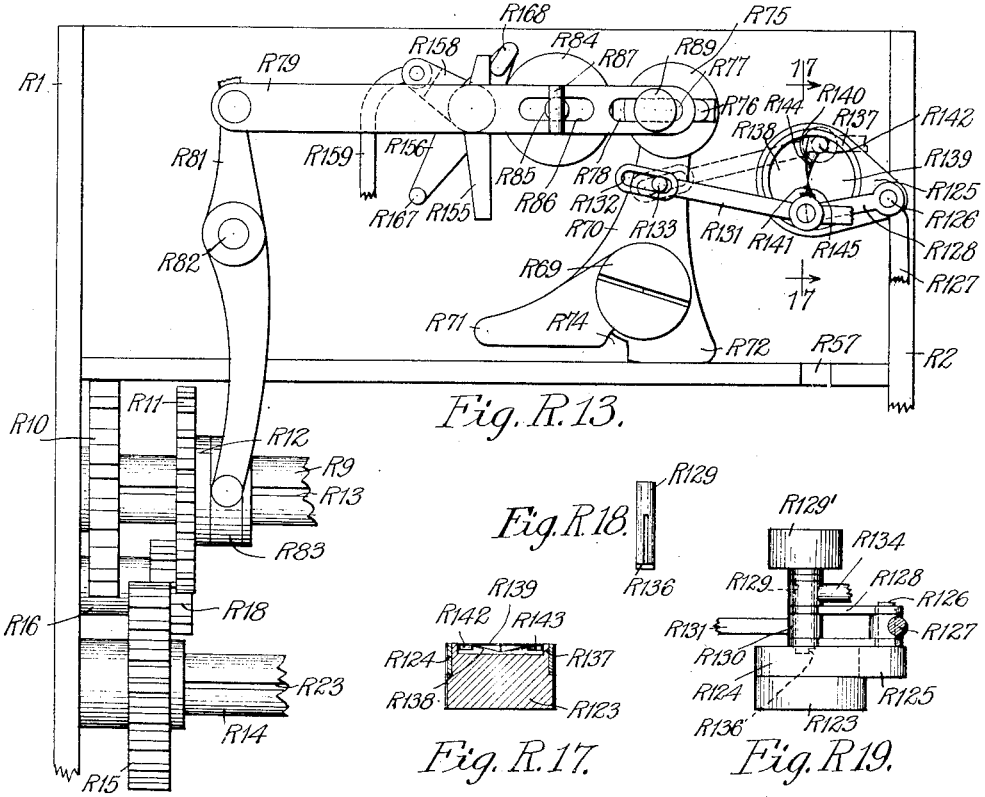
Inventor
Charles H. Tallmadge

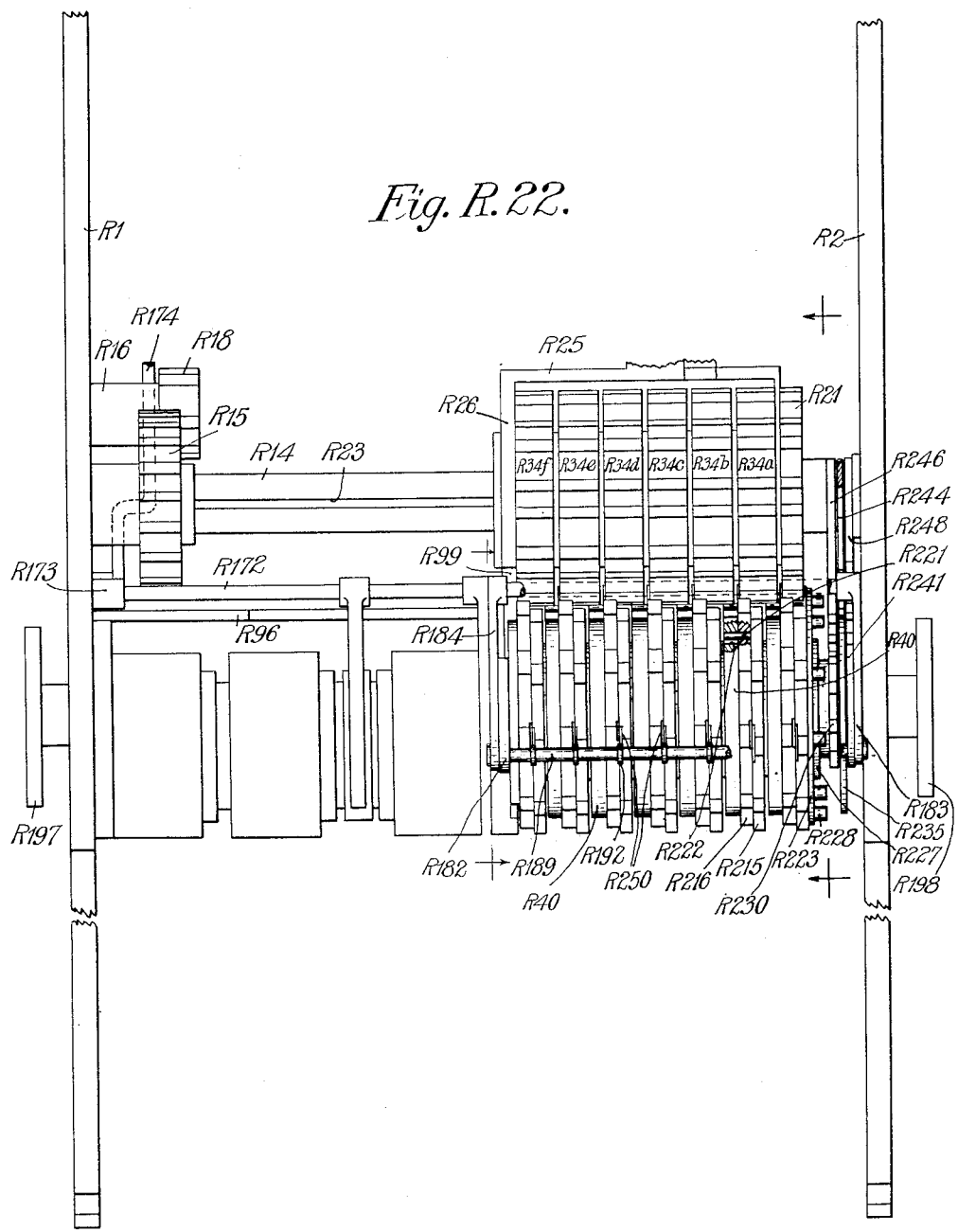

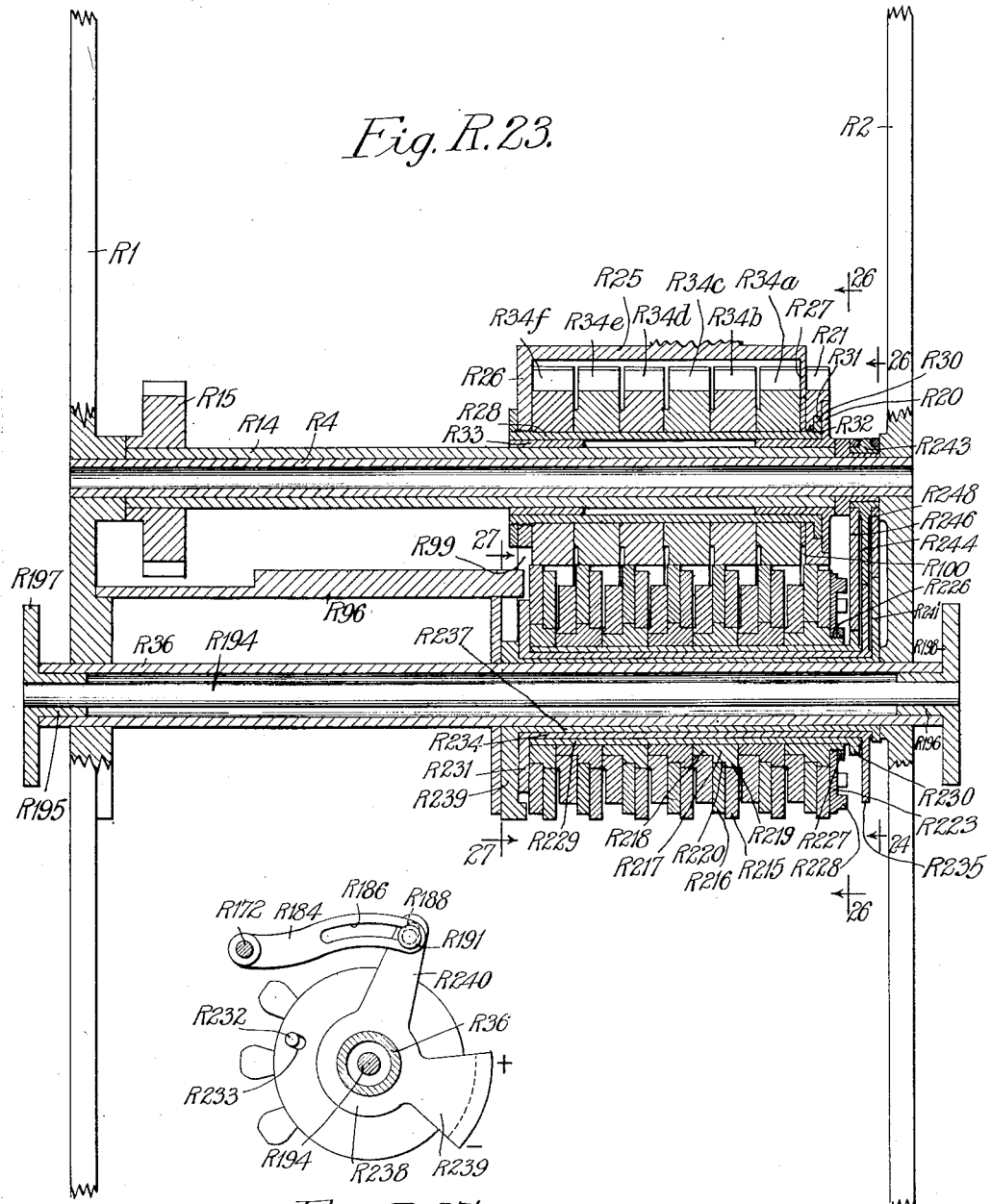

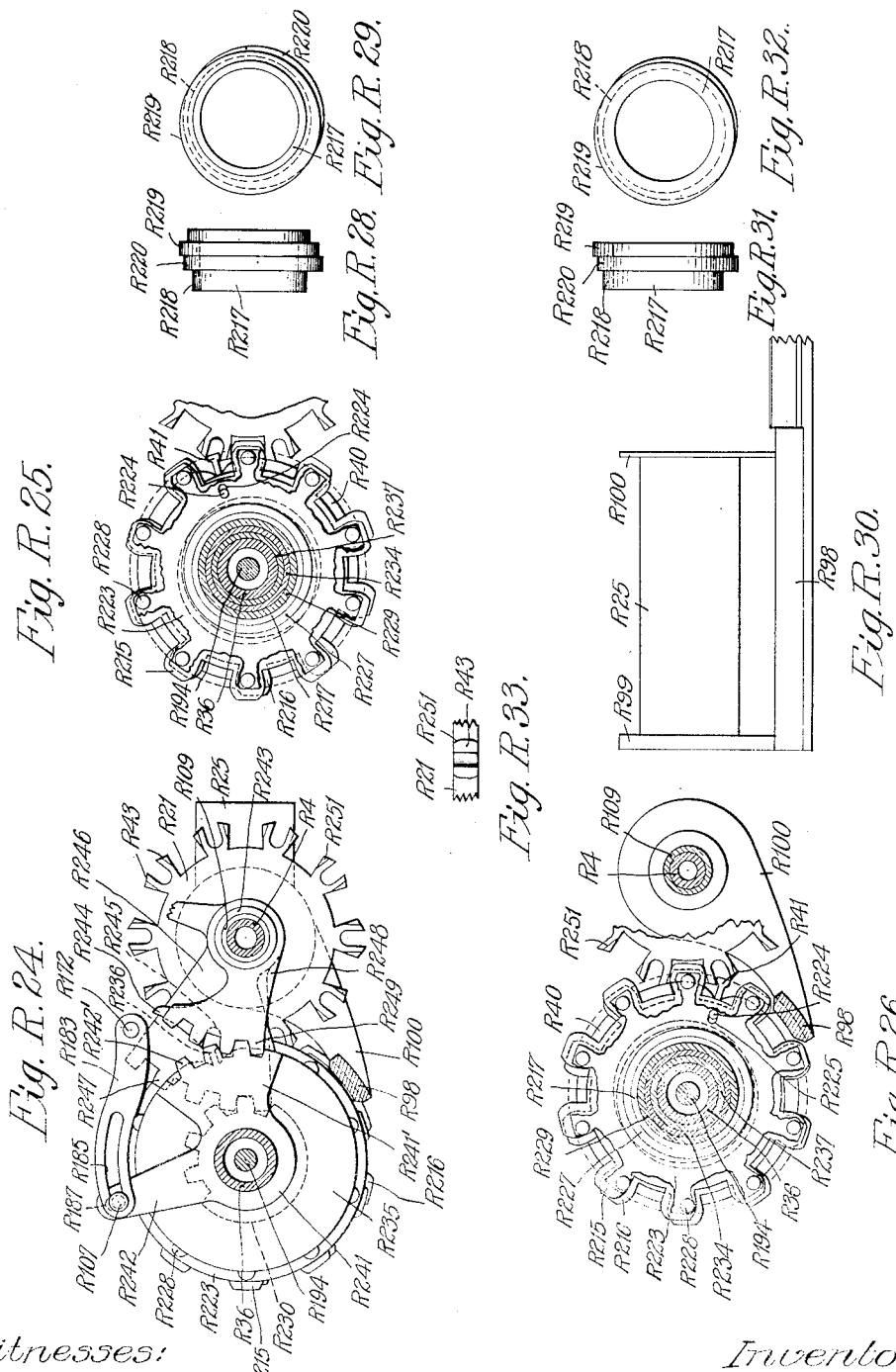
C. H. TALLMADGE.
ACCOUNTING MECHANISM.
APPLICATION FILED SEPT. 7, 1906.
1,084,667.
Patented Jan. 20, 1914.
58 SHEETS—SHEET 11.

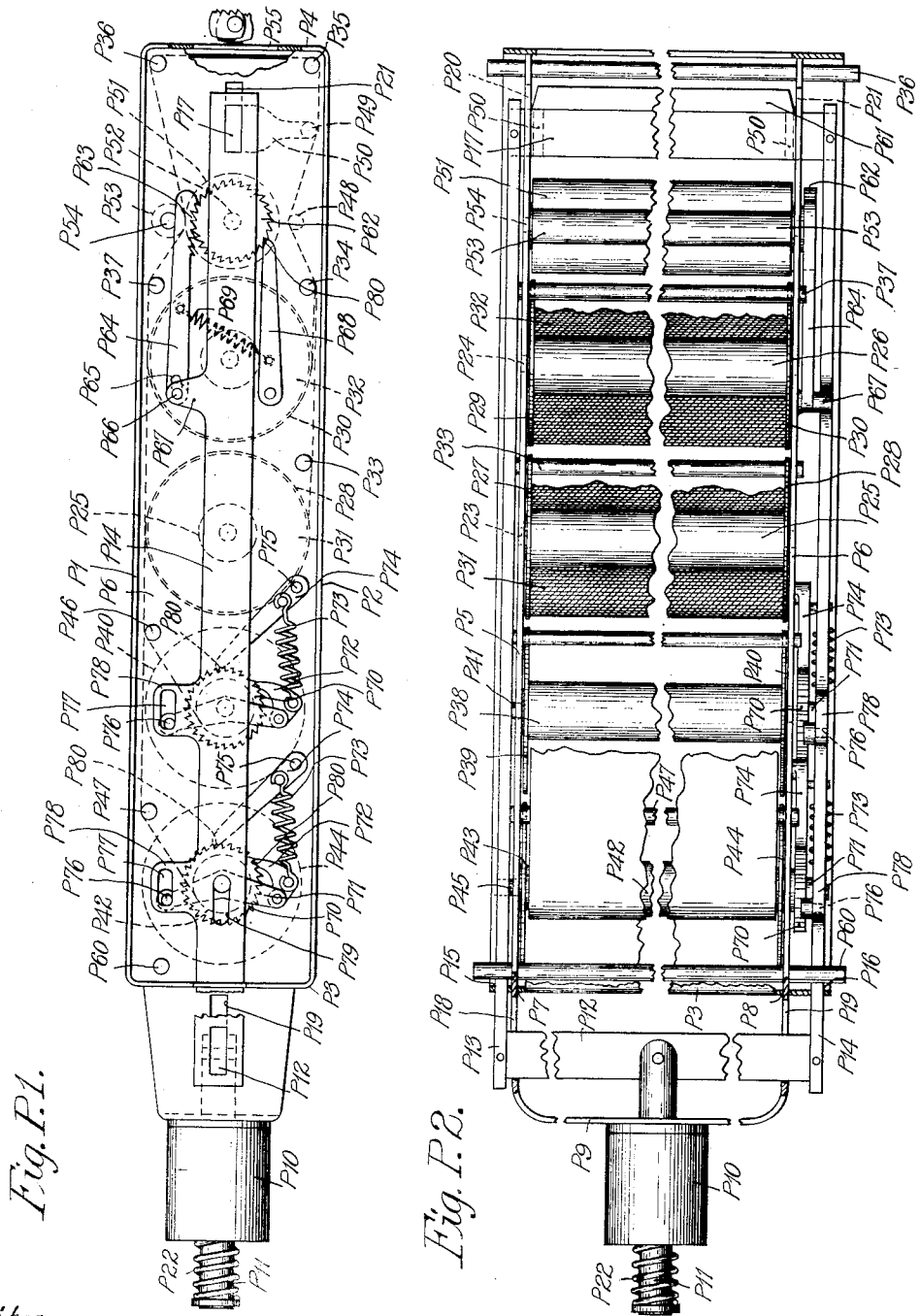

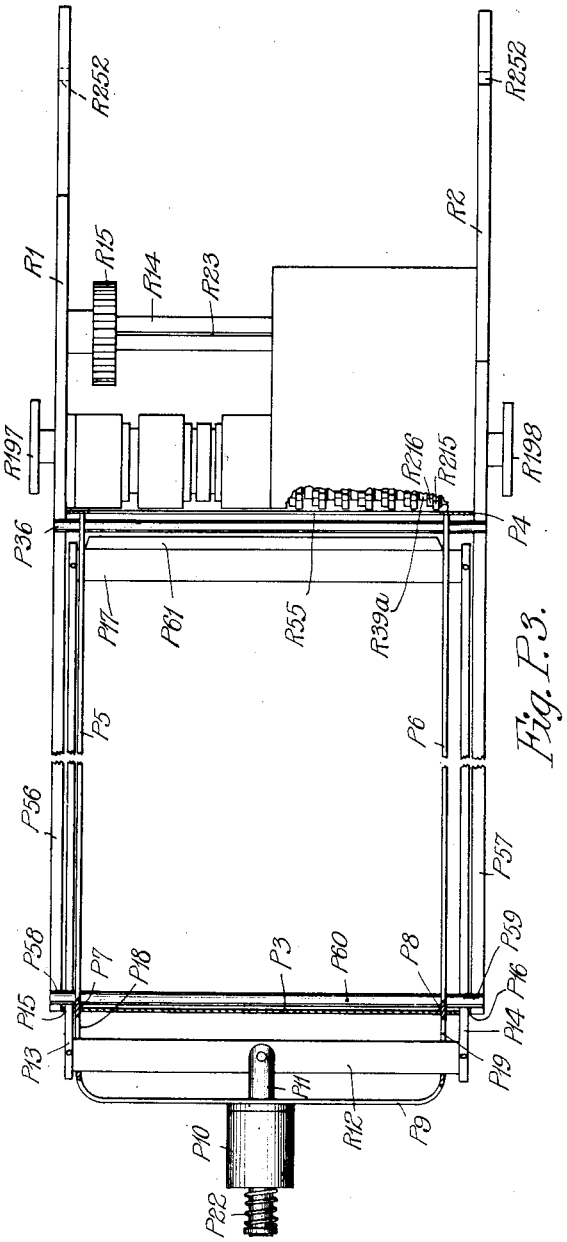
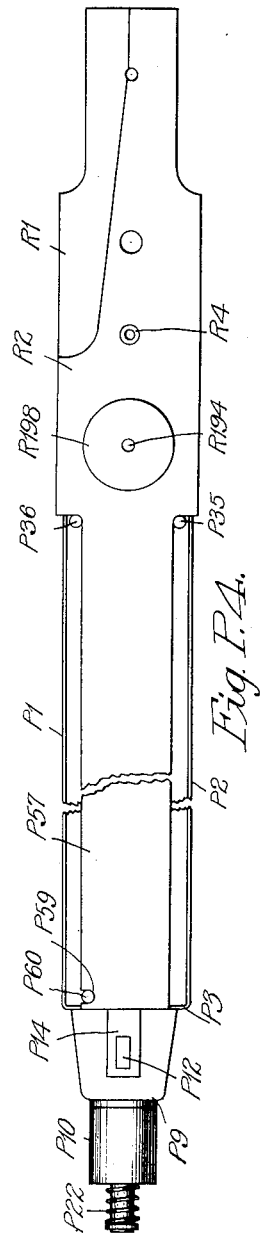

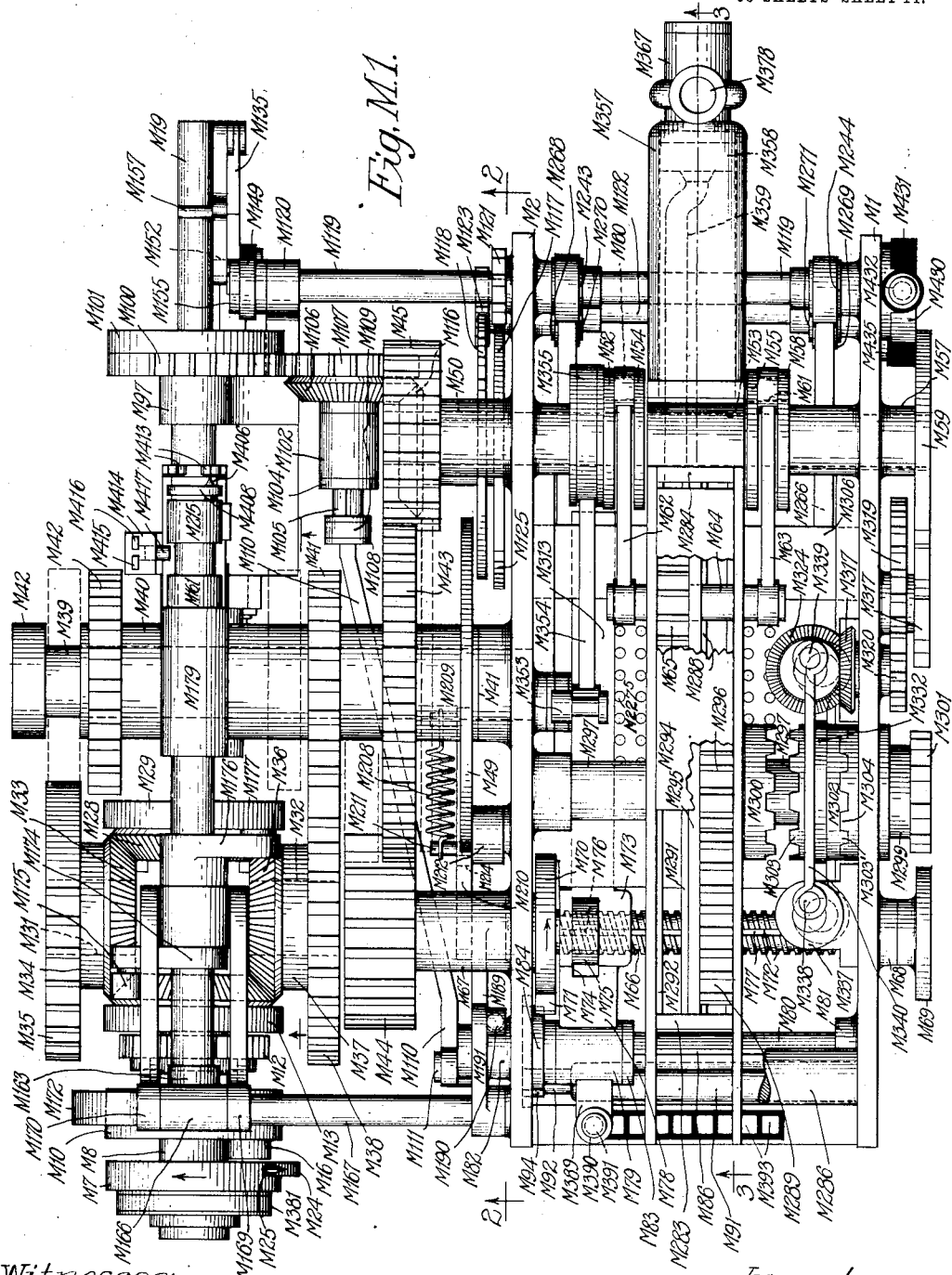

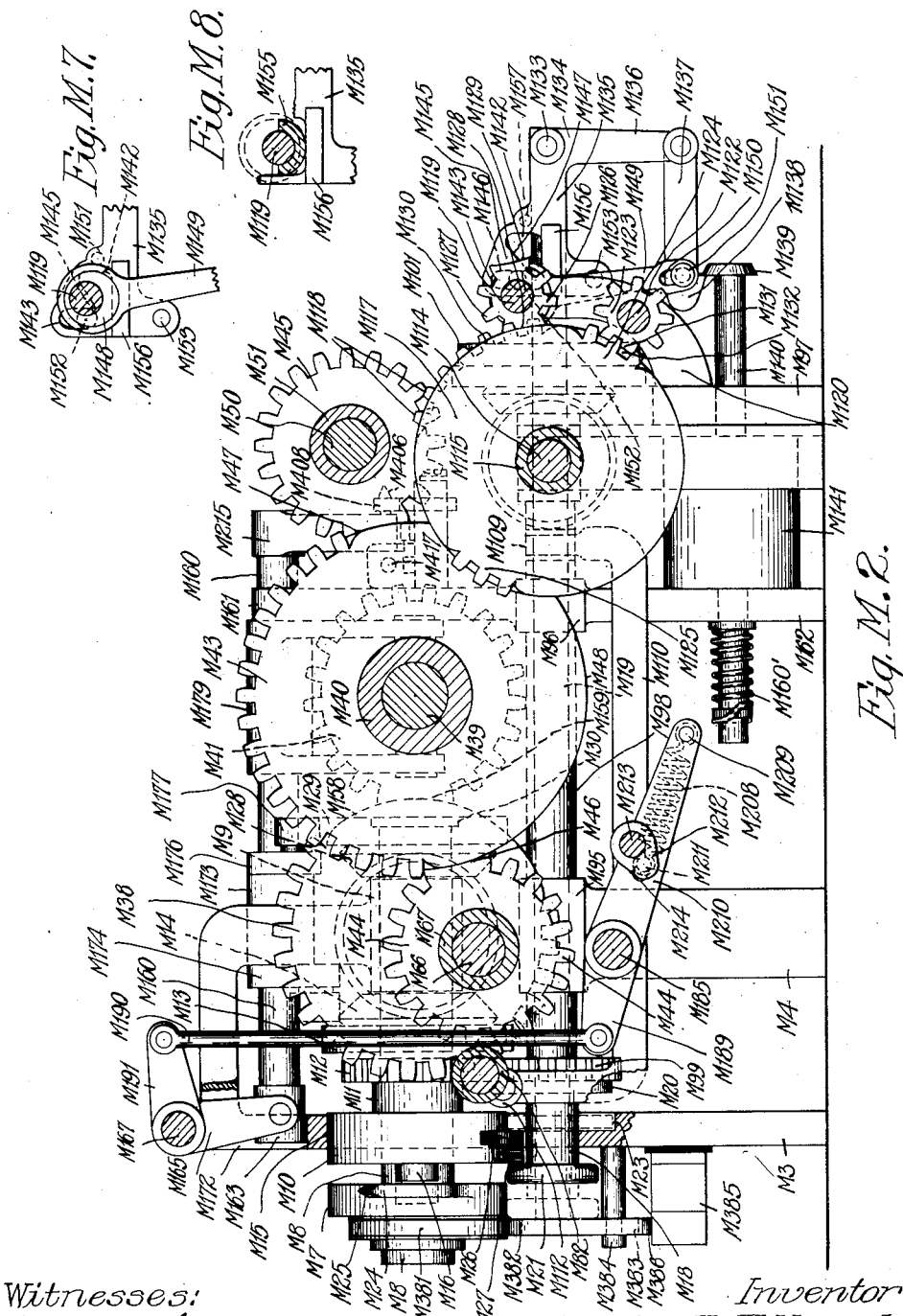

C. H. TALLMADGE.
ACCOUNTING MECHANISM.
APPLICATION FILED SEPT. 7, 1906.
1,084,667.
Patented Jan. 20, 1914.
58 SHEETS—SHEET 16.
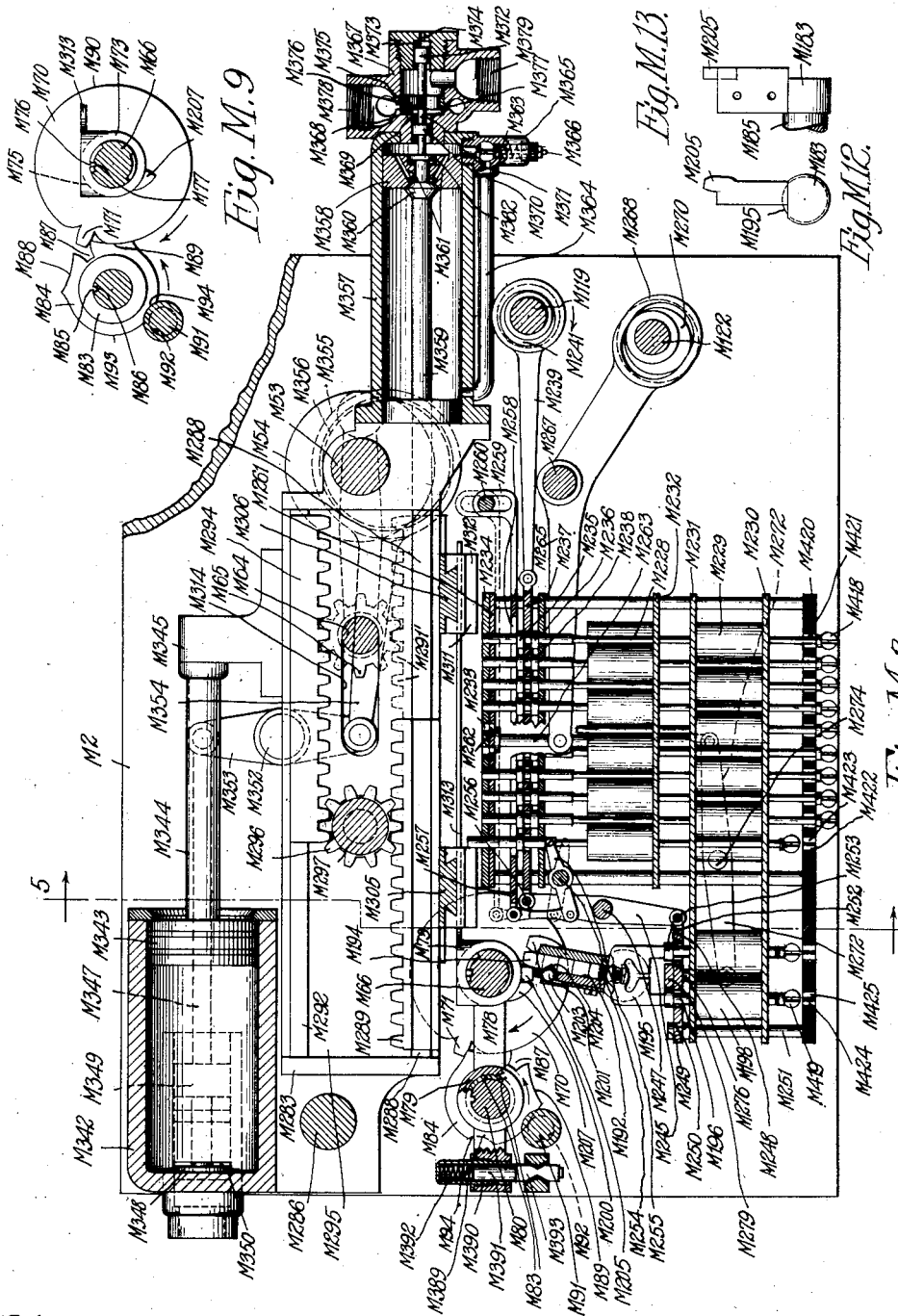
Witnesses:
Leonard W. Novander
George E. Higham
Inventor
Charles H. Tallmadge
By Brown Williams Bell Hanson & Bottcher
Attorneys

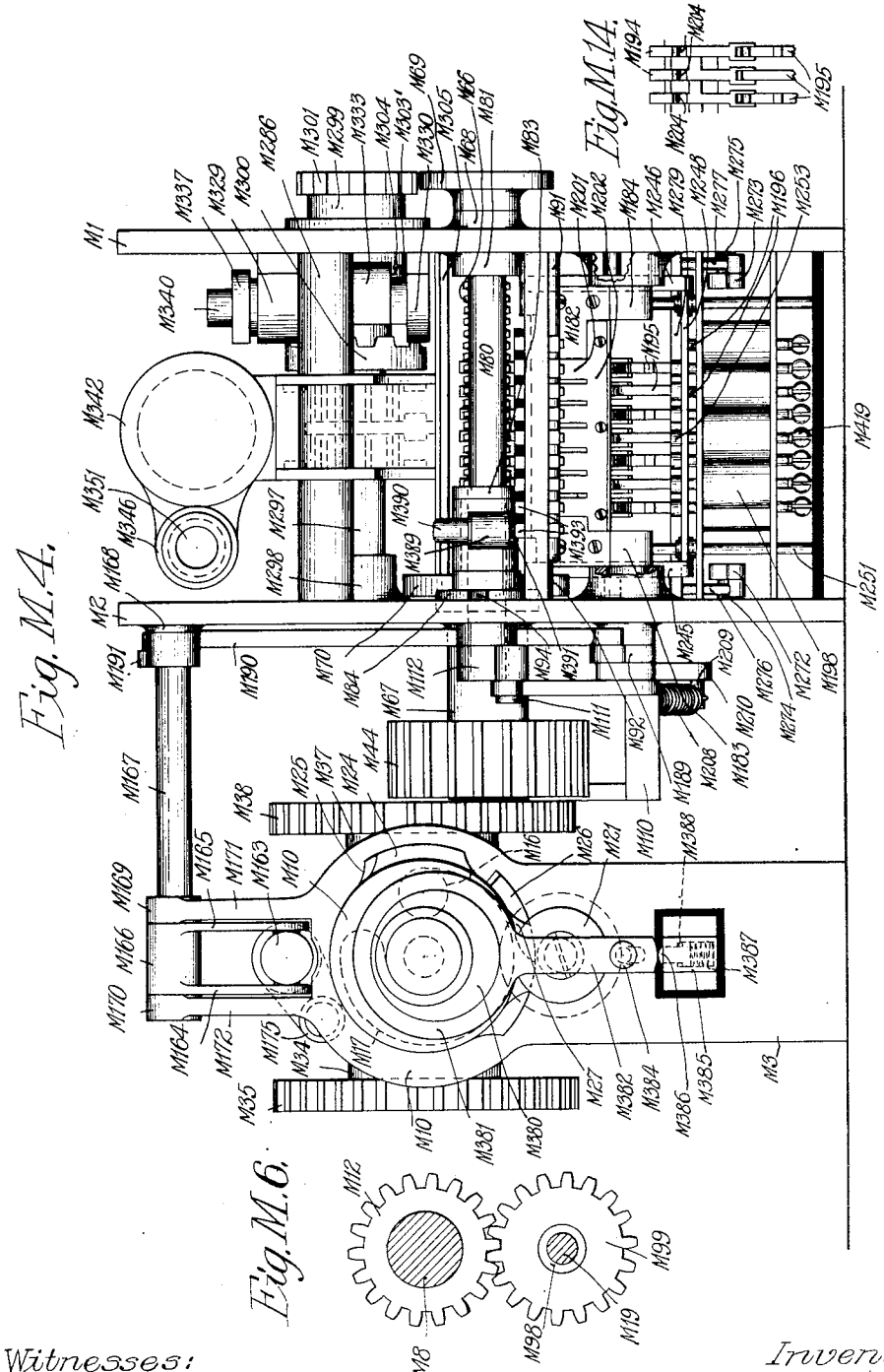

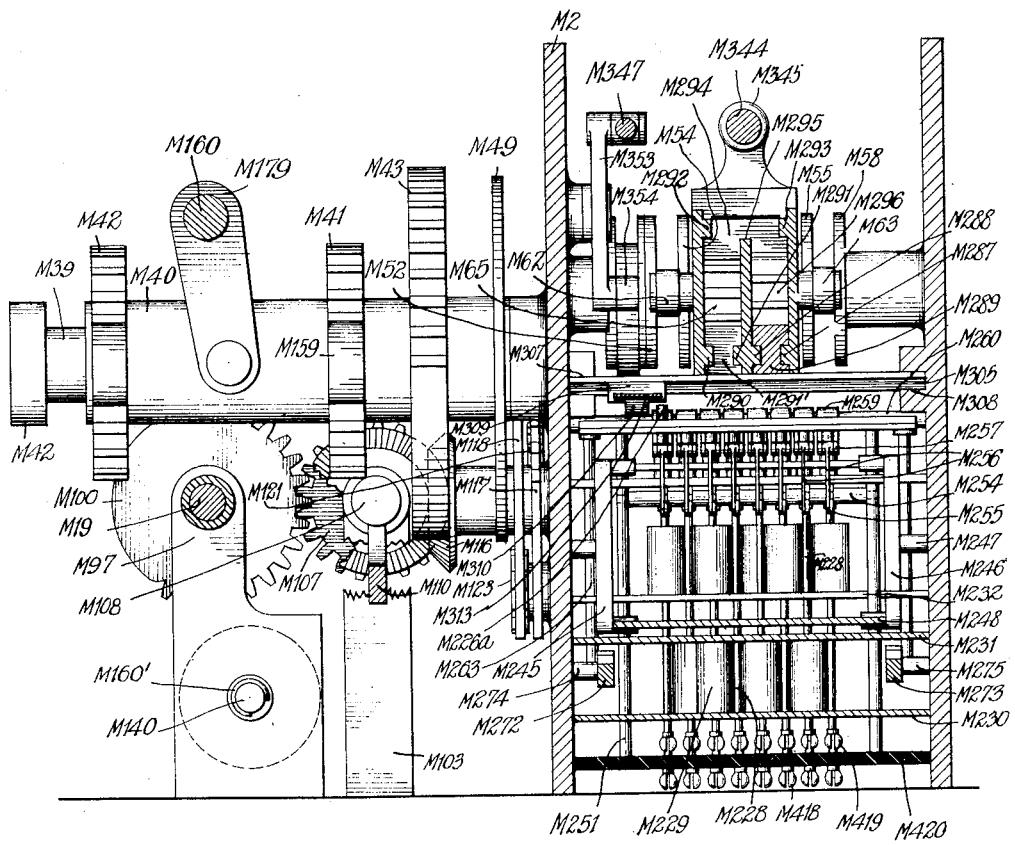
Fig. M.5.

C. H. TALLMADGE.
ACCOUNTING MECHANISM.
APPLICATION FILED SEPT. 7, 1906.
1,084,667.
Patented Jan. 20, 1914.
58 SHEETS—SHEET 19.
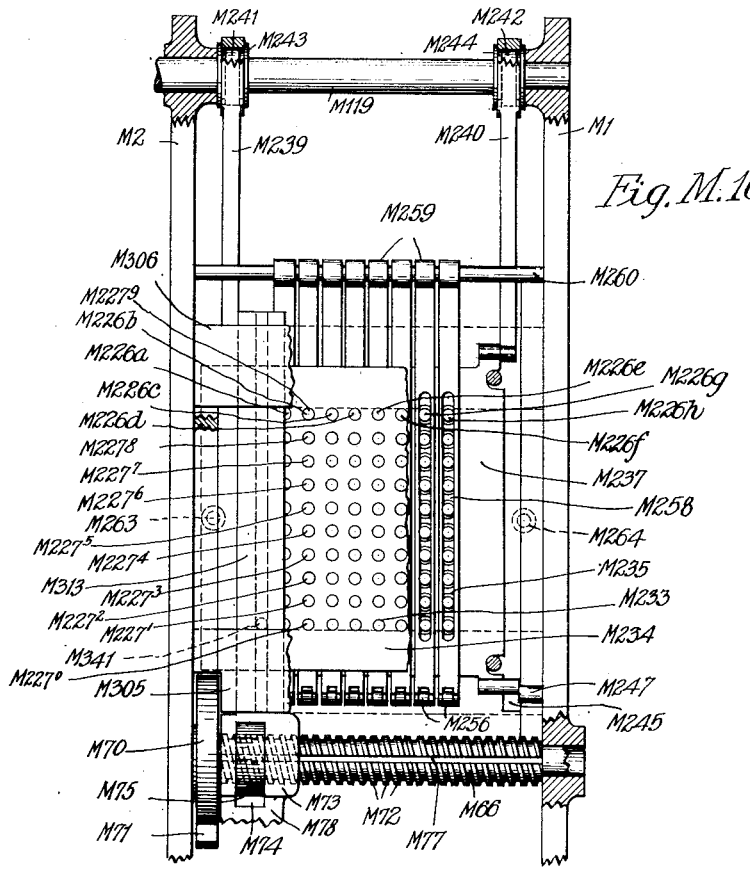
Fig. M.10.
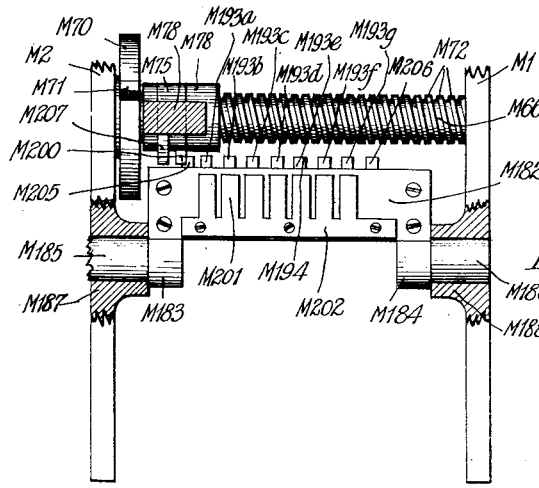
Fig. M.11.
Witnesses:
Leonard W. Novander
George E. Higham.
Inventor
Charles H. Tallmadge
By Brown Williams Bell Hanson & Boettcher
Attorneys

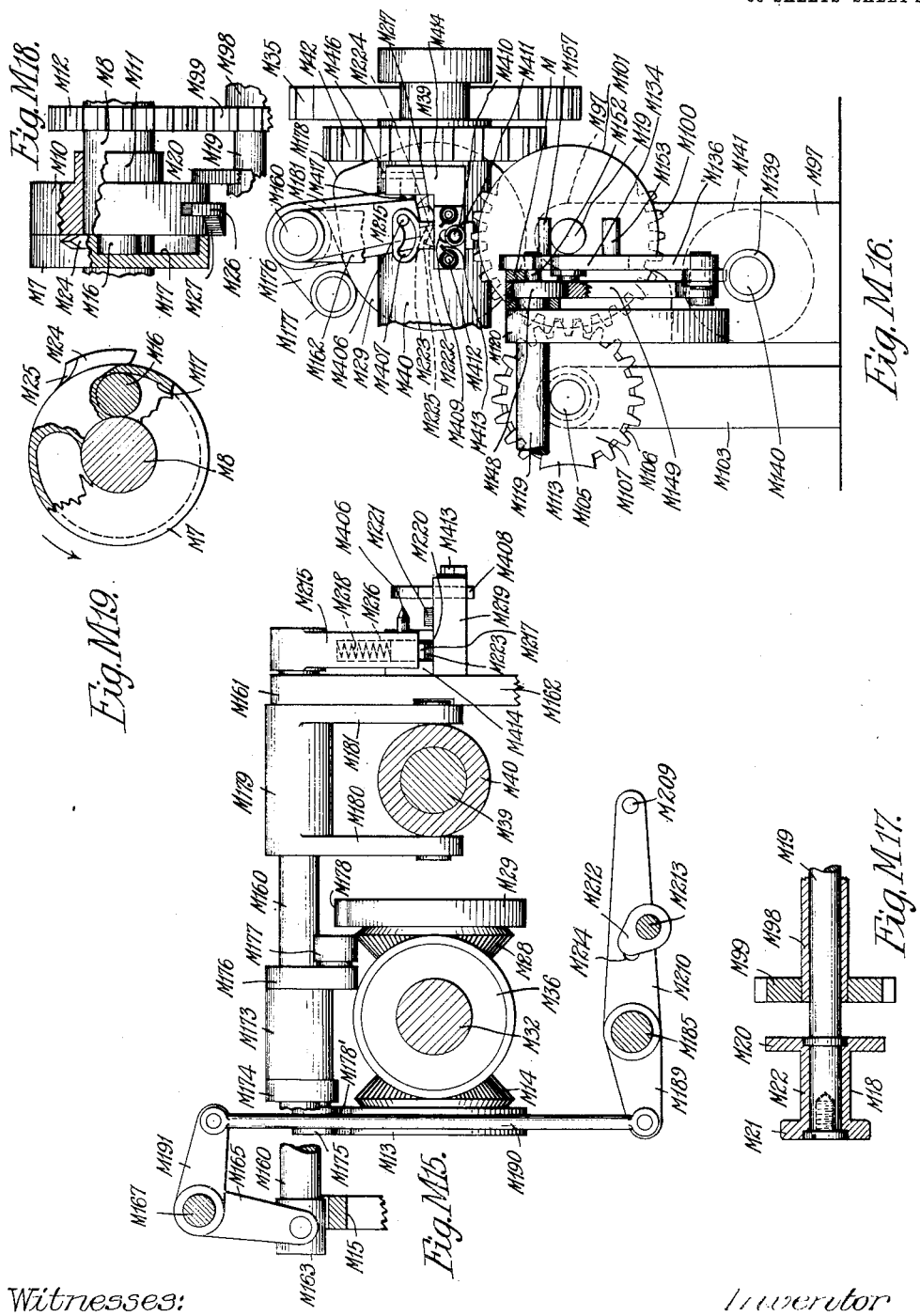

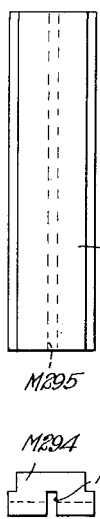
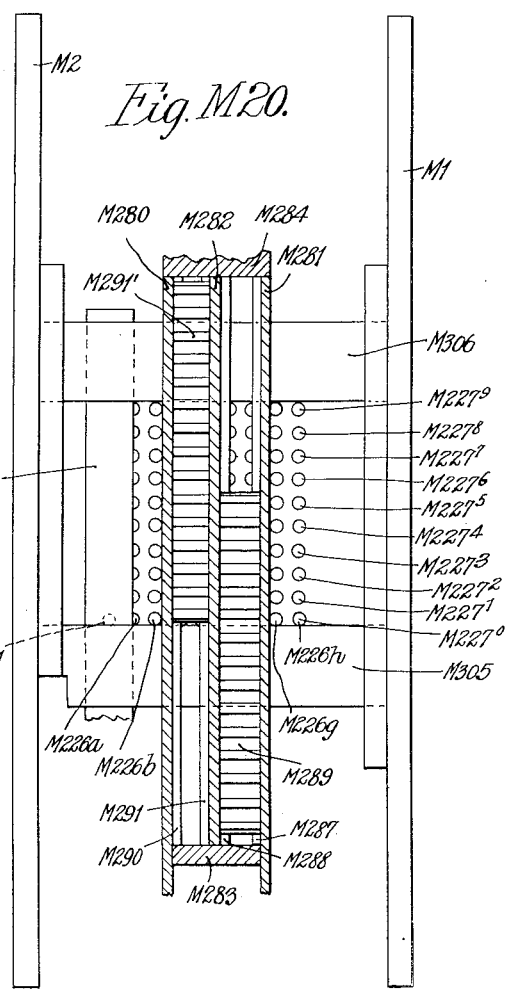

C. H. TALLMADGE.
ACCOUNTING MECHANISM.
APPLICATION FILED SEPT. 7, 1906.
1,084,667.
Patented Jan. 20, 1914.
58 SHEETS—SHEET 22.
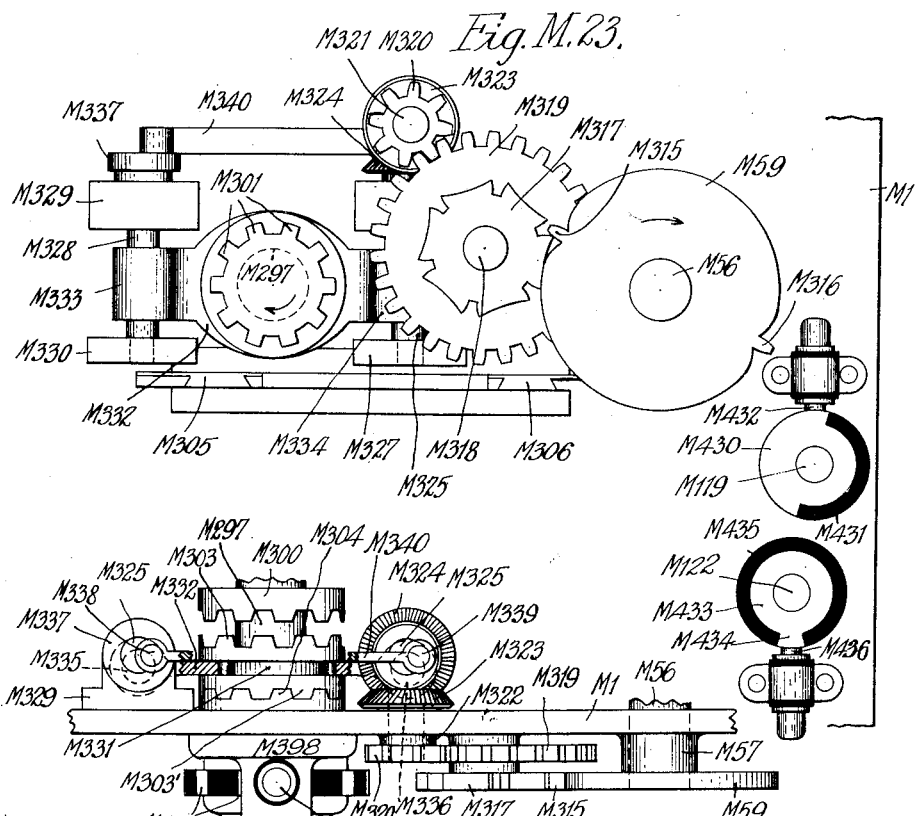
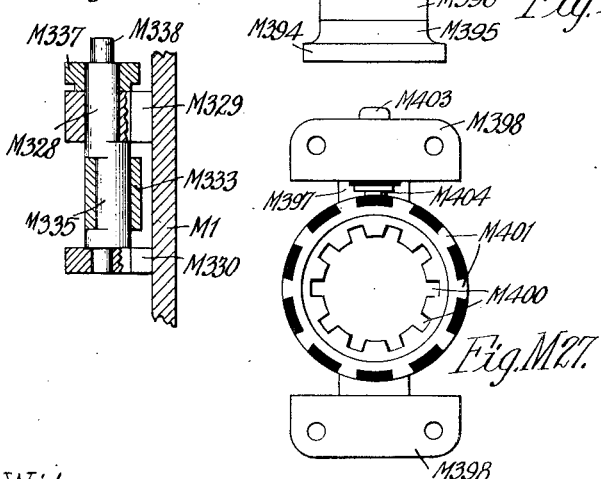
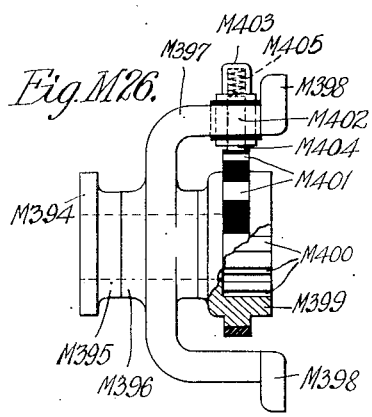
Witnesses:
George C. Higham.
Leonard W. Novander.
Inventor
Charles H. Tallmadge
By Brown Williams Bell Hanson & Boettcher
Attorneys C. H. TALLMADGE.
ACCOUNTING MECHANISM.
APPLICATION FILED SEPT. 7, 1906.
1,084,667.
Patented Jan. 20, 1914.
58 SHEETS—SHEET 23.
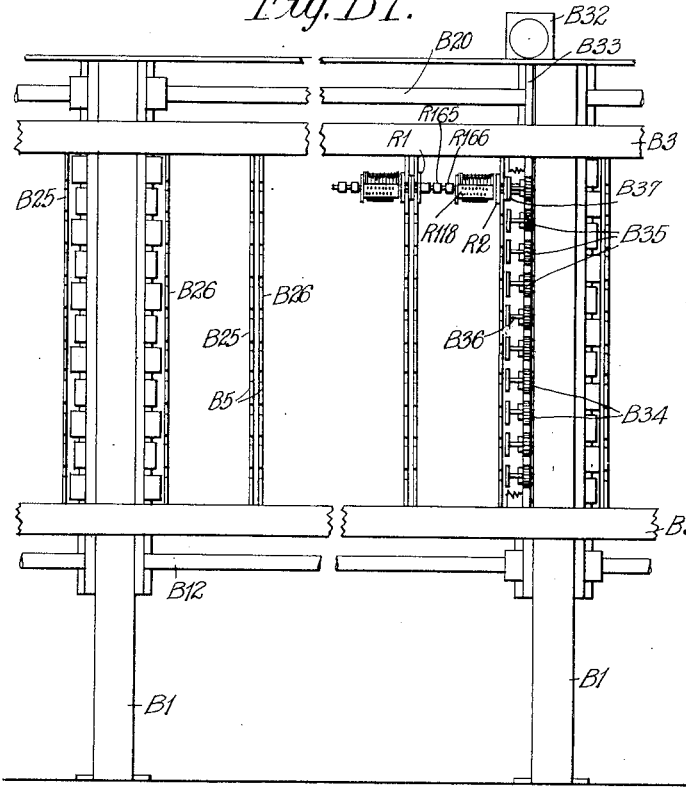
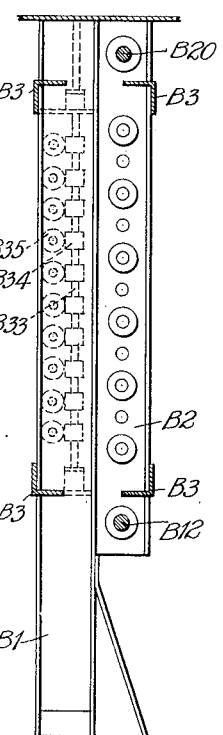
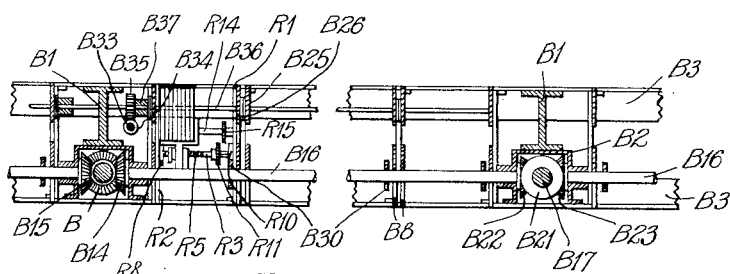
Witnesses:
Leonard W. Novander
George E. Higham
Inventor
Charles H. Tallmadge
By Brown, Williams, Bell, Hanson & Boettcher
Attorneys C. H. TALLMADGE.
ACCOUNTING MECHANISM.
APPLICATION FILED SEPT. 7, 1906.
1,084,667.
Patented Jan. 20, 1914.
58 SHEETS—SHEET 24.
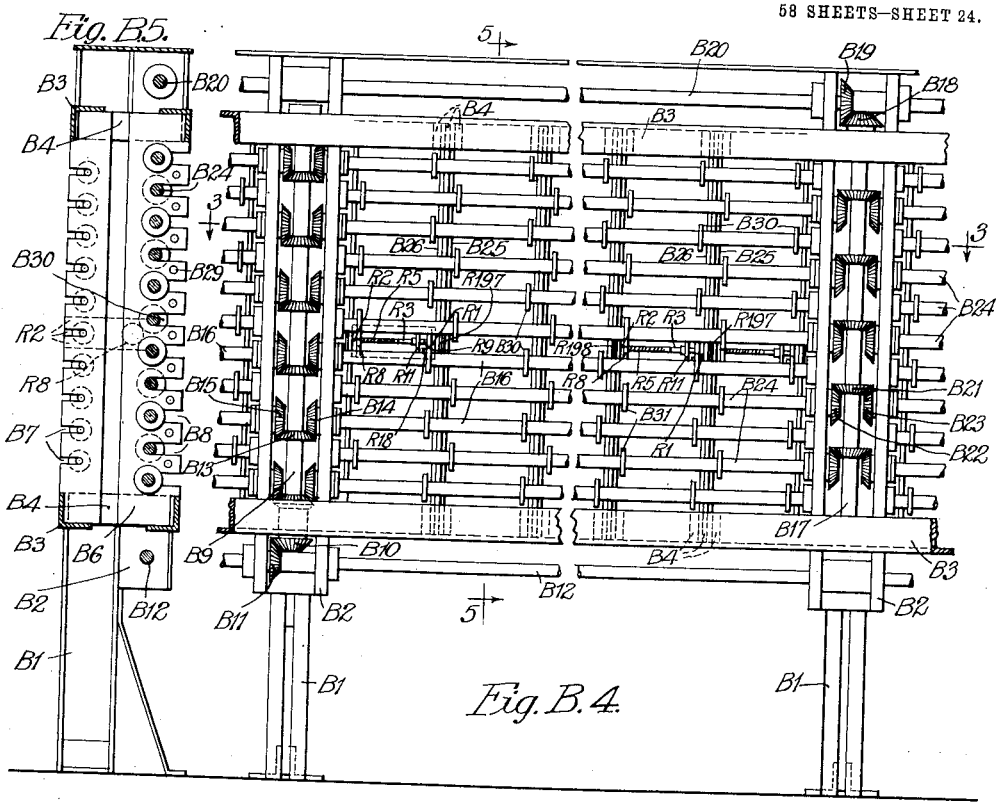
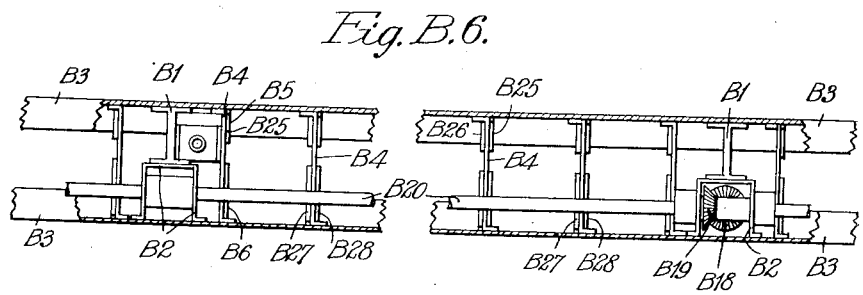
Witnesses:
Leonard W. Novander
George C. Higham
Inventor
Charles H. Tallmadge
By Brown Williams Bell Hanson & Boettcher
Attorneys C. H. TALLMADGE.
ACCOUNTING MECHANISM.
APPLICATION FILED SEPT. 7, 1906.
1,084,667.
Patented Jan. 20, 1914.
58 SHEETS—SHEET 25.
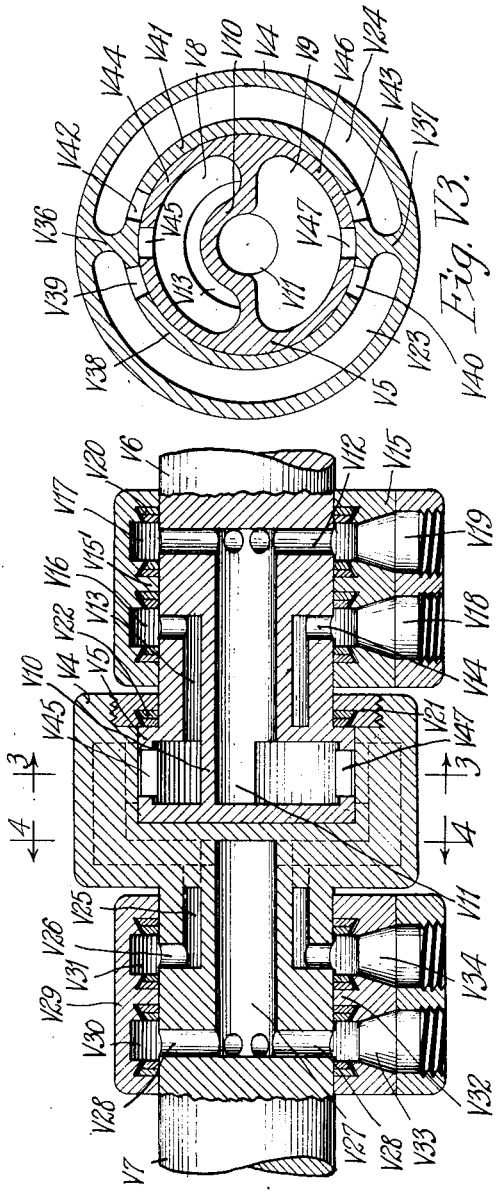
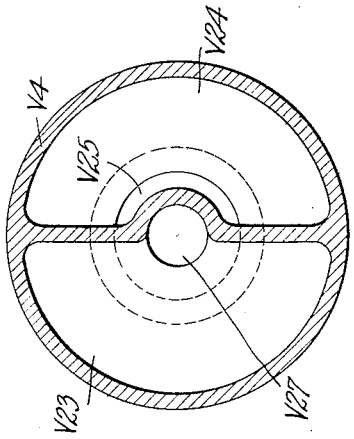
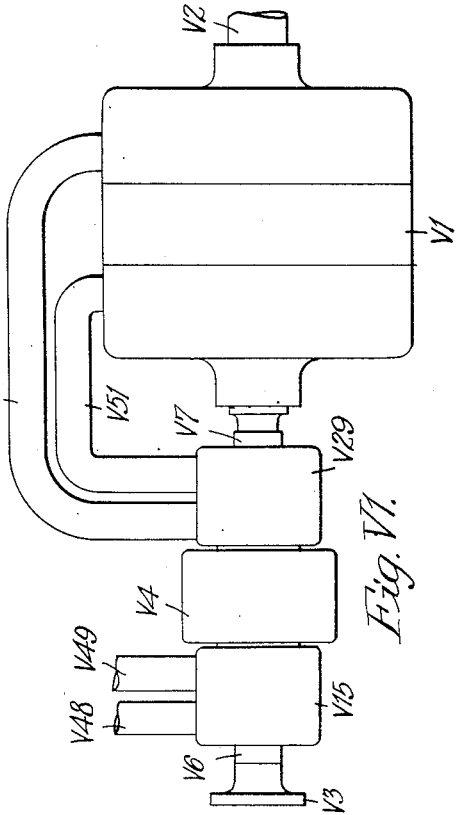
Witnesses:
Leonard W. Novander
George E. Higham
Inventor
Charles H. Tallmadge
By Brown, Williams, Bell, Hanson & Boettcher
Attorneys C. H. TALLMADGE.
ACCOUNTING MECHANISM.
APPLICATION FILED SEPT. 7, 1906.
1,084,667.
Patented Jan. 20, 1914.
58 SHEETS—SHEET 26.
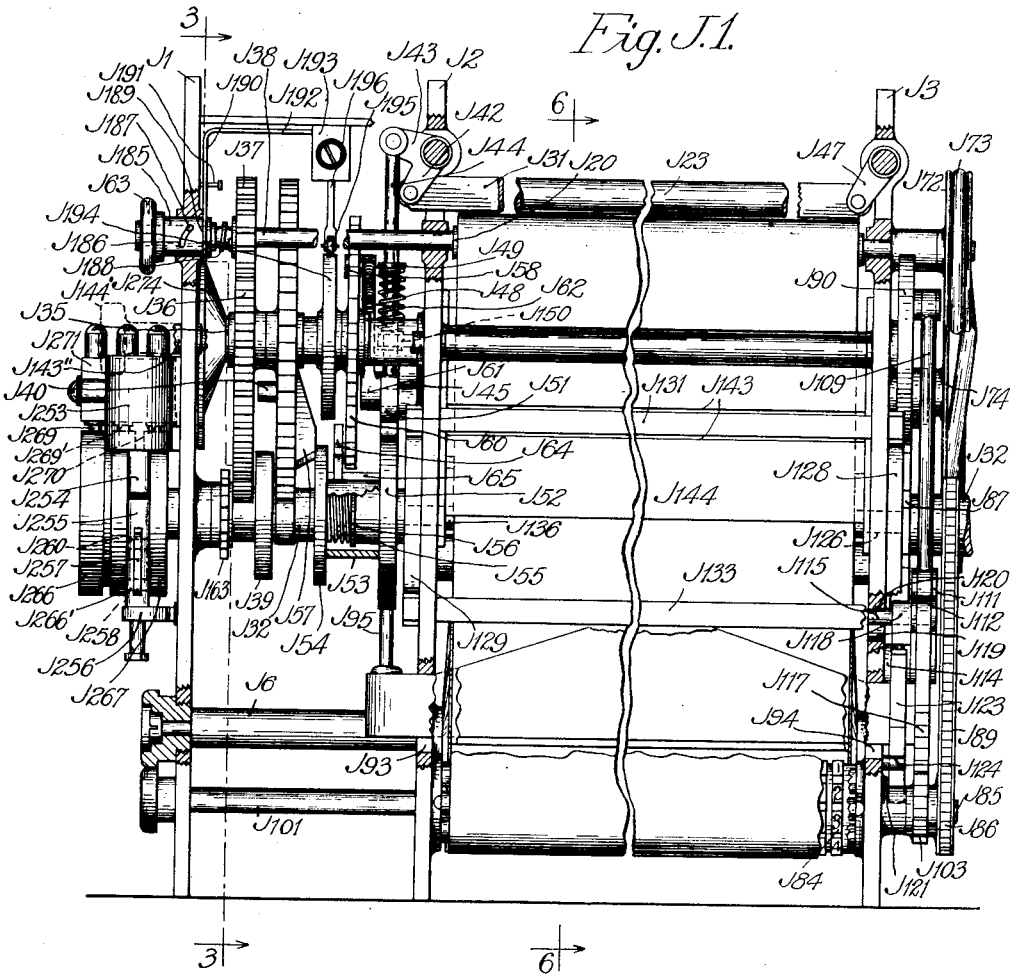
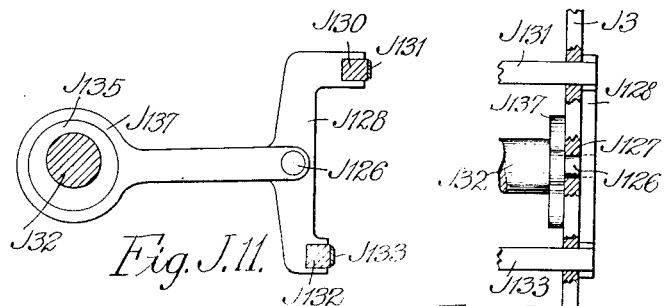
Witnesses:
George C. Higham.
Leonard W. Novander.
Inventor:
Charles H. Tallmadge
By Brown Williams Bell Hanson & Boettcher
Attorneys

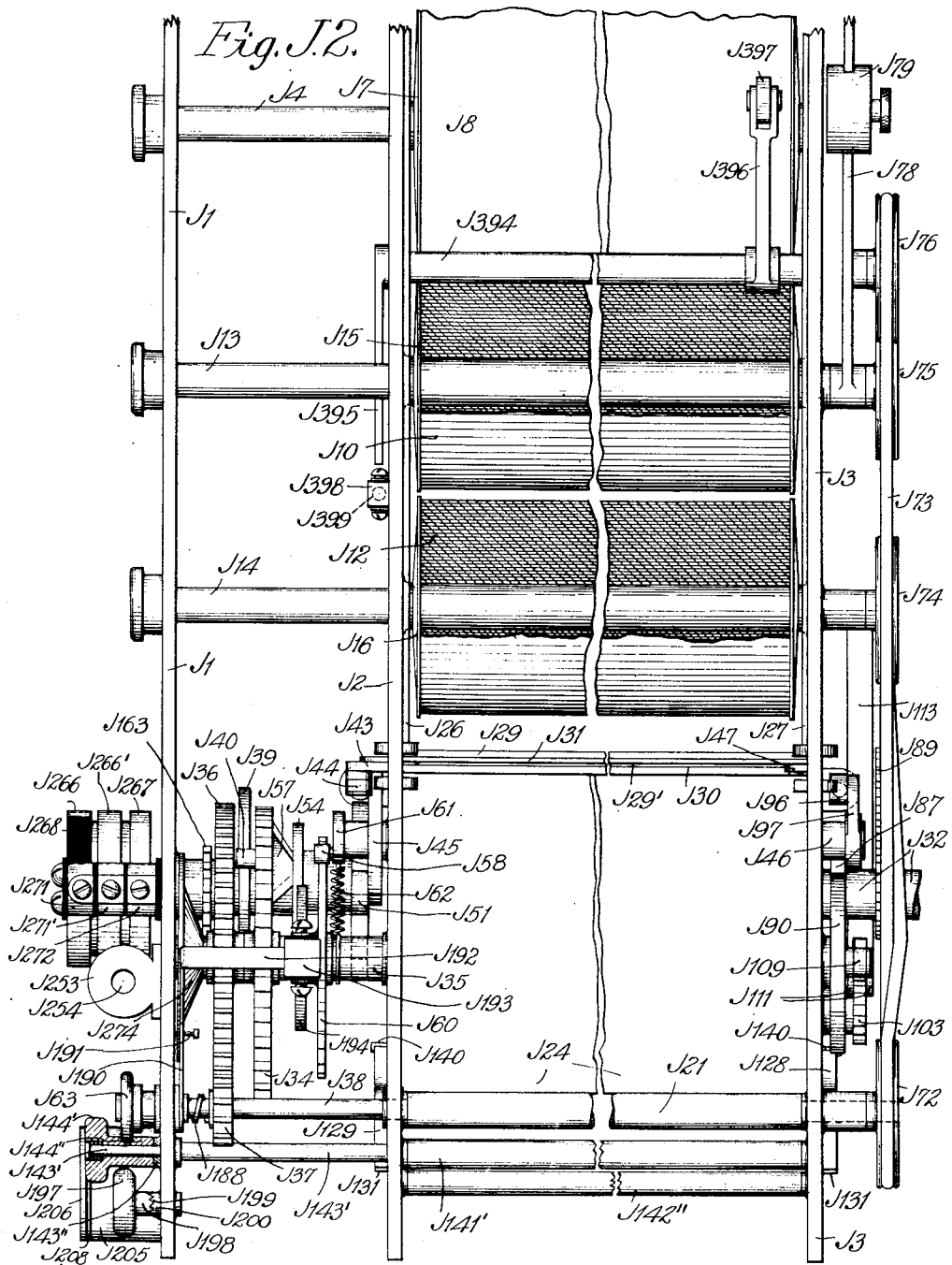

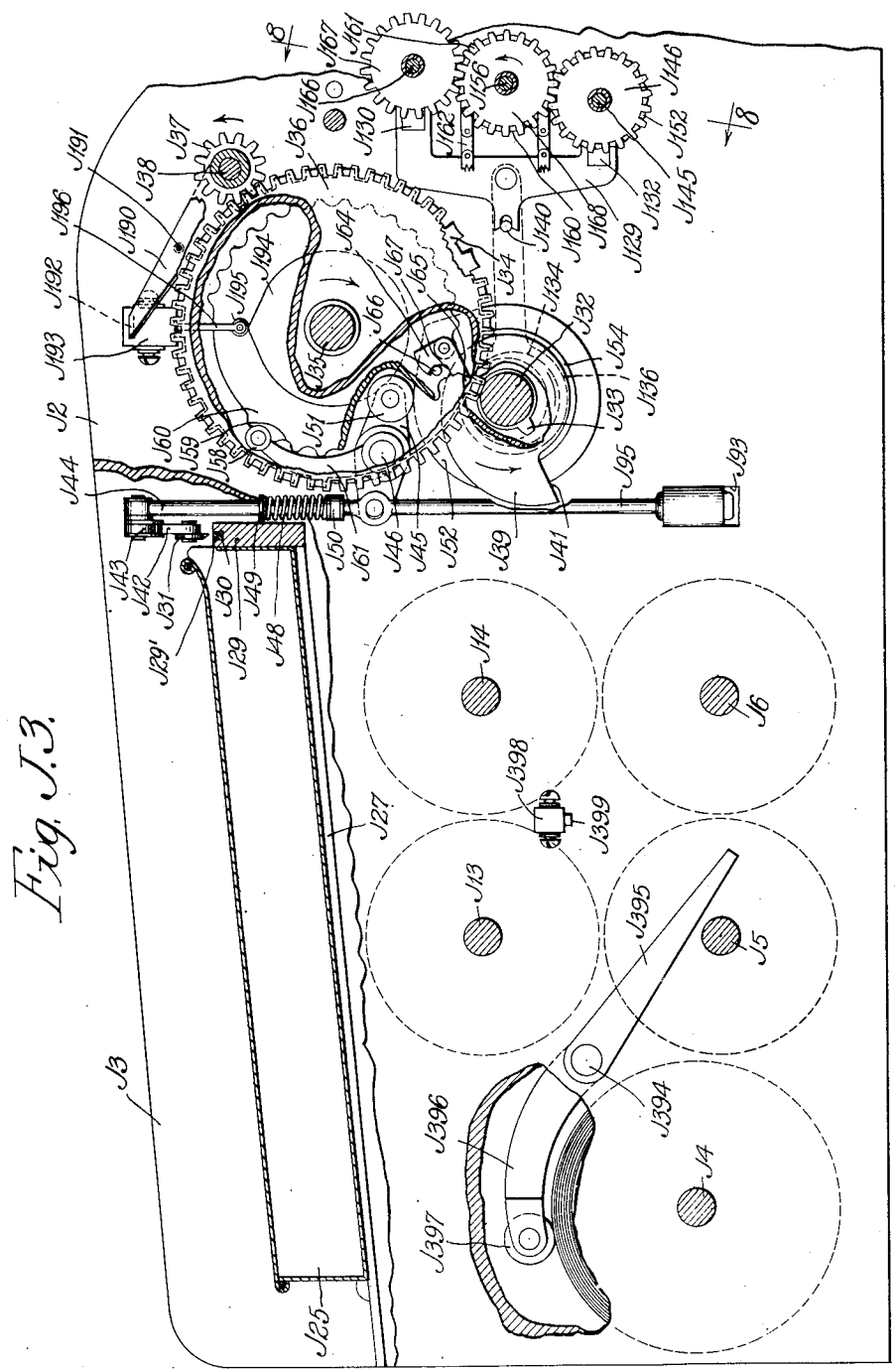

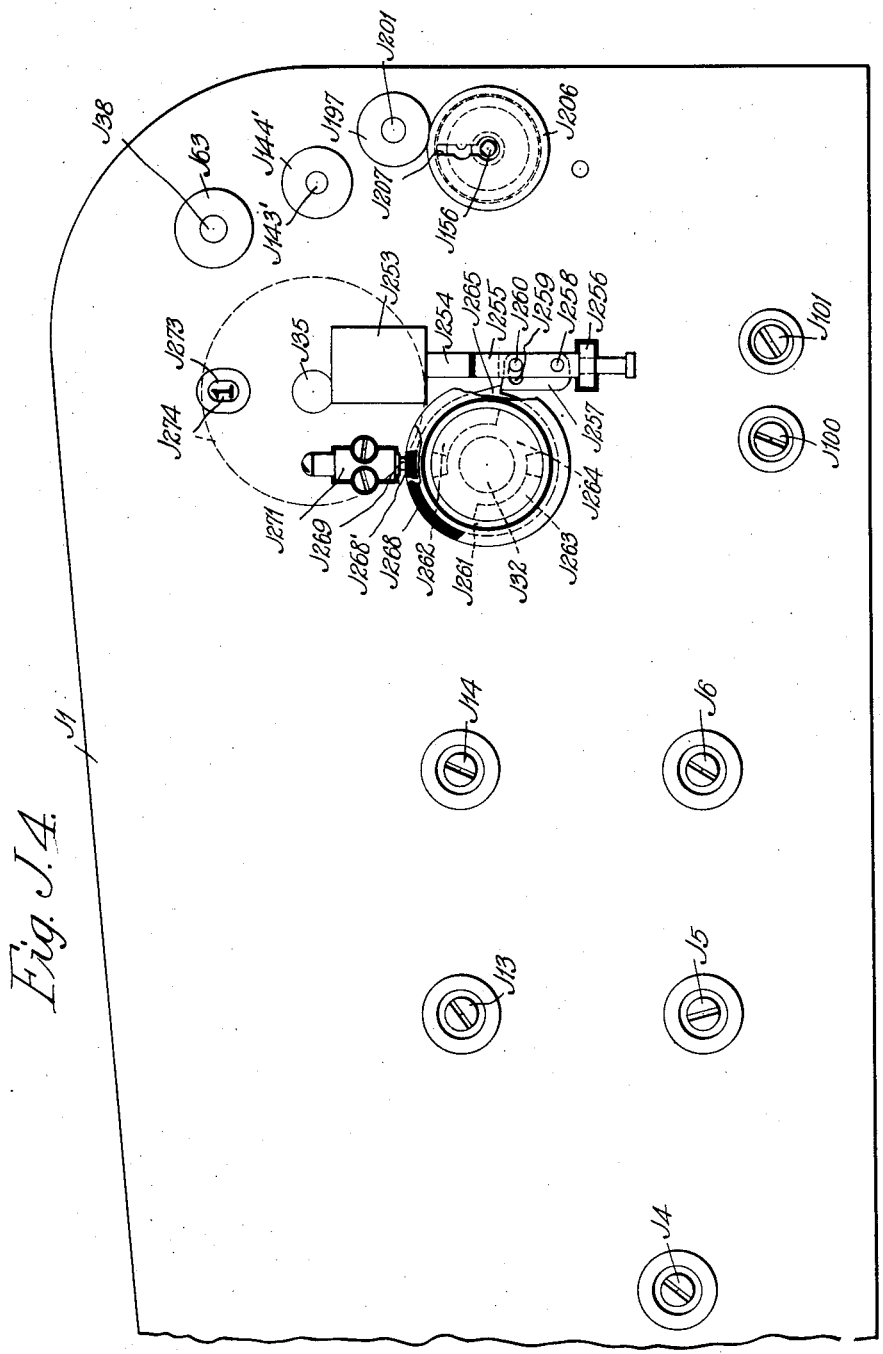

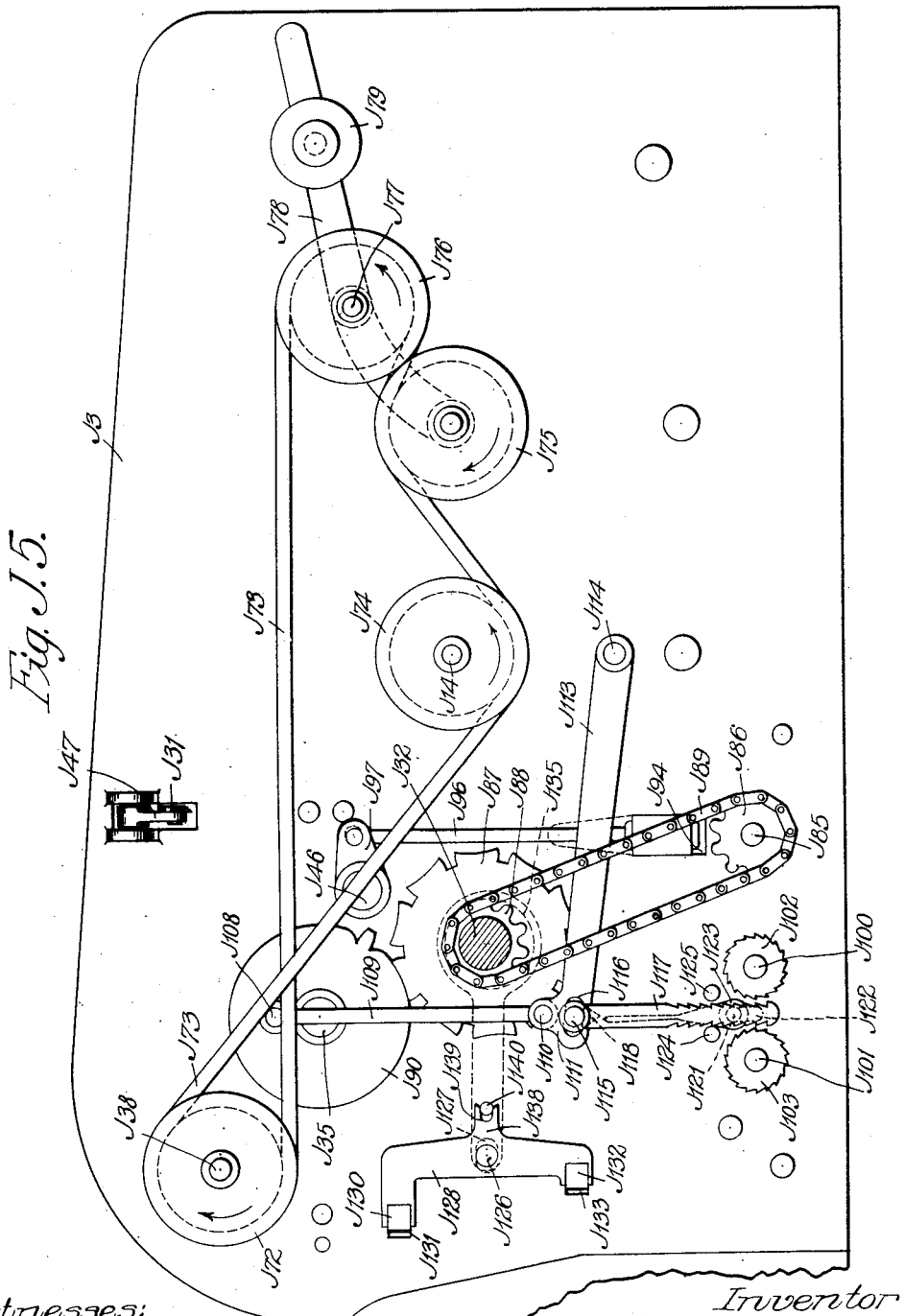

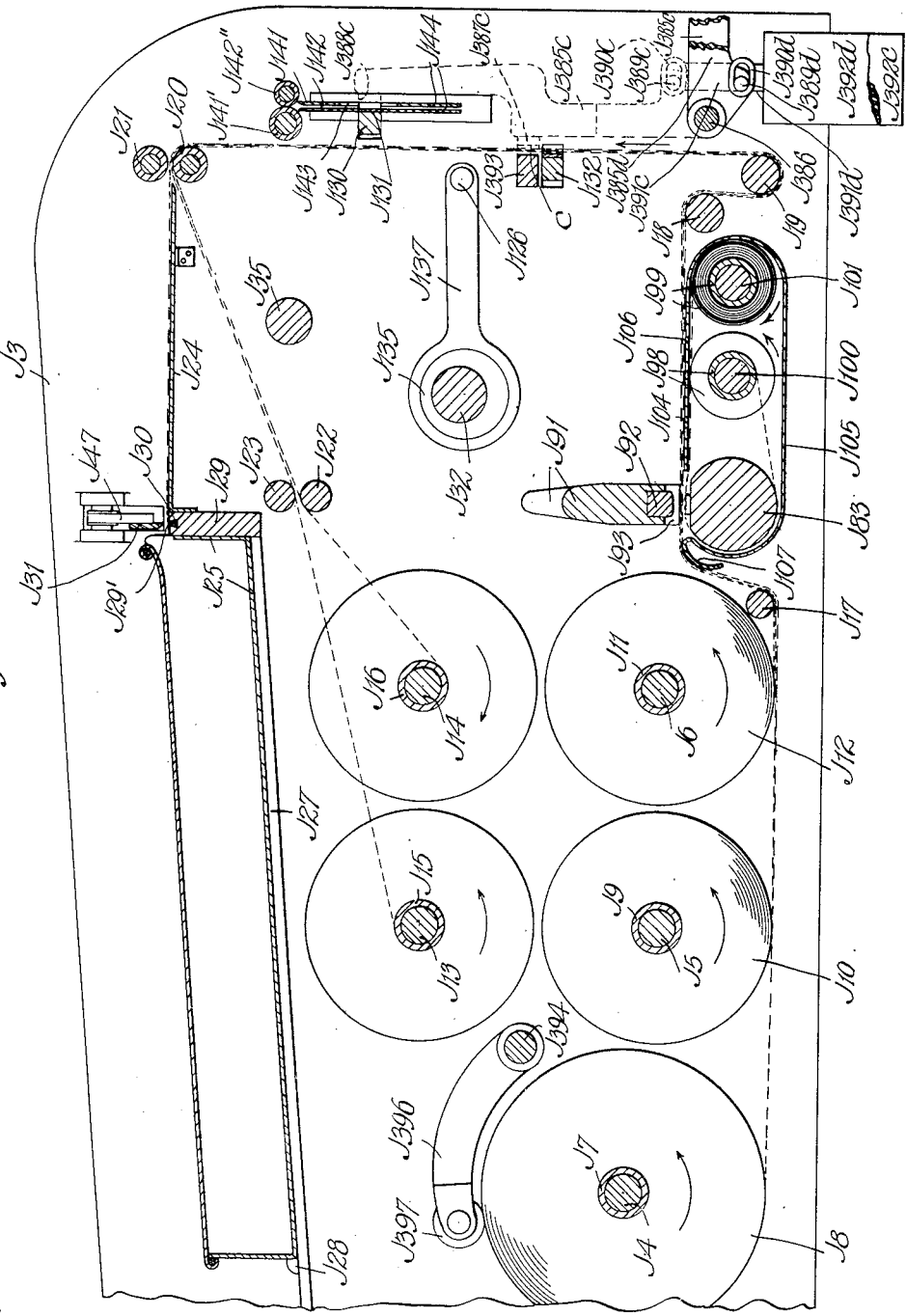

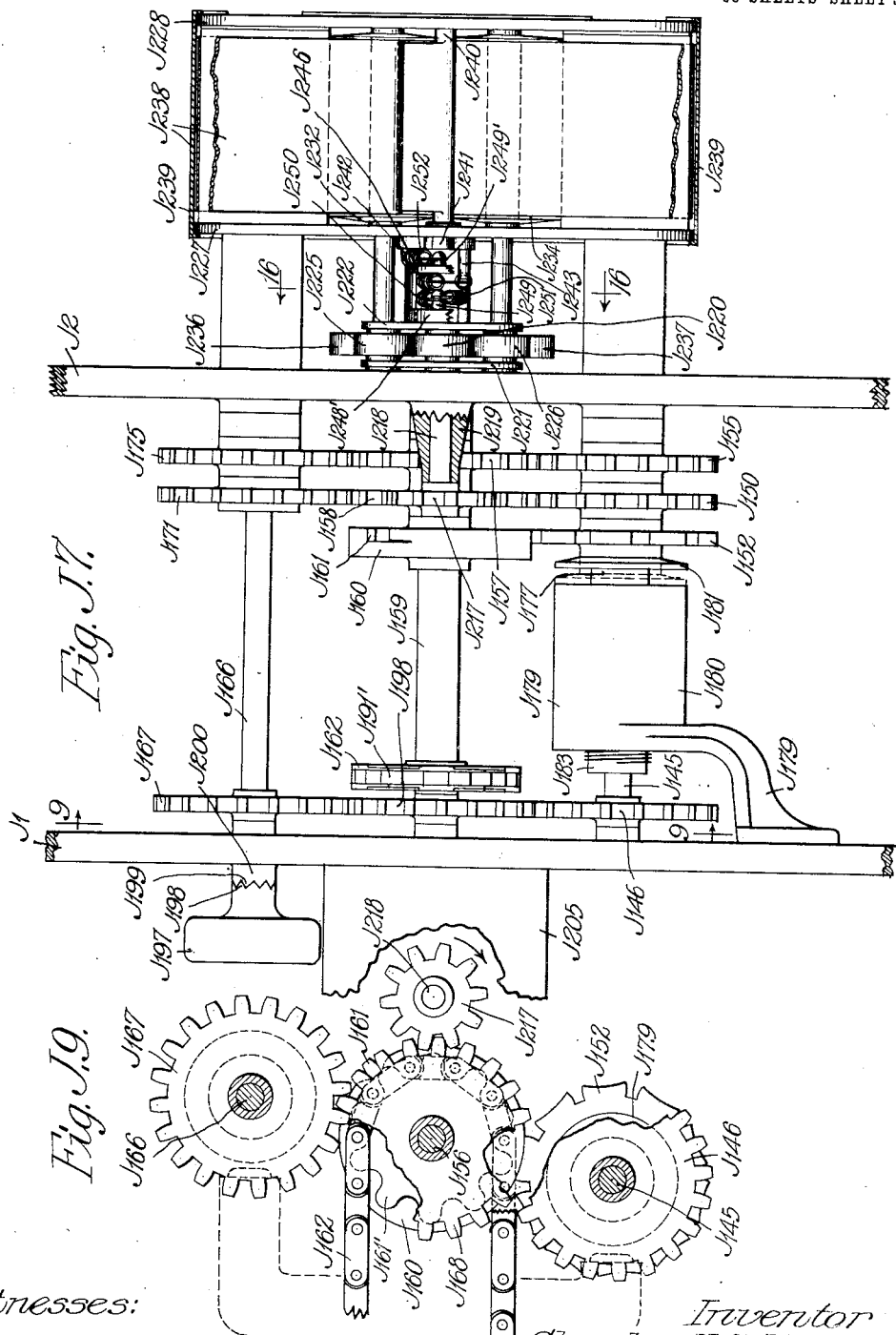

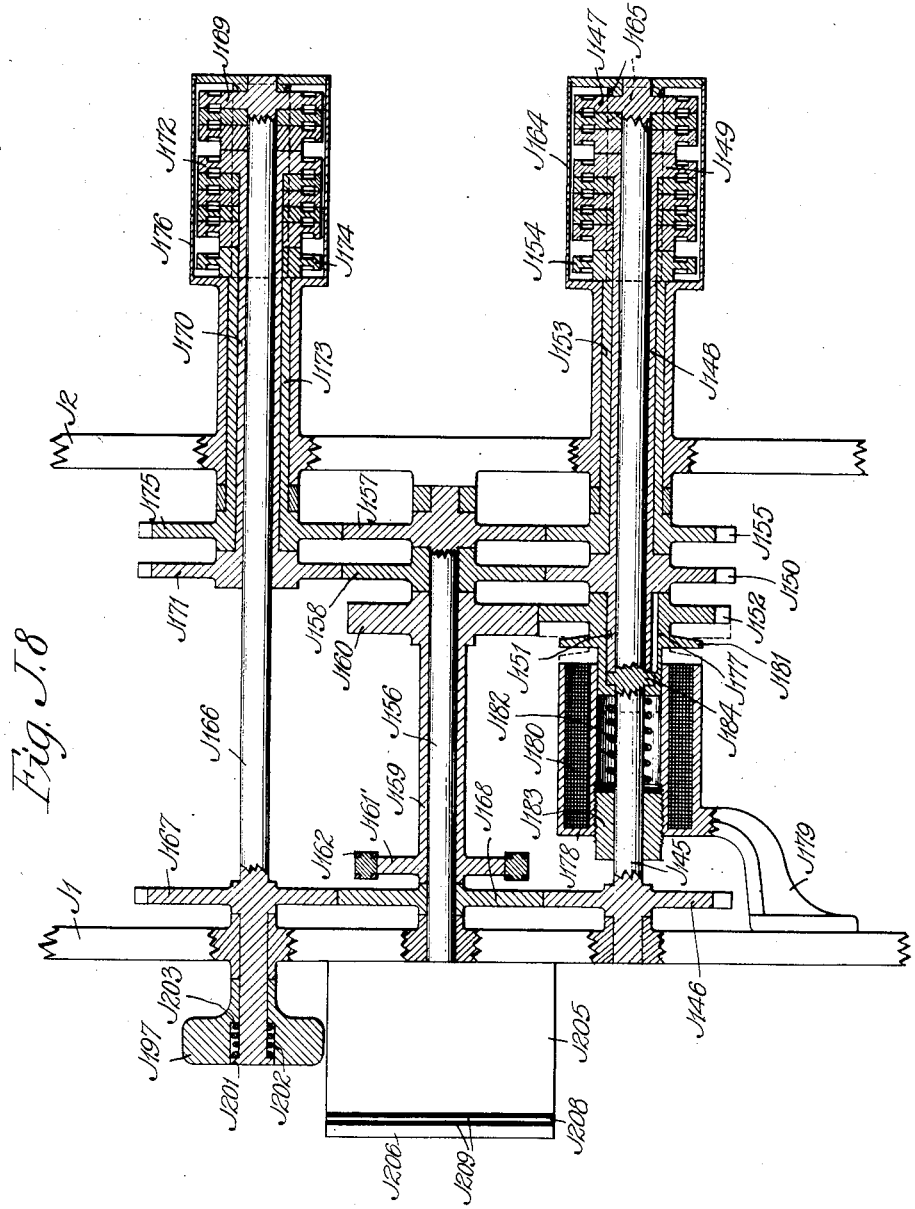

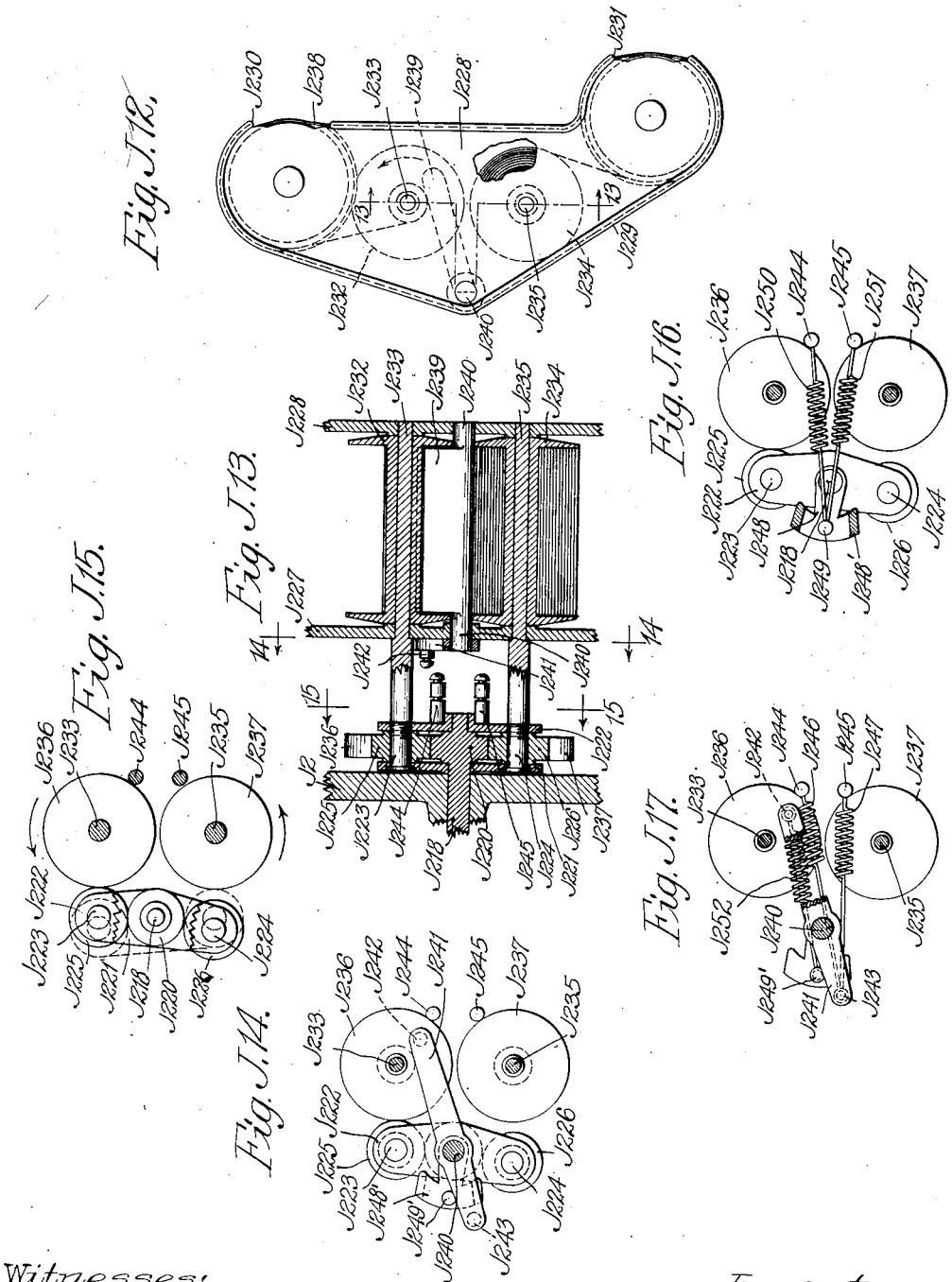

C. H. TALLMADGE.
ACCOUNTING MECHANISM.
APPLICATION FILED SEPT. 7, 1906.
1,084,667.
Patented Jan. 20, 1914.
58 SHEETS—SHEET 35.
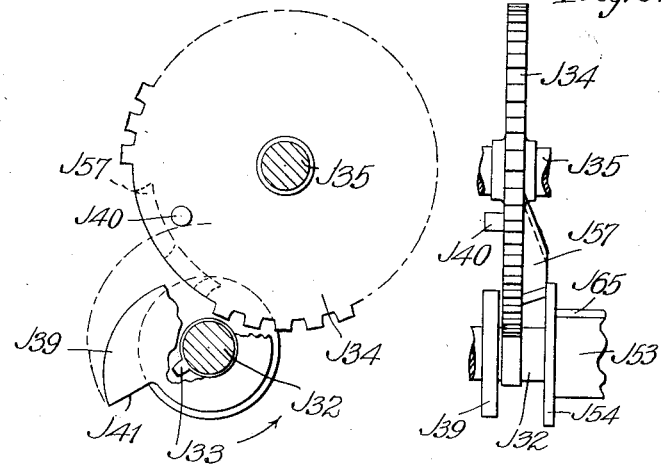
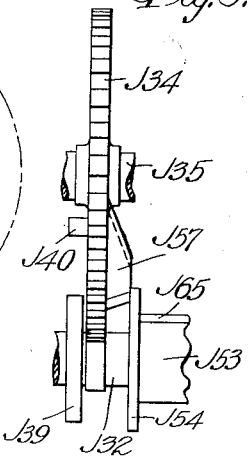
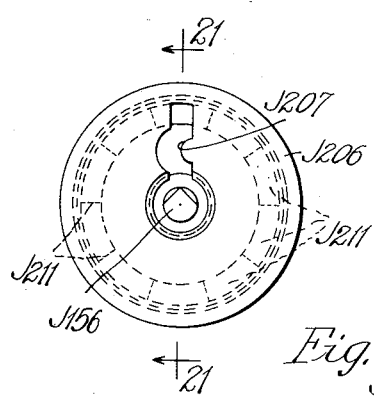
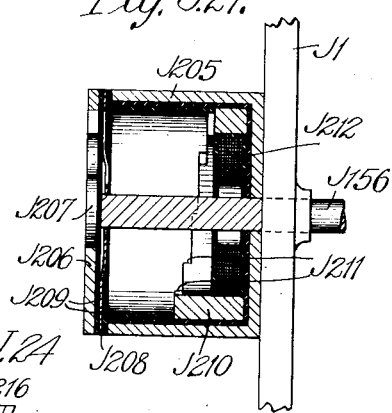
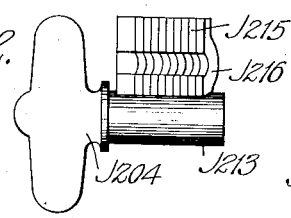
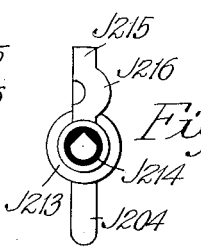
Witnesses:
George C. Higham
Leonard W. Novander
Inventor
Charles H. Tallmadge
By Brown Williams Bell Hanson & Boettcher
Attorneys

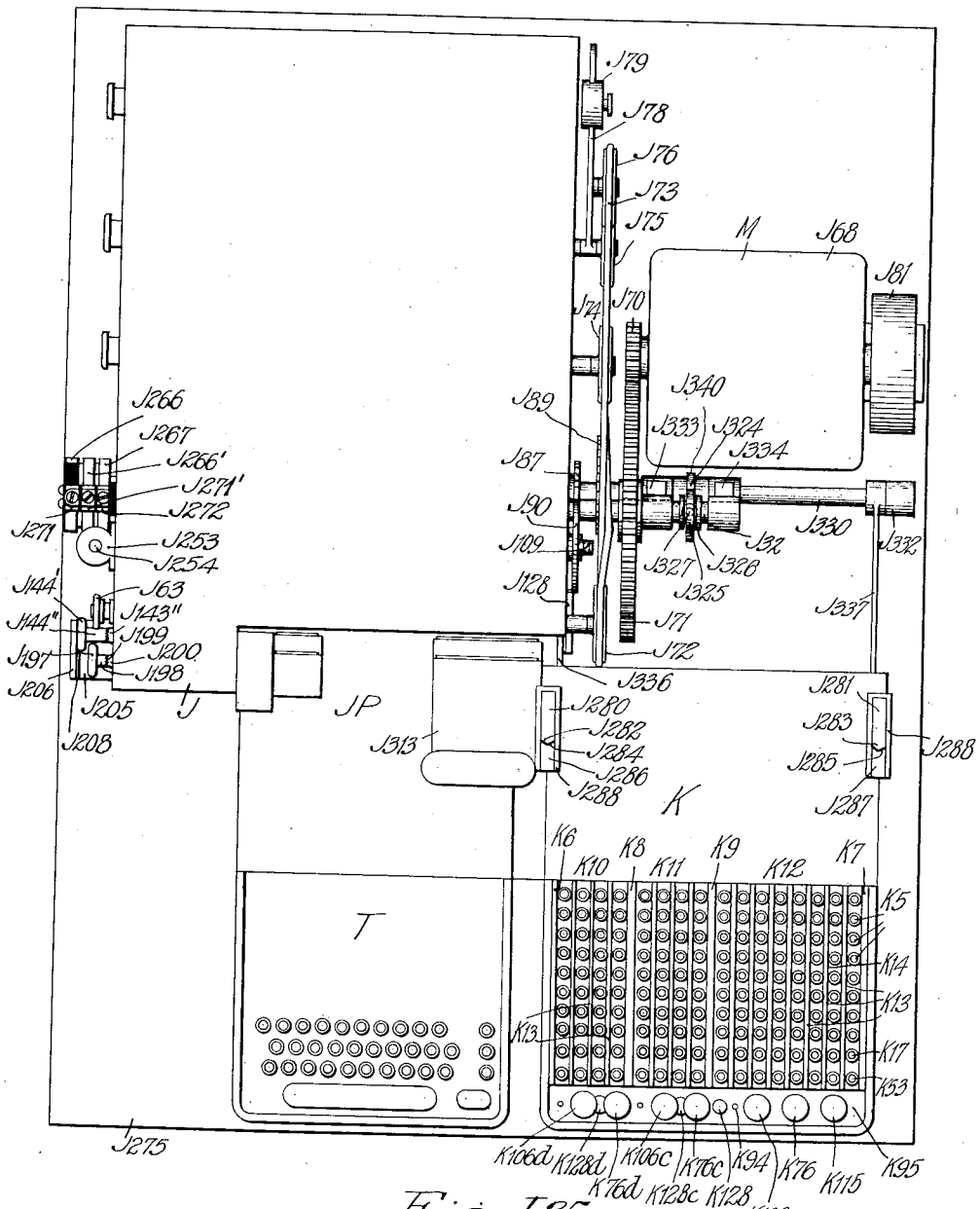

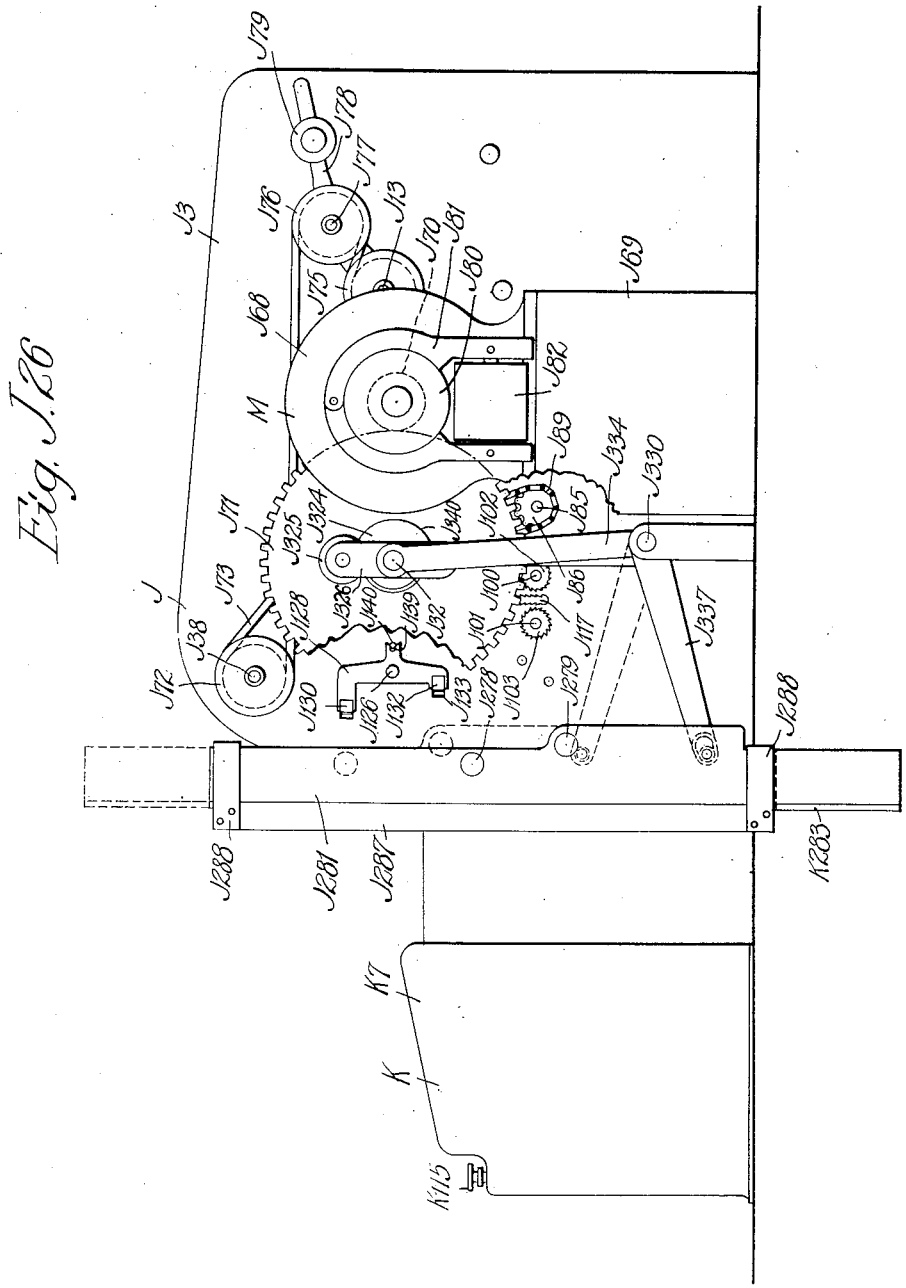

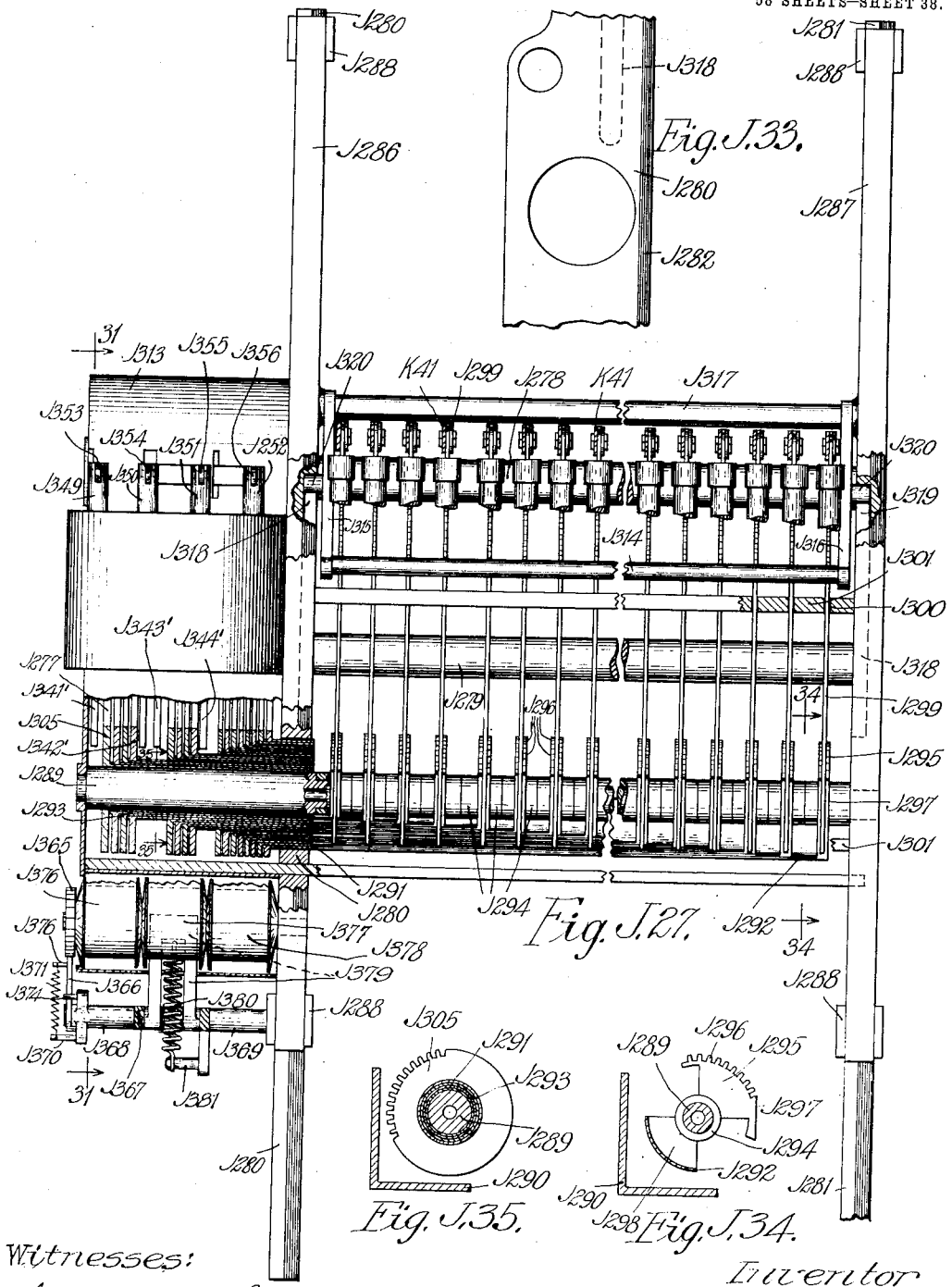

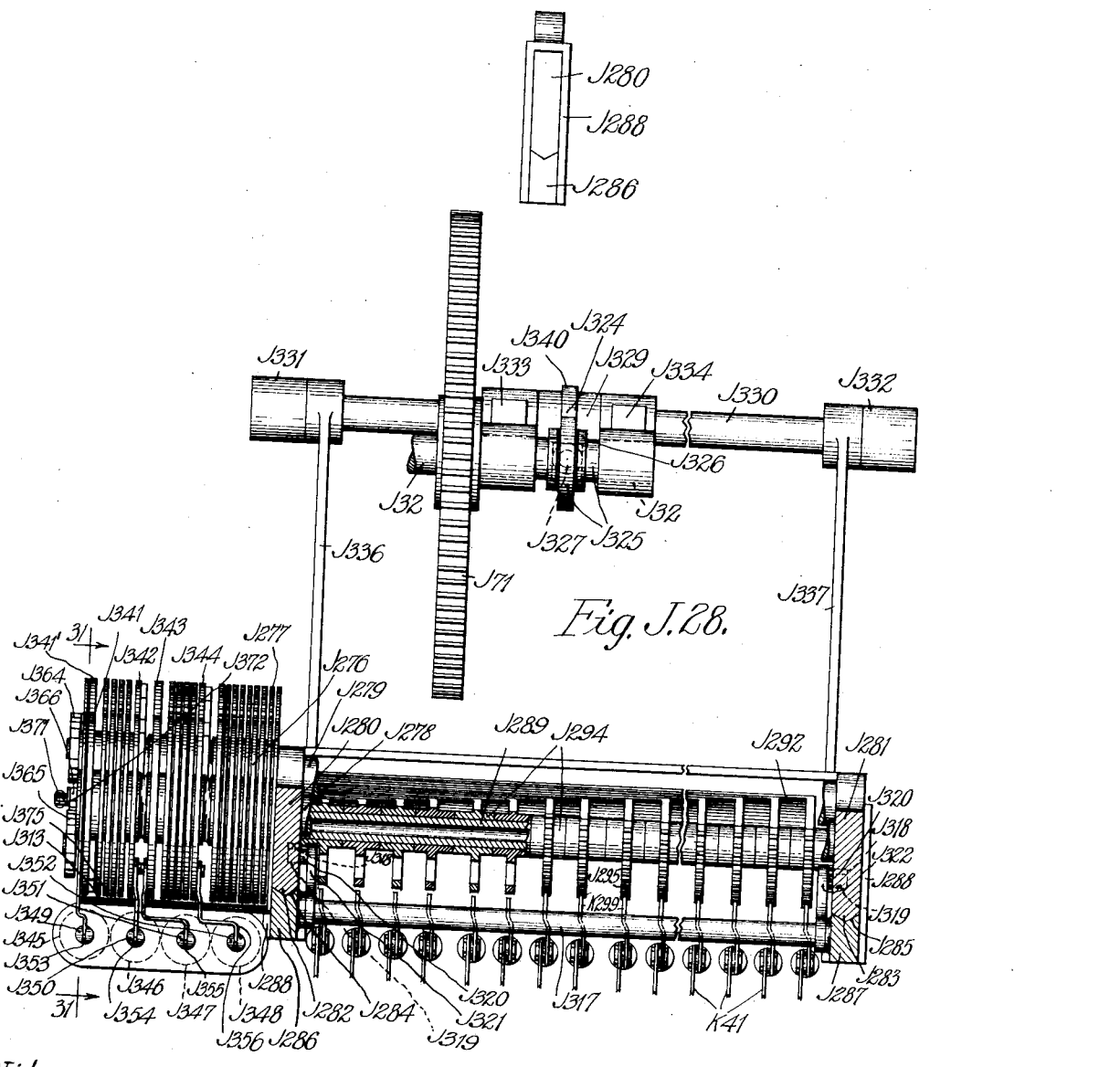

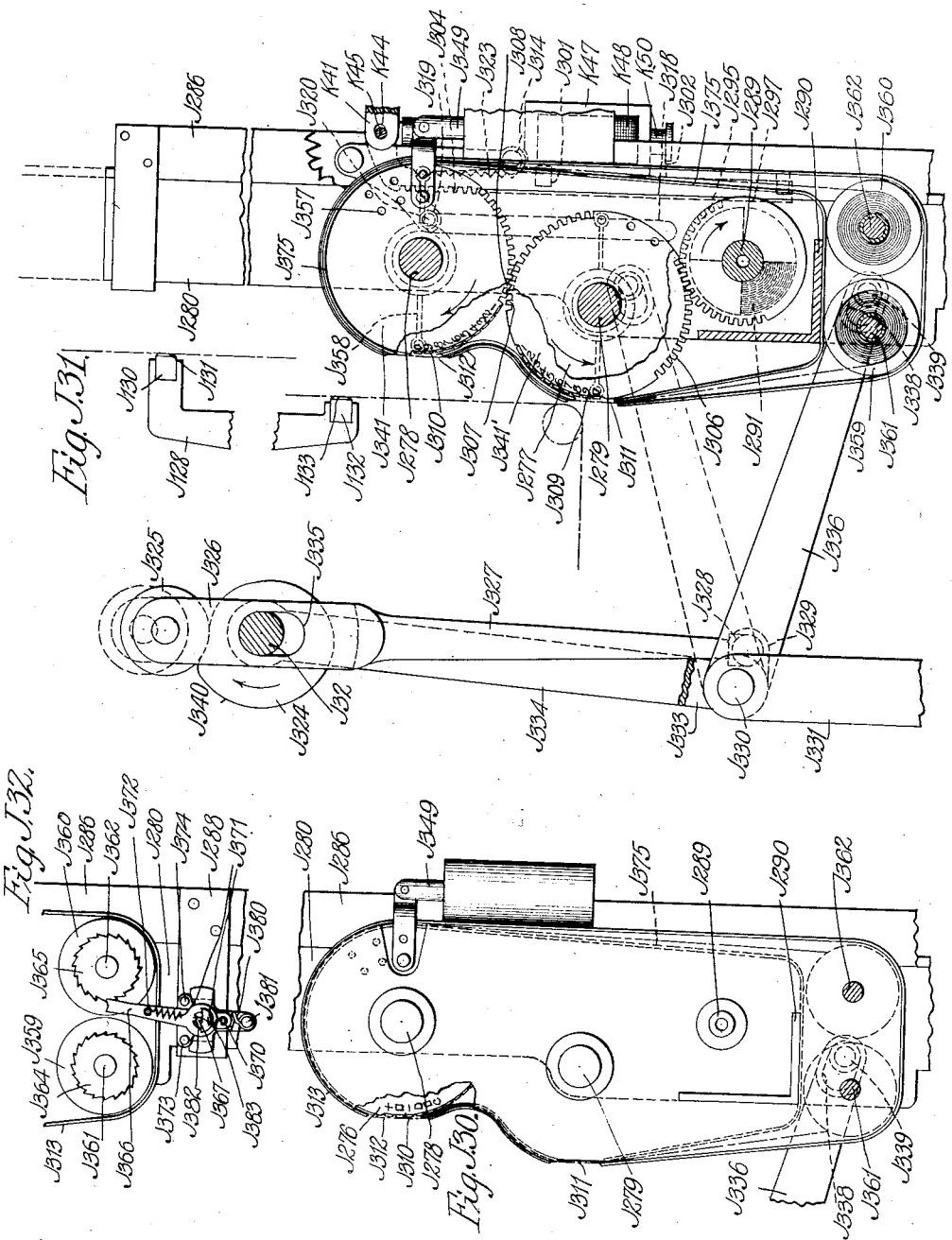

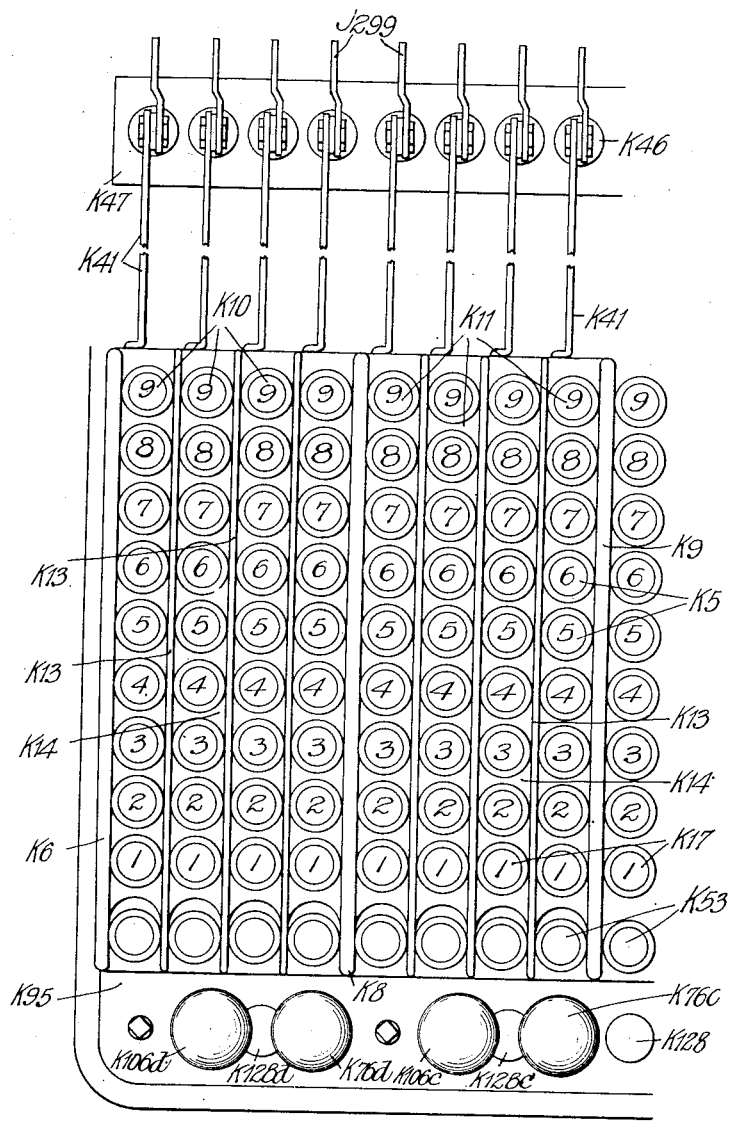

C. H. TALLMADGE.
ACCOUNTING MECHANISM.
APPLICATION FILED SEPT. 7, 1906.
1,084,667.
Patented Jan. 20, 1914.
58 SHEETS—SHEET 42.
Fig. K2.
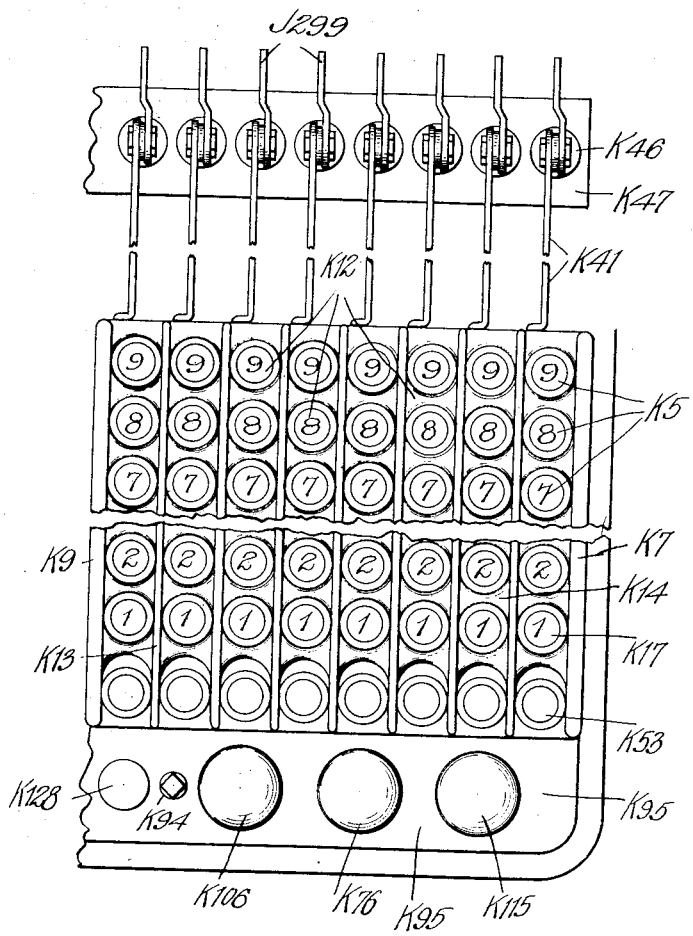

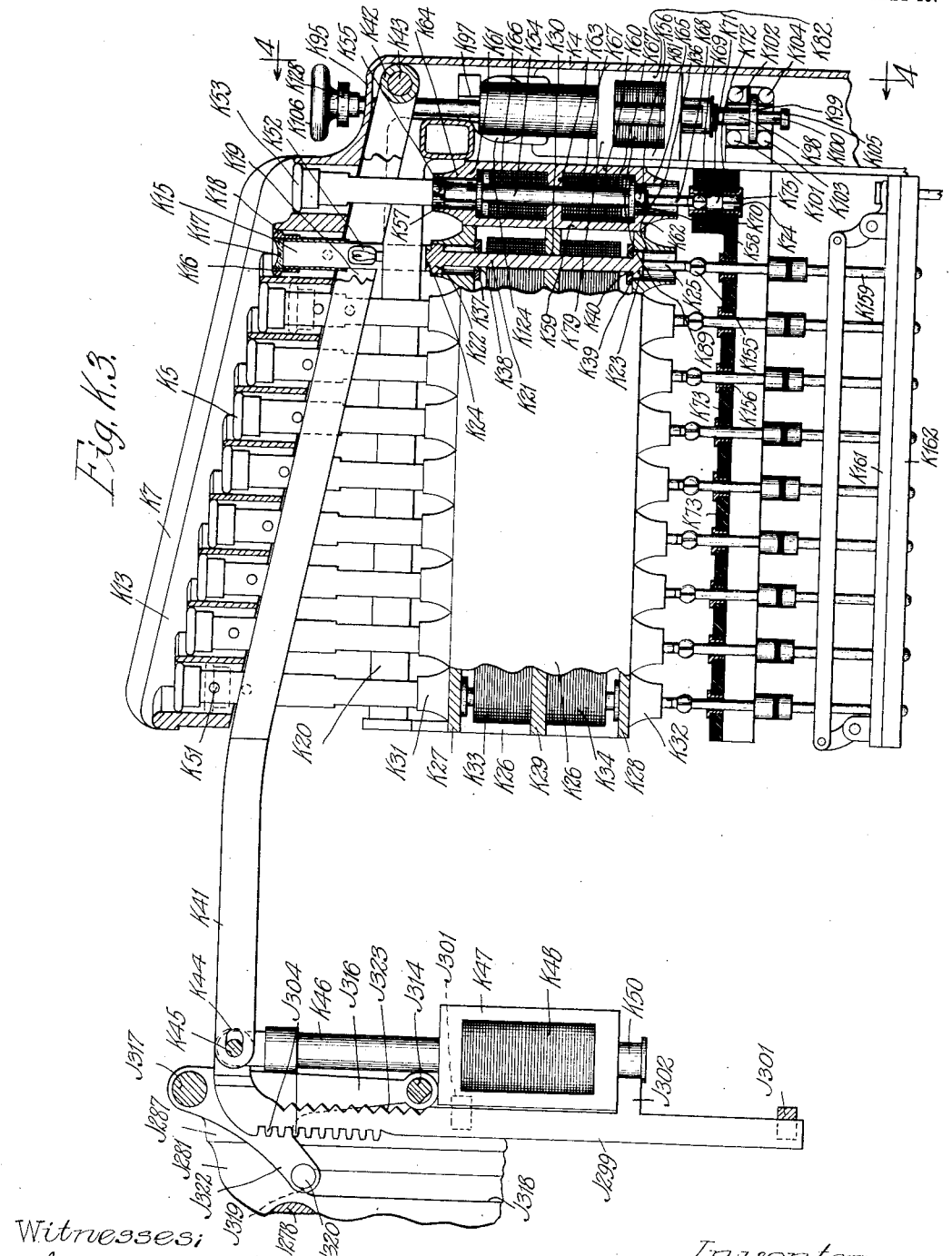

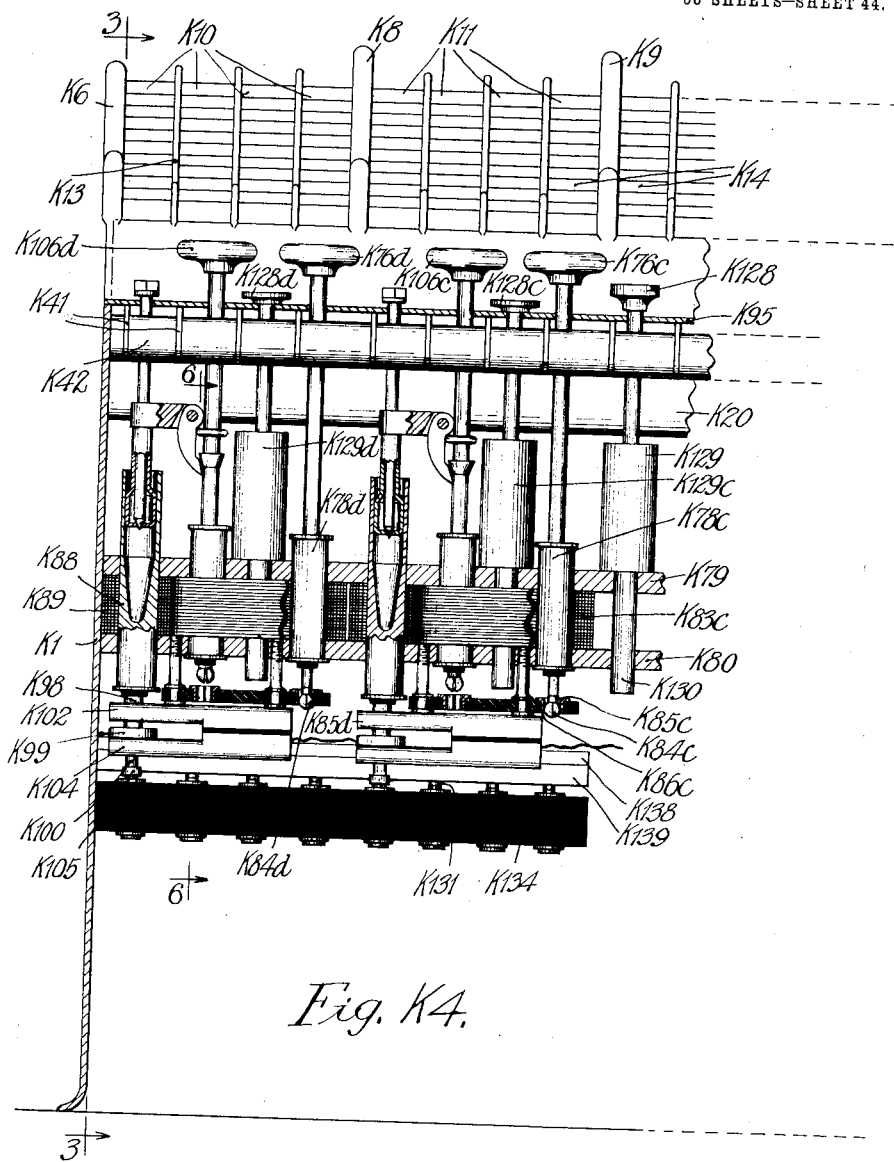

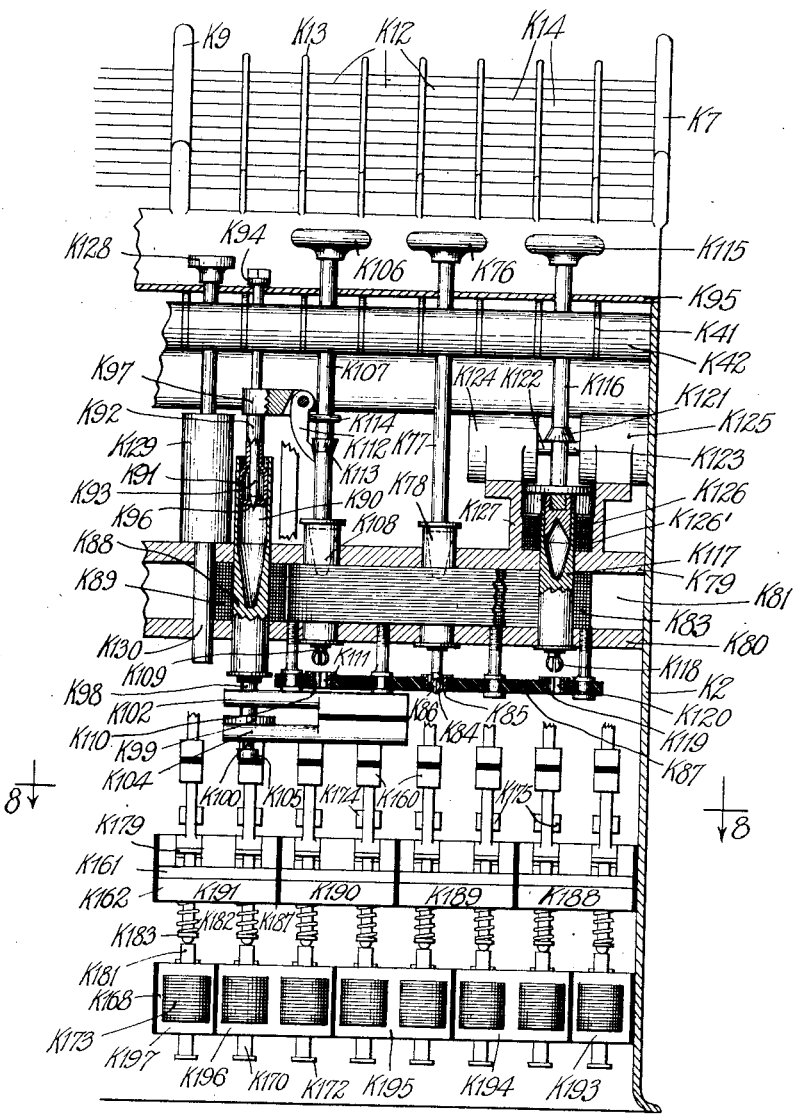
Fig. K.5.

C. H. TALLMADGE.
ACCOUNTING MECHANISM.
APPLICATION FILED SEPT. 7, 1906.
1,084,667.
Patented Jan. 20, 1914.
58 SHEETS—SHEET 46.
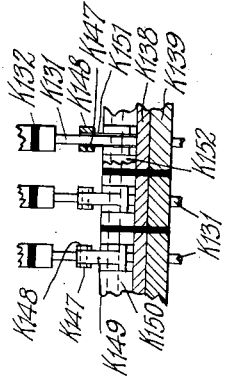
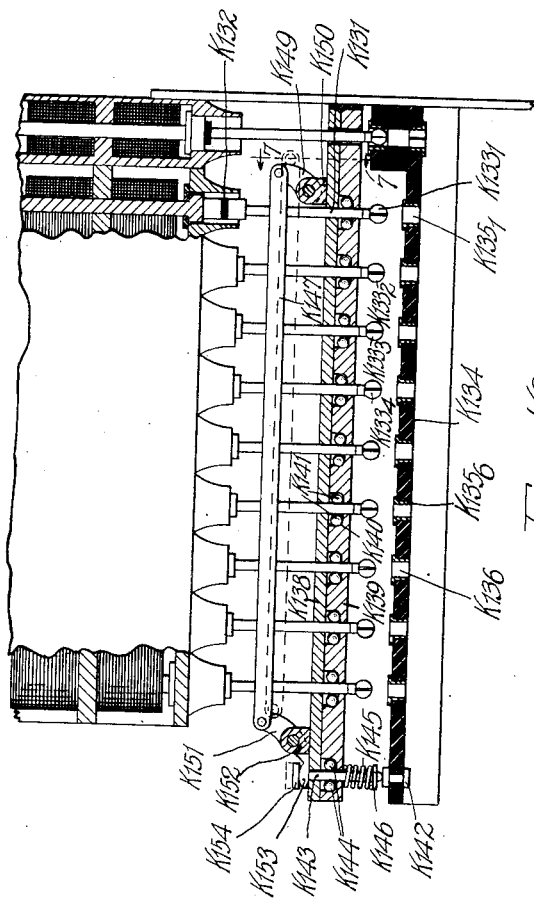

C. H. TALLMADGE.
ACCOUNTING MECHANISM.
APPLICATION FILED SEPT. 7, 1906.
1,084,667.
Patented Jan. 20, 1914.
58 SHEETS—SHEET 47.
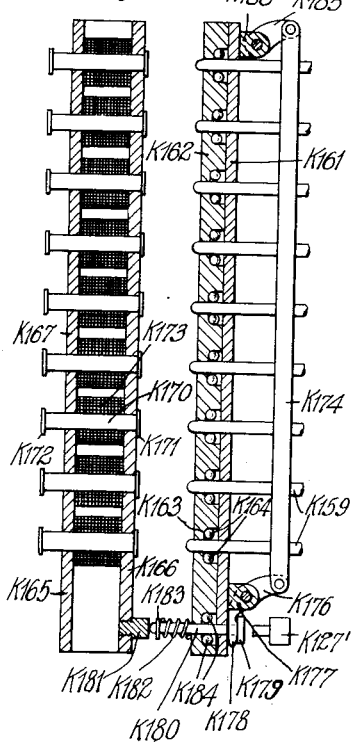
Fig. K9.
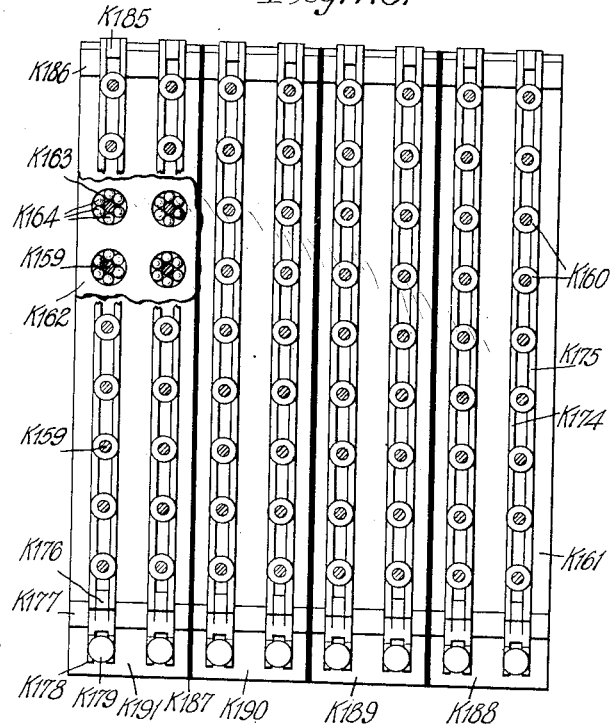
Fig. K8.
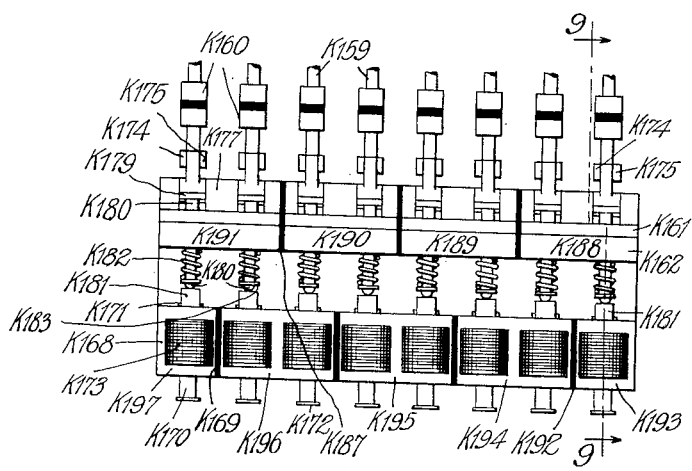
Fig. K10.
Witnesses:
George C. Higham
Leonard W. Novander
Inventor
Charles H. Tallmadge
By Brown Williams Bell Hanson & Bottcher
Attorneys

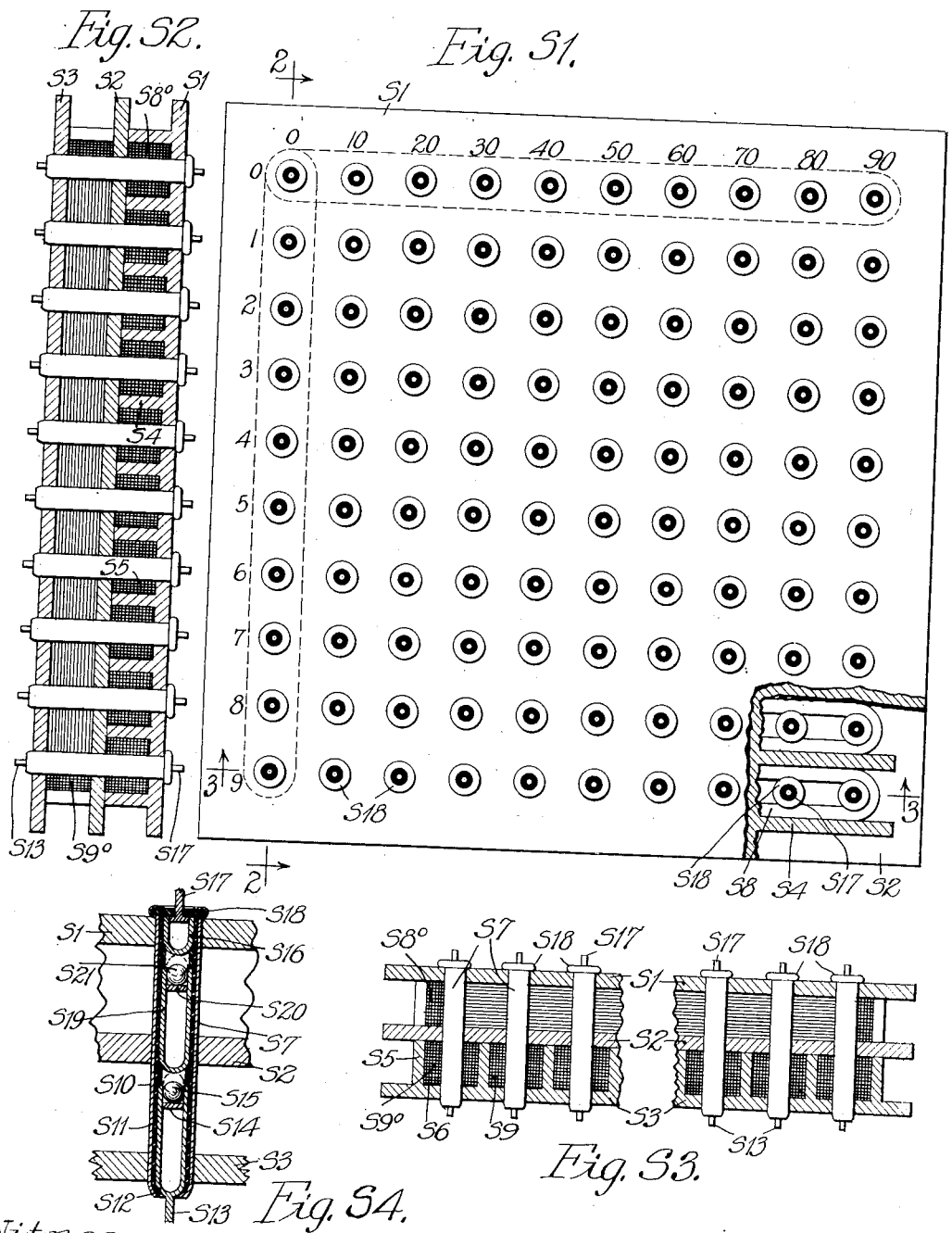

C. H. TALLMADGE.
ACCOUNTING MECHANISM.
APPLICATION FILED SEPT. 7, 1906.
1,084,667.
Patented Jan. 20, 1914.
58 SHEETS—SHEET 49.
Fig. C1.
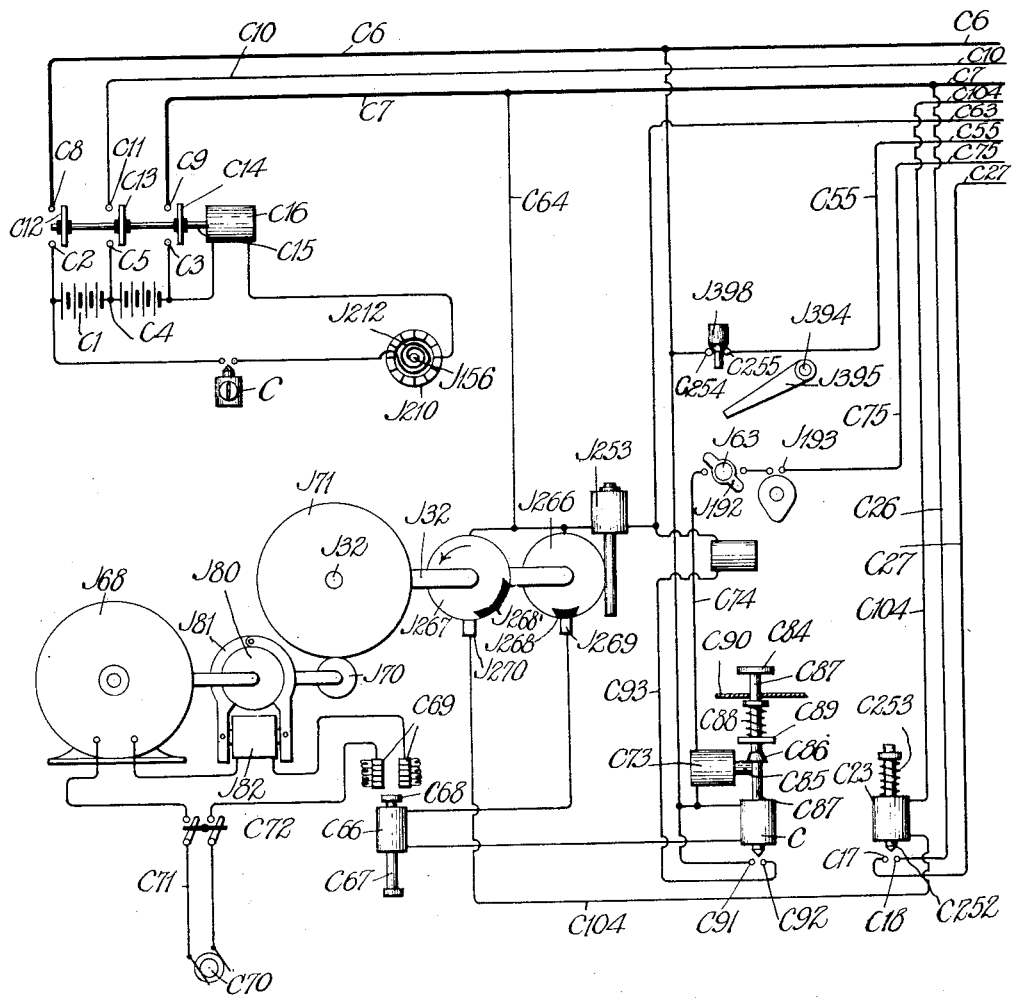
Witnesses:
Leonard W. Novander
George E. Higham.
Inventor
Charles H. Tallmadge
By Brown Williams Bell Hanson & Boettcher
Attorneys

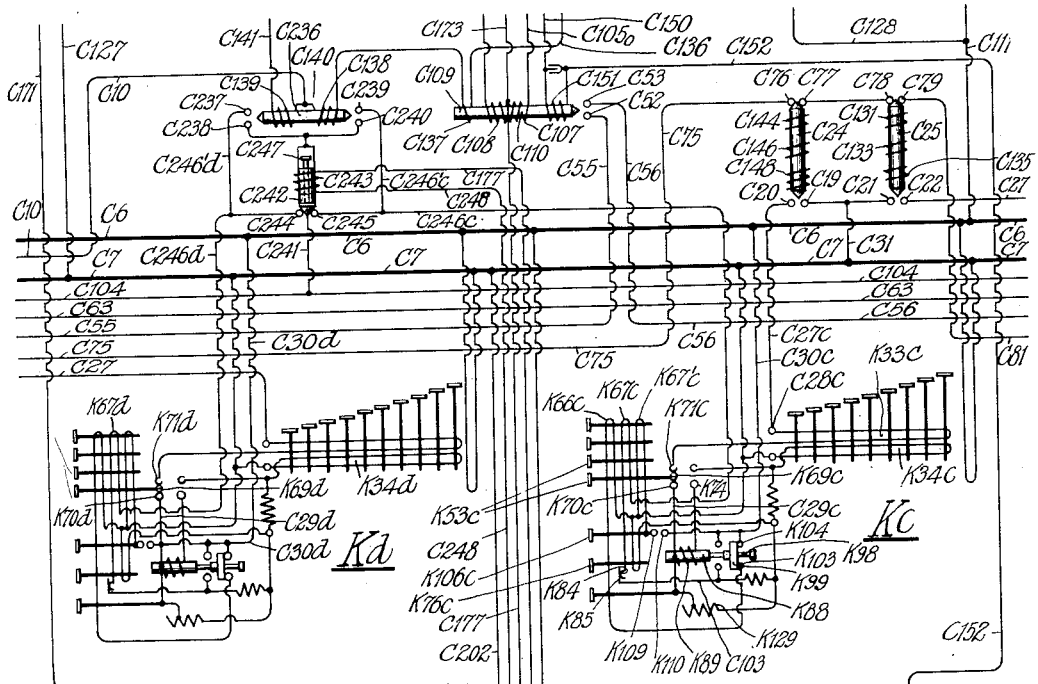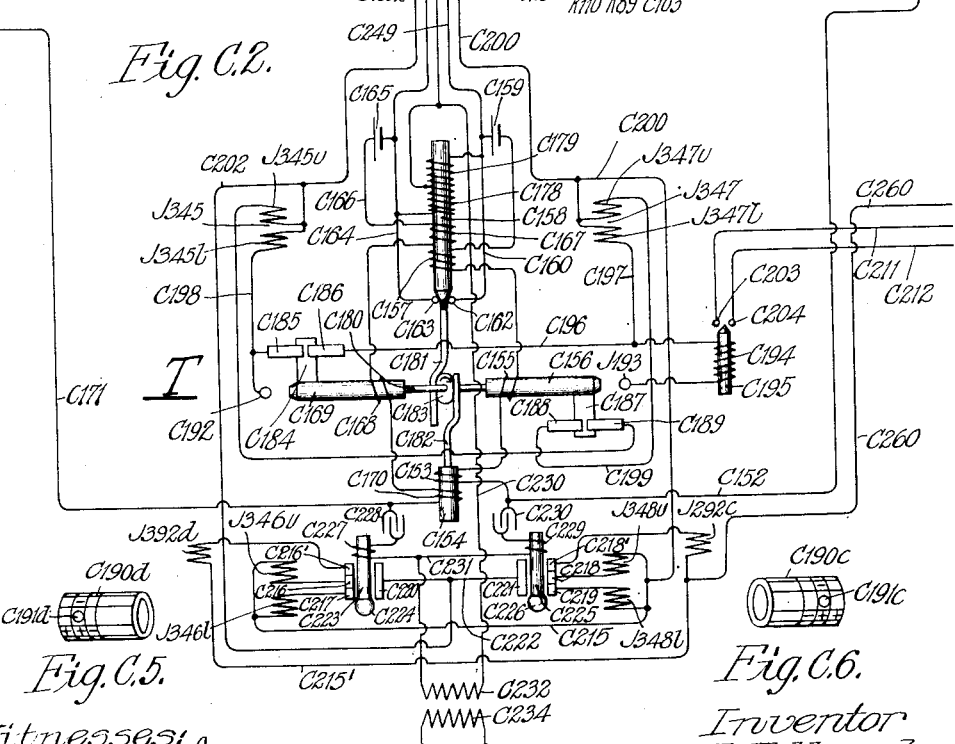

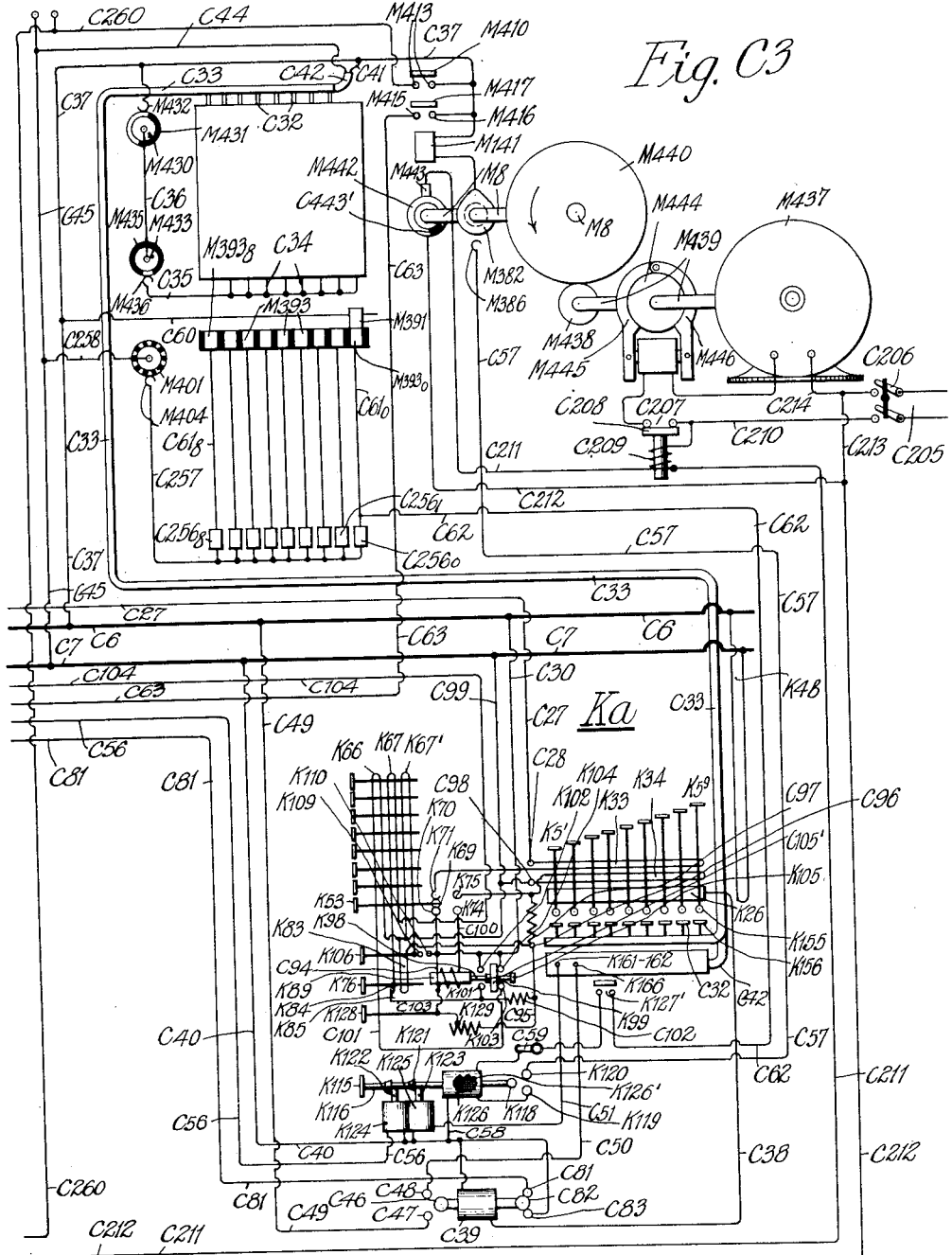
Fig. C3

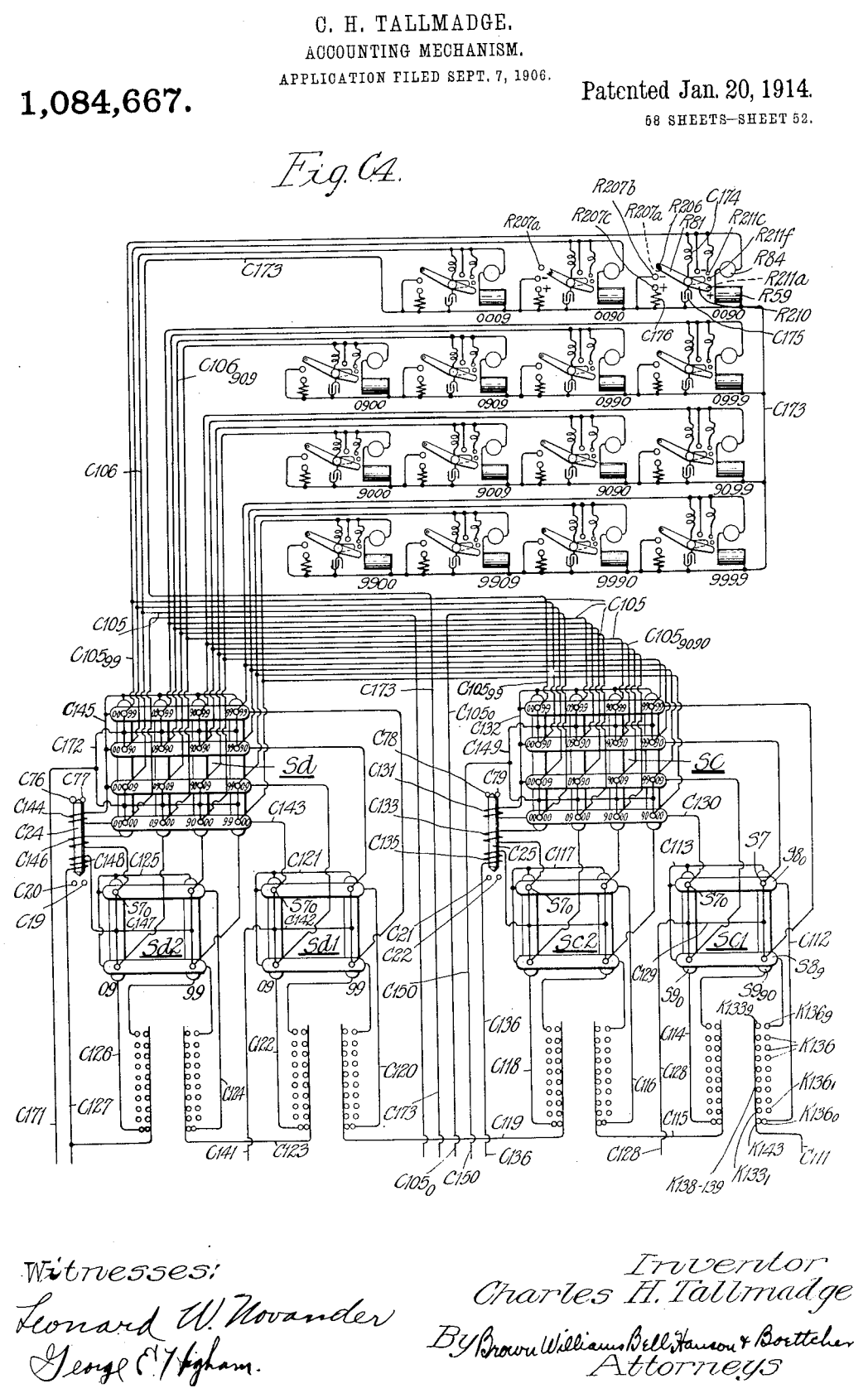

Fig. C4.

C. H. TALLMADGE.
ACCOUNTING MECHANISM.
APPLICATION FILED SEPT. 7, 1906.
1,084,667.
Patented Jan. 20, 1914.
58 SHEETS—SHEET 53.
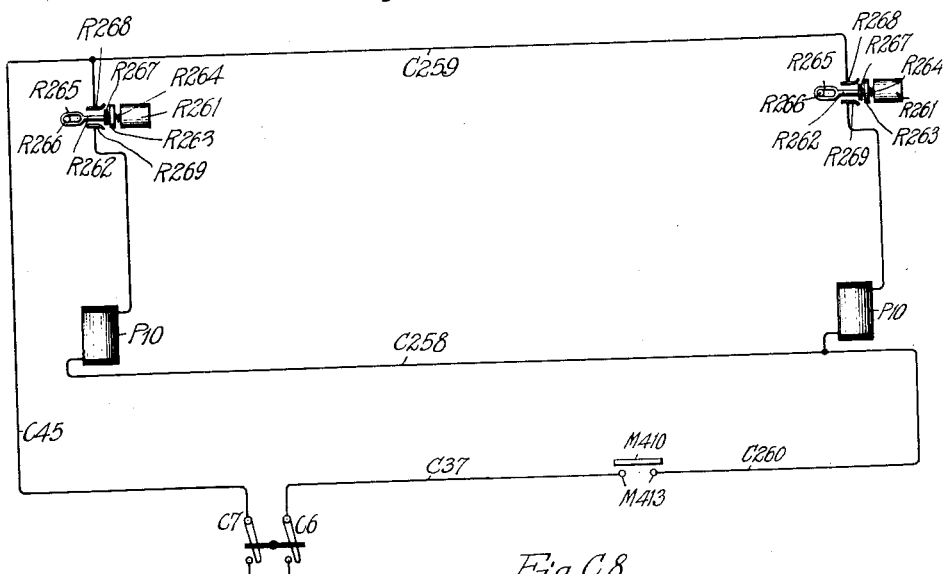
Fig. C.7.
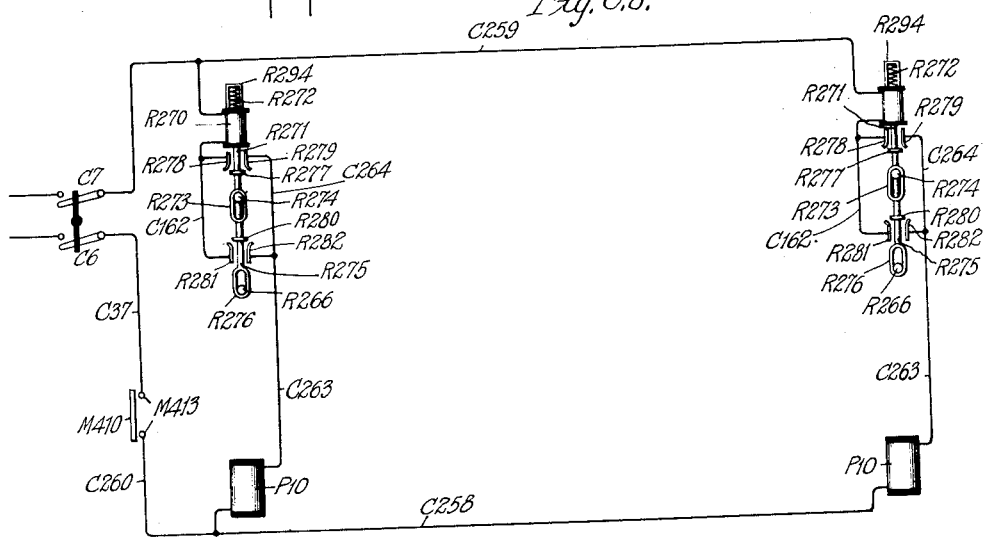
Fig. C.8.
Witnesses:
Leonard W. Novander
George E. Higham
Inventor
Charles H. Tallmadge
By Brown Williams Bell Hanson & Boettcher
Attorneys

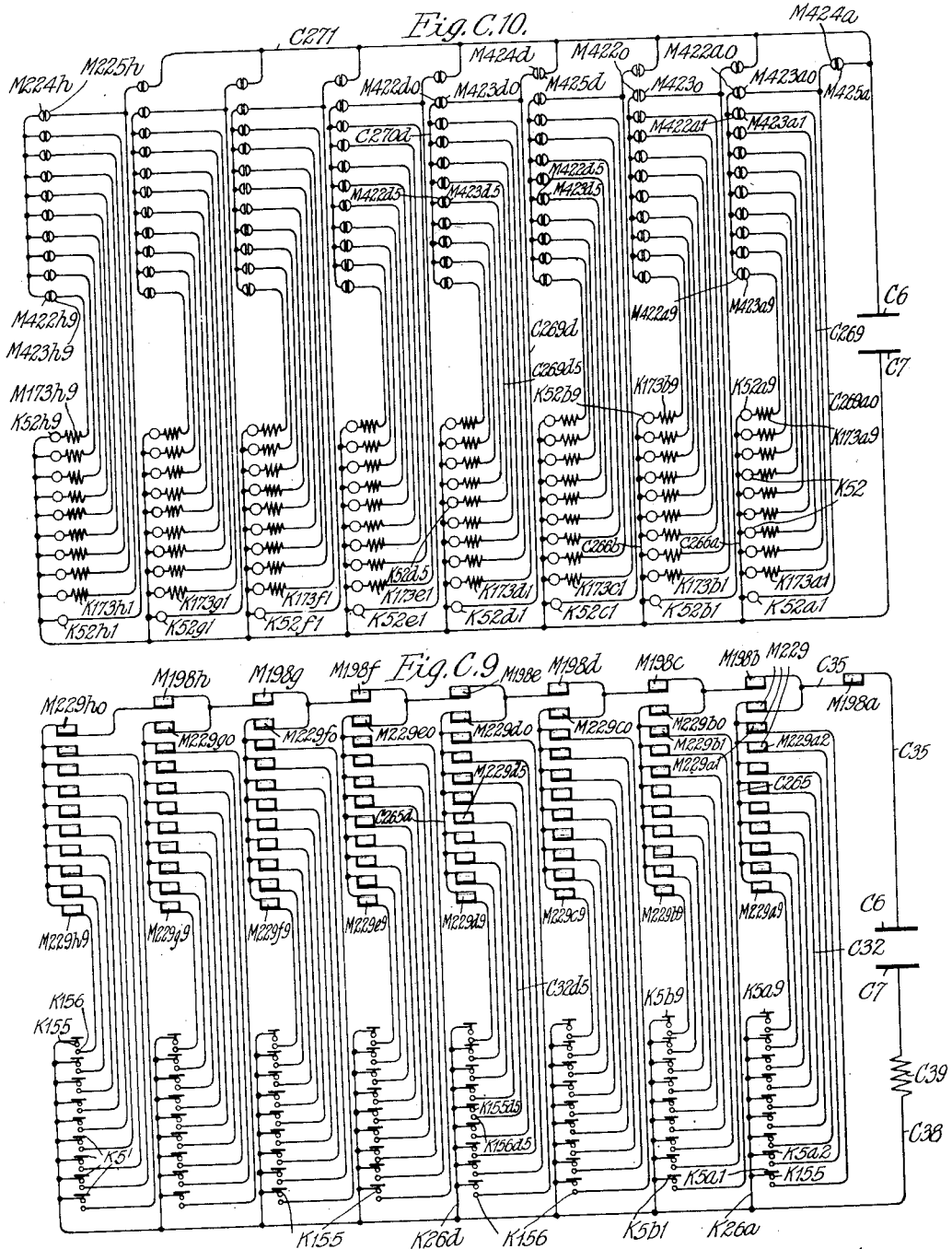

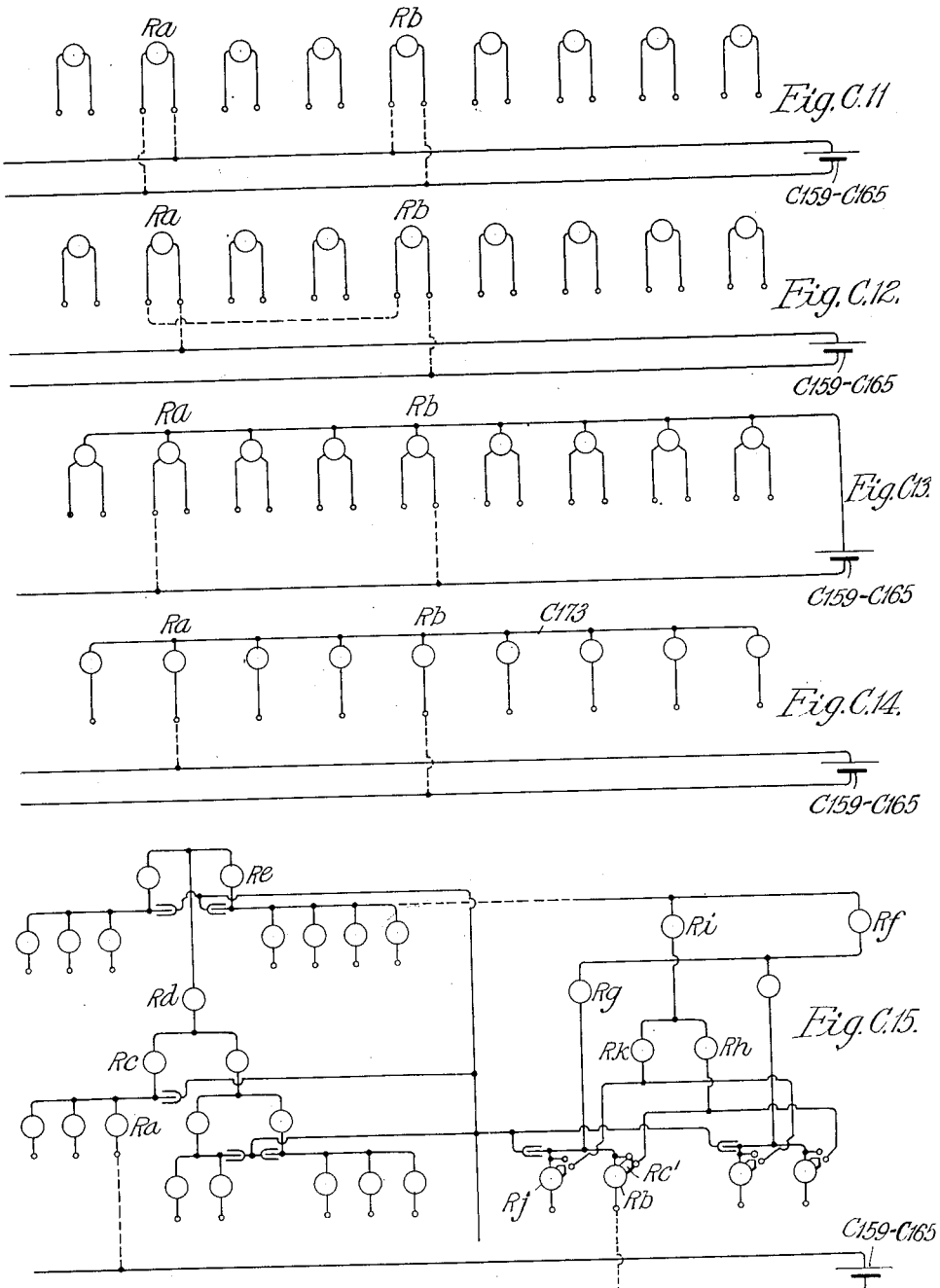

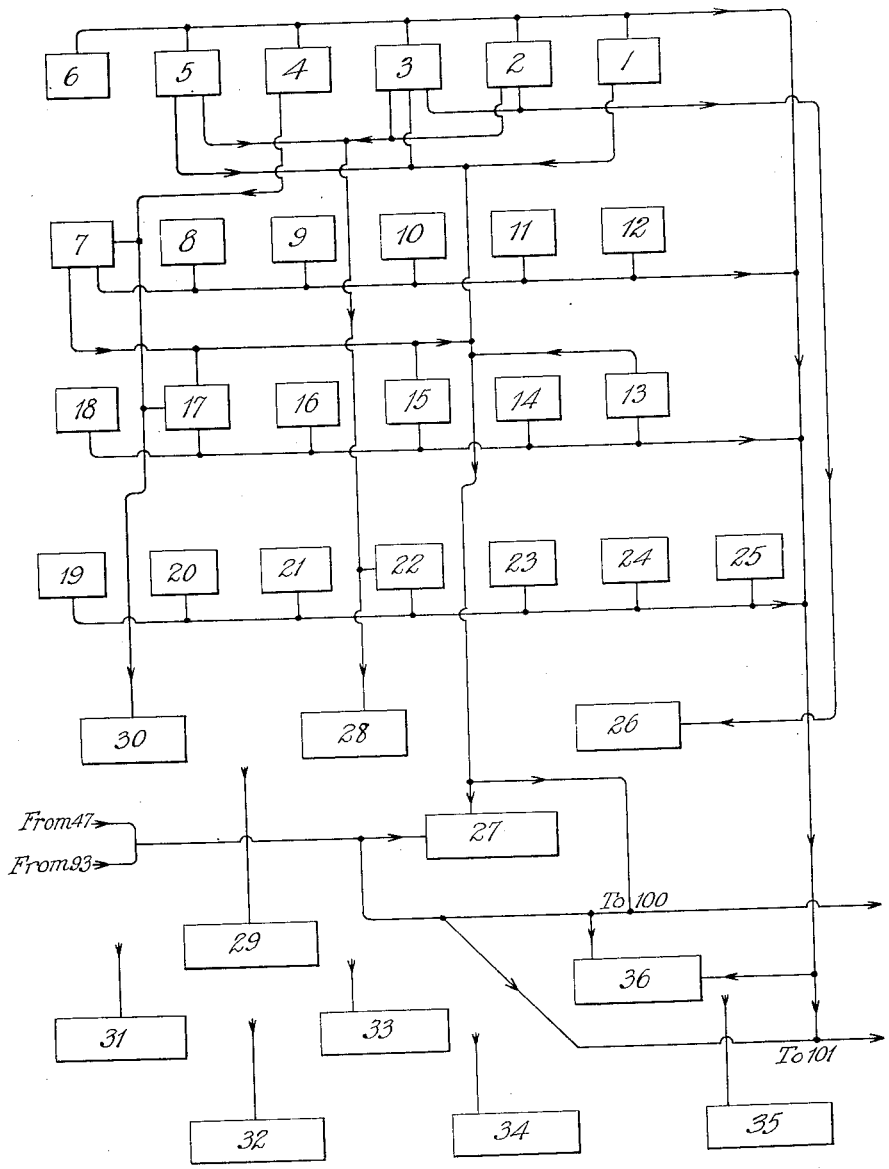

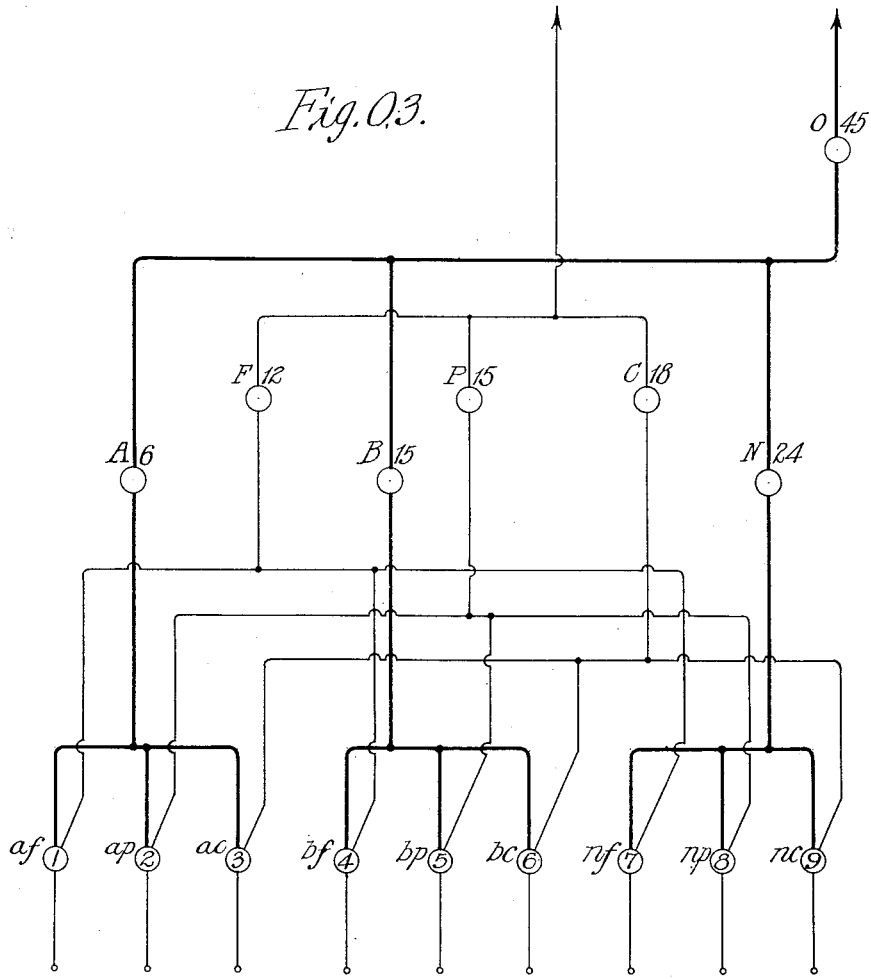

UNITED STATES PATENT OFFICE.

CHARLES H. TALLMADGE, OF CHICAGO, ILLINOIS, ASSIGNOR, BY MESNE ASSIGNMENTS, TO WILLIAM R. HEATH, OF BUFFALO, NEW YORK.

ACCOUNTING MECHANISM.

1,084,667.      Specification of Letters Patent.      Patented Jan. 20, 1914.

Application filed September 7, 1906. Serial No. 333,660.

*To all whom it may concern:*

Be it known that I, CHARLES H. TALLMADGE, a citizen of the United States, residing at Chicago, in the county of Cook and State of Illinois, have invented a certain new and useful Improvement in Accounting Mechanisms, of which the following is a full, clear, concise, and exact description, reference being had to the accompanying drawings, forming a part of this specification.

My invention relates to automatic accounting systems and contemplates improved features of operation and construction.

The essentials of the general accounting process, as commonly practised, comprise: First, the making of more or less detailed and consecutive records of original entries, either unclassified or only primarily classified, herein collectively called the journal; second, the transferring of the amounts of these entries counterbalancingly into appropriate ledger accounts, that is, classifying them in all desired fullness; and third, the summing of the entries so classified, specifically and generically, so as to exhibit the condition of each account and of the business as a whole. A typical record of a typical transaction requires a set or combination of three entries,—one in the journal, showing the amount and explanation of the transaction, with an indication expressed or readily inferred of the two ledger-accounts to be debited and credited, respectively, with the common amount, and two in the ledger, showing a debit and a counterbalancing credit of the amount to the respective accounts so indicated. Convenient references are commonly made between the original and posted entries and in the system hereinafter elaborated the ledger references form a peculiarly important part of the journal entry. The journal entry calls for a high degree of skill and judgment, as it determines the two ledger entries. The care required in the latter is merely care in routine work, involving no discrimination or discretion. Whatever is recorded in the journal must be transferred unchanged in substance to the ledger in order to secure a classified record in harmony with the original data, which is a condition precedent to correct summation results. The three written entries themselves are thus very closely related, but as practised in the present state of the art the operations of making them are wholly disconnected. The journal entries are made as the transactions occur, but the postings are commonly deferred to a more convenient time. There are also practical advantages in posting, say, a number of debits first, and then the corresponding credits, and frequently one person makes the journal entries and another does the posting.

There are well-known modifications of the typical process here presented, but it will be seen that the current method of constructing a journal and its ledger commonly involves for each transaction three separate perceptions of the entry data, followed by three corresponding separate volitional operations of entry-making. Further perceptions and operations are necessary in the summation, and these several disconnected perceptions of and operations upon the common data are the principal sources of accounting errors. While posting and summation are simple in principle and easy of performance in single cases, they are in practice not only very laborious but also difficult of correct performance. owing to the great number and variety of the items and accounts which are involved, the necessity for accuracy in every instance and the fallibility of human operations. The invention here presented substitutes the automatic for the human element in all operations subsequent to the initial act of entry, and to that extent eliminates the liability to error, the labor and the delay inherent in the methods now practised.

Referring now only to the first and second essential operations above specified, it is one principal purpose of this invention to avoid all posting errors by providing means whereby one perception and one corresponding volitional operation shall serve for all three related entries. To this end is established a physical or mechanical connection between the three entry-making operations, so that upon the original perception of the entry to be made and the execution of the determination to make it not only is the original entry made but the posted entries also, and necessarily in harmony.

In this specification the words "physical," "mechanical," and "automatic" are used synonymously and in contradistinction to "mental," "volitional," and "personal." By the use of the former I do not wish to exclude but distinctly to include electrical, chemical, pneumatic or other natural agencies equivalent in their automatic or necessary natural effect to those herein specified, it being my object to provide means for substituting the certain, necessary, scientific, trustworthy action of natural forces and laws for the uncertain, discretionary, empirical, fallible action of human perception and execution in transferring the data from the original consecutive record in the journal to the determined classification in the ledger.

Varying forms of ledger necessitate or permit various embodiments of this conception, with differing degrees of fulfilment of the complete purpose and with a variety of auxiliary results; but the essence of these embodiments is in the substitution of an automatic connection between the operations of making the entries corresponding to the necessary relations between the entries themselves, in lieu of the disconnected manner heretofore employed in making the related entries.

Various means may be supplied embodying the general idea of simultaneous, mechanically-harmonious, triplicate entries from one writing, upon journal and ledger-accounts placed in proper condition to receive the common data with automatic counterbalancing effect. A very simple and effective means is shown in co-pending application Serial No. 285,421, filed November 1, 1905, where the journal sheet is superposed upon the ledger sheets, properly placed in register to receive the entry on either the debit or credit side as may be appropriate, the posting entries being made by manifolding the essential portions of the journal entry. The ledger-page references are made when the other portions of the journal entry are made and are duplicated on the ledger sheets, so that a simple comparison of such duplications with the number of the ledger-page upon which they are found readily detects the entry of an item to the wrong account or to the wrong side of the right account, as will be evident by reference to said application. Since the amount of the entry is necessarily duplicated, with this provision on the face of the account itself for detecting an error in the account or the side to which a posting is made, there is a large measure of mechanically-secured harmony between the two records. While it is old to produce mere duplicates at a single writing by manifolding, and even to give such duplicates certain diverse effects by varying the context of the writing in the several copies, it is novel to apply such process to a set of books consisting of a journal and its double-entry ledger, with its unique counterbalancing effect, and it is one practical means, though not the most complete, for mechanically securing that *sine qua non* of accounting, an agreement between ledger and journal.

The generic invention embodied in these various methods and appliances lies in the perception of the susceptibility of journal and ledger accounts to be placed in wholly abnormal relations to each other, or to means for entry-making, or to both, which will permit a physical, mechanical or automatic connection to be established between the several operations of making a journal entry and its related ledger entries, and in the application of old entry-making means or the devising of new ones to produce such novel automatically-harmonious entries under such conditions. In the co-pending application referred to, these relations are established by a manual selecting and shifting of the sheets, and no automatic record is made in the journal of the accounts which are so placed in condition to receive the common data.

In the preferred form the proper relations are established by merely indicating upon keyboards the numbers of the desired accounts, and, as this operation simultaneously determines the ledger-accounts in their counterbalanced relations and the record thereof in the journal, the latter shows the accounts in such relations and the postings which have actually been made. Thus is secured a necessary and absolute harmony between the ledger-accounts themselves, and between them and the journal record, not only as to the amounts but also as to the accounts in which the amounts are entered and as to the debit or credit nature of the ledger entries, and thus is afforded to an auditor automatically-secured evidence of the condition of the ledger as to any transaction without a reference to the ledger itself. An inspection of the journal may perhaps disclose that the wrong amount has been entered, or that it has been debited or credited to the wrong account in the ledger, but whatever has been done in the ledger is reflected in the journal.

In order to facilitate entry in the desired accounts, and to avoid the labor and delay of mental summation of each account, and referring now to the third essential general operation mentioned in the beginning of this specification, a novel form of ledger has been devised, consisting of a multiplicity of combined adding and listing mechanisms, one for each ledger-account, with proper connections to suitable common keyboards. These account-mechanisms or registers are labeled, numbered and indexed just as are the accounts of an ordinary ledger. Provision is made for indicating consecutively and permanently recording the date, the amount and the debit- or credit-nature of each entry in each account.

For many uses the net balance of the account is practically the account itself, the component debits and credits being mere details like the explanations, which latter are habitually recorded only in the journal. By the introduction of a register to show automatically after every entry the balance of the account, a very great economy is secured in labor, as well as a further advantage in having the balances constantly available. The registers are connected up counterbalancingly, one positively to receive the debit, and the other negatively to receive the credit, and as the same amount is entered in each, the equlibrium of the ledger is necessarily maintained, thus obviating the necessity for a trial balance.

When I speak of the equilibrium of the ledger, I refer to that condition in which every debit item of every account is counterbalanced by a credit item in some other account. If a ledger were to be opened, all of the accounts would ordinarily stand at zero, with neither debit nor credit entries. At the commencement of the business, certain entries are made in certain of the ledger accounts, and for each such entry in any account there is an entry of equal amount, but of the opposing kind, in some other ledger account. This condition is continued as long as the ledger is continued in use (assuming it to be kept with accuracy) and if the balances in the various accounts be given plus and minus signs to indicate their nature, the total of all of the balances will remain at zero. It is this condition which I refer to as the condition of equilibrium.

It may sometimes happen that the sum of all of the balances will not be zero. This sum may be at the commencement of the year, $100,000. If with this condition as a starting point, the ledger accounts are made to represent all of the transactions which may take place, then as before, every debit entry in any account will be accompanied by a credit entry of equal amount in some other account. This counterbalancing entry of each item will maintain a given condition of the ledger, as a whole, with respect to the condition of equilibrium; that is to say, the total of all of the balances will be at all times $100,000.

This invention in its preferred form consists in the recognition of the balance as the essence of a ledger-account and the perception of the susceptibility of an adding- and subtracting-mechanism to embody such an account; the devising of means for simultaneously and counterbalancingly entering an amount, from one set-up, in any two of a multiplicity of such calculating registers, thereby securing a necessary equilibrium of the ledger and automatic summation, and the devising of means for automatically recording consecutively the numbers of the accounts so affected and the amounts counterbalancingly entered therein, thereby mechanically securing a complete harmony between the journal and the ledger entries. To this are added means for typewriting the explanatory details of the journal entry and for insuring the concurrent record of every entry in the journal and the ledger. It is not attempted to supersede the volitional entry in the journal, nor to insure its accuracy, but the automatic transference of the journal entry to the ledger is secured and complete harmony in all essential respects between the ledger and the journal is insured.

Ordinarily the balance in any given account does not shift from debit to credit or vice versa, and thus any suitable arithmetical universally adding and subtracting register may be employed. If the normal balance of an account is a debit, that is, let us say "positive," a register exhibiting black figures may be used, and as long as the balance in such register is positive the figures shown indicate directly the correct balance; but if the balance in such register shifts to the credit or "negative" side the correct amount of the balance is not directly shown nor is its nature directly disclosed. However, knowing the value of the maximum debit indication and that the balance is normally a debit and as such never of excessive size with respect to the range of the register, a larger reading will indicate that the balance has passed to the abnormal side. When, later, with a sufficient excess in the amount of debit entries, the balance again becomes normal in nature, the register will directly show the correct amount of the balance, and for the relatively few instances and brief periods that the balance is abnormal the reading of the register in combination with exterior information may be correctly translated as to amount and nature. Similarly with a balance which is normally a credit, that is, "negative", except that here the figures of the register may preferably be red, and the register should be reversed, either in its connection or its construction, so that what would ordinarily be added will be subtracted, and vice versa. This can be so easily accomplished by one skilled in the art that elaboration is unnecessary.

When for any reason it is desired to avoid a temporary abnormal showing of a balance, it can easily be shown as normal by making the entry in two portions, the first bringing the balance down to zero, when the account may be temporarily transferred to another register whose normal indication of balance is of the desired nature, and then making the remaining portion of the divided entry, returning to the original register when the balance of the account returns to its normal side. This is analogous to the transferring of an account to a new page in the conventional method, and then transferring it back to the original page when the balance returns to its original side. The index and the labels on the registers should of course be kept in harmony with the facts, and the consecutive record of the account may be obtained by a combination of the records of the two registers. Ordinarily the operator may not notice that the balance is about to change its nature, but it is easy to provide means for giving notice when the balance actually does change, whereupon the latest entry may be reversed, and the entry may then be divided as desired. It is thus perfectly practicable to use a register of the indicated arithmetical construction in carrying out the processes of this invention, but in the preferred form of the system an "algebraic" register is employed, operating indifferently above and below zero, automatically showing the correct nature and amount of the balance, whether positive or negative, and thus avoiding the necessity of dividing an entry or translating the indication of balance. This algebraic register is described in detail hereinafter, and while it is not a necessary feature of the system, since the counterbalancing results and correct indications in the ledger can be secured with the simpler form of register, it is nevertheless an important auxiliary to the other means and a valuable substitute for the arithmetical register, as it permits the registers to be of uniform construction and contributes to the ease and simplicity of operation.

I am not aware that mechanical registers have heretofore been used, or that it has heretofore been contemplated as possible to use them to embody or represent accounts in any such sense as herein set forth, so that they could properly be said to constitute a ledger, with one register permanently assigned to each account, capable of receiving debits and credits indifferently, and with or without automatically-counterbalancing entries in any two, freely selected Following the original conception of a multiplicity of such account-registers, the problem to be solved was to select at will any two of them, in one of which an item could be entered positively with the same amount necessarily entered negatively in the other, and automatically to record the amount and the accounts in the journal. With registers capable of operating both positively and negatively from a common source, obviously each may be thrown into or out of operative relation therewith by simple means at or in the register itself, and with care on the part of the operator only two may be connected for an entry and those two counterbalancingly. But this leaves the actual counterbalancing connection of two registers dependent on the care of the operator, who may inadvertently connect more or less than two or may not connect them counterbalancingly. The mechanism here presented is interlocked so that the connections must be properly made in this respect before each entry.

Other constructions have been contemplated by me, which, while not securing directly or necessarily the complete harmony between journal and ledger, or even the necessary equilibrium of the ledger, would nevertheless usually secure it, and in the event of failure to do so would mechanically indicate such failure, thus indirectly and practically enabling the operator to arrive at the same general result, though in a roundabout and less satisfactory way. A construction of this kind may provide for successive entries of the common amount in the two accounts, from successive set-ups, of which if the second does not counterbalance the first, a proper signal will be given. Or, it may provide for successive entries from a common set-up, the second perhaps requiring only a slight routine action on the part of the operator, and the mechanism may lock against further entry until the preceding counterbalance has been secured. Thus it will be seen that while the preferred embodiment directly secures simultaneous entires from one common set-up, neither the simultaneousness of the entires nor the unity of the set-up is essential to my purpose, and that the general end in view may be practically secured by providing automatic indication of a lack of harmony in lieu of directly and mechancally securing the harmony itself.

Other specific methods and mechanisms suggest themselves for accomplishing some portion at least of the work of this preferred embodiment of my general conception, most of them so clearly only partial or imitative substitutes for the more perfect and complete form here specified that they are not further referred to herein, as they are merely formal variations of my invention to the extent that they embody my conception of the idea of a physical, mechanical or automatic connection between the operations of making a journal entry and its related ledger entries, as a means to the end that the desired harmony between journal and ledger may be secured directly, certainly, completely, and scientifically, which idea of means I claim as my discovery and construction and which is embodied in the system of mechanism herein set forth.

Having insured the harmonious construction of journal and ledger, and secured the automatic summation of each account, I further relieve the accountant and secure further novel results by providing for the automatic concurrent exhibition of results in specific and generic accounts, *ad libitum*, so that when making the most elementary entry of earnings or expenses, e. g., without further care or consciousness on the part of the operator, the system carries the entry through the various intermediate accounts, however numerous, leaving its record in each, and automatically makes the proper showing in profit and loss or surplus. As all these showings are instantly made and are contemporaneously visible, as soon as the operator has made his last entry for the accounting period he may at once read from the registers the total amount and the detailed distribution of assets, liabilities, profit and loss, or any other generic accounts, in accordance with the prearranged classification.

Not only is the amount of any generic account thus instantly available after the last entry has been made in the journal, but it is also currently available, entry by entry, subject to modification by reason of any general entry usually made only once in a year or other period, as a charge for insurance or taxes. Such of these as are approximately known in advance may be divided into convenient fractions and entered weekly or oftener, and various expedients may be employed in determining corresponding entries on account of inventories, etc. From this it follows that a very close current approximation in these important generic accounts is rendered possible, with little or no addition to the mere work of making the original routine specific entries in the journal. It is immaterial whether these generic accounts or, in lieu thereof, their component specific accounts, are considered the ledger since a state of equilibrium exists whichever view is taken, and one view or the other may be adopted, according to the purpose sought; but in addition to these strictly accounting or commercial accounts, which constitute the ledger, provision is made for a series of registers which may be used for various special purposes receiving the data of any desired entries simultaneously with their entry in the regular ledger-accounts and automatically handling them on any prearranged plan. One special register may receive all entries made on the machine, showing both the total amount and the total number of such entries, thus giving a record of the labor performed by the machine. Others may be connected up at the beginning of any specified work, as a new journal, or the work of one day, or some particular group of transactions of which a separate total is desired. Various statistical summations may be made, concurrently with the commercial entries and without interfering with them, by merely connecting up suitable registers assigned to that special work. Such registers will of course not form any part of the ledger. Several other distinct purposes and applications of the invention will be disclosed hereafter.

The foregoing is a general description of what this improved system is intended to accomplish, and the mechanisms employed in the system for carrying out the various operations will now be described, first in a general way to show their general utility and relations, and then each of the mechanisms will be described in detail as to construction and operation, whereafter will be described the electrical circuits connecting between the various mechanisms, and operations for various transactions will be carried through the system to illustrate more clearly its adaptability and utility. These various features of arrangement, construction and operation are plainly shown and described and will be best understood by reference to the accompanying drawings, in which:

Figure G1 is a diagrammatic representation of the various mechanisms employed in the system and shows in a general way their relations and coöperations. Fig. G2 shows the same as Fig. G1, but illustrates more in detail the sequence of events and operations. Fig. R1 is a top view of a complete register mechanism. Fig. R2 is a front view of a register mechanism. Fig. R3 is a sectional view of the primary carriage and register taken on a plane passing through line 3—3, Fig. R2. Fig. R4 is a side view of the register mechanism with the right supporting wall removed. Fig. R5 is a sectional view taken on line 5—5, Fig. R1. Fig. R6 is a sectional view taken on line 6—6, Fig. R1. Fig. R7 is a sectional view taken on line 7—7, Fig. R3. Fig. R8 is a sectional view taken on line 8—8, Fig. R3. Fig. R9 is a top view of the clutch mechanism lever. Fig. R10 is a rear view thereof. Fig. R11 is a side view thereof. Fig. R12 is a top view of the register mechanism at the rear of the primary carriage showing the clutch mechanism in one operative position to cause rotation in one direction. Fig. R13 is a top view of the clutch mechanism in another operative position to cause reverse rotation. Fig. R14 is a top view of the secondary carriage and locking attachment. Fig. R15 is an end view thereof from the right. Fig. R16 is a top view of clutch mechanism and counter actuating mechanism. Fig. R17 is a diagrammatical sectional view of the pivot block for the carry-over mechanism taken on line 17—17, Fig. R13. Fig. R18 is a side view of the locking pin for the carry-over mechanism. Fig. R19 is a view of the locking-in mechanism pivot block showing the actuating arm pivoted thereto and the position of the locking pin. Fig. R20 is an isolated view of the locking mechanism for locking the secondary and primary carriages together. Fig. R21 is a top view of the block normally interposed between the connecting-in key and the actuating rod of the connecting-in electromagnet. Fig. R22 is a top view of the primary carriage and a printing register. Fig. R23 is a sectional view of Fig. R22 taken on a horizontal axial plane. Fig. R24 is a sectional view taken on line 24—24, Fig. R22. Fig. R25 is a sectional view taken on line 25—25, Fig. R22. Fig. R26 is a view like Fig. R25, but with the mechanism in another operative position. Fig. R27 is a view of the register locking to the right from line 27—27, Fig. R22. Fig. R28 is a top view of the units numeral wheel supporting hub. Fig. R29 is a side view thereof. Fig. R30 is a top view of the supporting hub for the other numeral wheels. Fig. R31 is a side view thereof. Fig. R32 is a top view of the primary carriage frame with the numeral wheel locking bar supported thereby. Fig. R33 is an end view of a tooth of the carry over gears in the primary carriage. Fig. P1 is a side view of the printing attachment for the registers. Fig. P2 is a top view thereof, the upper part of the inclosing shell and the feed rollers being broken away. Fig. P3 is a top view showing the attachment of the printers to the registers. Fig. P4 is a side view of Fig. P3. Fig. M1 is a plan view of the master machine mechanism, minor parts being omitted or broken away to more clearly reveal the more important parts. Fig. M2 is a sectional view taken on line 2—2, Fig. M1. Fig. M3 is a sectional view taken on line 3—3, Fig. M1. Fig. M4 is a front elevation view. Fig. M5 is a sectional view taken on line 5—5, Fig. M1. Fig. M6 shows in detail the gearing connection between the main driving shaft and the shaft driving the intermittent gear connected with the locking mechanisms. Fig. M7 is an isolated view of the locking frame for locking the clutch controlling member in its forward position. Fig. M8 is an isolated view showing how the locking frame is locked in its locking position. Fig. M9 is an isolated view showing the relative positions of the screw shaft intermittent gear and the intermittent locking gear driven thereby for controlling the connection of locking mechanisms into service, the relative positions being those when the screw shaft has been rotated one revolution. Fig. M10 is a plan view of some of the parts showing the arrangement of the setting-up pins and pick-up blocks and also showing the locking plates. Fig. M11 is a front view of the parts shown in Fig. M10 showing the normal arrangement of the reversing pin mechanism with respect to the screw shaft and gears thereon. Fig. M12 is an end view showing one of the rigid teeth on the pin frame. Fig. M13 is a front view of the end of the pin frame showing the tooth of Fig. M12. Fig. M14 shows several of the reciprocable teeth in the pin frame and their connection with the frames connected with the controlling electromagnets. Fig. M15 is a sectional view taken on line 15—15, Fig. M1, showing the arrangement for causing reverse operation. Fig. M16 is a rear elevation view of the parts shown in Fig. M15, part of the clutch locking mechanism and the primary intermittent driving gearing therefor being also shown. Fig. M17 shows the front end of the locking shaft and the clutch locking member carried thereon. Fig. M18 shows the clutch members in their engaging position. Fig. M19 is a front view of the forward clutch member, part being broken away to show the engagement of the clutch pin of the other member in the circular clutch slot. Fig. M20 is a plan view showing part of the pick-up mechanism but particularly showing the disposition of the lower gear racks of the differential mechanism. Fig. M21 is a top view of the upper rack bar. Fig. M22 is an end view of the upper rack bar. Fig. M23 is a view from the right of the gearing mechanism and clutch mechanism controlled thereby for connecting the differential gear mechanism either into operative engagement or into a locking position; circuit controlling mechanism being also shown. Fig. M24 is a top view of parts shown in Fig. M23, showing also auxiliary clutch mechanism for coupling engagement with the panel board shafts. Fig. M25 is an isolated, partly sectional view showing a crank shaft employed in the clutching mechanism in Fig. M23. Fig. M26 is a front view of the auxiliary clutch mechanism. Fig. M27 is an inner end view of the auxiliary clutch mechanism. Fig. B1 is a front elevation view of the panel board. Fig. B2 is an end view of Fig. B1. Fig. B3 is a sectional view taken on line 3—3, Fig. B4. Fig. B4 is a rear elevation view of the panel board. Fig. B5 is a sectional view taken on line 5—5, Fig. B4. Fig. B6 is a top view of the board with the top inclosing plate removed. Fig. V1 is a side elevation view of a synchronous air coupling and driving device to be disposed between the master machine and the panel board. Fig. V2 is an enlarged diametrical sectional view of the valve for controlling the coupling. Fig. V3 is a sectional view taken on plane 3—3, Fig. V2. Fig. V4 is a sectional view taken on plane 4—4, Fig. V2. Fig. J1 is a front view of the journal mechanism. Fig. J2 is a top view of the journal mechanism. Fig. J3 is a side elevation view of the part to the right of a plane passing through lines 3—3, Fig. J1. Fig. J4 is an exterior side view of Fig. J1 from the left. Fig. J5 is an exterior side view of Fig. J1 from the right. Fig.

J6 is a side view of the part to the right of a plane passing through line 6—6, Fig. J1. Fig. J7 is a front view of the type wheel mechanism and its operating gearing. Fig. J8 is a sectional view of the type wheel mechanism and operating gearing taken on plane 8—8, Fig. J3. Fig. J9 is a sectional view of the parts to the right of plane 9—9, Fig. J8. Fig. J10 is a front view of the printing bar frame, parts being broken away to better show the arrangement. Fig. J11 is a view from the left of Fig. J10. Fig. J12 is a view from the right of the inking ribbon controlling mechanism shown in Fig. J7. Fig. J13 is a sectional view taken on line 13—13, Fig. J12. Fig. J14 is a view of the mechanism to the left of plane 14—14, Fig. J13. Fig. J15 is a view of the mechanism to the left of plane 15—15, Fig. J13. Fig. J16 is a view of the ribbon controlling mechanism to the left of plane 16—16, Fig. J7. Fig. J17 is a view like Fig. J14 showing the locking springs. Fig. J18 is an isolated view of the knife cam operating gearing. Fig. J19 is a view of Fig. J18 from the right. Fig. J20 is an end view of the electromagnetic operator's lock. Fig. J21 is a sectional view on plane 21—21, Fig. J20. Fig. J22 is a side elevation view of the key. Fig. J23 is an end view of the key. Fig. J24 is a top view of the tail of the key. Fig. J25 is a plan view showing the relative positions of the journal mechanism, the journal printing mechanism, the typewriter, the automatic keyboard and the motor for driving the mechanisms. Fig. J26 is a side view of Fig. J25 from the right. Fig. J27 is a front view of the journal printing mechanism, the type gear wheels being shown in section. Fig. J28 is a top view of Fig. J27. Fig. J29 is a top view showing the arrangement of the guide standards and sliding frames. Fig. J30 is a side view of Fig. J27 from the left, the ribbon controlling mechanism being omitted. Fig. J31 is a side view to the right of plane 31—31, Figs. J27 and J28, the cam driving mechanism being also shown. Fig. J32 is a side view of the printing ribbon controlling mechanism. Fig. J33 shows a part of a supporting standard and the opening therein in which the type gear wheel tube shafts are held. Fig. J34 is a sectional view taken on line 34—34, Fig. J27, showing an intermittent gear frame and the supporting tube sector. Fig. J35 is a sectional view on plane 35—35, Fig. J27 showing a type wheel gear and gear supporting concentric tube shafts. Fig. K1 is an exterior plan view of the debit and credit keyboards. Fig. K2 is an exterior plan view of the amount keyboard. Fig. K3 is a sectional view along the plane 3—3, Fig. K2, showing also the attachment of the keys to the journal printing mechanism. Figs. K4 and K5 are front views of the apparatus to the rear of plane 4—4, Fig. K3 in the debit-credit keyboards and the amount board, respectively. Fig. K6 is a sectional view along plane 6—6, Fig. K4, looking toward the right. Fig. K7 is a front view of the parts to the rear of plane 7—7, Fig. K6. Fig. K8 is a plan view of the parts below plane 8—8, Fig. K5. Fig. K9 is a sectional view along plane 9—9, Fig. K8, looking toward the right. Fig. K10 is a front end view of Fig. K8. Fig. S1 is a top view of the switchboard panel or section. Fig. S2 is a sectional view along plane 2—2, Fig. S1, looking toward the right. Fig. S3 is a sectional view along plane 3—3, Fig. S1, looking toward the rear. Fig. S4 is an enlarged sectional view showing one of the unit switches and its arrangement in the panel. Figs. C1, C2, C3 and C4 when fitted together show the circuit connections between the various parts, diagrammatically illustrated. Figs. C5 and C6 show indicating dial members detached from their carrier. Fig. C7 shows a form of mechanism and circuits therefor for controlling the connecting-in of proper register printing mechanisms. Fig. C8 shows a modified arrangement for connecting in the register printing mechanisms. Fig. C9 diagrammatically shows the circuit arrangement between the keys of the amount board and the setting-up and reversing pin magnets of the master machine. Fig. C10 shows circuits controlled by the contacts of the setting-up and reversing pin electromagnets. Figs. C11 to C15 show various circuit arrangements for connecting in the register mechanisms. Figs. O1, O2 and O3 illustrate graphically and diagrammatically various ways in which registers may be connected together to carry out various systems of accounting.

In Fig. G1 the various parts and mechanisms of the system are diagrammatically illustrated and their relative arrangement shown, while in Fig. G2 the various parts are also diagrammatically shown and the sequence of events or operations shown by dotted lines and arrows. The registers which are to embody or represent the various accounts may be of any number and are mounted in a panel board or boards, the register mechanisms being designated generally by the reference character R and the panel board by the general character B. A keyboard is provided which contains typewriting mechanism designated by the reference character T, a debit board designated by Kd, a credit board designated by Kc and an amount board designated by K, and at the rear of these various boards and the typewriting mechanism is the journal mechanism designated in general by the reference character J. This journal mechanism is constructed to take care of the paper on which the various journal entries are to be made. By actuating the type-writing mechanism the operator may print directly on the paper the explanatory details of the entry. The numbers of the registers which are to receive the amount of the entry, one to be debited therewith and the other to be credited therewith, are set up respectively on the keyboards K$d$ and K$c$. Each register is represented by a number and to connect in any register the keys on the keyboard which build up this number are struck. To operate the registers a master machine mechanism, designated by the general reference character M, is utilized, which drives two shafts with which the registers may be connected.

As will be explained more in detail later, the register to receive the debit entry is connected with panel shafts to be operated in a positive direction, and the register to receive the credit is connected with panel shafts to be operated in a negative direction. On the keyboard K is set up the amount which is to be entered in the connected-in registers, whereupon setting-up mechanism in the master machine is actuated which determines the amount of rotation of the numeral wheels of the registers connected therewith.

On the keyboard 1 represents the position of type wheels which print the number of the clerk who operates the system, the number of the item and the date of the entry; 2 represents the position of the explanatory details printed upon manipulation of the typewriter T; 3 represents the position of type mechanism actuated by the three typewriter keys $t$ to designate special facts regarding the entry, and also the position of type mechanism actuated by either of the connected-in registers upon coming to rest at zero, thereby recording the clearance of the register and the closing of the account; 4 represents the position of type wheels for printing on the journal page a character representative of the direction of operation of the register connected in from the debit board, this indication being normally positive, but under abnormal conditions neutral or negative; 7 represents the position of type wheels which indicate similar information regarding the operation of the register connected in from the credit board; 5 and 8 represent the positions of the type wheels which print the numbers of the registers connected in to be simultaneously debited and credited, respectively, with the amount of the entry; 6 and 9 represent the positions of type wheels for printing the debit or credit nature of the balance in each register connected-in; 10 represents the position of the type wheels which print the amount of the entry, and 11 represents type for printing the firm name or other identification legend and the number of the page of the journal record.

C$m$ is a manual connecting member by means of which and the plugs $xy$ additional registers may be connected in to receive any particular entry. If the $x$ plugs are used the registers connected by means thereof will run in one direction, and if the $y$ plugs are used they will run in the opposite direction.

C$a$ is an automatic connecting board, which, upon being started, automatically connects in the registers for successive entries in accordance with a predetermined plan.

The parts represented by the general character S represent switchboards or sections electrically connected with the registers and with the debit and credit keyboards, these switchboards permitting a very great number of registers to be connected in by means of keyboards composed of digit keys upon which are set up the numbers representative of the register to be connected in.

C$c$ is a cross-connecting board or cabinet electrically connected with the switchboards, with the registers and with the manual connecting board C$m$. The cross-connecting board is similar in its use to the cross-connecting board in a telephone exchange system, all electrical terminals leading to this board, so that cross-connection between them and thereby between any of the electrical apparatus, may be readily made. Printer mechanism, designated in general by the letter P, is also provided to be attached to the registers so that the register indication may be printed at any time and a printed record of each indication kept.

The various mechanisms are connected together by electric conductors which may be inclosed in cables H, and in general the arrows show the direction of operations as indicated in Fig. G1.

The operator first manipulates the typewriter T, then sets up on the debit and credit boards the numbers of the registers representing the accounts to be affected and then sets up on the amount board the amount of the entry. By following the arrows it will be seen that the setting-up on the debit and credit boards results in operation of mechanisms in the switchboards S, and then in operation of parts of the registers to be connected in. The operation of the amount board results in operation of the setting-up mechanism in the master machine, which controls the amount of the entry to be made in the connected-in register. If the operator desires the entry to be received by other registers, he inserts suitable plugs in the board C$m$ and the desired additional registers are connected in. Now, upon actuation of the general operating key, the master machine is put in motion and enters the amount in the connected-in registers. Also manipulation of the automatic connecting-in board C$a$ will cause the registers to be connected-in according to a predetermined plan.

In Fig. G2 the diagrammatic arrangement and sequence of events is shown more in detail. Here the switchboards for the debit and credit keyboards are each divided into primary and secondary sections, the secondary switch section for the debit keyboard being designated by S$d$, and the corresponding primary switch sections by the characters S$d$1, S$d$2; the secondary switch section for the credit keyboard being designated by S$c$, and the corresponding primary switch sections by S$c$1 and S$c$2. This arrangement of the switch sections is to provide for the operation of a greater number of registers connected in from keyboards composed of digit keys running into several orders, as will be described in the detailed construction of the switchboards.

M$m$ is the motor for driving the master machine. 12 shows the lock by means of which the operator may unlock the journal mechanism to allow operation of the system. 13 and 14 illustrate diagrammatically relay mechanisms which are controlled by the registers connected in and in turn control printing mechanisms which appear in the places 3, 4, 6, 7 and 9 in Fig. G1. The sequence of operations is shown by the dotted lines and arrows.

In general, upon placing the key in the lock and turning it the proper amount, the operator energizes the system and unlocks the typewriter mechanism at 15 (diagrammatic). Upon manipulation of the typewriter the debit board K$d$ is automatically unlocked at 16, and upon its manipulation, the credit board is unlocked at 17. If the switching mechanisms have been actuated to connect in the registers designated on the debit and credit boards, the relay mechanism 13 is controlled by them to indicate the nature of the balances therein, and upon the master machine mechanically connecting the clutch mechanism of the registers the relay mechanism 14 is controlled by them to indicate the direction of their operation, these relays in turn controlling the type wheels represented at 4, 6, 7 and 9. Upon operation of the debit and credit boards and the mechanisms controlled thereby, the amount board is unlocked at 18, and upon its operation the general operating key, represented by the circle 19, is unlocked and upon depression of this key the clutch mechanism connecting the master machine with the motor M$m$ is actuated and the master machine is started to operate the connected-in registers. If these registers have been properly connected in and the relay mechanisms 14 properly actuated, the motor M$m$ is not affected, but continues its driving the master machine to complete the entry in the registers; but if the registers have not been properly connected in the motor will be stopped to prevent complete operation of the master machine and the registers will not be rotated to receive the entry. During the time of the connection of the debit and credit registers the indication of the nature of the balance and the direction of operation of the registers is carried back to be indicated on the type wheels, designated at 4, 6, 7 and 9, controlled by the relay mechanisms 13 and 14, and if during the entry there is a change in the nature of one or both of the balances in the registers under operation, this change is immediately indicated upon the corresponding type wheels and prior to their printing.

As soon as the master machine pick-up mechanism has operated sufficiently to enter the number in the connected-in registers, contacts are closed which complete the circuit through the motor M$j$ associated with the journal mechanism, and the journal mechanism is thus set in operation. As soon as the page in the journal mechanism has received its record from the type wheels under control of the keyboards and registers, all keyboards are automatically erased, as will appear hereafter, and thus everything at the operator's end is put in condition for the next entry. Just before the master machine comes to rest, another circuit is closed which operates the printers P associated with the registers just operated, and the indication on these registers is printed. Also at about this time will be actuated the type levers shown by 3, if the registers just being operated come to rest at zero, provided that their circuit connections have been maintained by having the repeating keys depressed upon their respective boards.

Figs. G1 and G2 are very diagrammatic and give but a very general idea of the construction, operation and coöperation of the various parts and mechanisms. These, however, will be much better understood after the detailed descriptions of the various mechanisms and the circuit arrangements have been studied, which descriptions will now follow.

*The register mechanism.*—The register mechanisms for the automatic system are all similar, as before stated, and are applied to the panel board with which is associated the master machine mechanism. The parts for each register mechanism are mounted between the main supporting walls or frames R1 and R2. These walls are connected by three transverse tubular framing shafts R3, R4 and R36. A sleeve or tubular shaft R5 is mounted on the shaft R3 between the shoulder R6 on said shaft and the supporting side R2, this sleeve having cut in its surface screw threads R7, and a driving gear R8 is secured to the right end of this screw shaft. On the left of the shaft R3 between the shoulder R6' and the supporting side R1 is a sleeve R9 secured to a driving gear R10. A gear R11 is secured to the clutch hub R12 which is keyed in the slot R13 running along the shaft R9, and this clutch hub has longitudinal movement on the tubular shaft R9 and rotates therewith upon rotation of the main driving gear R10. On the shaft R4 is mounted the tubular shaft R14, and secured to the left end of the shaft is a forward register driving gear R15. Mounted in a bearing R16 extending from the side wall R1 is a shaft R17 supporting at its inner end the reverse pinion R18, this pinion extending a distance to the right of the forward pinion R15, the left edge thereof only being in mesh with this forward gear, both these gears, however, being adapted to be independently engaged by the driving gear R11. This driving gear may be moved to the left to the end of its stroke to be in mesh only with the forward gear R15, whereupon the register shaft R14 will be driven in one direction, and when the driving gear is moved to the left only sufficiently to engage the reverse pinion R18, the register shaft is driven in an opposite direction. At the right end of the tubular shaft R14 is mounted a bushing or sleeve R19 having a flange R20, and to this flange is secured the register driving gear R21. This bushing or sleeve R19 has a feather R22 for engaging in the key way R23 running along the tubular shaft R14 and this main register driving gear must, therefore, rotate with this shaft. A primary frame R24 comprises the top wall R25 and the side walls R26 and R27, respectively. A tubular sleeve R28 is screw-threaded at its left end in the side wall R26 and clamped in place by the nut R29, the other end of this tubular shaft having a flange R30 engaging in the annular recess R31 formed in the register main driving gear between the flange R20 and the annular extension R32 from the hub of said gear, this gear being thereby laterally confined. Between the shaft R14 and sleeve R28 at the left end of the primary carriage is an alining bushing R33. Mounted in a row within the primary carriage to rotate on the tubular sleeve R28 is a series of carryover wheels R34a, R34b, R34c, R34d, R34e, and R34f, each wheel being constructed in a well known manner comprising the body part R35, from which extend ten teeth R35', each having a slot R35", as clearly shown in Fig. R7.

Upon the right end of the tubular framing shaft R36 is pivoted a sleeve or tubular shaft R37 on which is mounted a row of numeral wheels R38a, R38b, R38c, R38d, R38e, R38f, and R38g which are free to rotate thereon, with the exception of the wheel R38g at the left end of the series, which wheel is secured to the shaft R37 for purposes which will be described later. Secured one to each numeral wheel are the carrying wheels R39a, R39b, R39c, R39d, R39e, and R39f, each constructed in a well known manner comprising a cylindrical body part R30 from which projects a carrying tooth R41 for engagement in the slots R35" of the corresponding carryover gears in the primary carriage. In the normal relative position between the primary carriage and the register wheels, the drive register gear R21 is in mesh with the first numeral wheel R38a, each numeral wheel having ten teeth R42 upon which are placed the indicating figures. The first carryover gear R34a meshes with the second numeral wheel R38b and is adapted to be driven by the first carrying gear R39a when the corresponding carrying tooth R41 comes into proper position. The second carryover gear R34b meshes with the third numeral wheel R38c and is adapted for engagement with the carrying gear R39b secured to the second numeral wheel when the corresponding tooth R41 comes into proper position. This forms the well known carryover arrangement, the numeral wheel of the next higher order being rotated one division after nine advancements of the preceding numeral wheel. The edges R43 of the opposite sides of adjacent teeth on the carryover gears R34 are in the arc of a circle having a radius equal to that of the body part R40 of the carrying gears R39 and these edges being in engagement with the cylindrical surface, the carryover gears R34 are locked against rotation, except when a carrying tooth R41 engages in one of the slots, at which point the carryover gear may rotate as the grooves R44 at the base of the carrying tooth receive the edges R43, this being a well known arrangement in carryover register mechanism.

An extension R45 from the top wall of the primary carriage frame has a bore for receiving the collar or sleeve R46, receiving the screw shaft and slidable thereon, this sleeve terminating in end walls R47 and R48 which together comprise what is here designated the secondary carriage. Extending through the upper part of the end wall R47 is a shaft R49 terminating at its front end in an arm R50 and at its rear end being secured to one end of a locking arm R51 extending toward the right, a spring R52 connecting between the end of the arm R50 and the side wall R48 tending to rotate the shaft to force the right end of the arm R51 rearwardly. Secured to the end of the arm R51 and guided by the end wall R48 is the key plate R53 having at its lower end a notch R54 for engaging the threads of the screw shaft. The under part of the key plate is cut away to leave an upper part or tongue R55 and a shoulder R56, the upper part or tongue R55 engaging normally in the slot R57 cut in the top surface of a transverse stationary rod R58 extending between the side supporting walls R1 and R2, and the secondary carriage mounted on the screw shaft is therefore normally locked against lateral movement. The shoulder R56 normally engages the front surface of the rod R58 to limit the rearward movement of the key plate. Suitably supported to the framework back of the key plate is an electromagnet R59 whose armature connects with the rod R60, whose lower end passes through a stationary guideway R61 disposed back of the key plate, and a spring R62 between this guideway and a collar R63 on the rod tends to hold the rod in its rearward position. Interposed between the guideway R61 and the key plate is a block R64 supported at the end of a spring R65 secured at its other end to the lug R66 on an extension of R45 from the primary carriage. The tendency of this spring is to move the block rearwardly toward the rear stop R67 and against the guide R61 and downwardly against the top surface of the bar R58. The secondary carriage is normally in the position shown in Fig. R1, its left wall R47 engaging the extension R45 from the primary carriage, and upon energization of the electromagnet the rod R60 is pushed forwardly, the lower end thereof moving the interposed block R64 to carry the key R53 into engagement with the threads of the screw shaft, and upon rotation of this screw shaft the secondary carriage will immediately travel toward the left. The rear edge of the key tongue R55 is rounded and immediately engages the front surface of the rod R58 and during the entire travel of the secondary carriage toward the left the key is locked in engagement with the screw shaft. The pitch of the threads on the screw shaft is such that after one revolution thereof the right end wall of the secondary carriage will be in engagement with the primary carriage extension R45, and upon continued rotation of the screw shaft the primary carriage will be carried with the secondary carriage toward the left. The lower end of the block R64 is beveled, as best shown in Fig. R21, and upon travel of the secondary carriage this block will be lifted from the notch R57 and will engage the top surface of the rod R58.

During the first revolution of the screw shaft, the clutch mechanism, which will now be described, is actuated to carry the main driving gear R11 into mesh with either the forward or reverse register driving gears, the register operation being alternately one revolution of the screw shaft and then rotation of the shaft R14 to rotate the main register driving gear R21 which is in mesh with one of the numeral wheels. Pivoted above the secondary carriage to the pivot screw R69 is a foot-shaped lever R70 having a toe part R71 and a heel part R72. A tooth R73 extends upwardly from the left end wall R47 of the secondary carriage into a slot or groove R74 to normally engage the left edge of the heel part and the right edge of the toe part of the lever R70. The lever R70 is normally inclined toward the left with the front edge of the toe part disposed in the path of the tooth R73 and just above the bar R58, and when the secondary carriage starts to travel toward the left the tooth R73 rotates the lever to carry the upper part thereof toward the right and thereafter the rear edge of the tooth engages the front surface of the toe part to lock the lever against subsequent rotation to the left and a locking engagement is maintained during the entire travel of the primary carriage. The front edge of the heel part of the lever R70 after rotation thereof engages the rear surface of the bar R58 and limits the rotation of the lever by the tooth, this lever being, therefore, rigidly locked in its rotated position. After the primary carriage has been moved toward the left a sufficient distance and the desired numeral wheels have been actuated, the direction of rotation of the screw shaft is reversed, and at the end of the return movement to the right of the secondary carriage the tooth engages the left edge of the heel part and restores the lever R70 and the clutching mechanism to their normal position.

At the end of the lever R70 is a disk R75, from the top face of which extend the throw steps R76 and R77, the latter step being shorter than the former. These steps are adapted for engagement in the slot R78 in the right end of the link R79 pivoted at its other end at R80 to the clutch lever R81, this clutch lever being pivoted to the frame at R82 and at its other end being pivoted to the clutch collar R83 engaging in the clutch hub R12. An electromagnet R84 is suitably mounted on the frame and has a rod R85 extending upwardly from its armature through a longitudinal slot R86 in the link R79, there being cross pieces R87 and R88 between which the link R79 is held. In the position shown in Figs. R1 and R12, the electromagnet R84 has been suitably actuated or energized to cause the right end of the link R79 to be drawn downwardly to hold the long throw step R76 in the slot R78, and thus when the lever R70 is rotated by the secondary carriage the clutch lever R81 is given its maximum throw whereby the driving gear R11 is carried to the extreme left into engagement with the forward register driving gear R15. In the positions shown in Fig. R13, the electromagnet R84 has been suitably actuated or energized to push the end of the link R79 upwardly to allow engagement of the shorter throw step R77 only in the slot R78, and when the lever R70 is now rotated upon travel to the left of the secondary carriage the clutch lever R81 is rotated a shorter distance to carry the driving gear R11 into engagement only with the reverse pinion R18. A retaining screw R89 has engagement with the shorter throw step to limit the upward movement of the link R79 and to prevent escape thereof from the throw steps. As the left edges of the throw steps are coincident, the clutch lever will be restored to its normal position upon restoration of the lever R70 to its normal position.

The operation thus far is apparent. The main driving gears R8 and R10 are suitably connected with the master machine, as will be more clearly described later, they being given alternate actuation, the screw shaft being first driven one revolution which, as before described, causes the secondary carriage to be moved into operative engagement with the primary carriage extension after the key R53 has been moved into engagement with the screw shaft. During this first rotation the clutch mechanism is operated as described to carry the driving gear R11 into engagement either with the forward or reverse register driving gears and upon rotation then of the main driving gear R10 the shaft R14 and the main register driving gear R21 are rotated to cause rotation of the first numeral wheel, the amount of rotation depending upon the desired number of angular advancements of the numeral wheel. During the second revolution of the screw shaft the primary carriage is carried to the left a distance sufficient to carry the register main drive gear R21 into mesh with the second numeral wheel R38b, whereafter the shaft R14 is again rotated an amount depending upon the desired number of angular advancements of the numeral wheel, and so on, the primary carriage is moved laterally to carry the register main drive gear into engagement with the successive numeral wheels which are successively rotated to make the entry in the register. After the desired entry has been made the master machine is controlled to reverse the rotation of the screw shaft and the primary and secondary carriages immediately start their return movements toward their normal position. The primary carriage reaches its normal position first, and during the last reverse revolution of the screw shaft, the secondary carriage travels to its normal position, and the tongue of the key plate which, during the entire movement of the secondary carriage, engaged the front surface of the rod R58, again enters the locking slot R57. Although the electromagnet R59 may still remain energized holding the end of the rod R60 in front of the guide R61, the key plate will not be prevented from reengaging in the slot R57 as the lower edge of the block R64 has been carried into alinement above the end of the rod R60 upon return of the primary carriage and is, consequently, held away from the slot R57 to allow reëntry therein of the tongue R55. Upon deënergization of the electromagnet, the end of the rod R60 is withdrawn and the block R64 is carried by its spring into normal position between the end of the rod and the rear of the key plate. During the last revolution of the screw shaft the tooth on the secondary carriage engages the left edge of the heel of the clutch controlling lever R70 and the clutch mechanism is restored to its normal position.

In mechanism of this kind locking means must be provided for preventing lost or stray motion of the parts. During the relative motion between the primary and secondary carriage a tension spring R90 secured to the secondary carriage wall R48 and the extension R91 from the primary carriage tends to draw the primary and secondary carriages into operative position, but upon engagement of the wall R48 with the extension R45 locking mechanism is actuated to rigidly lock the primary and secondary carriages together. This locking mechanism is best shown in Figs. R1, R12 and R20, and comprises a locking lever R92 pivoted to the primary carriage as shown. The lever extends to the left over the edge of the secondary carriage wall R48, and has a tongue R92' extending downwardly and normally in contact with a trip extension R93. In the lower edge of the lever is a notch R94 and when the secondary carriage upon movement to the left engages with the primary carriage, the lever drops and the notch engages the edge of the wall R48 thus locking the carriages together. When the carriages return and the primary carriage reaches its normal position the tongue R92' strikes the trip extension R93 to raise the lever, thus releasing the secondary carriage and allowing return thereof to its normal position, the spring R90 during this relative movement of the carriage tending to hold the primary carriage in its normal rest position.

During engagement of the carryover gears R34 with the numeral wheels R38 and the carrying gears R39, they are all interlocked, but when the primary carriage moves toward the left, the carryover gears R34 successively pass out of engagement with the numeral and carrying gears and thus out of operative relation. A locking or alining mechanism for these carryover gears is therefore provided in the form of a locking bar or tooth R96 secured to the side wall R1 and the supporting frame R97 in position to engage between the teeth of the carryover gears as they leave the numeral and carrying wheels. The operative relation is also removed from the numeral wheels at the right as the primary carriage travels to the left, and therefore a locking or alining bar or tooth R98 is provided supported at the ends of the arms R99 and R100 extending, respectively, from the side walls R26 and R27 of the primary carriage. The locking edge on this bar R98 is arranged to engage between the teeth of the freed numeral wheels, the arrangement of these locking bars being best shown in Figs. R3, R4, R5, R6 and R7. It is also desirable to prevent connecting in of any other register mechanisms after the desired register mechanisms have been connected in and have started to operate, and locking mechanism for preventing this is in the form of a rod R101 pivoted at its ends in bearings R102 and R103, the forward end carrying a worm pinion R104 meshing with the worm thread R105 adapted to rotate with the screw shaft R5. When the desired register mechanisms are to be connected the appropriate keys are actuated and the corresponding electromagnets R59 energized to move the locking key plates of the register mechanisms to their screw shafts, whereupon the master machine is started and the screw shafts of all the register mechanisms rotated and the rods R101 of all the locking mechanisms are rotated to carry the detents R106 toward the collars R63 on the rods R60 associated with the electromagnets. The collars on the energized electromagnets are carried in front of the detent arm R106 and the corresponding register mechanisms are operated, but on all other register mechanisms the detents R106 will become disposed in front of the collars and any accidental energization of the electromagnets, other than those desired, will have no serious effect as the locking key plates for the corresponding register mechanisms will not be actuated. At the end of the return movement of the actuated register mechanisms the locking rods are also returned to their normal position and the collars at the actuated register mechanisms are released and the electromagnetic mechanism returned to its normal position by the spring R62.

The numeral wheels by means of the mechanism described are rotatable in either direction and can therefore perform operations of addition and subtraction. To best adapt the register mechanism for operations intended in this system it should operate algebraically, that is, it should pass through and operate at either side of zero and should always indicate the nature of the resultant with all its characteristics, and preferably without necessitating mental calculations. This mechanism, in addition to its universal adding and subtracting features, indicates mechanically and automatically the positive or negative nature of each resultant, and by such performance it becomes algebraic. Having thus secured algebraic operation, further improvements consist in securing not only a natural or normal indication but also a final indication of each resultant. In the register shown each numeral wheel is provided with two sets of figures from zero to nine inclusive, one set appearing on the right side of the teeth and the other set on the left, so disposed that the sum of the numbers represented by the figures on each tooth is nine.

One set of digits is used when the nature of the indicated resultant is positive and the other set when the nature of the indicated resultant is negative, and a shutter mechanism is provided having two rows of openings, one in alinement with the digits on one side of the wheels and the other in alinement with the digits on the other side of the wheels, the shutter being moved so that either row may be brought to the line of sight to reveal either one or the other set of indicated digits. With this arrangement when an operation passes through zero the shutter must be moved to bring the proper row of openings into the line of sight. Simultaneously with the passage through zero the numeral wheel which is being directly actuated, and with it every one of a higher order, is in such angular position that its carrying tooth, through its engaging carryover wheel, is rotated one-tenth of a revolution, and to maintain all the numeral wheels in their proper angular phase relations with each other this carrying must not stop with the highest order numeral wheel but must be carried around to the lowest order numeral wheel and up through such successive order numeral wheels, if any, as have their carrying teeth in position to carry. Without such cyclical carrying, in an operation passing through zero the shutter openings will disclose an indicated resultant which, though natural or normal, will differ from the final by one unit. In other words, to maintain all the numeral wheels in angular phase with each other and apparently with the shutter, thus always causing the register to show the final as well as the natural or normal indication, the highest order numeral wheel must carry around into the lowest order numeral wheel. Thus the carrying mechanism performs a closed cycle of events. To automatically maintain proper relations a closed cycle carrying mechanism is employed, controlled by the register itself, which carries from the highest order numeral wheel around to the lowest, advancing one-tenth of a revolution in the proper direction the units numeral wheel and each successive numeral wheel which is in carrying position. This advancement takes place at the end of a calculation, as during an entry some of the numeral wheels are locked by the locking bar R98 and some of the carryover wheels are locked by the locking bar R96 while the primary carriage is moving, and thus this cyclical carrying cannot be completed simultaneously with the passage through zero and the shifting of the shutter, nor until the primary carriage returns to its normal position; but, simultaneously with the passage through zero, mechanism is immediately operated and set in position so that this cyclical carrying is completed immediately after the primary carriage returns to its normal position.

As before described, the last numeral wheel R38q is secured to the tubular shaft R37 and when any operation carries through zero all the numeral wheels above the driver are actuated simultaneously and the last numeral wheel consequently is rotated one-tenth of a revolution to carry with it the shaft R37. At the other end of this shaft at the outside of the first numeral wheel is secured a carrying wheel R107 having a carrying tooth R108, this being similar to the other carrying wheels secured to the other numeral wheels. Secured to the shaft R4 between the side wall R2 and the shaft R14 is a thimble bushing R109 which forms an abutment for the primary carriage and on whose sleeve part is mounted a bell crank lever R110. The arm R111 of this lever has a slot R112 for engagement with the tooth R108, and at each side of this slot the edge of the arm is in the arc of a circle having a radius equal to the pitch circle of the carrying wheel R107, the lever R110 being thus locked against rotation until the tooth comes into engagement with the slot, this arrangement being best shown in Fig. R8. As best shown in Figs. R3 and R4, an arm R113 is secured to the hub R114 of the lever R110. The circular edge of this arm has teeth R115 for engagement with the teeth R116 cut in the edge of the sector gear R117 supporting one end of the shutter plate R118, whose other end is supported from the sector R119, these side sectors being pivoted to the tubular shaft R36. Thus, when the numeral wheel R38g rotates when the register passes through zero, this motion is transmitted through the shaft R37, gear R107, lever R110, lever R113 and the sector R117 to carry the shutter upwardly or downwardly. As here shown, the digits on the right side of the numeral wheels are for indicating positive resultants and those on the left side of the numeral wheels are for negative resultants, and the shutter is therefore provided with a row of openings R120 coinciding with the right side of the numeral wheels and with a row of openings R121 coinciding with the left side of the numeral wheels, and when the resultant is positive the shutter is moved to dispose the first row of openings in the line of sight L and when the resultant is negative the shutter is moved to dispose the second row in the line of sight, and the rows may be appropriately colored to indicate the character of the resultant, or may be designated by a plus or minus sign, as shown in Fig. R2, the upper row in this case being positive and the lower row negative.

With the mechanism thus far described algebraic operations may be performed, but upon passage through zero the indicated resultant will differ from the final resultant by one unit. Mounted at the rear of the register frame and secured to a cross supporting wall R122 is a pivot block R123 disposed, as shown, in front of the electromagnet R59. Upon the upper end of this block is pivoted a ring or collar R124 from which extends an arm R125, having a pivot post R126 to which is pivoted one end of the rod R127, whose other connection will be presently described. Links R128 engage at one end the pivot R126, one at each side of the connection of the rod R127 therewith, and in the other end of these links a pin R129 is keyed to have longitudinal motion. Engaging this pin between the links is the end R130 of a link R131 terminating at its other end in the elongated bearing or slot R132 engaging a post R133 extending from the clutch controlling lever R70. A rod R134 is pivoted at its front end to the arm R135 of the lever R110 and at its rear end is pivoted to the pin R129 above the links R128, and therefore as the lever R110 is rotated, when the register passes through zero, the rod R134 will be moved either forward or backward to set the pin R129 by carrying the center of this pin to either one side or the other of a line joining the centers of the posts R126 and R133. The construction of the pin R129 and the block R123 is best shown in Figs. R17, R18 and R19. The lower part of the pin has a segment cut therefrom to leave a shoulder R136. The block R123 has a flange R137 extending upwardly around its edge, and the upper surface of the block within the flange lies in planes of different heights, the left half R138 being in a lower plane, while the right half R139 is in a slightly higher parallel plane. The arm R125 is adapted to be rotated about the pivot block R123 between the rearward position shown in Fig. R1, and the forward position shown in Fig. R13. The dividing edge between the two planes lies in the arcs R140 and R141, the arc R140 having its center in the center of the post R126 when the arm R125 is in its rearward position, and the arc R141 having its center at the center of the post R126 when the arm R125 is in its forward position. At the rear part of the block in the surface R139 is cut a slot or groove R142 whose base lies in a third plane intermediate between the planes R138 and R139, the exit edge of this slot coinciding with the arc R140. Diametrically opposite this slot at the other edge of the block is a second slot R143 whose base lies in the same plane as that of the first slot and whose exit edge coincides with the arc R141. Leading from the lower plane to the higher plane and into the slots R142 and R143 are the inclines R144 and R145, respectively, the front edge of these inclines lying in the arcs R140 and R141 and the apexes of the inclines lying close to the axis of the block.

The normal position of the register mechanism is shown in Fig. R1, the rod R134 being in its rear position and the pin R129 resting with its foot against the lower plane R138 with its shoulder R136 resting against the exit edge of the rear slot R142. When the clutch lever R70 is thrown during the first revolution of the screw shaft the arm R131 assumes the position shown in Fig. R12, there being, however, no longitudinal movement thereof as the pin R133 will not move sufficiently in the slot R132. When the register, however, passes through zero the rod R134 is pulled forwardly, as before described, and the pin R129 is carried forwardly, the foot thereof first passing upon the plane R138 along the arc R140 and then sliding up the incline R145 to the higher plane R139, the pin assisted by the weight R129' on the upper end thereof, finally dropping into the lower slot R143. The foot of the pin being thus locked in the slot, the rod R134 is more securely locked against undesired subsequent rearward action, this position being maintained until the end of a calculation and until the clutch mechanism is moved toward its normal position during the last reverse revolution of the screw shaft. The pin upon being moved from its rear to its forward position is at a greater distance from the pin or post R133 in the lever R70 and the arm R131 is in the position indicated by dotted lines shown in Fig. R12. When the lever R70 is returned to its normal position the left end of the slot R132 is engaged by the post R133 and the link R131 is pulled longitudinally. However, as the center of the pin R129 is in front of the line joining the post R126 and R133, and as the pin is locked in the front slot R143, the result is clockwise rotation of the arm R125, the final position being shown in Fig. R13. This clockwise rotation of the arm having moved the foot of the pin R129 out of the forward slot, the pin then engages the lower plane R138 with its shoulder against the exit edge of the slot R143.

When the register passes through zero in the opposite direction this mechanism is, of course, operated in an opposite direction and the rod R134 is pushed rearwardly from the position shown in Fig. R13, and the foot of the pin R129 passes along the arc R141 and moves up the incline R144 to the higher plane R139, finally dropping in the rear slot R142 to more securely lock the arm R134 in its rear position, this position of the pin and the position of the link R131 being indicated by dotted lines in Fig. R13. As the pin during its rearward movement has been moved toward the right of its normal position shown in Fig. R13, the post R133 engages the end of the slot R132 when the clutch controlling lever R70 is restored to its normal position upon return of the secondary carriage, and the link is again moved longitudinally. The pin R129 being behind the line connecting the posts R126 and R133 and being locked in the rear slot, this pull on the link results in counter-clockwise rotation of the arm R125 to its rear position, as shown in Fig. R1, and this counter-clockwise rotation of the arm R125 having moved the foot of the pin R129 out of the rear slot it rests on the lower plane R138 with its shoulder against the exit of the rear slot, the mechanism being then all in its normal condition. The rod R127, heretofore mentioned as being pivoted at one end to the pin R126, engages at its other end with a special carrying mechanism. As best shown in Figs. R1, R4 and R5, the units numeral wheel has horizontal posts R148 extending to the right, one at each of its teeth, and suitably pivoted to the frame work at R149 and R150 are the carrying dogs R151 and R152, respectively, being parallel and connected at their front ends with the link R153. From the hub of the upper dog extends the arm R154 to which the front end of the rod R127 is pivoted. The point of the lower dog R152 is adapted to engage the posts on the numeral wheel to rotate this numeral wheel in the direction indicated by the arrow in Fig. R4, while the point of the upper dog R151 is adapted to engage these posts to rotate the numeral wheel in an opposite direction, and these dogs are actuated to cause corresponding rotation of the numeral wheel when the arm R125 is rotated upon return of the clutch mechanism to its normal position. Thus, by entirely automatic operations the indication on the register is always final, making any mental operations whatsoever unnecessary. The register when passing through zero in either direction causes movement of the higher order numeral wheels and of the mechanism before described to immediately shift the shutter in the proper direction to disclose the positive or negative nature of the indicated resultant, and to set the cyclical carrying mechanism so that when the carryover gears and register wheels are in perfect alinement in their normal position and the clutching mechanism has almost been restored to its normal position, the numeral wheels are all brought into phase, thus always showing the true final resultant.

It may be desired to indicate the number of positive entries and the number of negative entries made, as in an account, for instance, and for this purpose is provided mechanism actuated by the clutch operating mechanism. On the link R79 of the clutch operating mechanism is secured a perpendicular actuating bar or plate R155. A coöperating member or bar R156 is pivoted at R157 to the cross supporting wall R122 and an arm R158 extending from this coöperating member is pivoted to one end of a rod R159 extending forwardly, the forward end of this rod being pivoted to the lower end of a forked lever R160 whose arms R161 and R162 terminate in actuating collars R163 and R164 pivoted in association with the counters of indicators R165 and R166. The construction of the coöperating member R156 is best shown in Fig. R16, which shows a view from the front of this counter actuating mechanism, as shown in Fig. R13, in which the clutch mechanism has been actuated to move the driving gear R11 into mesh with the reverse pinion R18. From the forward end of the coöperating member a pin R167 extends upwardly and from the rear end of this member a post R168 extends upwardly, this post, however, at its end having a slot R169 wide enough to allow passage therethrough of the actuating plate R155. The length of the post and the position of the slot are so related that when the link R79 is moved upwardly to be engaged by the shorter throw step on the lever R70 the rear end of the actuating plate R155 will engage the top end of the post R168, and the lower end of the plate will pass over the end of the post R167 upon movement to the right of the actuating plate with the link R79. The coöperating member is therefore rotated to carry the arm R158 and the rod R159 rearwardly. When the rod R79 has been moved downwardly into engagement with the longer throw step, as shown in Figs. R12 and R1, the top of the plate R155 will pass through the slot R169 and its lower end will engage the end of the post R167 when the link R79 is moved to the right, and the member R156 will be rotated to move the arm R158 and the rod R159 forwardly, as shown in Fig. R12. As the rod R159 is moved rearwardly or forwardly the forked lever R160 is swung rearwardly or forwardly to rotate either one or the other of the collars R163 and R164. Within these collars are disposed suitable pawl and ratchet mechanisms which upon forward movement of the rod cause actuation of the counter R165 to indicate a positive entry and upon rearward movement of the rod cause actuation of the counter R166 to indicate a negative entry.

It may be desirable also to have the counters thrown back to zero indication when the register comes to and rests at zero and therefore releasing mechanism is provided which becomes effective to release the counters to allow them to return to zero indication only when the register indication is zero. The counters may be provided with suitable releasing mechanism indicated by R170 but not shown in detail, and this releasing mechanism is adapted to be operated at the proper time by the end of a releasing lever R171 secured to the shaft R172. Another lever R173 is also secured to the shaft R172 and extends downwardly, being pivoted at its end to the end of the rod R174 which extends rearwardly to be pivoted at R 175 to one end of the lever R176, whose other end pivots about the post R177 extending from the framework. At an intermediate point on this lever is pivoted a cam roller R178 adapted to be engaged by the cam surface R179 of the cam arm R180 secured to rotate with the clutch lever R81. As before stated, the shutter R118 is secured to the side sectors R117 and R119 and pivoted on the shaft R36. From these sectors R117 and R119, respectively, arms R181 and R182 extend upwardly. Secured also to the shaft R172 are the arms R183 and R184 which extend forwardly, the ends thereof terminating at the ends of the shutter frame arms R181 and R182. Within these arms are the slots R185 and R186, respectively, which at their forward ends coincide with slots R187 and R188 extending radially at the end of the shutter frame arm. Extending through the slots R185 and R186 and R187 and R188 is a rod R189 held in place therein by the heads R190 and R191, this rod being in position over the teeth of the numeral wheels, and on it over each numeral wheel is secured a washer R192. In the center of one tooth of each numeral wheel is cut a slot R193 large enough to receive a washer. The slots in the numeral wheels bear such relation to the zero digits in the numeral wheels that when the indication is zero these slots are in line and under the rod R189 so that all the washers on the rod may fall into the slots when the rod is lowered. The slots in the ends of the shutter arms R181 and R182 are for the purpose of allowing movement of the rod toward and away from the teeth as the washers engage in the slots or are raised above the surfaces of the unslotted teeth. The relation between the releasing lever R171 and the arms R183 and R184 is such that when the washers engage the unslotted teeth the releasing lever is held from effective engagement with the releasing mechanism of the counters, but when all the washers engage in the slotted teeth the arms R183 and R184 drop to rotate the shaft R172, whereupon the releasing lever drops sufficiently to operate the releasing mechanism and, consequently, returns both counters to zero indication. Since there are two zero readings of the register, each one indicating a zero resultant but having the mechanism come to rest in an angular position different from the other by thirty-six degrees it is necessary that the rod R189 shall shift with the shutter, thereby keeping in phase with all parts of the mechanism, so as always to be over the slotted teeth of the numeral wheels when the indication of the register is zero, and this rotation of the rod is allowed by the slots R185 and R186 cut in the arms R183 and R184. Normally, therefore, when the register indicates zero the counters will likewise be at zero indication, but these counters should not be released when the register merely passes through zero, as may happen several times during a series of operations thereof, and to prevent release at those times the mechanism before described and associated with the clutch lever R81 is provided. When the clutch mechanism is thrown in, the cam arm R180 is rotated and the cam surface R179 engages the cam roller R178 to cause rotation of the lever R176 to move the rod R174 forwardly to rotate the shaft R172 to carry the releasing lever R171 upwardly out of operative engagement with the releasing mechanism, and if the register now passes through zero during its course of operation the releasing mechanism is prevented from operating, the arms R183 and R184 being also rotated upon rotation of the shaft R172 to hold the rod and washers from engagement with the numeral wheels. This release mechanism can, therefore, become effective only after release of the clutch mechanism and when the register has come to rest with its indication zero.

Indicating mechanism may also be provided which is capable of showing the date and time of every entry, the arrangement of this mechanism being best shown in Fig. R3. The shaft R194 extends through the tubular framing R36, being secured at its ends to the bushings R195 and R196 bearing in said tubular framing and secured at their outer ends to the coupling flanges R197 and R198. By means of these coupling collars the shaft R194 of the register mechanisms may be coupled together and eventually with the date and time controlling device. Within the tubular framing R36 is a pinion R199 secured to the shaft R194 and communicating through gearing R200 with the suitably mounted indicator R201 whose indicating wheels indicate the time and date as determined by the time and date controlling mechanism.

Electrical contact mechanism may also be associated with the various operative parts of the register mechanism to control indicating circuits actuating mechanism for indicating to the operator and otherwise the operating condition of each register mechanism. The contact arm R202 extends rearwardly from the secondary carriage, as best shown in Fig. R1, and supports at its end a brush R203 adapted to travel over the contacts R204a, R204b, R204c, R204d, R204e and R204f, the brush and contacts being suitably connected in circuit. These contacts R204 are disposed in correspondence with the numeral wheels and when the brush R203 rests on the first contact R204a indication may be given the operator that the register main driving wheel R21 engages the first numeral wheel, and when the brush engages the second contact R204b the indication to the operator may be given that the driving wheel engages the second numeral wheel, and so on. In a similar manner the positions of the clutch mechanism may be indicated to the operator, the contact arm R205 extending from the clutch lever R81, carrying at its end a brush R206 for engagement with the contacts R207a, R207b, R207c, the contacts and brush being suitably connected in circuit. When the brush engages the first contact R207a the indication will be that the clutch mechanism is normal and when the brush engages the second contact the driving wheel R11 will be in engagement with the reverse pinion R18 and this condition will be indicated to the operator, and when the brush engages the last contact the driving gear R11 will mesh with the forward gear R15 which condition will be indicated to the operator.

A circular contact wheel R208 is mounted on the shaft R14 to rotate with the register driving gear R15 and a pair of contact brushes R209 are suitably mounted to engage this contact wheel. As the gear R15 and the register main driving gear R21 rotate, this contact wheel will rotate with the same angular velocity and the controlling circuits, including the contact wheel and brushes, will be effected for each unit of the number entered on any numeral wheel. In the same manner the conditions of balance or sign of the indicated resultant and the passage through zero of the indicated resultant may be indicated to the operator by means of a contact arm R210 extending rearwardly from the pin R129 and engaging the contacts R211a, R211b and R211c which correspond to the various positions of this mechanism. A contact R253 is engaged at R175 by the lever R176 when this lever is in its rearward position upon the register's coming to rest at zero, thus closing a circuit to actuate mechanism indicating that the register is clear. The exact condition, position and operation of the various parts can thus be closely followed by the operator. The various circuits and the indicating mechanism at the operator's board will be described in connection with the circuit arrangements of the system.

In the register mechanism thus far described, the result indicated on the numeral wheels must be read, but it is desirable that this result be automatically printed for record and for future reference. The construction and arrangement of the mechanism to accomplish this must be slightly modified and this modified register mechanism is best shown in Figs. R22 to R33.

In general, the construction is such that printing mechanism may be brought into engagement with the numeral wheels at the line of sight to receive on paper from the numeral wheels the indicated resultant and for this purpose the numeral wheels are provided with raised type.

The entire register mechanism remains the same with the exception of the numeral wheels, and, as shown in the figures referred to, each numeral wheel comprises two parts or disks R215 and R216, each carrying a set of numbers, the sets running in opposite directions as shown in the register before described. The parts of each numeral wheel, together with its carrying wheel, are mounted on a hub R217, the carrying wheel being mounted on the concentric part R218 of the hub, the part R215 being on the eccentric part R219 and the part R216 being on the eccentric part R220 of the hub. The eccentric arrangement of the parts R219 and R220 is such that upon rotation of the hub through a suitable angle the disks move in opposite directions, one set moving forwardly to project the suitable numbers thereon into the line of sight, while the other set moves rearwardly to withdraw the adjacent numbers thereon from the line of sight. As the numbers on the wheel parts are raised in the form of type, printing means such as paper may be brought by printing mechanism into engagement at the line of sight with the numbers of the wheel parts which project forwardly and such printing mechanism will eventually be described. The adjacent teeth on the disks of each numeral wheel, of course, slide by each other a short distance, but both remain in mesh with the teeth of the carryover wheels in the primary carriage. The carrying wheel for each numeral wheel always rotates therewith and is coupled to the adjacent disk by means of a pin R221 extending from the numeral wheel disk and engaging in a slot R222 in the carrying wheel. Thus, the numeral wheel parts and the carrying wheel will rotate together but at the same time the disks may move rearwardly or forwardly on account of the pin and slot coupling connection. The end disk R215 of the first numeral wheel is connected with a disk R223 to a pin and slot coupling comprising the pin R224 extending from the disk R215 and engaging in the slot R225 in the disk R223, this disk being mounted on the concentric part R226 of the hub R217 of the first numeral wheel and being held in place thereon by the washer or ring R227 having threaded engagement with the end of the hub. Extending from the plate R223 are the posts R228, one for each set of teeth on the numeral wheels, and these posts are associated with the dogs R151 and R152 hereinbefore described which connect with the setting mechanism mounted on the pivot block R123 at the rear end of the register frame.

The hubs of all the numeral wheels are keyed to a sleeve R229 which terminates at its right end in a gear R230. The left disk of the last numeral wheel is coupled to the flange R231 by means of the pin R232 extending from the disk and engaging in the slot R233 in the flange. This flange is secured to the left end of a sleeve R234 disposed within the sleeve R229, and this sleeve R234 terminates at its right end in a carrying disk R235 having a tooth R236. Another sleeve R237 within the sleeve R234 and mounted upon the shaft R36 terminates at its left end in the bell crank lever R238 having a forwardly extending arm R239 and an upwardly extending arm R240. The right end of this inner sleeve terminates in a bell crank lever R241 having a rearwardly extending gear arm R241' and an upwardly extending arm R242, the arm R241' having teeth R242'. The bushing R109 on the shaft R4 which supports the primary carriage pivotally supports a hub R243 from the center of which the arm R244 extends forwardly having a slot R245 for engaging the tooth R236 on the carrying wheel R235, and having locking surfaces at the sides of the slot for engaging the locking surface of the carrying wheel. Secured to the hub R243 at the left side of the arm R244 is the gear segment R246 having teeth R247 for engaging the teeth of the gear R230. Secured to the hub R243 at the right of the arm R244 is the gear arm R248 having teeth R249 for engaging the teeth of the gear sector R241'. With this arrangement the operation is as follows: When the calculation extends through zero all the numeral wheels at the left of the numeral wheel then being actuated move simultaneously one-tenth of a revolution and the last numeral wheel being coupled to the flange R231 rotates the sleeve R234 and the carrying wheel R235 through one-tenth of a revolution, the tooth R236 causing rotation of the arm R244 which upon rotation, as hereinbefore described, causes either forward or rearward movement of the rod R134 connected with the setting mechanism at the rear of the register frame and with the arm R135 which extends from the hub R243. Upon rotation of this hub the gear sectors R246 and R248 will also rotate, the gear sector R246 causing rotation of the gear R230 and the sleeve R229 connected with the hub of the numeral wheels, and the hubs with the eccentric surfaces thereon are rotated a sufficient angle to cause relative movement between the numeral wheel disks to withdraw the disks which are then in their forward position and to shift forwardly the other set of disks bearing the proper digits. The gear sector R248 upon rotation causes rotation of the bell crank lever R241, the sleeve R237 and the bell crank lever R238 at the left end of said sleeve, thereby causing movement of the arm R239 to carry either the plus or minus sign thereon into line with the digits on the numeral wheel disks which are being brought forward, the plus and minus signs appearing in type on the front edge of the arm R239 at the ends thereof, as best shown in Fig. R27. This shifting forward of the proper numeral wheel disks and the movement of the arm R239 to dispose the proper sign in line with the digits on the numeral wheel disks is accomplished immediately upon passage of the register through zero, but the indication on the forward disks is not at this time completed, and before the complete resultant will appear the first numeral wheel must be carried one-tenth of a revolution, and this is accomplished when the clutch mechanism of the register mechanism is restored to its normal position, this operation having been fully described hereinbefore, the setting mechanism at the rear of the register mechanism being actuated upon restoration of the clutch mechanism to cause movement of the rod R127 and the carrying dogs R151 and R152, which dogs upon engagement with the proper posts on the disk R223 cause one-tenth of a revolution of the first numeral wheel in the proper direction, and the resultant indicated on the forward numeral wheel disks is final.

The mechanism for causing release of the counting mechanisms R165 and R166 is practically the same as for those on the non-printing register, the bar R189 being pivoted at its ends in the slots R187 and R188 of the arms R242 and R240 which rotate with the inner sleeve R237. The releasing mechanism for the counters is prevented from actuation until the slots R250 in the numeral wheel move into line to be engaged by the washers R192 on the bar R189. These slots in this printing register are in two parts, one-half of each slot being in each of the adjacent teeth of the disks of the numeral wheel, this being best shown in Fig. R22.

On account of the relative shifting of adjacent teeth on the disks of each numeral wheel the locking bar R98 supported from the primary carriage will not always be closely engaged by the teeth of the numeral wheel disks. When the right disks of the numeral wheels are in the forward position, as shown, the teeth thereon will be relatively disposed, as shown in Figs. R24 and R25 and the locking bar as the primary carriage moves engages at its upper edge with both teeth of each set but at its lower edge engages only one tooth of each set. When the left numeral wheel disks are in their forward position the relative position of the teeth is as shown in Fig. R26, and the locking bar does not quite touch any of the teeth and there may, consequently, be slight displacement. However, to restore the alinement of the numeral wheel disks when the primary carriage returns to its normal position, the side edges R251 of the teeth of the carryover gears and especially the driver gear in the primary carriage are beveled, as best shown in Figs. R24 and R33, and even though the numeral wheel disks become slightly displaced they will be drawn into proper position upon engagement of their teeth with the beveled edges of the carryover gears and driver gear.

*The register printing or recording mechanism.*—The printing or recording mechanism for association with the register mechanism to print the indications thereon is shown in Figs. P1 and P2. The line of sight or of printing includes the digits on the forward numeral wheels, the plus or minus sign and the characters in the counters and time indicator, all these digits and characters being raised similar to type. The mechanism for the printing or recording device is inclosed within a rectangular band or box forming the upper wall P1, the lower wall P2, the front wall P3 and the rear wall P4. Side walls P5 and P6 are disposed within the band a slight distance from the edge thereof, the upper, lower and rear edges of these side walls being in contact with the top, bottom and rear walls, while the front ends of the side walls extend through slots P7 and P8 in the front wall P3 and are connected together by the cross piece P9. Mounted on the cross piece P9 is the electromagnet or solenoid P10, whose core P11 connects at its end to the cross bar P12, whose ends are secured to the side bars P13 and P14 which pass through the slots P15 and P16 in the front wall P3 outside of the side walls P5 and P6 but within the edges of the band, these rods being connected at their rear ends with the cross bar P17. The front cross bar extends through the slots P18 and P19 in the side walls, while the cross bar P17 extends through similar slots P20 and P21 through the side walls at the rear end thereof. Upon energization of the solenoid the core will be moved rearwardly and with it the frame comprising the cross and side bars. Upon deënergization of the electromagnet a spring P22 connected to the armature and to the electromagnet shell will return the frame to its front position. Mounted on the transverse shafts P23 and P24 pivoted in the side walls P5 and P6 are the feed spools P25 and P26 respectively, the spool P25 having end flanges P27 and P28, while the spool P26 has end flanges P29 and P30. The record paper roll P31 is carried on the spool P25, while a carbon paper roll P32 is carried on the spool P26, with the carbon side out. A guiding roller P33 is pivoted between the side walls to the rear of the spool P25. The guiding roller P34 is pivoted between the side walls to the rear of the spool P26. A roller P35 is pivoted between the side walls at the lower rear end thereof and immediately above this roller between the upper rear edges of the side walls is pivoted a roller P36, and directly above the roller P34 between the upper edges of the side walls is the roller P37. In front of the spool P25 is the intake spool P38 for the carbon paper. This spool has the flanges P39 and P40 and is mounted on the shaft P41 pivoted between the side walls. The intake spool P42 for the record paper has the flanges P43 and P44 and is mounted in front of the intake spool P38 on the shaft P45 pivoted between the side walls. The guiding roller P46 is pivoted between the upper edges of the side walls to the rear of the intake spool P38 and the guiding roller P47 is pivoted between the upper edges of the side walls to the rear of the intake spool P42. Between the rollers P34 and P35 and above the plane thereof is the guiding roller P48 also pivoted between the side walls, and between the rollers P35 and P48 is a guiding roller P49 pivoted in the ends of the arms P50 extending from the cross bar P17, its normal position being shown in Fig. P1. Above the roller P48 is a feed cylinder P51 mounted on the shaft P52 pivoted in the side walls P5 and P6 and above this feed cylinder is a second feed cylinder P53 mounted on the shaft P54 pivoted between the side walls P5 and P6. The record paper from the roll P31 passes under the roller P33 and under the carbon paper from the roll P32, both record paper and carbon paper then passing under the roller P34 over the roller P48, under roller P49, around the rollers P35 and P36, between the feed cylinders P51 and P53 and over the rollers P37 and P46, the carbon paper being then taken up on the intake spool P38, while the record paper passes on over the roller P47 to be taken up by the intake spool P42. In the front wall P4 is the window or slot P55, this slot being of sufficient length to take in the numeral and character wheels on the register, on the counters and on the time indicator, and the papers which are carried by this slot are also of sufficient width to take in all the characters in the line of print on the indicating wheels.

The printer or recorder for each register mechanism is suitably mounted with respect thereto to bring the window or slot into proper position with respect to the line of printing and this mounting is best shown in Figs. P3 and P4. Where a printer or recorder is to be used with a register mechanism the side walls R1 and R2 thereof are extended forwardly to form the supporting arms P56 and P57 having in their upper edges at the front thereof the grooves P58 and P59. The ends of the shafts for the rollers P35 and P36 extend beyond the edges of the inclosing band, as shown, and a rod P60 extends beyond the side walls P5 and P6 at the top and front thereof. The distance between the extensions from the shafts for the rollers P35 and P36 is equal to the width of the arms P56 and P57, the printer frame being then slipped over these arms until the rear extensions are against the front edges of the register walls R1 and R2 and when in this position the ends of the front supporting rod R60 will be in position to drop into the grooves P58 and P59 to lock the printer frame to the register mechanism frame. In this position the edges of the window or slot in the front wall of the printer will be in line with the faces of the characters disposed in the line of printing.

Mounted on the front edge of the cross bar P17 is the printing pad P61 of rubber or other suitable material, and when the solenoid P10 is energized the cross rod P17 will be moved rearwardly to carry the pad into engagement with the papers passing by the slot P55 and will press the papers against the raised characters on the indicating wheels, and on account of the disposition of the carbon paper, as described, these characters will be printed on the record paper in front of the carbon paper. Some slack is necessary in the papers between the rollers P35 and P36 during this printing operation, and this slack is provided when the roller P49 is carried rearwardly toward the roller P35. The distance between the rollers P36 and P35 is practically the same as that between the rollers P35 and P48 and the angle in the papers between the rollers P35 and P48 when the roller P49 is in its normal position is practically the same as the angle will be in the paper between the rollers P35 and P36 when the papers are carried into engagement with the characters. In other words, the slack normally between the rollers P35 and P48 is transferred between the rollers P35 and P36 when the roller P49 moves rearwardly and allows the paper between the rollers P35 and P48 to straighten out.

After each printing operation the papers must be advanced for the next printing operation and this advancement is accomplished by the feed cylinders P51 and P53, which cylinders are more or less in pressure with each other and preferably formed of friction material such as rubber. Mounted on the shaft P52 between the side wall P6 and the side rod P14 is the ratchet wheel P62 which is engaged by the teeth P63 at the front end of a ratchet or bar P64 having at its rear end a slot P65 engaging a pivot pin P66 fixed in the end of the arm P67 extending upwardly from the side rod P14. The cut of the teeth is such that there will be no rotation of the cylinder P51 during the rearward movement of the side bars, but upon forward movement thereof the cylinder will be rotated to draw forwardly the papers after a printing operation. The papers are advanced an equal distance after each operation and this amount is determined by the length of movement of the side rod P14 and the length of the slot P65. A locking pawl P68 is pivoted below the side bar P14 to the side wall P6 and at its point engages the ratchet wheel P62 to lock the feed cylinder against reverse rotation after a forward advancement thereof. A spring P69 connects between the pawls and holds them against the ratchet wheel.

The papers, as before stated, are eventually taken up on the intake spools P38 and P42. The normal rotation of these intake spools must vary with the varying diameters of the paper rolls, the length of the paper fed thereto after each printing operation being constant. Each intake roll is provided with a ratchet wheel P70 secured to its shaft between the side wall P6 and the side rod P14. To each of the intake roller shafts a lever P71 is pivoted at an intermediate point, the lower end being pivoted to a pawl P72 engaging the teeth of the ratchet wheel and connected by a spring P73 with a locking pawl arm P74 pivoted at P75 to the side wall P6, its end being in engagement with the ratchet wheel to prevent reverse rotation thereof after forward advancement by the pawl P72. The other end of the lever P71 has a pin P76 extending therefrom into a slot P77 in the arm P78 extending from the side rod P14. When the printing frame is moved to carry the papers against the type of the indicator wheels the levers P71 are rotated in a clockwise direction to carry the pawl P72 across the ratchet wheel teeth, and when the printing frame is restored to its normal position the springs P73 acting with the pawl P72 cause sufficient rotation of the intake rolls to take up whatever slack there is in the papers after a printing operation. In reality there is at no time slack in the papers as the springs P73 are always in tension to cause rotation of the intake rolls by the pawls P72. When the papers are just started on the intake spools the amount of rotation of the rolls must be maximum and when the rolls are filled the necessary amount of rotation thereof to take up the slack would be minimum. The length of the slots P77 therefore is such that sufficient rotation may be caused by the spring P73 to take up the slack, and the disposition of the slots is such that when the papers are just started on the intake spools the pin P76 will be in engagement with the front end of the slots so that upon rearward movement of the printing frame the levers P71 will be given their maximum rotation to cause the maximum amount of rotation of the intake rolls upon release of the printing frame. The ends of the shaft of one or all of the spools may extend through the slots P79 in the side rods P13 and P14 to offer additional guiding support for the printing frame. Niches P80 may also be cut in the ends of the pawl P72 and in the locking pawls P68 and P74 which have, if their pitch is half the pitch of the wheel teeth, an effect equal to that of doubling the number of teeth on the ratchet wheel. The springs P73 also serve to hold the pawls in engagement with the ratchet wheels.

Any number of copies of an indication on the register may be taken by the printer or recorder, either by increasing the number of pairs of feed spools and the number of pairs of intake spools, depending upon the number of copies desired, or by winding on each spool one or more pairs of carbon and record papers, and all will be controlled in the same manner as that described. Each record paper roll on the intake spools will have a complete record of all the indications on the register mechanism to which the printer is attached. All positive indications are set up on the right side of the numeral wheel and will all be alined in one column on the record paper, while all negative indications are set up on the left side of the numeral wheels and on the record paper appear in a column slightly to the left of the positive indications, all positive indications being preceded by the plus sign and all negative indications by the minus sign. The indications on the counters and time indicators appear in their respective rows on the paper at the left of the numeral wheel indications thereon. The actuation of the printer or recorder to print a resultant occurs directly after each operation of the register by the master machine. The circuit for the electromagnets or solenoids P10 includes the selective contacts R267—268—269 on the registers and the contacts M410 and M413 on the master machine. The selective contacts are on each register and are closed only on the registers operated by such operation and remain closed only until the printers are actuated. The master machine contacts, as shown in the description of the master machine mechanism, are out of electrical engagement during the operation of the master machine and are brought into electrical connection only as the master machine mechanism comes to rest after having driven the connected register mechanisms, during which connection of these contacts the solenoids P10 of only the printers associated with the registers just operated will be active to actuate the printers to receive the indications on the registers, all the contacts becoming again disconnected when the master machine comes to rest, thus opening the circuits through the solenoids allowing restoration of the printers to their normal position. The circuit drawings and their description will fully show the connections.

*Master machine mechanism.*—The two primary movements of the register mechanisms, one of translation to shift the driving mechanism from one numeral wheel to the next, and the other of rotation to revolve the numeral wheels, are controlled by the master machine mechanism which is associated with the panel board to be connected with the screw shift shafts and the driving wheel shafts with which shafts each of the register mechanisms is connected. The master machine mechanism, therefore, must cause proper rotation of two main shafts which must be alternately operated to cause alternate translatory and rotary motion in the register mechanisms. The translatory motion is always of a fixed amount, while the rotary motion is of a variable amount proportional to the value of the given digit which is to be entered on the connected numeral wheel. Broadly, the master machine mechanism comprises these two main shafts with proper reversing and controlling mechanism for the translatory motion producing shaft, while setting up mechanism is provided for the rotation producing shaft to determine the amount of rotation thereof and differential mechanism for driving this shaft the allowed amount determined by the setting up mechanism. This setting up mechanism and differential driving mechanism will be eventually described in detail. Means are also provided for causing the operation of the main shafts to be alternate, and intermittent gearing mechanism is employed for this purpose. Locking and other adjusting mechanisms are also necessary to render the operation reliable and accurate and all these features will appear in detailed description. Broadly, the operation is, that the proper pressing of digit keys upon a suitable key board corresponding to the number to be entered, causes operation of the setting up mechanism; whereupon actuation of a switch or button causes electromagnetic clutch operating mechanism to become effective and the master machine begins its operation alternately to rotate its screw shaft and the connected screw shafts of the registers, and to cause the operation of the differential gearing mechanism, the latter being controlled by the setting-up mechanism to cause rotations of the successive numeral wheels corresponding to the digits of the number to be entered thereon. The rotary motion is therefore entirely under the control of the operator, while the translatory motion is fixed and automatically controlled by the master machine. After the connected registers have been suitably actuated by the master machine, the operative parts of the master machine are automatically restored to their normal position.

The parts of the master machine mechanism are supported by main vertical supporting walls M1 and M2, a front supporting wall M3, the supporting standards M4, M5 and M6, and various other minor supporting members which will appear as the description goes on. The main driving mechanism is supported from the front wall M3 and the standard M4. The driver clutch member M7 is freely mounted on the front end of the shaft M8 extending rearwardly through the bearing M9 on the standard M4. The driven clutch member M10 is part of and affixed to the front end of a sleeve M11 fitting over and driving the shaft M8 by means of key engagement. Toward the rear end of the shaft M8 the gear M12, the cam M13 and the bevel gear M14 are rigidly affixed. The driven clutch member M10 is cylindrical and engages in the circular opening M15 in the supporting wall M3, thus assisting in the support of the shaft M8 which extends into the clutch member M7. As best shown in Figs. M1, M2, M4, M18 and M19 the driven clutch member M10 has a clutch pin M16 extending from the front face thereof for engagement in the clutch groove or channel M17 in the clutch member M7, this clutch groove forming almost a complete circle, as best shown in Fig. M19. Thus, when the driven clutch member is moved forwardly the clutch pin thereon engages in the clutch groove and when the end of the groove is reached the clutch parts will move together. The relative movements between the clutch members are controlled by the member M18 (Figs. M17 and M20), secured to the front end of the horizontal shaft M19 and comprising the clutching disk M20 and the unclutching disk M21 supported from the sleeve M22, and mechanism for causing forward and backward reciprocation of the controlling member with the shaft M19 which will be described later. Normally the disk M20 is behind the supporting wall M3 and the rear lower edge of the clutch member M10, but upon forward movement of the shaft M19 the disk is moved against the lower edge of the clutch member carrying it forwardly thereby moving the clutch pin into the clutch slot, the disk at the end of its forward movement fitting into the circular space M23 in the supporting wall M3 partially overlapping the opening M15 and the clutch members, thus holding them in engagement while this disk is in its forward position. The rotation of the driving clutch part is continuous in the direction indicated by the arrow and on the periphery of this member near the rear edge thereof is a cam ridge or wedge M24 having its cam or wedge point M25 at its front end, as best shown in Figs. M1, M2 and M4. On the periphery of the driven clutch member M10 and near the front edge thereof is a cam ridge or wedge member M26 having its cam or wedge surface M27 at its front end, as best shown in Figs. M2 and M18. Normally when the clutch members are separated the disk M21 is disposed between them engaging the front surface of the cam M27 thus holding the clutch member M10 in its normal position, its front face being in the same plane with the rear face of the unclutching member. When the shaft M19 is moved to carry the clutch controlling member forwardly the disk M20, as before said, moves the members into clutching engagement, the disk M21 at the end of this forward movement being in front of the path of the wedge members, as shown in dotted position in Fig. M2, and not engaged thereby during the time that the clutch members are driven together to cause operation of the master machine mechanism. Should there be any creeping of the disk M21 toward the rear this wedge point M25 will force the disk back to its forward position, and thus rigid clutching connection is insured. When it is desired to uncouple, however, the shaft M19 is pulled rearwardly to restore the disks to the normal position. The disk M20 releases the clutch member M10 and the cam or wedge point M27 coming into engagement with the disk M21 is forced rearwardly to its normal position to carry the clutch pin from the clutch groove.

Pivotally mounted on the rear end of the shaft M8 are the bevel gear M28 and cam M29 rigidly connected together and confined between the rear face of the bearing M9 and the flange M30 at the end of the shaft. Extending from the left and right sides of the bearing M9 are respectively the stub shafts M31 and M32. On the stub shaft M31 is pivoted the bevel gear M33 meshing with the bevel gears M14 and M28, and secured to the hub M34 of this bevel gear is the intermittent gear M35. Pivoted to the stub shaft M32 is the bevel gear M36 having engagement with the opposite sides of the bevel gears M14 and M28 and secured to the hub M37 of this bevel gear is the intermittent gear M38. This is a well known gearing arrangement and causes reverse rotation of the intermittent gears driven thereby, the direction of rotation being indicated by arrows, the gear M38 rotating in a forward direction and the intermittent gear M35 rotating in a reverse direction.

Mounted on a stub shaft M39, extending from the left of the supporting wall M2, is a sleeve M40 adapted to be reciprocated on the shaft M39 between the shoulder M41 and the head M42 at the left end of the shaft, this translatory motion being accomplished by mechanism which will be described later. Secured at about the middle part of this sleeve is the intermittent gear M41 adapted for engagement with the forward driving gear M38, being normally in such engagement. At the left end of the sleeve is mounted the intermittent gear M42 normally to the right of and out of connection with the reverse gear M35 but adapted when the sleeve is moved to the left to come into connection with the reverse gear, the gear M41 at the same time being disconnected from the forward gear. In other words, when the sleeve M40 is in its normal position to the right, the gears M41 and M38 will be in connection and the sleeve will be rotated in a counterclockwise direction, while when the sleeve is moved to the left the reverse gear will be in connection with the gear M42 and the sleeve will rotate in a clockwise direction. Secured to the sleeve to the right of the gear M41 thereon is the main driving gear M43 which is at all times in engagement with the intermittent gear M44, but which is in engagement with the intermittent gear M45 only during the time that the sleeve is in its normal position to the right. This main driving gear moving with the sleeve is given either forward or reverse rotation and being always in connection with the gear M44 may give either forward or reverse rotation to this gear, but being in connection with the gear M45 only during the position of the sleeve to the right this gear M45 can be rotated only in one direction. The gear M44 upon being driven eventually causes either forward or reverse rotation of the screw shaft of the connected registers, while the gear M45 connects with the differential gearing mechanism and upon being driven eventually causes rotation of the numeral wheels, whose direction of rotation is controlled directly by the register mechanisms as before described. This translatory motion caused by the screw shaft and the rotary motion for the numeral wheels must come about alternately and this is accomplished by the main driving gear M43 which has driving teeth extending over only a part of its periphery. The number of driving teeth on the gears M44 and M45 is the same as the number of driving teeth on the main driving gear, and these gears have locking teeth M46 and M47 normally in engagement with the locking surface M48 of the main driving gear at the opposite ends thereof, the driving teeth of the main gear covering for this purpose a little less than one half of the periphery. Thus, in the normal position best shown in Fig. M2, the gears M44 and M45 are locked to the main gear, but when the forward gear M38 is effective the gear M44 is unlocked and given a complete revolution, thereupon again passing into locking engagement with the other end of the locking surface M48 of the main gear. During the rotation of the gear M44 the gear M45 remained locked, but immediately when the gear M44 becomes relocked after rotation the teeth of the main gear engage with and unlock the gear M45 and cause a complete rotation thereof, whereafter this gear is relocked and thus held while the gear M44 is given a second rotation, and so on the gears M44 and M45 are alternately rotated one revolution. When the sleeve M40 is moved to the left the main gear becomes disconnected from the gear M45 and the direction of rotation of the main gear being reversed the gear M44 is given reverse rotations until the mechanism controlled thereby is restored to its normal position. To lock the gear M45 against rotation when it thus becomes disconnected from the main gear the locking plate or disk M49 is provided which is secured to the sleeve M40 to the right of the main gear thereon and when the sleeve is moved to the left this locking disk engages the locking tooth of the gear M45 and locks it in position during the reverse period of the main gear.

The gear M45 is secured at the left end of the shaft section M50 bearing in the hub M51 extending from the supporting wall M2, and this shaft section at its other end terminates in a crank disk M52. An intermediary shaft section M53 terminates in the crank disks M54 and M55 and the shaft section M56 journaled in the hub M57 secured to the supporting wall M1 terminates at its left end in the crank disk M58 and at its right end in the intermittent gear M59. These shaft sections are in alinement and a crank pin M60 connects the crank disks M52 and M54 while the crank disks M55 and M58 are connected by the crank pin M61. Crank arms M62 and M63 engage at one end respectively with the crank pins M60 and M61, the other end of these crank arms supporting a shaft M64 on which is pivoted the gear pinion M65 forming part of the differential mechanism, which will be described later, and upon rotation of the shaft sections this gear pinion will be reciprocated forward and back by this crank arrangement.

The gear M44 is secured at one end of the shaft M66 journaled in the hub M67 extending from the supporting wall M2 and in the bearing hub M68 supported from the wall M1, the end of the shaft to the right of the wall M1 terminating in the coupling flange M69 for coupling engagement with the panel shafts connected with the register mechanism shafts. Secured to the shaft M66 immediately to the right of the supporting wall M2 is the intermittent gear M70 having one tooth M71. The shaft between the gear M70 and the supporting wall M1 is provided with screw threads M72 and a box M73 has screw threaded engagement with these threads and is normally disposed adjacent to the gear M70. Disposed in the vertical slot or opening M74 through this box is the intermittent gear M75 which rotates with the screw shaft M66 by virtue of its tongue or key M76 engaging in the keyway M77 and as the screw shaft is rotated the box M73 has translatory motion, the gear M75 moving therewith and also having rotary motion. An arm M78 extends forwardly from the box M73 and carries at its front end the hub M79 engaging the shaft M80 which is pivoted in the bearing M81 supported from the wall M1 and in the bearing M82 supported from the wall M2. Within this hub is a bushing or sleeve M83 carrying at its left end the intermittent gear M84, the bushing having the tongue or key M85 for engaging in the keyway M86 of the shaft M80 and therefore this gear will have longitudinal motion on this shaft and rotational motion therewith. This gear has a single tooth slot M87 at the sides of which are the locking surfaces M88 and M89, respectively, for engagement with the locking surface M90 of the gear M70, whose tooth M71 will cause rotation of this gear M84 upon engagement therewith in the tooth slot M87.

The normal relative positions of the parts just described are best shown in Figs. M1, M3 and M4, the gear M84 being a little to the left of the gear M70 and only part thereof being in alinement with it, while the locking surface M88 engages the locking surface of the gear M70 just below the tooth M71. With the gearing mechanisms in position, as shown, the gear M70 will rotate in the direction of the arrow upon rotation of the gear M44 and the gear will make about nine-tenths of a revolution when the tooth M71 engages in the slot M87 to rotate the gear M84 one-fifth of a revolution to bring the locking surface M89 into engagement with the locking surface of the gear M70, this position being shown in Fig. M9. Below the shaft M80 and parallel therewith is the locking shaft M91 extending between the supporting walls M1 and M2 and having a reduced portion M92 at its left end which is normally tangent to the pitch surface M93 of the gear M84. A circular notch M94 cut in this pitch surface is carried to a position above the reduced section of the shaft M91 during this rotation movement of the gear M84, this notch M94 being then concentric with the shaft M91, the radius of this notch being equal to that of the normal part of this shaft. As the gear M84 is rotated by the gear M70 it is also moved toward the right on the shaft M80 owing to the connection between its supporting hub M79 and the box M73 carried to the right upon rotation of the screw shaft M66. The gearing M70 after its first revolution is still partially in alinement with the gear M84, but during the second revolution the gear M84 will be moved out of alinement therewith and the notch M94 will engage the normal part of the shaft M91, thus locking the gear M84 and the shaft M80 keyed thereto against further rotation, although the gear M84 and supporting hub may still travel toward the right along the shaft M80 upon further rotation of the screw shaft M66. When the direction of rotation of the gear M44 is reversed, the direction of movement of the block M73 is reversed, and as the block moves toward the left it carries with it the hub M83 and gear M84 which remains locked to the shaft M80 until at the end of the next to the last revolution of the gear M70 when the locking notch M94 is moved clear of the normal part of the shaft M80, and the position then will be that shown in Fig. M9, the gear M70 being ready to begin its final revolution, the tooth thereon being just about to engage the tooth slot of the gear M84. During the first tenth part of this last revolution, then, the gear M84 is returned to its normal position, shown in Fig. M3, with its locking surface M88 engaging the locking surface of the gear M70, which gear completes the remaining nine-tenths of its last revolution, being then in its normal position, as shown in Fig. M3.

The function of the gear M84 and its associated mechanism described in the preceding paragraph is to shift and to lock certain gearing mechanisms which control the operation of automatic clutch controlling mechanism, which mechanisms will now be described. Below and parallel to the clutch shaft M8 and journaled in bearings M95, M96 and M97 is the tubular shaft M98 through which passes the shaft M19 referred to before as supporting at its front end the clutch controlling disks M20 and M21. Secured to the front end of this tubular shaft is the gear M99 meshing with the gear M12 affixed to the shaft M8, these two gears being of the same diameter. (See Fig. M6.) At the rear end of the shaft M98 is secured the intermittent gear M100 to the rear of which and adjacent thereto is the locking disk M101 having a diameter equal to the pitch diameter of the gear M100. A bearing M102 at the top of the supporting standard M103 encircles the bushing M104, which is keyed to the shaft M105 to rotate it with said bushing and also to permit translatory motion therethrough. Secured to the right end of the bushing M104 is the bevel gear M106 and secured to the rear end of the shaft is the intermittent gear M107, this intermittent gear being normally in mesh with the intermittent gear M100. A collar M108 at the other end of the shaft is engaged by the head M109 of a connecting rod M110, whose other end is pivoted to the crank pin M111 extending from the crank arm M112 in which the left end of the shaft M80 terminates. The tooth surface and the locking surface of the intermittent gear M100 cover respectively approximately three-fourths and one-fourth of the periphery, and the number of working teeth on the gear M107 is equal to the number of the teeth on the gear M100, the gear M107 being provided with a locking tooth M113. The locking surfaces of these two gears are normally at extreme opposite sides so that there will be an equal number of teeth on each gear at each side of the meshing line. When the shaft M80 is rotated during the first revolution of the gear M70 the crank arm M112 will be actuated to cause the rod M110 to move toward the rear moving with it the shaft M105, thereby carrying the gear M107 from the alinement plane of the gear M100 to that of the locking disk M101, the purpose of which will be described in more detail later, and upon engagement of the gear M84 with the locking shaft M91 this position of the gear M107 will be maintained.

Supported upon the shaft M114 which is affixed to the wall M2 is the hub M115, at the left end of which is secured the bevel gear M116 having mesh with the bevel gear M106. Also mounted on said hub between the wall M2 and the bevel gear M116 are the intermittent gear disks M117 and M118. A shaft M119 is journaled in the walls M1 and M2 and in the bearing M120 and carries an intermittent gear pinion M121 engaging the gear disk M117, while the shaft M122 having bearing in the walls M1 and M2 carries at its left end an intermittent pinion gearing M123 which engages with the gear disk M118. The gear disk M117 is intermittent and has two working sections M124 and M125 of three teeth each, the sections being about 180 degrees apart. The engaging gear pinion M121 has two working sections M126 and M127 180 degrees apart and each having three tooth slots for engagement with the teeth upon the gear M117, while between the tooth sections are, respectively, the locking surfaces M128 and M129, the surface M128 being normally in engagement with the locking surface M130 of the gear disk M117, and the approaching tooth section M124, of this gear disk is slightly to the rear of the gear pinion, as best shown in Fig. M2. The intermittent gear disk M118 has a plurality of teeth extending through an arc thereof and the engaging pinion M123 has a like number of teeth disposed about its periphery and a locking surface M131 for engagement with the locking surface M132 of the gear disk M118, the locking surfaces being normally in engagement and the pinion to the rear of the teeth of the gear disk.

The gear disk M117 and the gear pinion M121 are provided for controlling the automatic clutching mechanism which will now be described. The shaft M19 controlling the clutch controlling member at its front end extends through the hollow shaft M98 and projects beyond the rear end thereof, as shown in Figs. M1, M2 and M16. Pivoted at M133 to the rear end of the shaft M19 is the bell crank lever M134 whose horizontal arm M135 extends forwardly along the side of the shaft M19 and whose vertical arm M136 extends downwardly, being pivoted at its end to the rear end of the latch lever M137 whose hooked end M138 is adapted for latching engagement with the head M139 at the rear end of the rod M140 extending from the armature of the electromagnet M141. The front part of the arm M135 is enlarged and has the opening or compartment M142 separated into a front vertical part M143 and a rear part M144 by the downward extending cam tongue or lug member M145, whose front edge M146 is vertical and whose lower edge M147 is inclined downwardly and forwardly, as shown. At the left end of the shaft M119 is the eccentric head or disk M148 engaged by the upper end of the eccentric arm M149, (Fig. M7), whose lower end has a slot M150 engaging the pin M151 at the front end of the latch arm M137. Also extending to the left from the eccentric disk M148 is the crank pin M152 which normally is disposed in the middle of the vertical compartment M143 in the lever arm M135.

If the operator desires to connect the clutch mechanism to start the master machine, actuation of a suitable switch or key will close a circuit through the electromagnet M141 to draw forwardly its armature and the arm M140, whose head is normally engaged by the latch end M138. The bell crank lever M134 is immediately rotated about its pivot M133 and the point of the tongue M145 is raised above the crank pin M152, the upward motion of the bell crank lever being limited by the stop pin M153 which engages the lower surface of the rod M19. Further forward movement of the electromagnet arm will then cause bodily movement of the rod M19 with the bell crank lever, and at the end of this forward motion the crank pin will lie within the compartment M144. Immediately upon engagement of the clutch members, however, the shaft M98 bearing the gear M100 is rotated and the gear M107 is rotated one-half revolution, and as the bevel gear M116 is of the same dimension as the bevel gear M106 the gear disks M117 and M118 will also be rotated one half revolution. The teeth of the section M124 on the gear M117 during this half revolution will engage the pinion M121 to cause one-half revolution thereof, whereupon the crank pin M152 is also rotated clockwise 180 degrees to again engage in the vertical compartment M143 to lock the bell crank lever and rod M119 against return to the rear. The eccentric disk M148 is also rotated 180 degrees to draw the eccentric arm M149 upwardly to raise the latch end M138 from the head M139. Also adapted to rotate with the shaft M119 and to the right of the bell crank lever is the cam segment M155 (Fig. M8) normally disposed above the shaft but adapted upon rotation thereof to be brought downwardly against the shelf M156 extending toward the right from the arm M135 of the bell crank lever to lock this bell crank lever in downward position, the downward movement of the arm M135 being limited by the stop pin M157 engaging the top of the rod M19.

As before stated, the tubular shaft M98 and the gear M100 start to rotate immediately upon clutching engagement of the clutch members, but rotation of the gear M41 by the forward gear M38 does not take place immediately. The teeth of the forward and reverse gears M38 and M35 cover about three-fourths of the periphery, the remainder being locking surface, the locking surface M158 of the forward gear being normally preceded a slight distance by the locking surface M159 of the gear M41 and rotation of the main driving gear M43 will be delayed an interval until the teeth upon the gear M38 revolve into contact with the teeth upon the gear M41. At the same time the gear M100 and gear M107 commence rotating to cause locking of the rod M19 to assure maintenance of clutching relation of the clutch members. After this short interval of rest the teeth of the forward gear engage with those of the gear M41, and for about the next three-fourths revolution of the forward gear the main gear will be rotated one revolution, first to cause one revolution of the screw shaft and then to cause one revolution of the differential gear mechanism driving gear M45. The forward gear and the gear M100 rotate with equal angular velocity, owing to the fact that the gears M12 and M99 are similar and also to the fact that the bevel gears M14 and M36 are similar. After the half revolution of the gear M107 its locking surface M113 comes into engagement with the locking surface of the gear M100, but just before the end of this locking engagement between the gears is reached the rod M110 with the shaft M105 and gear M107 will have been moved to the rear by the crank arrangement operated upon rotation of the gear M84 during the first revolution of the gear M70. The locking surface M113 upon such rearward motion of the gear M107 engages the locking wheel M101 and there will be no further actuation of the gear M107 and the clutch controlling mechanism controlled thereby until the rotation of the screw shaft has been reversed and the gear M84 restored to its normal position during the last reverse revolution of the gear M70. As before stated, the gear M84 is returned during the first tenth of this return revolution of the gear M70 and during this time the crank mechanism will have been actuated to pull the rod M110 and gear M107 forward to again bring the gear M107 into the alinement plane of the gear M100, and during the remaining nine-tenths of the revolution of the gear M70 the final half revolution is given the gear M107 to return it to its normal position. During this final half revolution the section M125 of the gear M117 has been moved to rotate the pinion M121 through its other half revolution, the result being that the crank pin M152 is restored to its normal position and being in engagement with the front edge M146 of the cam tongue M145 during such return movement the bell crank lever with the rod M19 is carried rearwardly to the normal position, the eccentric disk M148 being also restored to drop the arm M149 and the latch arm M137 to bring the latch M138 into position to be engaged by the head M139, which head was restored to its normal position by the tension spring M160' upon deënergizing the electromagnet M141. During this return movement, however, of the clutch controlling mechanism with the rod M19, the clutch disk M21 was restored to its normal position to spread the clutch sections apart as hereinbefore described, and the mechanism is now in its normal position.

The reversing mechanism will now be described and the means automatically operated by the gear M75 for controlling such reversing mechanism. As before stated, the sleeve M40 must be moved to the right or left to bring either the forward gear M38 or the reverse gear M35 into service to cause alternate operation of the gears M44 and M45 when the forward gear is actuated and to cause reverse movement of the gear M44 only, when the reverse gear is in service. A shaft M160 at its rear end passes through the bearing M161 at the upper end of the standard M162, the front end of this shaft being journaled in a collar M163 to the sides of which are pivoted the arms M164 and M165 extending downwardly from the hub M166 secured to the end of a shaft M167 journaled at its right end in the hub M168 in the middle supporting wall M2 and at its left end journaled in the bearings M169 and M170 at the upper ends of the arms M171 and M172 respectively, extending from the upper end of the supporting plate M3, the hub M166 being disposed between these bearings. To the rear of the collar M163 a hub M173 is secured to the shaft M160, from the front end of which extends the cam arm M174 terminating in the cam roller M175 and from the rear end of which extends the cam arm M176 terminating in the cam roller M177. In the normal position the shaft M160 is in its rear position as best shown in Figs. M1 and M2, and in this position the cam roller M177 is in the alinement plane of the cam disk M29 to be engaged by the cam point M178 upon rotation of the bevel gear M28. During this position of the shaft M160 the front cam roller M175 is to the rear of the alinement plane of the front cam disk M13, but when the shaft is moved to its front position this cam roller is moved to the alinement plane of the cam disk M13 to be engaged by the cam point M178' upon rotation of the bevel gear M14, and during this front position the rear cam roller M177 will be withdrawn from the alinement plane of the cam disk M29. At the rear of the shaft M160 is the hub M179 whose two downwardly extending arms M180 and M181 are pivoted at their lower ends to the sleeve M40 on which are mounted the gears M41, M42, the main gear M43 and the locking disk M49, whose functions have already been described. This hub M179 is keyed to the shaft M160 to rotate therewith but the shaft M160 is adapted to move longitudinally therethrough.

The mechanism for controlling the longitudinal movement of the shaft M160 will now be described. Disposed below and parallel with the screw shaft M66 is a pin case M182, best shown in Figs. M3, M4 and M11, this pin case having downwardly extending arms M183 and M184, from which extend, respectively, the shafts M185 and M186 journaled, respectively, in the bearings M187 and M188 in the supporting walls M2 and M1, respectively. This pin case is, therefore, adapted to swing forwardly and rearwardly, and at the left end of the shaft M185 is secured the arm M189 at whose front end is pivoted the lower end of a connecting rod M190, whose upper end is pivoted to the end of the arm M191 secured to the shaft M167 whose rotation controls the longitudinal movement of the shaft M160. The pin case has the vertical slot or channel M192 extending entirely therethrough and in this slot are disposed a row of pins M193a, M193b, M193c, M193d, M193e, M193f and M193g. Each pin terminates at its upper end in a tooth M194, which teeth normally project beyond the upper edge of the pin case and the lower end of each pin is pivoted to a plate M195, each carried on the ends of a set of armatures M196 and M197 controlled by a set of electromagnets M198 and M199 disposed below the pin case, as best shown in Figs. M3, M4 and M14. As will be eventually explained, each set of electromagnets is adapted to be connected in circuit and energized to draw their armatures and corresponding connecting plate and pin downwardly to draw the corresponding tooth downwardly within the pin case out of the path of a tooth M200 extending from the gear M75 which travels longitudinally across the pin case upon rotation of the screw shaft. Each pin is also normally locked in its normal position by a spring extension M201 extending from a common supporting frame M202 secured to the front side of the pin case, and each spring plate bears against a ball M203 which engages in a notch M204 of the corresponding pin. The pins, therefore, are normally locked in their upper position although the locking arrangement is yielding so that they may be drawn downwardly upon energization of the corresponding electromagnets. To the left of the series of movable pins is a stationary tooth M205 secured to the pin case, and to the right of the movable pins is another stationary tooth M206 rigidly secured to the pin case (see Figs. M12, M13). There is a second tooth M207 extending from the gear M75 which, in the position of this gear shown in Figs. M3 and M11, is disposed to the left and in front of the tooth M200, the tooth M200 in the normal position shown in these figures being in front of the rigid tooth M205.

As before stated, energization of any set of electromagnets below the reverse pin case causes depression of the corresponding pin. When the gear M75 is to be carried toward the right its rotation is in a clockwise direction as indicated in Figs. M1 and M3, and just before the completion of the first revolution the tooth M200 thereon will come behind the tooth of the first movable pin M193a, and if this pin has been lowered there will be no engagement of the teeth and the gear M200 will rotate and travel toward the right until the first pin is reached which has not been depressed, and during the last part of the rotation of the gear M75 the tooth of the pin will be engaged and the pin case rotated counterclockwisely. Upon such counterclockwise rotation, however, the shaft M185 and the arm M189 thereon will also be rotated to draw the connecting rod M190 downwardly, thereby causing clockwise rotation of the shaft M167 and of the hub M166 with its arms M164 and M165 connected with the collar M163, the result being that the shaft M160 is drawn forwardly to the position shown in Fig. M15, to carry the cam roller M175 into the alinement plane of the cam point M178' on the front cam disk M13. Upon engagement of the cam point with the roller the hub M173 and shaft M160 will be rotated in a clockwise direction, this movement being transmitted through hub M179 and the arms M180 and M181 to the gear supporting sleeve M40, the motion being sufficient to carry the gear M42 into the alinement plane of the reverse gear M35 and to withdraw the gear M41 from alinement with the forward gear M38, as before described. This shifting of gears will produce reverse rotation of the main gear M43 and gear M44 and of the screw shaft M66, and the block M73 and the gear M75 will then be returned toward the left, the direction of rotation of the gear M75 being also reversed. During this reverse movement the depressed pins are maintained in their depressed position and the tooth M207 upon reaching the rigid tooth M205 at the extreme left of the pin case will engage this tooth to rotate the pin case clockwisely to its normal position, this, of course, causing clockwise rotation of the shaft M185 and the arm M189 and rearward movement of the parts connected with the shaft M160, which shaft is moved to the rear to carry the rear cam roller M177 into the alinement plane of the cam point M178 of the rear cam disk M29, and upon engagement of the point and roller the shaft M160 will be rotated in a counterclockwise direction, the result being that the sleeve M40 is returned to its position to the right to again bring the forward gear into driving relation and to disconnect the reverse gear.

During the reverse rotation of the screw shaft, as before described, the gears M84 and shaft M80 are rotated clockwisely to restore connection between the gear M107 and M100, whereupon the clutch controlling mechanism becomes effective to uncouple the clutch members to stop the operation of the master machine mechanism.

Locking mechanism provided for locking the shaft M160 at either end of its longitudinal movement is best shown in Figs. M1, M2 and M15, and comprises a spring M208 pivoted at its rear end to the pin M209 at the end of the arm M210 extending rearwardly from the hub to which is secured the arm M189, the other end of the spring engaging the crank pin M211 extending from the end of the crank arm M212 pivoted on the pin M213 extending from the frame. The crank pin extends through a slot M214 in the arm M210 and the tendency of the spring is to revolve the crank arm so that the crank pin will throw the lever to its maximum position either above or below the pivot pin M213, depending upon which side of the pivot pin the arm M210 has been moved upon rotation of the shaft M185. Thus, the shaft M160 is held in either its front or rear position until it is positively actuated upon rotation of the pin case to rotate the shaft M185. Locking means are also provided for locking the shaft M160 at the ends of its rotary motion, this mechanism being best illustrated in Figs. M2, M15 and M16. Secured to the rear end of the shaft M160 is the locking arm M215 extending downwardly and having a longitudinal pocket M216 from which projects a locking pin or tooth M217, a compression spring M218 being within the pocket and tending to force the locking tooth outwardly. Below the arm M215 and extending rearwardly from the supporting standard M162 is a shelf M219 on which are the two locking wedges or detents M220 and M221 corresponding in position to the front and rear position of the arm M215. The normal position of the arm is to the right and to the rear, as shown in Figs. M1 and M2, and in this position the locking tooth M217 engages the locking face M222 of the rear locking detent M221. When the shaft M160 is moved forwardly and rotated in a clockwise direction to shift the gearing to the reverse position, the locking arm M215 is first carried forwardly to bring the locking tooth into the alinement plane of the front locking detent M220 and upon rotation, then, of the arm the tooth will travel up the incline surface M223 of this front locking detent, and when the shaft M160 comes to rest, the locking tooth will engage the locking surface M224 of the front detent, this position being shown in Figs. M15 and M16. When the shaft M160 is again moved rearwardly and then rotated in a counterclockwise direction toward its normal position, the locking tooth is first carried into the alinement plane of the rear locking tooth M221 and upon rotation of the arm the pin M217 travels up the incline M225 of the rear locking tooth and eventually reëngages the locking face M222 of this tooth to lock the shaft M160 against further rotation. Thus, any longitudinal or rotary motion of the shaft M160 and controlled parts is provided against unless directly actuated by the proper mechanism at the proper time.

The mechanism for causing the translatory motion has practically all been described, and the description of the setting up mechanism and of the differential mechanism will now follow. Each numeral wheel on the register is represented by a row of setting up pins, each row containing ten pins corresponding to the digits zero to nine on the numeral wheel. As best shown in Fig. M10, there are eight rows $M226a$, $M226b$, $M226c$, $M226d$, $M226e$, $M226f$, $M226g$ and $M226h$ reading from left to right, and in each row are the ten pins $M227^0$, $M227^1$, $M227^2$, $M227^3$, $M227^4$, $M227^5$, $M227^6$, $M227^7$, $M227^8$, $M227^9$ reading from front to rear. As shown in Fig. M3 these pins are vertical and each terminates at the upper end of a rod M228 connected with the armature of an electromagnet M229, some of which electromagnets are mounted between the supporting plates M230 and M231, the remainder being carried on the supporting plate M232, the electromagnet sets for the pins and the pin case being also arranged between the supporting plates M230 and M231. The pins at their upper ends pass through and are guided in openings M233 in the plate M234 and each pin has two collars M235 and M236, which engage a locking plate M237 having the openings M238 of a diameter sufficient to allow easy passage therethrough of the pin collars. This plate is actuated by and is pivoted to the front end of the arms M239 and M240 extending from the eccentric straps or collars M241 and M242 engaging the eccentric disks M243 and M244 mounted on the shaft M119. The other end of the locking plate is pivoted to the upper ends of the levers M245 and M246 pivoted at an intermediate point to the shaft M247 connected between the supporting walls M1 and M2. The lower ends of the levers M245 and M246 are pivoted to the rear end of the locking plate M248 which at its forward end has slots M249 for engaging in grooves M250 at the upper ends of the frame pins M251. This locking plate M248 has the openings M252 normally disposed below and concentric with the collars M253 on the armature rods M196 and M197 of the pin actuating electromagnets. The first pin $M227^0$ of each row is normally raised, as shown in Figs. M3 and M5. Mounted on a pivot shaft M254 is a row of levers M255, one for each order row of pins and each being pivoted at its rear end to the lower end of the first or zero pin of the order row and pivoted at its front end to a link M256 pivoted at the front end of a plate M257 having a longitudinal slot M258 through which all the pins of a given order row extend, all of these plates M227 having a slotted rear end M259 engaging a cross shaft M260. The operator desiring to enter a number in registers actuates suitable switches or keys to control the circuits for the electromagnets of the pins representative of the digits in the number to be entered. Thus, the pin in the units order row representative of the units digit will be raised, the pin in the tens order row representative of the tens digit in the number, and so on. Each of the reversing pins in the pin case corresponds to one row of the setting-up pins, and whenever any pin representative of a significant figure in any row is raised circuits will also be closed through the electromagnets controlling the proper reversing pin or pins which will be depressed, and therefore whenever a number to be entered is set up on the setting-up pins, all the reversing pins up to the one corresponding to the highest order of the number will be depressed, which means that the screw shaft will rotate in a forward direction until this last reversing pin is reached whereupon reversal of the driving mechanism will take place. It will be noticed, however, that through the connection between the first zero pin and the plates M257, immediately upon raising of any other pin in a row the corresponding plate will also be raised upon engagement therewith by the upper collar of the pin, and this upward motion being transmitted through the corresponding link M256 and lever M255 causes lowering of the normally raised zero pin, and there can, therefore, be only one raised pin at any time in any row. The adjustment of the electrical circuits to raise the proper setting up pins and depress the corresponding reversing pins is one of the first operations performed by the operator, whereafter is actuated the switch or key for bringing in circuit the clutch electromagnet M141, this, as before described, being followed by rotation of the gear M100 and eventually one-half revolution of the shaft M119. This rotation of the shaft, however, actuates the eccentric disks M243 and M244 to draw to the rear the arms M239 and M240 and the locking plate M237 connected therewith, and the openings M238 in the locking plate will be moved out of center with the pin collars and the raised pins representative of the number set up will be locked in their raised position, but all other pins will be locked in their depressed position.

Through the connecting levers M245 and M246 connecting the locking plate M237 with the locking plate M248 this locking plate M248 will be moved forwardly over the depressed collars M253 and under the raised collars M253, thus locking the raised pins up and the depressed pins down, and this locking engagement will be maintained throughout the entire operation of the master machine mechanism when upon the last half revolution of the shaft M119 the locking plates will be returned to their normal positions to allow restoration of the setting-up and reversing pins. This restoration is directly accomplished by the restoring plate M261 disposed below the guiding plate M234 and, like said guiding plate, having openings M262 through which the upper ends of the setting-up pins pass. This restoring plate is connected to rods M263 and M264 to which are respectively pivoted the front ends of levers M265 and M266 pivoted on the cross shaft M267 secured to the frame, the other ends of these levers terminating, respectively, in eccentric straps M268 and M269, respectively engaging eccentric disks M270 and M271 mounted on the shaft M122. This shaft, as before described, mounts the intermittent pinion M123 for engagement with the gear disk M118 and the teeth on this gear disk are so set that there will be no driving engagement with this pinion, except during the second half revolution of the gear disk driven primarily from the gear M100. During this last half revolution the pinion M123 and its shaft M122 are rotated and the front end of the levers M265 and M266 are lowered to carry the restoring plate M261 downwardly against the raised rods M257 held up by the raised pins, and these rods and raised pins, therefore, are restored to their normal position, the locking plates having been restored to the normal position to allow passage through their openings of the pin collars. Upon lowering of the rods M257, however, the first or zero pins of each row through the connecting levers and links are restored to their normal raised position. The rods M263 and M264 extend downwardly a distance and pivot to the rear end of the levers M272 and M273, respectively, pivoted at an intermediate point on the pins M274 and M275, respectively, extending from the supporting walls M2 and M1. The front ends of these levers are pivoted to the rods M276 and M277, respectively, which terminate at their upper ends in the heads M279. Upon lowering of the restoring plate M261 for the setting-up pins the front end of the levers M272 and M273 through the described connection is raised and the head M279 of the rods M276 and M277 is brought into contact with the under side of the reversing pin frames M195, the result being that all the depressed reversing pins are raised to their normal position.

Mounted above the setting up pins is the differential gearing mechanism, which, as will now be described, is operated and controlled to cause rotation of a shaft which eventually connects with the driving gears of the register mechanisms for causing suitable rotation of the connected numeral wheels. This differential gearing mechanism is mounted in a supporting casing comprising the side walls M280 and M281, the intermediate wall M282 and the front and rear walls M283 and M284, the frame being supported at the front on the shaft M286 passing through the side walls, and at the rear on the shaft M53 driven from the gear M45. At the lower edge of the casing and extending from the side and intermediate walls are the extensions or guideways M287 and M288 extending into corresponding grooves of a right lower gear rack M289. In the lower part at the left side of the casing extending from the side and intermediate walls are the extensions or guideways M290 and M291 engaging in corresponding grooves in the left lower gear rack M291'. At the top of the casing extending inwardly from the side walls are the extensions or guideways M292 and M293 engaging in corresponding grooves in the upper gear rack M294, said upper gear rack having also a slot M295 in its lower face to engage the upper edge of the intermediate wall, as best shown in Figs. M5, M21 and M22. The gear pinion M65 before referred to, as driven from crank mechanism M45 disposed between the left lower gear rack and the upper gear rack, is in mesh therewith. In the right compartment of the gearing case is the gear pinion M296 meshing with the right lower gear rack and the upper gear rack, this pinion being secured to a shaft M297 which extends through the side walls of the gearing casing, being pivoted at its left end in the hub M298 and at its right end bearing in a collar or hub M299 supported from the frame wall M1. Secured to this shaft immediately to the right of the side casing wall M281 is the clutch member M300. The hub M299 at its outer end carries the coupling member M301 adapted to be connected with the rotary panel shafts leading to the registers, and at the inner end of this hub is secured the clutch collar M302 having on its left face the clutch teeth M303 for engagement with the clutch teeth of the clutch member M300, and having on its right face the clutch teeth M303' tor engagement with the clutch teeth M304 rigidly secured to the framing wall M1, and by actuating mechanism, which will eventually be described, this clutch collar with the hub may be moved toward the left to be engaged with the clutch member M300 rotated with the gear pinion M296, or may be moved toward the right to engage with the locking teeth M304, whereby the hub is locked against rotation.

The right lower rack bar M289 is normally disposed at the front end of the gearing casing, while the left lower rack bar M291' is disposed at the rear end of the casing, the upper gear rack, which is common to both the lower gear racks, being normally also at the rear end of the gear case. Secured to the under side of the right lower gear rack is the dove tail transverse track plate M305, and secured to the under side of the left lower gear rack is the dove tail transverse track plate M306, these guide plates bearing at their ends in guideways M307 and M308 in the supporting walls M1 and M2. Engaging the dovetailed edges of the guide plate M305 is the pick-up block M309 having the engaging extension M310. Engaging the dovetailed edges of the guide plate M306 is the pick-up block M311 having the engaging projection M312. Extending through these pick-up blocks is the bar M313 secured at its front end to the block M73 engaging the screw shaft M66, and upon rotation of this screw shaft the block M73 is moved longitudinally thereon thus carrying the bar M313 and moving the pick-up blocks longitudinally along the track plates. The reversing pins in the pin case, before described, are spaced in alinement with the order rows of setting-up pins, and after the first rotation of the screw shaft the reversing tooth of the gear M75 in the block M73 will be in the alinement plane of the first movable reversing pin, and the extensions of the pick-up blocks will be in line with the first order row of setting-up pins corresponding to the units numeral wheel on the registers, the front pick-up block in its normal position being just in front of the zero setting-up pin which normally is raised, and the rear pick-up block being just to the rear of the plane of the last setting-up pin, and after this first revolution of the screw shaft, as hereinbefore explained, the main driving gear becomes effective to rotate the gear M45, which through the crank arrangement on its supporting shaft causes reciprocation of the crank arms M62 and M63 and causes the shaft M64 to reciprocate the gear pinion M65 which is in the left compartment of the gear casing in mesh with the left lower gear rack and the upper gear rack. This shaft M64 extends through slots M314 in the side and intermediate walls of the gear casing, and upon reciprocation of this shaft upon rotation of the gear M45 the gear pinion M65 thereon has a motion of translation equal to that of the shaft and will necessarily drive the upper gear rack or the left lower gear rack, or both of them together, a distance equal to two times the translatory distance traveled by the cross head shaft. The upper gear rack, however, is always in mesh with the pinion M296 which is mounted on the stationary shaft M297 and is always in mesh with the right lower gear rack. Therefore, the upper and right lower gear racks always travel together the same distance but in opposite directions. It follows also from this arrangement that the sum of the movements of the lower gear racks is always equal to two times the distance traveled by the shaft M64 in either direction, and as the length of the stroke of the shaft is constant the sum of the distances traveled by the lower gear racks is also constant, and the sum of these distances must equal the distance from the zero digit pin to the nine digit pin. Both the lower gear racks may travel at the same time upon reciprocation of the shaft M64, or one of them may travel until stopped, whereupon the other will continue to travel in the opposite direction until the sum of their distances traveled equals the constant referred to. The normal distance between the engaging edges of the pick-up blocks M309 and M311 is equal to the sum of the travels of the lower gear racks plus the thickness of a pin. Consequently, the blocks will travel toward one another until they engage the opposite sides of a raised pin. The amount of travel of the right lower gear rack, however, is directly proportional to the amount of angular rotation of the pinion M296, the gearing relations being such that when the pin pick-up block connected with this gear rack moves to any raised pin, the pinion will be rotated a number of tenths of a revolution corresponding to the number represented by the raised pin; for example, if the front pin block is in engagement with the normally raised "0" pin, as best shown in Fig. M3, there will be no movement of the gear rack or the pinion. If the "1" pin is raised the right gear rack will travel rearwardly one-tenth of the constant distance referred to, to engage the "1" pin and the pinion will be rotated one-tenth of a revolution. In the same manner if the "2" pin is raised the gear rack will be moved rearwardly two-tenths of the distance and the pinion will be rotated two-tenths of a revolution. The remaining tenths of the fixed sum distance is in each case covered by the rear pin pick-up block which travels forwardly to engage in each case the rear edge of the pin engaged at its front edge by the front block.

Owing to the freedom of movement of the gear racks the rear pick-up block may first travel forwardly to the raised pin and the front pick-up block may then be moved rearwardly to the pin, the result in each case, however, being a rotation of the pinion M296 corresponding to the raised pin. Thus far, the pinion M296 will be rotated in one direction when the shaft M64 is moved forwardly and in the opposite direction when the shaft is drawn rearwardly, and if the pinion were connected during all this time with the panel register controlling shafts the number carried in on the connected register numeral wheels would, during the reverse movement of the pinion, be again taken out, and provision must, therefore, be made for preventing driving relation during rotation of the pinion in one direction, and for various reasons, which will appear later, it is more advantageous to have this pinion locked to the panel shaft mechanism when it is turning in a clockwise direction during the time that the shaft M64 is carried rearwardly. This connection of the pinion with the panel shafts is controlled by the position of the clutch collar M302 before referred to, and the movements of this clutch collar are automatically controlled by mechanism driven upon rotation of the gear disk M59 which rotates with the gear M45.

The clutch collar controlling mechanism, is best illustrated in Figs. M1, M23 and M24. The gear disk M59 is intermittent and has the two opposite teeth M315 and M316 for engagement with the intermittent pinion M317 mounted at the end of a pivot pin M318 extending from the supporting wall M1. Connected with this pinion to rotate on the same pin is the gear M319 meshing with the pinion M320 secured to the right end of the shaft M321 having bearing in the hub M322 and terminating at its left end in the bevel pinion M323. The gearing arrangement of the train of gears just described is such that each engagement of a tooth of the gear disk M59 with the locking pinion M317 will cause a half revolution of the bevel gear M323, and after each engagement of the gear disk with the locking pinion these members will have their locking surfaces in engagement to lock the train of gears against accidental rotation. The bevel pinion M323 meshes with the bevel gear M324 secured to the top end of a crank shaft M325 journaled in the bearing boxes M326 and M327 secured to the supporting wall M1. This crank shaft is vertical and disposed at the rear of the clutch collar M302. In front of the clutch collar is a similar crank shaft M328 pivoted in bearings M329 and M330 also secured to the supporting wall M1 (see Fig. M25.) The clutch collar has the slot M331 in which engages the clutch plate or ring M332 whose horizontal internal diameter is greater than the diameter at the bottom of the slot. This clutch plate terminates at its front and rear ends in the bearings M333 and M334 which engage respectively the eccentric crank sections M335 and M336 of the crank shafts. At the upper end of the crank shaft M328 is the crank plate M337 and extending from this is a crank pin M338, while from the bevel gear M324 at the upper end of the crank shaft M325 extends the crank pin M339, these crank pins being in similar angular positions and connected by the connecting link M340, the crank sections of the crank shafts being also in similar angular positions, the angular position of the crank pins being, however, displaced 90 degrees from that of the crank sections. The crank shafts will thus rotate in the same direction with the same angular velocity and always in exact step. The crank sections of the crank shafts are normally in the extreme position to the right as shown in Figs. M1, M24 and M25, and the clutch ring or plate M332 is also in its extreme position to the right to hold the teeth M303' of the clutch collar in locking engagement with the rigid teeth M304, and as before stated, upon engagement of one of the teeth of the gear disk M59 with the locking pinion M317 the gear M320 and the bevel pinion M323 will be rotated one-half revolution. During the last part of the first half revolution of the gear disk M59 the clutch plate will be moved to the left to carry with it the clutch collar to bring the locking teeth M303 thereon into engagement with the clutch member M300 which rotates with the differential gear M296, and during the last part of the second half revolution of the gear disk M59 the clutch plate and collar will be returned to their right position to lock the clutch collar and hub M299 against rotation.

The direction of rotation of the gear disk M56 is always in the direction of the arrow shown thereon, and in the normal position the locking surface of the locking pinion M317 is in engagement with the locking surface of the gear disk behind the tooth M315, this locking pin having just been rotated by said tooth. There will, therefore, be no further rotation of the locking pinion M317 until the opposite tooth M316 comes into engagement with the next slot of the locking pinion, and during all this time the clutch collar will remain in its position to the right and in locking engagement with the fixed teeth M304. During this first half rotation, however, the shaft M64 carrying the differential pinion M65 has been moved forwardly to bring the pickup blocks on the rack bars into engagement with the set up pin, and when the end of this forward movement of the shaft M64 is reached, the tooth M316 on the gear disk M59 will have passed through engagement with the locking pinion M317 whereupon through the intermediate gearing the crank shafts will be rotated to carry the shift plate and collar to the left to lock the collar with the clutch member M300 connected with the differential pinion M296. Now, when the shaft M64 is returned to the rear during the last half rotation of the gear M45 the clockwise rotation of the pinion M296 will be transmitted to the clutch member M300 and to the clutch collar in locking engagement therewith whereby the hub M299 and the coupling member M301 will be rotated, the amount of rotation, of course, being determined by the raised pin. At the end of the rearward movement of the shaft M64 the tooth M315 of the gear disk M59 will again engage the locking pinion M317 to cause another advancement thereof, whereby the intervening gearing mechanism will cause the shift plate and clutch collar to be moved to their normal position at the right into locking engagement with the locking teeth M304.

There are no movable setting up pins corresponding to the normal position of the pick-up blocks M309 and M311, but a single pin M341 which may be stationary is provided in this position in alinement with the zero pins of the rows, this single pin being in engagement with the front pick-up block to lock the lower right rack bar against accidental movement when in normal position. Thus upon forward movement of the differential mechanism there is very little strain to the parts thereof, but upon return movement there will be considerable load thereon as the register mechanisms in operative connection with the panel shafts are driven, and there is therefore provided relay means, preferably pneumatic in operation, to take up the load and furnish the power during this return movement, thereby preventing wear and strain on the gearing and the other parts of the master machine mechanism. This pneumatic mechanism is best shown in Fig. M3. Mounted over the differential gearing case is the cylinder M342 in which is a piston M343 whise piston rod M344 connects at its rear end with the arm M345 secured to the upper gear rack of the differential gearing. A valve chamber cylinder M346 is mounted on the left of the cylinder and a valve stem M347 carries the valve M348 and the head M349. A port opening M350 extends from the valve cylinder into the main cylinder for the admission of compressed air to the main cylinder, and leading through the front end of the valve cylinder is the exhaust opening M351. Pivoted on a pin M352 extending from the supporting wall M2 is a lever M353 pivoted at its upper end to the rear end of the valve stem and at its lower end being pivoted to the arm M354 extending from the eccentric strap M355 engaging the eccentric disk M356 on the shaft M53, this being best shown in Figs. M3 and M5, and upon rotation of this shaft the lever is rocked to oscillate the valve head M348 within the valve chamber to open and close the port and the exhaust openings. At the rear of the differential casing and secured to the rear end wall thereof is a cylinder M357 in which is a piston head M358 at the end of the piston rod M359 connected at its front end to the left lower gear rack. This piston head has a slight reciprocating movement on the piston rod so as to open a valve M360 which is a part of the piston rod and which closes the openings M361 passing through the piston head when in engagement with the piston head, to close connection between the front and rear of the piston head, this reciprocal movement being limited between the valve and the collar M362 at the end of the piston rod. When the left lower gear rack is moved forwardly the piston head will hang back from the valve head to allow the air in front of the piston to escape to the rear thereof during this forward movement. Upon return of this gear rack, however, these escape openings will be closed and the air to the rear of the piston head compressed. The amount of this compression, however, is determined by the strength of a spring M363 controlling the bypass M364 leading from rear to the front end of the cylinder, this spring being within the pocket M365 and adjustable by means of the adjusting nut M366. This bypass relieves the compression at the back of the cylinder when it exceeds the force of the spring and also serves to carry to the front part of the cylinder any oil or grease which is carried to the rear end of the cylinder by the piston head.

Mounted at the rear of the cylinder M357 is a frame M367 containing a valve chamber M368 between which and the cylinder is a cylindrical opening M369, in which is a piston head M370 mounted on the stem M371 which at its rear end engages the head M372 in the channel M373 in the rear wall of the framing M367, this channel connecting with the outside through the vent M374. In the valve chamber M368 is the valve ring M375 having a diametrical cross piece M376 passing through an opening in the stem M371 to be thus secured thereto. A port slot M377 connects with the outlet M378 which through piping (not shown) is connected with the valve chamber of the main cylinder M342, while the inlet M379 leads to the valve chamber and is connected with a source of compressed air. The diameter of the valve head M370 is sufficiently greater than the head M372 so that normally the valve stem will be held toward the front to hold the valve ring over the port slot to cut off compressed air from the main valve chamber and cylinder. When the gear M45 starts to rotate from normal position the shaft M53 is rotated and by virtue of the eccentric arrangement just described the lever M353 is rotated to draw the valve stem and valve head M348 rearwardly. The port M350 which controls the flow of compressed air to the cylinder immediately becomes closed and the exhaust outlet M351 open, there being then no resistance to the forward passage of the main piston head M343 and of the differential gearing mechanism which may be then freely actuated by the master machine gearing mechanism to properly pick up. During the last half revolution of the shaft M53 however, the clutch mechanism has been actuated to connect the differential gearing with the panel shaft and register mechanisms. The left lower gear rack, however, will not be loaded and, consequently, upon rearward movement of the shaft M64 this gear rack will be moved to the rear and the tendency will be to over compress the air to the rear of the piston head M358 connected with this gear rack. Owing to the overbalance of pressure against the larger auxiliary piston head M370 the port slot M377 will normally be closed by the valve ring, but upon over compression of air in the large cylinder this auxiliary piston and its stem are moved rearwardly to remove the valve ring from the port slot and compressed air from the supply source may then flow through the port slot and from the outlet M378 to the valve chamber connected with the main driving cylinder M342. As before described, however, the valve head M348 early in the return stroke of the eccentric mechanism connected with the valve stem is moved to open the inlet port and to close the exhaust opening permitting compressed air from the supply source to then enter the main cylinder and drive the piston M343 rearwardly, and, it being connected with the upper gear rack, the entire load of the panel and register mechanisms is taken up by the main cylinder. Should the main piston move too fast the upper gear rack would cause clockwise rotation of the pinion M65 and the rearward movement of the lower left gear rack would be checked to allow the compression to the rear of the piston M358 to assume a normal value, whereupon the overbalance of pressure against the auxiliary piston head M370 becomes effective closing the main valve until the piston M343 assumes normal speed. The movement of the differential gearing mechanism is therefore cushioned and at the same time governed to maintain normal speed and balance.

Referring back again to the main clutch members M7 and M10 for engaging the master machine mechanism with the driving source, the long clutch groove M17 in member M7 which extends a circumferential distance of 240 degrees, is for the purpose of allowing ample time to the electromagnet M141 to actuate the controlling mechanism to move the clutch member M10 forward into complete engagement with the driving member and current flow through this electromagnet should be maintained until the locking mechanisms have become effective to complete the locking together of the engaged clutch members. The normal position of the clutching slot is best shown in Figs. M4 and M19, one end thereof being to the right of the center, the other end being directly above the center, the clutch pin in this position being to the rear of the end at the right. At the front end of the main shaft M8 is the eccentric disk M380 engaged by the eccentric strap M381 from which the arm M382 extends downwardly and guided in its vertical reciprocation by means of the slot M383 engaging the pin M384 extending from the front supporting plate M3. Directly below this arm extending forwardly from the supporting wall M3 and insulated therefrom is an arm M385 having a pocket in its front end directly below the end of the arm M382 in which pocket a contact pin M386 may reciprocate, a spring M387 tending to hold this pin in its maximum upper position against the shoulder M388.

The arm M382 is moved into its lowest position by the eccentric disk to press the contact pin downwardly and this contact pin and arm are included in the controlling circuit for the main electromagnet M141. When the operator actuates the proper switch or key to close this circuit, the electromagnet becomes effective to carry the clutch rod M19 forwardly, the clutch pin starting to engage in the right end of the clutch slot and by the time the other end of the slot reaches the pin the two clutch members will be completely connected, the direction of rotation being indicated by the arrow. During this movement of the clutch members the arm M382 rises but the pin is held in engagement therewith until the members have been thus completely moved together, whereupon the pin reaches its uppermost position but the arm still travels a sufficient distance upwardly to break contact with the pin, whereupon the circuit through the electromagnet is broken, but by this time the clutch members are together. In this master machine mechanism is also provided contact means for controlling circuits and indicating mechanism to indicate to the operator the various operative positions of the mechanism, the conditions the operator desires to know being the position at any time of the pick up blocks and the positions and number of advancements of the driving pinion M296, whose motion is transmitted to eventually cause corresponding rotation of the engaged register numeral wheel. The circuit controlling means for the first condition are best shown in Figs. M1, M3 and M4. An arm M389 extends forwardly from the hub M83 connected with the box M73 which travels along the screw shaft, as before described. At the end of this arm is supported the pocket M390 in which may reciprocate a contact brush M391 against the action of the compression spring M392 to be carried in contact with the contact blocks M393, whose positions correspond in alinement with the positions of the setting-up pin order rows, one block being engaged by the brush, while the pick up blocks are in position to engage the raised pin in the corresponding row, and circuits connected with the brush and contacts and with the indicating mechanism are thus controlled and the operator notified at any time which numeral wheel in the connected registers is being operated. The second condition is controlled by an arrangement best shown in Figs. M24, M26 and M27. As already described, the coupling member M301 is reciprocated to the left and right with its hub M299 and the clutch collar M302 to be moved into and out of engagement with the clutch member M300 of the driving pinion of the differential gearing. Engagement with this reciprocating member is accomplished by the coupling disk M394 which may rotate but which has no longitudinal movement, this clutch disk being mounted at the right end of the shaft M395 journaled in the bearing M396 supported by the yoke M397 which at its flanges M398 may be secured to the main supporting wall M1. At the right end of this shaft is mounted the coupling cap M399 having slots M400 about its periphery for engagement with the teeth of the coupling member M301. The length of these slots is sufficient to maintain engagement with the teeth in any position of the coupling member M301 during its reciprocation, and the rotational movements of this reciprocating coupling member are therefore transmitted to the coupling flange M394 which may be directly connected with a similar coupling flange connected with the panel shafts. The teeth on the coupling member M301, and those on the clutch collar and engaging members, are of the same number, preferably ten. Corresponding to the ten digits on the numeral wheels and arranged about the periphery of the clutch cap M399 are ten equally spaced contact teeth M401 separated by insulation, as shown, and in the upper arm M402 of the supporting yoke is secured insulated therefrom the pocket M403 in which may reciprocate the contact brush M404 against the pressure of the spring M405 holding it in contact with the contact teeth. Circuits suitably connected with the contact teeth, brush and indicating mechanism are therefore actuated in correspondence with the rotations of the driving pinion and the operator at any time may see that the numeral wheels are being properly driven by the differential gearing mechanism.

Extending from the rear of the arm M215 in the lower end thereof is the pointed pin M406, normally in engagement at one end of a circular slot M407 at the upper end of a plate M408 which is adapted to reciprocate vertically through an opening at the rear end of the shelf M219. Extending rearwardly from this plate through a slot M409 in the rear end of the shelf M219 is a pin M410 carrying a contact ring M411 insulated therefrom. Extending from the rear end of the shelf M219 at each side of the contact ring M411 is a pin M412, these pins being insulated from the shelf and on each pin is supported a contact spring M413. The edges of the slot M407 have a radius less than that of the arc in which the pin M406 travels, and the upper edge of the slot M407 will, therefore, act as a cam surface which, when engaged by the pin M406 upon rotation of the arm M215 will cause the plate M408 to be raised vertically to close the contacts. The normal position of this circuit controlling mechanism is normally that shown in Figs. M1 and M2, the arm M215 being to the right and the pin M406 within the right end of the slot M407. As before described, the arm M215 will remain in this position until the last set up pin has been reached and the reversing mechanism actuated to carry the shaft M160 forwardly, whereupon the pin M406 is withdrawn from the slot M407. Upon engagement then of the front cam roller with the front cam disk, the shaft M160 is rotated to carry the arm M215 to the left, the position of the mechanism at this time being shown in Figs. M15 and M16. The screw shaft is now driven in the reverse direction and in the beginning of its last revolution the reversing mechanism will again be actuated to throw the shaft M160 to the rear, the pin M406 then entering the left end of the slot M407. The rear cam roller also will be carried into the alinement plane of the rear cam disk, and when the screw shaft finally comes to rest, the shaft M160 is rotated and the pin M406 carried through the slot M407 and upon engagement of the pin with the cam slot M407 the plate M408 is raised, closing the contacts, and, as will be described later, these contacts are in circuit with electromagnets which control the register printing or recording mechanisms. When the arm M215 has returned to its normal position to the right the pin will be in position at the right end of the cam slot M407, the parts being again all in their normal position. Contact mechanism is also actuated when reversal of the screw shaft takes place and the arm M215 is swung to the left. Supported from the shelf M219 is a contact box M414 in which are contacts M415 and M416 and from which extends a contact button M417 to be pressed in when the arm M215 swings to the left to electrically connect together the contacts.

Each armature of the set up pin electromagnets M229 terminates in a contact head M418, and each of the armatures of the reversing pin electromagnets terminates in a contact head M419. Below the plate M230 is secured a horizontal supporting plate M420 of insulating material having the openings M421 alining with the contact heads, and each opening is lined with two contact sections M422 and M423 insulated from each other. The contact heads of the reversing pin electromagnets and of the zero setting-up pins are normally disposed above the plate M420 and out of contact with their corresponding contact sections, while the contact heads for the electromagnets of the other setting-up pins are normally disposed below the plate M420 and out of contact with the corresponding contact sections. As before stated, when a pin in any order is set up all reversing pins below but up to that particular order are depressed, this being brought about by the electromagnets M198 and M199. Upon energization of a setting-up electromagnet to actuate the corresponding pin the corresponding contact head is carried into engagement with the corresponding contact sections to close them, and also when the electromagnets of the reversing pins are energized the contact heads M419 thereof connect together corresponding contact sections M424 and M425 also secured in the plate M420. As will be more fully explained in connection with the electrical circuit diagrams for the system, these contact heads and contacts control circuits which at the operator's keyboard indicate the operative condition of the reversing pin and setting-up pin mechanisms.

In Figs. M1 and M23 are also shown contact mechanisms for controlling energization of the circuits of the setting-up and reversing pin magnets. At the end of the shaft M119 is mounted a contact wheel M430 having a segment M431 of insulating material, a contact brush M432 being suitably supported from the wall M1. At the end of shaft M122 is mounted a contact wheel M433 whose entire periphery with the exception of a small part M434 is surrounded by the insulation M435. A contact brush M436 is suitably supported from wall M1 to engage this contact wheel.

*The register panel board.*—Each register mechanism is a self-contained mechanism and is supported in a panel board, this panel board being in the form of a framework offering shelves or compartments for receiving the register mechanisms, with shafting and gearing mechanism suitably arranged to engage with the driving gears of the register mechanisms, these shafts and gearing mechanisms all being driven by the master machine mechanism which has already been described. The panel board is also so constructed and arranged that each register mechanism is easily accessible so that any one may be removed without disturbing the others. This panel board mechanism is shown in Figs. B1, B2, B3, B4, B5 and B6. The panel board may be of any length or height determined by the number of register mechanisms to be supported, and in Figs. B1 and B4 sections only of the board are shown. The framework consists of the main vertical supporting struts or beams B1, B1, to the rear of which is secured a box-like structure B2, B2. These vertical supporting members are held in alinement by the horizontal members or angle beams B3. Between the vertical supporting members and connecting the horizontal bars are the cross pieces B4 to which are secured the vertical partition members B5 and B6. In the front edge of the partition walls B5 are the horizontal slots B7 and in the rear edge of the partition walls B6 are the horizontal slots B8 disposed on lines midway between the slots B7. The box structures B2 form housings for bevel gearing and through each alternate gearing case passes a vertical shaft B9 terminating at its lower end in a miter gear B10 engaging with a miter gear B11 secured to a horizontal main shaft B12, journaled in the lower ends of the gear cases. Secured to the vertical shaft B9 are a plurality of miter gears B13 engaging with miter gears B14 and B15 secured to one end of shafts B16. These shafts B16 extend to the left and right of the gear case and are journaled at their other ends in the side walls of the intermediate gear cases. These shafts also pass through the alternate slots B8. In each intermediate gear case is a vertical shaft B17 terminating at its upper end in a miter gear B18 engaging one of the miter gears B19 secured to the main driving shaft B20 journaled at the top of the gear cases. Secured to this vertical shaft are a plurality of miter gears B21 engaged by the miter gears B22 and B23 secured to one end of shafts B24. These shafts B24 extend horizontally to the left and right from the gears B22 and B23, being journaled at their other ends in the side walls of the alternate gear cases. These shafts also are disposed in the intermediate slots B8 between the alternate slots occupied by the shafts B16.

The partition walls B5 are double, each comprising two plates B25 and B26 separated by the cross pieces B4. Likewise, the rear partitions B6 are double, each comprising plates B27 and B28 separated by the cross pieces B4. Each compartment for the register is bounded on the sides by the vertical partition walls B5 and B6 and at the top and bottom by planes passing through adjacent horizontal shafts, the position of a register mechanism within a compartment being shown in Figs. B1, B3 and B5. As shown in these figures, each register is inserted or slid into its compartment from the front. As shown in Figs. R1, R4 and R5, in the register mechanism the ends of the side walls R1 and R2 are narrowed to a width corresponding to the distance between adjacent horizontal shafts, and when a register mechanism is inserted the narrowed ends engage between adjacent shafts, while the front framing tubular shaft R36 of the register mechanism, within which is journaled the shaft R194, engages at its ends in the front slots B7, and when the register mechanism is in place the rear ends of the side walls thereof lie between adjacent horizontal shafts with their shoulders against said shafts and the side walls in engagement with the inner plates of the vertical supporting walls B5 and B6, the coupling flange members R197 and R198 at the ends of the shaft R194 engaging in the space between the plates of B5 and occupying one-half the width thereof, these flanges engaging with the flanges of adjacent register mechanisms and occupying the other half of the space between the plates B25 and B26. Near the rear edge of the plates B27 and B28 comprising the rear supporting walls are holes B29 which coincide with the holes R252 in the ends of the walls R1 and R2 of the register mechanisms, and when the register mechanisms are in place bolts or pins may be inserted in these openings, thus securing the register mechanisms within their compartments in the panel board. By withdrawal of the corresponding pins or screws and uncoupling the flanges R197 and R198 the register mechanism is then free to be drawn forwardly from its compartment without interfering with the adjacent or other register mechanisms.

As best shown in the rear view of the panel board (Fig. B4), each shaft B16 carries a number of gears B30 for engagement with the driving gears R10 of the register mechanisms. On each of the shafts B24 is mounted a plurality of gears B31 for engagement with the driving gears R8 of the register mechanisms. Each of the gears B30 and B31 is common to two register compartments, and, as shown, the driving gears R10 of the middle and lower register are engaged by a gear B30, while the driving gears R8 of the middle and upper registers are driven in common by a gear R31.

The main shafts B12 and B20 connect at the end of the panel board with the master machine mechanism, being respectively in driving relation with the differential gearing and the screw shaft of the master machine mechanism. The rotation of the shaft B12 is transmitted to the gears B30 through the bevel gear mechanism contained within the alternate gear casings, and the rotation of the shaft B20 is transmitted to the gears B31 through the bevel gears in the intermediate gear casings, and when the master machine is in operation the screw shaft and the differential gearing mechanism are alternately operated to cause rotation first of the shaft B20 and then of the shaft B12, whereupon the driving gears R8 and the screw shafts of the connected register mechanisms are driven to cause translatory motion of the connected mechanism, and then the driving gear R10 is rotated to cause rotary motion and operation of the register indicating mechanism. Owing to the engagement of one gear B31 with two register driving gears R8, the threads on the screw shafts of alternate registers must run in opposite directions to cause the proper direction of travel of the primary and secondary carriages. Likewise the circuits for the polarized electromagnets controlling the clutch mechanisms of the registers must be adjusted so that the clutch mechanism will be actuated to cause proper direction of rotation of the register drive wheel R21. The shafts B12 and B20 may be brought into connection at any point with the master machine by means of suitably arranged gearing.

The shafts R194 of the adjacent registers in each horizontal row are all connected together by the coupling flanges R197 and R198. These shafts, as described in connection with the register mechanisms, are connected with the date or time indicators R201. Controlling clock mechanism B32 is shown mounted on the top of the panel board over one of the vertical supports, and a shaft B33 extends downwardly, and in line with each row of shafts R194, carries a worm B34 having engagement with a worm wheel B35. Each worm wheel is mounted on a shaft B36 suitably journaled in walls of the upright supporting members, which shaft terminates in a coupling flange B37 for connection with the coupling flange on the shaft R194 of the end register mechanism. The movement of the clock mechanism is transmitted through the vertical shaft B33 to the worms thereon and from the worm wheels to the coupling flanges B37 and thence to the shafts R194 on the register mechanisms, the time information being indicated on the time or date indicators R201.

The shafts B12 and B20 are driven upon actuation of the master machine mechanism and all the shafts B16 and B24 are then alternately rotated and the driving gears R8 and R10 of all the register mechanisms are also driven. The calculating mechanism of none of the registers, however, will be operated until suitable electric circuits have been closed through the controlling electromagnets. Electromagnet R59 connects the secondary carriage with the register screw shaft, the movement of which secondary carriage operates the clutch mechanism, in accordance with its control setting secured by the polarized electromagnet R84, to connect the driving gear R10 with the register indicating mechanism.

*Synchronous air valve coupling.*—When a small number of registers is employed the master machine may connect directly with the panelboard shafts, but when a large number of registers is employed the two shafts connecting the master machine with the register panel will require considerable power to operate them, and if they are driven directly by the master machine the latter must be made very heavy and even then would undergo considerable wear. To permit the furnishing of any desired amount of power to the register panel shafts without deriving this from the master machine, a motor is placed between the master machine and the register panel upon each shaft, and the coupling between the master machine and the motor is of such nature as to drive the panel shafts in exact synchronism with the corresponding shafts from the master machine. Various means may be employed for accomplishing this, such as a synchronous electric motor or a steam or air motor. The means shown in Figs. V1 to V4 is adaptable to be operated by some fluid under pressure, such as steam or compressed air, and the principal novelty resides in the synchronous valve, whose details are shown in these figures and will now be described.

In Fig. V1 is shown apparatus which is interposed between corresponding shafts of the master machine and panelboard. V1 is a reversible motor which may be driven by compressed air or steam. The shaft V2 connects with one of the panelboard shafts, while the coupling member V3 connects with the corresponding master machine shaft. The coupling consists of an outer valve member V4 and an inner valve member V5, the inner valve member being connected with coupling V3 by the shaft V6, while the outer valve member is connected by shaft V7 with the rotating element of the motor V1. The inner valve member is divided into two compartments V8 and V9 by the partition ridge V10. The axial tubular passageway V11 through shaft V6 communicates with the lower compartment V9 and communicates through passageways V12 with the exterior of said shaft. The outer compartment V8 communicates through the annular passageway V13 and passageways V14 with the exterior of shaft V6. Surrounding this shaft to the right of the valve member is the casing V15 having annular compartments V16, V17 separated by the central partition V15'. The compartment V16 communicates with passageways V14 and with the exterior through outlet passageway V18. Compartment V17 communicates with the exterior through inlet passageway V19 and surrounds and communicates with passageways V12. Suitable packing rings V20 are also provided. The valve compartment or head V5 is confined within the outer valve member by the flange V21, screw-threaded into the end of the exterior member as shown, packing rings V22 being also provided. The outer valve member has the two compartments V23 and V24. Compartment V23 communicates with the exterior of shaft V7 through the axial tubular passageway V27 and the radial passageways V28. Compartment V24 communicates with the exterior of shaft V7 through the annular passageway V25, and the radial passageways V26. Surrounding shaft V7 to the left of the exterior valve member is the shell or casing V29 having the two compartments V30 and V31 separated by the partition V32. Compartment V30 surrounds the passageways V28 and communicates with the exterior through a passageway V33. Compartment V31 surrounds passageways V26 and communicates with the exterior through passageway V34. Compartments V23 and V24 are separated from each other by partition walls V36 and V37. Through the inner wall V38 of compartment V23 there are two port openings, port opening V39 being immediately to the left of partition V36 (referring to Fig. V3) while port opening V40 is immediately to the left of partition V37. Through the inner wall V41 of compartment V24 there are also two port openings, opening V42 being immediately to the right of partition V36, and opening V43 being immediately to the right of partition V37. Through the upper wall V44 of the inner valve member there is a port opening V45 and diametrically opposite to this port opening in the lower wall V46 is the port opening V47, these port openings lying longitudinally respectively between port openings V39, V42 and V40, V43 and normally out of communication therewith. Upon rotation, however, of the inner valve member the upper and lower ports will communicate with either of the upper and lower ports of the exterior valve member.

Passageway V19 is connected with the source of compressed fluid supply through a pipe V48, while the exhaust fluid passes through passageway V18 and out through pipe V49. Passageway V34 connects through pipe V50 with one end of motor V1, while passageway V33 connects through pipe V51 with the other end of the motor, and these pipes may be either the exhaust or supply pipes for the motor. The driving fluid always enters through pipe V48 and exhausts through pipe V49, but the direction of flow through pipes V50 and V51 depends upon the direction of rotation of the inner valve member connected with the master machine. If, now, the master machine is operated to cause clockwise rotation of the shaft connected with coupling V3 the interior valve member is rotated in a clockwise direction to carry ports V45 and V47 respectively into communication with ports V42 and V40, and driving fluid immediately begins to flow through the valve and motor as follows: from pipe V48, through passageway V19, compartment V17, passageways V12, passageway V11, into the lower compartment V9 of the inner valve member, through communicating ports V47, V40 into compartment V23 of the outer valve member, through passageways V27 and V28, into compartment V30, through passageway V33, into pipe V51, through the motor back through pipe V50, through passageway V34, into compartment V31, through passageways V26 and V25, into compartment V24 of the outer valve member, through communicating ports V42, V45, into the upper compartment V8 of the inner valve member, through passageways V13 and V14, into compartment V16 and through passageway V18 and pipe V49 to exhaust. The motor immediately starts to rotate in a positive direction to cause corresponding rotation of the connected panel shaft. As the inner valve member continues its clockwise rotation the outer valve member follows, being driven by the motor. If the master machine is rotated in a counter-clockwise direction the inner valve member rotates likewise and carries its ports into communication with ports V39 and V43 of the outer valve member, and the driving fluid flows through the motor in an opposite direction. The fluid enters the pipe V48 and flows through the passageways before traced into the lower compartment V9 of the inner valve member, through communicating ports V47, V43, into compartment V24 of the outer member, through passageways V25 and V26, compartment V31, passageway V34, pipe V50, through the motor in reverse direction, out through pipe V51, through passageway V33, into compartment V30, through passageways V28 and V27, and into compartment V23 of the exterior valve member, through communicating ports V39, V45, into upper compartment V8 of the inner valve member, through passageways V13 and V14, compartment V16, passageway V18 and pipe V49 to exhaust. Thus when the master machine is rotated the inner valve member is rotated correspondingly to open the supply circuit to the motor, and so long as the corresponding valve ports remain in communication the motor operates in perfect synchronism with the master machine. In the normal relative position of the ports as shown in Fig. V3 there is no communication between them. If the motor tends to run faster than the master machine mechanism, there is relative movement between the valve members to return these members to their normal relative position to disconnect the inner member ports from those of the outer member, and the speed of the motor is immediately reduced, whereupon the inner valve member again carries its ports into communication with those in the outer member and synchronous speed is resumed. If the speed of the motor becomes far enough in excess of that of the master machine, the reverse port openings of the outer valve member are carried into communication with the ports of the inner member and the direction of the fluid flow through the motor is immediately reversed to quickly carry the valve members into position, which causes resumption of synchronous speed. Thus the supply of fluid being kept up the motor however powerful can neither fall behind nor race ahead of its controlling valve and the motor assumes the entire burden of driving the panel shafts and the registers connected therewith.

The registers may be on different boards or sections which may be placed in different rooms or even different buildings. Each section may be driven by a separate master machine or one main master machine may control all by means of synchronous motor driving connections.

*The journal mechanism.*—In this system provision is made for simultaneously making multiple consecutive records or journals of all entries, including not only such data as are entered from the keyboards but also certain other data automatically entered as hereinafter set forth. The main function of the journal mechanism is to properly carry journal papers through a printing field and into engagement with associated printing mechanism controlled by the keyboards, registers and other mechanisms.

The journal mechanism is illustrated in figures marked with the reference character J. Its various operative parts are mounted between and supported by the vertical longitudinal walls J1, J2 and J3. Extending through these walls and journaled therein are the shafts J4, J5 and J6. The shaft J4 mounts a spool J7 which carries the paper roll J8. The middle shaft J5 mounts a spool J9, which carries a carbon paper roll J10. The front shaft J6 mounts a spool J11 which carries a duplicate paper roll J12. Over the shafts J5 and J6 respectively are the shafts J13 and J14, mounting respectively the intake spools J15 and J16 for taking up the carbon paper and the duplicate record paper, these shafts being driven in a manner which will be described later. As best shown in Fig. J6, the original record, the carbon and the duplicate record sheets come together and pass below a guide roller J17, then over a printing mechanism, which will be described later, then around guide rollers J18 and J19, and then upwardly between the feed rollers J20 and J21, the papers then dividing, the carbon and duplicate record sheets passing between guide rollers J22 and J23 to intake spools J15 and J16, respectively, while the original record sheet passes over an apron J24 into a receptacle J25. This receptacle is placed, as shown, between the supporting walls J2 and J3, resting on shelves J26 and J27 extending from these walls and being confined between the rear abutment J28 and the front cross wall J29. Along the top of this cross wall is a slot J30, containing an insert J29' of fiber or some material uninjurious to a cutting edge, and as the paper passes by into the receptacle, it is cut at the proper time by a knife J31. The operation of this knife mechanism will be more clearly described later. The driving roller J20 is connected with driving mechanism, as will be described later, and is preferably of soft friction material, and the idle roller J21 is also of soft friction material and presses against the drive roller, so that when the roller J20 is driven the papers will be advanced.

J32 is a main driving shaft having connection with a driving motor. At the left end of this shaft between the walls J1 and J2 is a one-tooth gear J33 adapted to mesh with a thirty-tooth gear J34 secured to an intermediate shaft J35 extending between the supporting walls. Upon the shaft J35 is also rigidly mounted a gear J36 having sixty teeth and meshing with the pinion J37 secured to the shaft J38 mounting the driving roller J20, this pinion having twelve teeth. Thus, for each revolution of the main driving shaft J32 the one-tooth gear thereon will cause one-thirtieth of a revolution of the gears J34 and J36 and one-sixth of a revolution of the gear J37 and shaft J38. Each page section of the journal papers is provided with space for twenty-five lines, and top and bottom page margins equal to the space of five lines. The spacing of these lines is equal to one-sixth the circumference of the driving roller J20. In other words, each revolution of the main driving shaft normally causes advancement of the paper a distance equal to the space between the lines.

Secured to the left end of the main driving shaft and between the gears J34 and J36 is the cam J39 and extending from the left side of the gear J34 is a cam pin J40 for engagement with the cam. The cam is so constructed and the position of the pin is such that the cam surface J41 will engage with the pin a sufficient length of time to cause one-fifth revolution of the shaft J35, and during this one-fifth revolution the shaft J38 and the driving roller will rotate one complete revolution. Each page section of the papers should have an upper and a lower margin between which the lines are arranged, and during this one-fifth revolution of the shaft J35 and one revolution of the drive roller J20 the papers are advanced a distance equal to the distance between the last line of one page and the second line of the next page, between which lines the paper is cut to leave the lower margin on the advanced page and the upper margin on the following page. After this one-fifth revolution of the shaft J35, the single-tooth gear J33 will cause one-thirtieth revolution of the shaft J35 and one-sixth revolution of the shaft J38 to advance the paper from line to line, and this continues until the cam surface J41 again engages the pin J40, whereupon another one-fifth revolution of the shaft J35 will provide for the margins. During the one-sixth advancements of the drive roller the papers receive the entries constituting the body of the page. Typewriting mechanism similar to the ordinary typewriter is disposed in front of the journal mechanism by means of which explanatory details may be entered as the papers are advanced.

As shown in the drawings, the cam J39 has carried the pin J40 to the position shown, the shaft J35 and the gears thereon having been rotated one-fifth of a revolution to provide for the two margins and to carry the first line of the new page into line of print. After this is accomplished, there will be no further mechanical rotation of the shaft J35 until the tooth of the gear J33 again comes into mesh with the gear J34. During this interval of rest the mechanism controlling the knife blade is actuated and the filled page severed and deposited in the receptacle. As best shown in Figs. J1 and J3, the knife blade is pivoted at its left end to the end of the arm J42 of the bell crank lever pivoted at its elbow in the supporting wall J2, the end of the other arm J43 being pivoted to a rod J44 extending downwardly and pivoted at its lower end to a rocking lever J45 pivoted to the cross shaft J46 journaled in the supporting walls J2 and J3. The right end of the knife blade is pivoted to the end of an arm J47 pivoted in the supporting wall J3, this arm being similar to the arm J42 of the bell crank lever. A spring J48 encircling the rod J44 between a collar J49 and an abutment J50 extending from the supporting wall J2 tends to rotate the bell crank lever to hold the knife blade away from the papers passing under the edge thereof. The other end of the rocking lever J45 terminates in a cam roller J51 adapted for engagement with the cam wheel J52. This cam wheel J52 is on the main driving shaft, and a sleeve J53 extending to the left from the cam wheel terminates in a disk J54. A spring J55 encircling the shaft between the disk, and an abutment collar J56 tend to hold the disk toward the left and the cam wheel out of the alinement plane of the cam roller J51. Extending from the right face of the gear J34 is a cam ridge J57 which, during the one-fifth revolution of the gear J34, comes into engagement with the disk J54 causing the cam wheel J52 to be moved to the right into the alinement plane of the cam roller J51. During the next revolution of the main shaft J32 the point of the cam wheel is carried into engagement with the cam roller J51 to cause rotation of the rocking lever J45 and the consequent lowering of the knife blade, whose edge engages the insert J29' and severs from the outer paper a completed page section which drops into the receptacle J25 provided therefor. After the knife has been actuated the cam ridge releases the disk J54 and the cam wheel J52 is moved to the left out of the alinement plane of the cam roller. During this position of rest of the shaft J35, the first line on the new page being in the line of print, printing mechanism, which will soon be described, is actuated to print on the following page the number of the page and the identification legends, and when the gear J33 again comes into mesh with the gear J34 rotation of the shaft J35 and of the driving roller J20 will continue and each line of the page will be brought successively into the line of print. The cam ridge J57 remains in engagement with the disk J54 during the cutting of the pages and during the printing of the first line of the new page, and until the gear J33 again passes through engagement with the gear J34 to advance the papers to bring the second line into the line of print, and during this shifting from the first to the second line, the cam ridge releases the disk J54, thus allowing the cam wheel to be moved to its normal position out of the alinement plane of the cam roller J51. Upon the paper by means of typewriter mechanism may be printed suitable explanatory details on each line. The operator also has manual control of the paper advance roller J20 and can, therefore, bring any line of the page into printing position while actuating the typewriter mechanism, thus permitting continuation of the explanatory details through several lines.

The mechanism when a line is in position is locked by means of a locking roller J58 engaging in the grooves J59 in the periphery of the wheel J60 secured to the shaft J35, this roller being pivoted in the arms J61 loosely pivoted on the shaft J46, a spring J62 connecting with the arms J61 and some stationary part serving to hold the locking roller evenly in the grooves.

The shifting from line to line is brought about automatically when each entry occupies only one line. Should an entry require more than one line the paper is manually shifted by turning a knob J63 at the left end of the shaft J38 on which is mounted the feed roller J20. This manual turning may extend through 29/30ths of the revolution of the shaft J35, but when the mechanism is in such a position that the first line of the new page is in position to receive an entry, the shaft J35 is locked against further manual turning until the main shaft J32 is rotated one revolution to cut off a page and to carry out the operations of numbering the page and printing the identification legends thereon, and after this is accomplished the paper is free to be manually shifted through the next twenty-nine thirtieths. This locking of the shaft J35 when the first line is in position is brought about by the pawl J64 pivoted to the locking wheel J60, the point of this pawl extending downwardly into the path of a ridge J65 projecting from the sleeve J53 extending from the cam wheel J52. The direction of rotation of the shafts J32 and J35 is indicated by arrows in Fig. J3, and when the first line of the page is in the line of print the positions of the various parts are as shown in this figure, the ridge J65 having just passed by the point of the pawl. The knob J63 cannot now be turned to advance the paper, as the shaft J35 is locked, owing to the locking engagement of the pawl point with the ridge J65, and thus the cutting off of a page and the automatic printing of the identification legends are assured. When the main shaft is again started, the ridge J65 is carried away from the pawl and the shaft J35 is free to be rotated to cause advancement of the paper to carry the second line into the line of print, and the locking pawl being then free, the operator may manually advance the paper. The pin J66 engaging in the slot J67 limits the oscillation of the pawl.

The motor J68 for driving all these various shafts and mechanisms is best shown in Figs. J25 and J26. This motor is mounted on a pedestal J69, its driving pinion J70 is in mesh with the driving gear J71 mounted on the main driving shaft J32, and the other mechanisms, being all in gearing or other connection with this main shaft, are properly actuated upon operation of the motor. At the right end of the feed roller shaft J38 is secured the pulley J72 engaged by the belt J73, which belt also passes around the pulleys J74 and J75 secured respectively to the ends of the shafts J14 and J13 on which are mounted the intake spools J16 and J15, the belt then passing around a tension pulley J76 pivoted on a pin J77 extending from the arm J78 pivoted on the shaft J13 between the pulley J75 and the supporting wall J3, this arrangement being best shown in Fig. J2. Along the rear end of the lever J78 a weight J79 is adapted to be shifted and set, to vary the tension on the belt. The belt so engages these various pulleys that rotation of the pulleys will be in the direction of the arrows shown on Fig. J5. The shaft mounting the pulley J72 is driven by the pinion J37 engaging the intermediate gear J36. As the papers are advanced upon rotation of the driving roller J20 on the shaft J38 the slack of the paper must at all times be taken up by the intake spools, but the amount of rotation of the intake spools to take up the slack varies according to the amount of paper wound on the spools, and this change is taken care of by the frictional belt driving arrangement, the belt driving the pulleys for the intake spools until all the slack has been taken up, whereupon the belt will slip along these pulleys to keep the paper taut. The tension side of the belt passes over the top of the tension pulley J76 and thus when the paper becomes taut and the intake pulleys stop rotating, the tendency of the belt will be to lift the loose pulley, thus relieving the tension of the belt and allowing it to slip more freely over the intake pulleys. The papers are thus automatically wound on the intake rolls but are never subject to excessive tension. On the motor shaft there may also be provided a brake wheel J80 engaged by brake straps J81, as shown, electromagnetic means J82 being provided for controlling the clamping of the straps about the friction wheel to quickly stop the motor after any operation thereof.

Mention has already been made that each page must be numbered and the mechanism for automatically applying the numbers to successive pages will now be described. This mechanism is best shown in Figs. J5 and J6. A cylindrical supporting frame or barrel J83 extends between the supporting walls J2 and J3 near the lower end thereof. It contains type for printing the page heading legends and at its right end are page counting or number wheels J84, these number wheels being connected by means of a shaft J85 with a ten-tooth sprocket wheel J86 at the outside of the supporting wall J3. Loosely mounted on the main driving shaft J32 is a ten-tooth intermittent gear J87, on whose hub is secured a ten-tooth sprocket wheel J88 connected with the sprocket wheel J86 by the chain J89. The ten-tooth intermittent gear is adapted to be driven by the one-tooth intermittent gear J90 secured to the end of the shaft J35. This shaft J35, as already described, is driven from the main driving shaft and during each revolution thereof a page is printed and completed. Each of the numbering wheels has ten characters, and it is obvious therefore that the shaft J85 must be driven one-tenth of a revolution for each revolution of the shaft J35, so that the pages may be consecutively numbered, and this relation is brought about by the gears J90 and J87, each revolution of the intermittent gear J90 causing one-tenth of a revolution of the gear J87 and of the sprocket wheels J88 and J86, the number wheels being therefore advanced one unit. The engaging locking surfaces of the intermittent gears are effective in preventing displacement of the numering wheels except when they are to be actuated to change their indication.

Extending between the walls J2 and J3 over the line of print of the page numbering wheels and page identification legend type is the abutment frame J91 having at its lower edge the abutment ridge or pad J92 of softer material for engagement with the raised characters for printing the page heading. The ends of this abutment frame extend through slots J93 and J94 in the walls J2 and J3, and rods J95 and J96 extend upwardly from the ends and connect with lever arms J45 and J97 respectively, these arms J45 and J97 extending from the shaft J46 which is rotated upon engagement of the cam wheel J52 with the cam roller J51 as already explained, and the abutment frame J91 is therefore lowered at the same time that the knife is lowered to cut a printed page from the paper. The means for properly inking the type for printing the page heading is shown in Fig. J6. Between the cylindrical frame J83 and the guide rollers J18 and J19 are the spools J98 and J99, each of which may serve either as an intake or feed spool, these spools being mounted on the shafts J100 and J101 respectively, which extend between the walls J1 and J2 and through the wall J3 to be engaged at their ends by the ratchet wheels J102 and J103 respectively. In the drawing, spool J98 is taking up the ribbon J104 which is fed from the spool J99, passing then over the page heading type and around the frame J83. The frame J83 and the spools are surrounded by the shell J105, whose upper part J106 and whose rear end J107 are shaped and disposed to properly guide the papers from the main supply rolls between the page heading type and the abutment pad J92. Thus, when the cam wheel J52 becomes effective the abutment frame is lowered and the abutment pad presses the paper and ribbon against the page heading type, the record on the outer paper being printed from an inked ribbon, while that on the inner paper is printed by means of the carbon paper.

The position of the numbering wheels is such that the number will appear in proper position near the right upper corner of the page. As this printing occurs only once for each page, the inking ribbon may be shifted only once for each revoltuion of the shaft J35 which makes one revolution per page. Extending from the intermittent gear disk J90 is a pin J108 to which is pivoted the rod J109 pivoted at its lower end to the pin J110 connecting the upper ends of the plates J111 and J112 extending from the front end of the bar J113 pivoted at J114 to the outside of the supporting wall J3. A pin J115 extends through slots J116 in the side walls J111 and J112 and is engaged between these walls by the upper end of a rack or pawl lever J117 extending downwardly between the ratchet wheels J102 and J103. Secured also to the pivot pin at the left of the rack bar is a heart-shaped cam block J118. The left end of the pin J115 extends into the opening J119 in the supporting wall J3, and when the rod J109 is in its uppermost position, the left end of the pin is in the groove or niche J120 at the upper part of the opening, so that the pin in this position will be in the center of the slots J116 and so that the point of the heart-shaped cam block will be in a central position with respect to the axes of the ratchet wheels J102 and J103. A pivot pin J121 extends outwardly from the wall J3 on a line midway between the axes of the ratchet wheels, and within the wall J3 a tongue J122 extends from the pin downwardly between the ribbon spools so that when the ribbon fills one spool it will engage the tongue to rotate the pin in one direction, and when the ribbon fills the other spool the tongue will be engaged to rotate the pin in the opposite direction.

Secured to the pin between the wall J3 and the rack bar J117 is the lever J123 which extends upwardly to within a short distance of the point of the heart-shaped cam block, and this lever may rotate between the stops J124 and J125 extending from the wall J3. The point of the cam-shaped block will engage at one side of the upper edge of the lever J123, depending upon which spool is filled by the ribbon, and as the bar J113 is carried down the cam face of the cam block passes along the edge of the lever J123 to cause translation of the rack bar J117 toward the corresponding ratchet wheel, whereby upon return of the rack bar to its upper position the engaged ratchet wheel will be rotated to take up the ribbon. In the figures the spool J99 has just become filled and has moved the tongue to the rear to throw the upper edge of the lever J123 forwardly, and upon rotation of the gear disk J90 and downward rotation of the bar J113 the point of the cam block will pass to the rear of the edge of the lever J123 and the rack bar will, consequently, be moved toward the rear, and when the parts return to their normal position to raise the rack bar, the ratchet wheel J102 will be rotated and the spool J98 will be rotated to advance and to take up the ribbon. When this spool becomes filled the tongue J122 will be swung toward the front and the lever J123 toward the rear, whereupon the cam block will engage the front side of the lever and will move the rack bar to subsequently cause rotation of the ratchet wheel J103, whereupon the spool J99 becomes the intake spool.

Thus far, the description has pertained mainly to the mechanisms for advancing the papers, for cutting off the page and for printing the heading thereon, and now will be described the various mechanisms and means for automatically printing all portions of the journal entry other than the explanatory details which are printed by the typewriter. This automatic printing is brought about in a manner similar to that in which the page numbers are printed as has already been described, abutment frames being moved to press the papers at a suitable point against the type of indicating or number wheels which are suitably disposed, as will be described. Extending through the slots J127 in the supporting walls J2 and J3 are rods or shafts J126. Outside of the wall J3 is secured the fork-shaped abutment frame J128 and at the left side, outside of the supporting wall J2, is the forked abutment frame J129. Connecting the upper ends of the fork-shaped frames is a bar J130 supporting on its front face a pad J131. Connecting the lower ends of the fork-shaped frames is a bar J132 on whose front face is secured a pad J133. Secured to the main driving shaft J32 are the eccentric disks J134 and J135 engaged respectively by the eccentric rods J136 and J137 whose front ends engage the rods J126, and upon rotation of the main shaft these rods are therefore moved forward and back. An extension J138 extends rearwardly from each forked frame and has a groove or channel J139 which is engaged by the pin J140 when the frames are in their normal position to the rear to be held thereby against rotation or displacement. When these frames are moved forwardly the pin becomes disengaged from the groove to allow the frames to properly carry out their functions. The papers passing from the guiding roller J19 to the feed roller J20 pass in front of the abutment bar J132, and therefore when the main shaft rotates the abutment frames at the proper time are carried forwardly to press the pad J133 against the papers and the type on the printing wheels. The abutment bar J130, however, is in front of the paper and performs its functions only when additional memorandum of an entry is required, it being sometimes desirable, for instance, to print upon the face of the invoice or other paper which forms the basis of the entry, a duplicate of the entry, or some portion thereof. A holder J141 is therefore provided which extends between the supporting walls J2 and J3 and comprises the pocket J142 for receiving the papers, there being an opening J143 through the pocket, at the front of which opening the printing wheels are disposed and through which opening the abutment pad J131 passes at the proper time to press the papers against the type. This pocket may be slipped into the guides J144 on the supporting walls J2 and J3 and may, therefore, be removed when not desired. The pocket may be made of transparent material, such as celluloid, or may be of open work material, and thus will not obscure the document it may contain, and while in place, if empty, will not obscure the printing behind it on the journal record.

At the top of the holder J141 are the two feed rollers J141' and J142', composed of elastic friction material, such as rubber, supported upon shafts passing through the supporting side walls J1, J2 and J3, and thereby held in such position that upon passing paper down between them it enters the pocket J142. The roller J141' is adapted to be manually turned by means of its shaft J143' passing out through the left side wall J1 and there mounting the knob J144'. Just outside the wall J1 and fixed thereto around the shaft J143' is the pawl disk J143", engaged by the spring pawl J144", which is fixed rigidly to the knob J144', and thus the roller J141' may be turned equal fixed amounts, conveniently spacing the paper held between the two rollers, by turning the knob J144'. This roller-control mechanism affords means for conveniently inserting the paper in the pocket to any desired distance and bringing any portion of it to the printing line. Upon this paper explanatory details may be entered by means of the typewriter mechanism adapted to print from the common keyboard both on the journal page and on the memorandum sheet concurrently, in whole or in part, as desired. This permits the typewriting on the memorandum sheet, with or without carbon-made duplicates, of any desired matter, such as the details of a bill of goods sold, the rollers J141' and J142' providing for the shifting of the paper, which thus typewritten upon may constitute an original invoice. By this means, in connection with others herein described, are secured the making of an invoice simultaneously with a full or condensed record of the details thereof in the journal.

As part of the journal record provision is made for printing the date, the consecutive number of the entry, and the number or other designation of the operator making the entry, and this information may be duplicated on the document held in the pocket J142. These records are placed at the left side of the paper. The mechanism for controlling these records is best shown in Figs. J7 and J8, and the driving mechanism is mounted between the front ends of the supporting walls J1 and J2, the type wheel frames being between the walls J2 and J3 adjacent to the wall J2, the drawings being to double scale. Secured to the left end of the lower shaft J145 of this mechanism is the gear J146, this shaft at its right end terminating in the units date wheel J147. On this shaft is also pivoted the sleeve J148 terminating at its right end in the units wheel J149 of the entry counter. A gear J150 is secured to this sleeve and on its shoulder or hub J151 is mounted the intermittent gear J152 having ten teeth. A second sleeve J153 encircles the sleeve J148 and terminates at the right end in the number wheel J154 for printing the number of the operator. Secured to this sleeve is the gear J155. The middle shaft J156 is pivoted in the walls J1 and J2 and has a gear J157 secured to its right end, this gear meshing with the gear J155. To the left of this gear J157 an idler gear J158 is pivoted on shaft J156 and meshes with the gear J150. A sleeve J159 is mounted on the shaft J156 and at its right end supports the intermittent gear J160 having one tooth J161 adapted for engagement with the intermittent gear J152. At the left end of this sleeve is secured the sprocket wheel J161', which through the chain J162 is connected with the sprocket wheel J163 secured to the left end of the main driving shaft J32, as best shown in Fig. J2.

The type wheels just referred to are all inclosed within the casing J164 in which is a slot J165 which is in line with the lower printing abutment bar J132, and when this bar is moved forward it presses the paper against the type disposed along the slot to print them on the sheets. Secured to the left end of the upper shaft J166 is a gear J167 which meshes with the idler gear J168 on the shaft J156, which idler gear also engages the gear J146 secured to the shaft J145, the gears J146 and J167 being similar. The right end of the shaft J166 terminates in the units wheel J169 of the date counters.

A sleeve J170 encircles the shaft J166 at its right end and terminates at its left end in the gear J171 meshing with the idler J158. The right end of this sleeve terminates in the units entry counter wheel J172. A second sleeve J173 encircles the sleeve J170 terminating at its right end in the number wheel J174 for printing the operator's number and at its left end terminating in the gear J175 meshing with the gear J157 secured to the shaft J156, the gears J175 and J155 being similar. These upper number wheels are mounted within the housing J176 which has a slot along its front in line with the upper abutment printing bar J130 and upon forward movement of this abutment bar the papers are pressed against the type in line in this slot. As the sprocket wheel J161' is driven both the upper and lower sleeve shafts and the connected gears are driven, and owing to the similarity of the gears associated with each of the printing wheel groups the printing of the memorandum will be a duplication of the printing appearing on the journal page. The intermittent gear J160 having one tooth and the intermittent gear J152 having ten teeth, the entry counter wheels J149 and J172 will make one-tenth of a revolution for each revolution of the sleeve shaft J159 and of the main shaft J32. In other words, for each entry the entry printing wheels are advanced one unit. There are occasions, however, when it becomes necessary to throw the entry counters out of gear, as is the case when an entry is carried over from the first to the second line on the page. For if the entry counters were not then out of gear, the gear J152 being driven would count up one in both entry counter groups in the middle of an entry and again at the end. Electromagnetic means are provided for automatically moving the gear J152 out of the alinement plane of the tooth J161. The hub J177 is keyed to the hub J151 of the gear J150, but moves longitudinally thereon. An electromagnet frame J178 is supported on the bracket J179 and supports the coil J180. A flange J181 extending from the hub J177 forms an armature. The shaft J145 passes axially through the electromagnet frame and a spring J182 encircles the shaft within the electromagnet frame and bears against the left end of the hub J177 and against the abutment J183 having adjustable screw threaded engagement in the left end of the electromagnet frame. The left end of the hub J181 is flanged inwardly, as shown, and the spring tends to hold this flange against the abutment ring J184 on the shaft J145 so that normally the gear J152 is in the alinement plane of the tooth J161. When the electromagnet is energized, the armature flange is attracted and the gear J152 is drawn to the left out of the alinement plane of the tooth, but the locking surfaces of the gears still remain in engagement, the tooth extending only from the right half of the gear J160.

By suitable electrical mechanism, which will be described later, the journal motor circuit is automatically closed at each entry. As before explained, the last revolution of the main driving shaft before completing a journal page, causes the driving roll shaft to be rotated a complete revolution to move the papers to provide for the lower margin of the filled page and the upper margin of the next page, the mechanism coming to rest when the first line of the new sheet is in the line of print in front of the lower abutment bar J132. The mechanism is now in the position as shown on the drawings ready for beginning a new journal page. As also pointed out before, the locking pawl J64 is in engagement with the locking ridge J65 to prevent manual turning of the drive roller shaft to advance the papers. The operator by means of the type-writing attachment begins to print along line 1, but the explanatory details of the entry may require several lines. If after completing the first line the motor were started in the ordinary manner, the main journal shaft would turn one revolution and would drive the entry counters one unit, but as the entry has not been completed this operation of the counters is not desired. The operator, although not able to manually turn the feed roller, can, by turning the knob J63, cause the establishment of electrical circuits through the electromagnet coil J180, which electromagnet then operating, as before shown, holds the driving gear J152 to prevent driving thereof by the gear J160, and the paper will be mechanically shifted to bring line 2 into the line of print without causing operation of the entry counters.

Referring to Fig. J1, the knob J63 has a hub J185 journaled in the supporting wall J1 and a segmental slot J186 in this hub is engaged by the pin J187 extending from the shaft J38, the hub being rotatable and longitudinally slidable on the shaft J38. A spring J188 encircles the shaft between the hub and the pinion. The slot is so disposed that on turning the knob in a counter-clockwise direction the shoulder pulls itself along the pin J187 inwardly against the action of the spring J188, and when the rear end of the slot reaches the pin there can be no further rotation of the knob as the shaft J38 is locked against manual rotation owing to the locking of the gear J36 by the pawl J64. At the right end of this hub is a groove J189 in which engages one end of the L-shaped rod J190. The vertical arm of this rod is guided on a pin J191 extending from the supporting wall J1 and the horizontal arm J192 of the rod extends into the contact member J193. On the shaft J35 is also securely mounted a cam wheel J194 having engagement with a cam roller J195 at the lower end of a contact operating rod J196, whose upper end extends into the contact member J193. When the first line is in position and the feed roller is locked against manual rotation, as shown, the point of this cam wheel J194 engages the cam roller J195 to move the contact rod J196 upwardly in the contact member, and when the knob J63 is now rotated the rod J190 will be moved to the right to carry the arm J192 thereof into the contact member, and an electrical circuit is closed at this point. The keyboard is provided with an auxiliary key, which will be described more in detail later, this key being normally inoperative. Upon the establishment of the contact as just described, a local electrical circuit will be closed to actuate electromagnetic mechanism which will unlock the auxiliary key, and the operator may then actuate this key, whereupon is caused the closure of the circuit which controls the electromagnetic mechanism which will shift the entry counter driving gear J52 to the left. Also upon depression of the auxiliary key, as will be described more in detail later, the circuit for the journal motor is closed and the main driving shaft is driven one revolution to advance the papers to bring line 2 into the printing line, the entry counters, however, not being actuated as the drive gear has been shifted from the alinement plane of the driving tooth J161. During this revolution of the main driving shaft the operations of cutting off a page, numbering a new page and printing across its top the identification legends have been accomplished, and at the end of this rotation the cam wheel J194 will have allowed the contact operating rod J196 to be lowered to break the circuit controlling the auxiliary key which is again restored to its normal locked position, and the motor circuit is also open at the end of the revolution, the entry counter driving gear being released to return to its normal position. The locking pawl J64 has also been moved beyond the locking ridge J65 and if a third line is required for the entry the operator can turn the knob J63 a sufficient distance to cause rotation of the shaft J38 and advancement of the papers to carry line 3 into the printing line. Although the arm J192 is moved in the contact member J193 the circuit at this point will not be closed as the rod J196 is in its lower position. If the third line is sufficient for the entry the operation of the journal motor is caused automatically in the usual way, which will be described later, and the main driving shaft is given another revolution, at the end of which rotation the entry counter wheels will have been rotated. If more lines were necessary for the entry the operator would merely continue turning the knob until the entry was completed. Thus, when the first line is in the line of print there can be no manual shifting of the paper until the main shaft has been driven one revolution to perform the necessary functions hereinbefore enumerated, and if the entry requires more than this first line the operator must set the motor in operation by actuation of the auxiliary key whose actuation also causes operation of the electromagnet controlling the entry counter driving gear, and this auxiliary key is used only during this condition of the mechanism. After the first line is passed the papers may be shifted at will by merely turning the knob.

The date wheels are set manually, a knob J197 being provided for this purpose. The knob is longitudinally slidable on the shaft but is keyed thereto. The inner end of the hub has teeth J198 for normally engaging the locking teeth J199 extending from the outer edge of the hub or bearing J200 in which the shaft J166 is journaled. The end of this shaft has a head J201, and a spring J202 within the head of the knob bears against this head and the shoulder J203 to push it to normally hold the knob to the right and the teeth in locking engagement. To set the date wheels the knob is pulled outwardly to the left, and upon rotation rotates the shaft J166 and the date wheels. As the date is properly set on the wheels J169, the rotation of the shaft J166 by the knob is transmitted through the gears J168 and J146 to the shaft J145, and the date wheels J147 for printing on the journal page, are set simultaneously with the date wheels J169.

The operator's number wheels are automatically set upon rotation of the shaft J156 by means of an operator's key J204 which may be brought into engagement with the end of the shaft J156. This key mechanism is shown in Figs. J20 to J24. The lock comprises a cylindrical box J205 secured to the left side of the supporting wall J1, the shaft J156 passing through the axis thereof. The cover J206 of the box has the key hole J207. Between the cover and the box is a spring plate J208 which forms one terminal of an electrical circuit, this spring being insulated by the disks J209 of insulating material. To the rear end of the box is the ring J210 having along its front edge a series of steps J211, this ring being entirely insulated from the lock frame, as shown. The ring and lock parts are of iron and a coil J212 is disposed within the ring and about the shaft, the ring forming the other terminal of the circuit, which circuit includes the coil and a suitable source of current. The end of the shaft is of somewhat irregular form such as shown in Fig. J20, and the key hub J213 is lined with a bushing J214 of insulating material which fits the shaft end but which keeps the key insulated therefrom. The key tongue J215 may be of any cross section and the key hole is disposed to be over the lowest step. When the key is inserted the top of the tongue passes below the contact spring J208, and when the key is turned the front side of the tongue engages the edge of the proper step, thus closing the circuit through the energizing coil, and an electromagnetic circuit is formed through the iron parts and the key, which is also iron, thus holding the key securely in its turned position. The number of steps corresponds to the number of digits on the operative number wheels J154 and J174, and the length of the key tongue is made to agree with the height of the corresponding step, so that each key upon insertion will cause a different angular rotation of the shaft J156 when the key is turned into engagement with its corresponding step. The rotation of the shaft J156 is communicated by the gear J157 through the gears J155 and J175 to the operator's number wheels J154 and J174, and thus when printing takes place, the number of the operator's key will appear on the journal page and also on the memorandum record. The circuit through this lock also includes electromagnetic mechanism which must first be actuated before operation of the system can take place. The system is therefore normally locked against any actuation and each operator must first unlock it before he can perform any operations and after his work is finished he withdraws his key from the lock and again restores the system to its locked and inoperative condition.

As before stated, the upper and lower counter wheel groups are at the front of the journal mechanism printing frame, the lower group being in position to act in conjunction with the lower abutment bar J132 to print on the journal record pages and the upper counter group being in position to act in conjunction with the upper abutment bar J130 to print on the memorandum record. Provision, however, must be made for inking the type on the counter wheels and this inking arrangement and adjustment are best shown in Fig. J7 and Figs. J12 to J17. A gear J217 meshes with the gear J158 at the front thereof, being secured to the end of the shaft J218 journaled in the hub J219 extending from the supporting wall J2. At the right end of this shaft is rigidly mounted a friction gear J220. A plate or frame J221 is loosely pivoted at its middle on the shaft J218 at the left of the friction wheel, and a similar plate or frame J222 is pivoted to the shaft at the right of the friction gear, the ends of these plates being respectively connected by pivot shafts J223 and J224 suporting the friction wheels J225 and J226.

As best shown in Figs. J7 and J12, the counter wheel groups are inclosed in a housing comprising the side walls J227 and J228 surrounded by the inclosing shell J229, having the openings J230 and J231 which aline with the slots in the upper and lower counter housings. Within the housing between the counter groups is a spool J232 carried on the shaft J233, and a spool J234 carried on a shaft J235. These shafts are journaled in the framing J2 and in the side walls of the housing, and at their left ends are secured the friction wheels J236 and J237, these friction wheels being in the alinement plane of the friction wheels J225 and J226, the arrangement being such, however, that only one of the friction wheels at any time may engage with the corresponding spool friction wheel, this being best shown in Figs. J14, J15 and J16. The inking ribbon J238 passes from one spool and is guided by the inclosing shell to pass over the type of the counter wheels, being then taken up by the other spool. When the sleeve shaft J159 is driven the friction wheel J220 drives both friction wheels J225 and J226, and when the framing supporting these friction wheels is swung to the position shown in Fig. J15, the friction wheel J225 will engage the friction wheel J236 and the spool J232 will become the intake spool. When the frame is swung to carry the friction wheel J226 into engagement with the friction wheel J237 the lower spool J234 becomes the intake spool. The swinging of the framing supporting the wheels J225 and J226 is controlled by the position of a tongue J239 supported from the shaft J240 pivoted in the side walls of the housing, this tongue extending between the spools. At the left end of the shaft to the left of the housing wall J227 is secured a lever J241. At the rear end of this lever arm is a pin J242 extending toward the left, and at the front end of this lever arm is a crank pin J243 extending also to the left. Extending to the right from the supporting wall J2 are two pins J244 and J245, and the pin J243 of the lever is connected with the pin J244 by the spring J246 and is connected with the pin J245 by the spring J247, the shaft J240 lying in a plane midway between the planes of the pins J244 and J245. With this arrangement, when a spool becomes filled the ribbon thereon engages the tongue J239 to rotate the shaft J240, and when the pin J243 of the lever arm passes beyond its mean position the springs become effective and continue the rotation of the shaft to throw the tongue against the ribbon on the emptying spool. Extending forwardly from the plate J222 and rigidly secured thereto is a crank arm J248 from whose upper end the crank pin J249 extends to the right. This pin is connected with the pin J244 by a spring J250 and with the pin J245 by a spring J251. This pin rotates about the shaft J218 lying in a plane passing midway between the two pins with which it is connected, and thus if this crank pin is at one side beyond its mean position, the springs continue the rotation in that direction until either the friction wheel J225 or the friction wheel J226 engages with the spool friction wheel in the path thereof, and this spool will then be driven. The initial movement of the crank pin to one side or the other of its mean position is caused by the spring J252, connected between the pin J242 and the pin J249' extending toward the right from the framing J248' extending from the crank arm J248. Thus, when the tongue is shifted from the filling spool toward the emptying spool the lever J241 is also rotated and the spring J252 overpowers the springs J250 and J251 connected with pin J249 at the right side of the crank arm and the crank arm is rotated. When the pins J242 and J243 pass beyond their mean positions the springs J250, J251 and J252 suddenly throw the crank arm to the end of its position to carry the corresponding friction rollers into engagement to change the direction of rotation of the spools, and this engagement of the friction rollers is maintained by the springs until the tongue is sufficiently shifted by the filled spool.

The main driving shaft J32 turns one revolution for each entry and provision should be made for automatically causing the shaft to stop always at a fixed point. This is accomplished by electromagnetic means best shown in Fig. J4. An electromagnet J253 is supported from the supporting wall J1 at the left side thereof, its armature J254 being vertical and connected with a bar J255 which is insulated therefrom, this bar at its lower end passing through the guideway J256 which is also insulated from the frame. A pawl J257 is pivoted at its lower end to the pin J258 extending through the bar and is limited in its rotation by means of the slot J259 engaged by the pin J260 extending through the bar.

J264 is a sector hub mounted rigidly at the end of the main shaft J32. Mounted on the sector is a disk J261 from the sides of which extend the segmental projections J262 and J263 which engage the sectors of the hub J264, these segmental projections being of such length that there may be slight relative rotation between the sector hub and the disk J261. This disk J261 has a single tooth J265 which is engaged by the pawl upon actuation of the electromagnet. Mounted upon the disk J261 are the contact wheels J266, J266' and J267 which, however, are insulated from the disk J261. Two of the contact wheels have a small section of insulation J268 and J268' along their periphery. These contact wheels are engaged by brushes J269, J269' and J270 which extend from the brush holders J271, J271' and J272 supported from the wall J1. These brushes are terminals of electrical circuits which will be described later, the contact rings also forming terminals, one of the circuits being the circuit which normally controls the operation of the motor. When this electromagnet J253 is energized its armature is attracted and the pawl engages the tooth J265 to cause sufficient angular advancement of the tooth disk and of the contact wheels thereon to move the insulating part J268' from under its brush and to carry the metallic part of its contact ring into engagement with its brush, the length of the segmental projections, as before explained, allowing such relative movement between the sector hub and the toothed disk. The motor control circuit being now closed, the motor is started to turn the main shaft, and the sector hub after a short interval catches up with the projections from the toothed disk and then all parts are rotated together. At the end of one revolution of the main shaft the insulation area again comes into position below the brush and thus the motor control circuit is again opened and the motor stopped, the parts being then in their normal position. Thus, the revolution of the main shaft is always stopped at a certain fixed point. In this Fig. J4, is also shown a sight hole J273 through the wall J1, and inside the wall and secured to the shaft J35 is the indicator disk wheel J274, which is also shown in Figs. J1 and J2. Arranged in a circle on the face of this wheel are numbers 1 to 25 corresponding to the number of the lines on a journal page and by observing the indications on this wheel the operator can ascertain what particular line of the journal page is in the line of print.

Further journal printing mechanism, like the date, number and operator recording mechanisms, is composed of a plurality of type wheels. The functions of this group of wheels are to complete the journal entry and to record the ledger operations. The mechanism operating these type wheels is designed to carry them into printing position when the abutment printing bars are moved forwardly by the journal mechanism and then to permit them to fall back into their normal rest position, thus in no way obscuring the printed record on the journal page after the record is made. These type wheels print at the right side of the journal page, and thus by means of these type wheels, together with the date, entry and operator-number type wheels directly attached to the journal mechanism, is secured in printed form, automatically or semi-automatically controlled, a record completely indicative of the operator's manipulation of the entire system. These type wheels and the mechanisms for operating and controlling them are shown in Figs. J25 to J35.

Fig. J25 is a plan view diagrammatically showing the arrangement of the journal mechanism, the printing mechanism and the keyboards, these being all mounted on a common supporting base J275.

J represents the journal mechanism, JP the journal printing mechanism, T the operator's typewriter, K the electromagnetic keyboards which set up type wheels in the printing mechanism, and M the motor for driving these various mechanisms. The upper type wheels J276 and the lower type wheels J277 are mounted on shafts J278 and J279 respectively, these shafts being fixed in the vertical supporting walls J280 and J281. The front edges J282 and J283 of these supporting walls are V-shaped and engage in the guideways or channels J284 and J285. In the rear of the stationary supporting walls standards J286 and J287 extend from the bed plate J275. Straps J288 secured to the standards extend rearwardly alongside of the supporting walls and serve to hold them in position and to guide them as they are raised and lowered. A third shaft J289 extends between the supporting walls. The three shafts, together with the angle bar J290, form with the side walls a rigid supporting structure or frame. Upon this shaft J289 are concentrically mounted a plurality of tubes J291, as shown in Fig. J27. These tubes to the left of the supporting wall J280 and within said wall are complete and fit upon and support each other concentrically. Between the walls J280 and J281, however, the tubes are not complete but are in the form of ninety-degree sectors, the largest sector J292 extending farthest to the right, while the smallest sector J293 extends the least distance beyond the wall J280, and the intermediate sectors extend proportional distances. On the shaft J289 are pivoted a plurality of hubs J294, one for each sector. Extending in one direction from each hub is a ninety-degree wing or segment J295, whose periphery is provided with teeth J296 and a straight locking surface J297. Extending in the opposite direction from each hub is a segment J298 to which is connected the end of the corresponding tube sector, one of these intermittent gear mechanisms being thus connected to each tube sector to cause rotation thereof. The locking surfaces of the intermittent gear segments are perpendicular, each normally engaging the rear locking surface of one of the vertical rack bars J299 which are guided in guide slots J300 cut in the guide bars J301 extending between the supporting standards J286 and J287. The upper end of each rack bar engages with one of the key levers of the electromagnetic keyboard mechanism, which will be described later, this connection being by means of a pin K45 engaging in a slot K44 at the end of the key lever. As will be shown in the description of the electromagnetic key mechanism, these key levers may be depressed a distance which is proportional to the number represented by the key, and when a number is set up on the electromagnetic keyboard K, the levers corresponding to the digits in the board are depressed and the rack bars are lowered correspondingly and held in their depressed position, and when the framing with the various shafts is raised in the manner which will be presently shown, the teeth of the segmental intermittent gears engage with the teeth J304 cut in the rear edge of the back bars near the top thereof, and the gears in engagement with the depressed rack bars are given a rotation, which rotation is transmitted to the gear wheels J305 secured to the left end of the tubes J291 as shown in Fig. J27. Above each of the gears J305 is disposed one of the type wheels J277, which type wheels have teeth J306 which mesh with the teeth of these gear wheels. These type wheels have teeth J307 for a distance along their upper edges and each meshes with the teeth J308 of one of the upper type wheels J276, and consequently upon rotation of the segmental intermittent gears, upon engagement thereof with the rack bars, the sectors and tubes will rotate the corresponding gears J305 and the type wheels. Along the rear edges of the type wheels are arranged the type characters J309 and J310.

The desired type characters when the wheels are rotated are brought into line in the openings or slots J311 and J312 formed in the inclosing shell J313 which surrounds the operative mechanisms, and when the framing has been raised to its full height the slots will be in line with the abutment bars J130 and J132, and when these bars are pushed forwardly by the journal mechanism the paper which passes by them will be pressed against the type which is within the slot, and the journal pages and the memorandum record will be printed with the indications appearing on the type wheels. As will appear later, the construction and arrangement of the key levers in the key board mechanism is such that the depression of the key levers and racks is inversely proportional to the values of the numbers upon the keys struck. In accordance with this arrangement, the characters on the type wheels are in inverse order to the direction of rotation thereof, the character 0 being normally in line in the printing slots. For instance, if key "1" is struck the key lever will move the corresponding rack bar downwardly a distance corresponding to nine teeth, and when the corresponding segmental intermittent gear engages with these teeth it will be rotated to cause rotation of the type wheels to move nine type spaces stopping finally when the type character "1" is in the printing slot. In a similar manner when the key "9," for instance, is struck, the type wheels will move only through one space and will stop at the type character "9."

The maximum rotation of the intermittent gear segments, the tubes, and the gears J305 is a little less than 90 degrees, and the open sectors between the gear segments J295 and the wings J298 are also 90 degrees. Consequently, if one of the intermittent gears be rotated its maximum distance, that is about 90 degrees, it will revolve its tube sector so that the front edge thereof will come almost in contact with the rear edge of all the intermittent sector wings J295 to the left of this particular gear in operation, while at the same time the front edge of the actuated gear wing will come almost in contact with the rear edge of all the other tube sectors, and it is plain therefore that any and all of this tubular connecting mechanism may remain at rest or may be rotated its maximum amount or to any intermediate position without interference therein.

As before stated, the keyboard directly and primarily sets the vertical racks J299, and upon their setting depends the amount of rotation of the type wheels. These racks should be locked in their depressed position before the framing is raised, to insure accuracy, and this is accomplished by means of a locking bar J314 pivoted to the ends of arms J315 and J316 pivoted at the ends of a shaft J317 extending between the standards J286 and J287. Cut on the inside of the supporting walls J280 and J281 are the vertical slots J318 whose upper ends J319 are inclined forwardly for a short distance. See Figs. J28 and J31. A pin J320 for each of these slots normally engages in the inclined upper end thereof, these pins extending from the arms J321 and J322 extending from the hubs of the arms J315 and J316. Upon depression of any of the rack bars and immediately upon raising of the framing supporting walls J280 and J281 the pins J320 will pass from the inclined to the vertical part of the slots, thereby causing rotation of the arms J315 and J316, and the locking rod J314 being thrown rearwardly engages with its locking edge in the locking notches J323 cut in the front edges of the rack bars, and all rack bars are immediately locked in position. When the frame is again lowered, the pins upon passing into the inclined ends of the slots cause the locking bar to be released from the rack bars.

The mechanism for raising and lowering the framing carrying the type wheels is driven from the main driving shaft J32 on which to the right of the main driving gear J71 thereon is mounted a cam wheel J324. This cam wheel engages the cam roller J325 pivoted at the upper end of the clevis J326 which, by means of the connecting rod J327, connects with the crank pin J328. At the end of the crank arm J329, this crank arm being secured to the shaft J330 journaled in the upper end of the standards J331 and J332 which extend from the bed plate, to offer additional rigidity, bars J333 and J334 are journaled at their lower ends on the shaft J330 and at their upper ends on the shaft J32. This shaft J32 passes through elongated slots J335 in the clevis, and thus as the cam wheel engages the cam roller the clevis and connecting rod may be vertically reciprocated to oscillate the shaft J330.

Extending from the ends of the shaft J330 and secured thereto are the arms J336 and J337 which at their ends have slots J338 in which engage pins J339 extending respectively from the frame walls J280 and J281, and thus as the cam wheel rotates with the main shaft, the shaft J330 and the arms extending therefrom are oscillated to raise the walls with their mechanisms carried thereby to bring the slots before the type wheels into the printing lines, and while the cam roller passes over the surface J340 of the cam wheel the shaft J330 will remain at rest and the abutment bars operated by the journal mechanism will be moved forwardly to cause the papers to be printed with the records indicated on the type wheels, and after this printing is accomplished the cam wheel allows return of the shaft J330 and the printing mechanisms to their normal position. When the printing mechanism is in its normal position it is low enough to permit the reading of what has been printed upon the lowest line of the journal page.

Upon the shafts J278 and J279 are four pairs of type wheels not controlled by or operated directly by means of the rack bars as are the number type wheels just described. These additional type wheels are lettered J341, J341', J342, J342', J343, J343', J344 and J344', and indicate certain conditions concerning the registers during the entry. The operation of the upper set of the additional type wheels is directly controlled by the electromagnets J345, J346, J347 and J348 mounted at the outside and at the front of the inclosing shell J313, and their armatures J349, J350, J351 and J352 normally come to rest in an intermediate position, and upon energization of electromagnets the armatures are adapted to be moved in either direction. Pivoted to the upper ends of these armatures and extending rearwardly therefrom are the arms J353, J354, J355 and J356 connecting respectively with the upper set of additional type wheels J341, J342, J343 and J344, this connection being best shown in Figs. J28 and J31. These type wheels are each provided with sets of radial holes J357, by means of which the arms may be pinned to the wheels, several sets of holes being provided for each wheel, as shown, for the purposes which will appear later. Upon energization of any of the electromagnets the connected type wheel will be given an angular advancement in a direction depending upon the direction of attraction of the electromagnet armature. The type wheels of the upper set are mounted on the shaft J278 and mesh with the respective type wheels of the lower set having the prime reference characters, which lower wheels are mounted on the shaft J279. Each of these additional type wheels is held in a normal position by means of springs J358 arranged as shown.

The type wheels are separated into groups, as shown in Figs. J27 and J28. In the left group of the upper row the left wheel is the type wheel J341, which serves to indicate on the journal page whether or not a certain register has operated, and if it has whether the entry made therein was in a positive or a negative direction, and for this purpose the rear edge of this wheel has the type characters +, □ and —, which represent respectively positive entry, no entry, and negative entry. As will appear later when the circuits for the system are explained the electromagnets are controlled by the operation of the register mechanisms, and if there is no operation of the corresponding register the corresponding electromagnet will not be actuated. If there is a positive entry the electromagnet will be energized to rotate the wheel to bring the plus sign into the printing slot, and if there is a negative entry the minus sign will be moved into the printing slot. The contacts lettered R207a, R207b and R207c and the contact brush R206 on the register mechanisms are the means for controlling the operation of the electromagnet which rotates this first type wheel. The wheel J342 at the right of this first group serves to indicate the nature of the balance on the corresponding register mechanism, that is, whether this balance is of a positive or negative nature, or whether the register is at zero. The electromagnet for turning this number wheel is also controlled by the operation of the register mechanism. The intermediate four type wheels of this first group are those connected with the sectors and serve to indicate the number of the particular register which is debited with the entry. The second group of type wheels serves a similar purpose in connection with the register which is credited with the entry, the wheel J343 indicating the direction of the entry and of rotation of the register which receives the entry. The intermediate four type wheels indicate the number of the register receiving this credit entry, and the wheel J344 indicates the nature of the balance shown on the register.

Any other characters besides +, □, and — may be used, as, for instance, D, X and C, the type for which will be suitably placed about the periphery of the additional type wheels, and for this purpose the several sets of holes J357 are provided, whereby the arms connecting with the electromagnets may be secured to the wheels at any set of these holes to bring the corresponding characters into the printing slot when the controlling electromagnet is energized. The last group of type wheels indicates the amount of the entry which has been made in a positive direction in the first register, whose operations and indications are shown by the first group of type wheels, and in a negative direction in the second register, whose operation and indications are shown by the type wheels in the second group.

Means for inking the various type characters must, of course, be provided in this printing mechanism, and as it may be desired to use different colors for printing from the various groups of type wheels, a ribbon of any color may be used for each group. The sets of spools J359 and J360 for these ribbons are mounted on the shafts J361 and J362 fixed at the right end in the framing wall J280. As shown in Fig. J32, at the left end of these shafts are the ratchet wheels J364 and J365 respectively adapted for engagement with a pawl tongue J366 which is pivoted to the end of the crank shaft J367 journaled in the bearing posts J368 and J369. A pin J370 extends from the front end of the post J368 and a tension spring J371 connects between this pin and a pin J372 extending from the upper end of the pawl tongue, this spring serving to throw and hold the tongue to one side of its mean position, the stops J373 and J374 limiting the swing of the pawl. The inclosing shell J313 extends about the ribbon spools, while an inside shell J375 is within the outer shell, and at its lower end passes below the angle bar J290 and above the ribbon rollers which are thus confined. The ribbons J376, J377 and J378 pass from one spool between the outer and inner shells over the type on the type wheels and across the type slots, being then taken up on the other spool. As the frame with the type wheels is raised when printing is to be performed the inking ribbons and spools are carried with the frame, the pawl tongue, however, being pivoted to the crank shaft J367, and when the framing is again lowered the tongue will engage the ratchet wheel of the intake spool to cause advancement of the ribbons. Means for automatically shifting the tongue when a spool is filled are provided. The end of the crank arm J379 extends between the spool sets J359 and J360, and a spring J380 connects between the crank arm end and the pin J381 extending from the bearing post J369. As shown in Fig. J32, the end of the crank shaft has a slot J382 in which engages a lug J383 extending from the hub of the pawl tongue, which tongue may thus have a slight relative motion with respect to the crank shaft. The spool J360 is shown in the drawing as the intake spool, the pawl tongue engaging the ratchet wheel J365. When the spool J360 becomes filled sufficiently the crank arm will be moved by the ribbon beyond the central plane and the spring J380 will then throw the tongue against the other ratchet wheel. The lug J383 on the pawl tongue is engaged by the side of the slot J382 and the pawl tongue thrown into engagement with the ratchet wheel J364, the spool J359 then becoming the intake spool. In Fig. J6 is also shown two similar type levers J385d and J385c for printing in the journal and memorandum records when a register comes to rest at zero, that is, when the account represented by the register is closed. These levers are pivoted on a shaft J386, properly supported by the framing. The lever J385d carries two type projections bearing the type character D, not shown, while the lever J385c carries the two type projections J387c and J388c, bearing the type character C. At the lower ends of the levers are the pins J389d and J389c, engaging in slotted bearings J390d and J390c, at the upper ends of armatures J391d and J391c, surrounded by energizing coils J392d and J392c, respectively, the circuit arrangement for these coils being shown in the description and drawing of the circuit system. The levers in the normal position are horizontal, and upon energization of the coils they are thrown upwardly to carry their characters against the memorandum paper opposite the abutment bar J130, and against the journal papers at a distance above the abutment bar J132 equal to the distance between two lines, this being for the reason that these levers are not actuated until after the other portions of the entry have been made and the journal papers have been shifted. The abutment bar J393, extending between the walls J2 and J3, above the abutment bar J132, receives the impact of the type on the levers printing in the journal records, while the abutment bar J130 receives the impact of the type on the levers printing in the memorandum record. The position of the characters D and C printed by these levers, with respect to the other portions of the entry, is shown on page 88, representing a journal page, and in the description referring to this representation.

In Figs. J2, J3 and J6 is shown circuit controlling mechanism controlled by the amount of paper on the feed spool J7. A shaft J394 is pivoted between the walls J2 and J3 and terminates outside the wall J2 in an arm J395. Also secured to this shaft is an arm J396 terminating in a roller J397 which is in engagement with the paper roll J8 on the spool J7. As the paper is fed from the spool the arm J396 swings downwardly and the arm J395 is carried upwardly. A circuit controlling device J398 is supported on this wall J2 and contains contacts controlled by the button J399 which extends downwardly to be engaged by the end of the arm J395 when this arm has reached its upper position after the spool J7 has become empty. The result of the actuation of this contact device J398 is to prevent further operation of the system until the paper supply has been renewed. The circuits and mechanisms controlled by the contact device will be described in detail later.

*The electromagnetic keyboard.*—This keyboard is designed to be largely automatic in its operations. The keys themselves do not have to be driven home by the pressure of the finger upon them, but a mere touch gives to them an initial movement throwing them out of equilibrium into an operating magnetic field which then carries them into the final operative position, and means is also provided whereby the operator may regulate the force required for this initial movement. Shielding is provided around the key heads which prevents the actuation of more than one key at a single touch. Provision is also made whereby the last key touched in setting up a number may perform not only its own regular function but also the additional function of a general operating key. Another feature is the almost entire absence of springs, and to perform the functions ordinarily secured by the use of springs a magnetic system is here employed.

The keyboard mechanisms are shown in Figs. K1 to K10. The keyboard is divided into three sections, one for debit connection and for controlling the operation of the type wheels in the left group shown in the journal printing mechanism, a second for credit connection and for controlling the operation of the type wheels of the middle group shown in the journal printing mechanism, and the third for controlling the amount of the entries, which amount also appears on the right group of type wheels. The internal mechanisms of these three keyboards are largely identical, being only slightly modified to suit their particular functions. The three sections of the board are side by side and contained in one frame, as shown.

K1 and K2 are the side walls of this frame, K3 is a vertical intermediate wall section and K4 is the front wall, these walls containing the mechanisms below the key tops. The key heads K5 are arranged in stepped planes above the operative mechanisms.

K6 is the left side inclosing wall, K7 is the right side inclosing wall and K8 and K9 are intermediate dividing walls, the debit section being between the walls K6 and K8 and comprising four order rows K10 of digit keys K5d, each row containing nine digit keys.

The credit keyboard section is arranged between the intermediate walls K8 and K9 and comprises the four order rows K11, each having nine digit keys K5c. The amount keyboard section is between the walls K9 and K7 and comprises eight order rows K12, each having nine digit keys K5a.

K13 indicates intermediate shielding between the key order rows consisting of vertical plates running from front to rear. Between the side shieldings and between the keys are the I-shaped walls K14 fitting about the circular ends of the keys, each wall being level with the key behind it, and these walls prevent touching two keys in the same order by one finger at the same time while the shielding plates extending from front to rear prevent simultaneous touching of two keys in different orders by one finger. The upper stem of each key is in the form of a tube K15 engaged at its upper end by a rim or framing K16 which secures a disk K17 of transparent or translucent material, the rim K18 of the frame K16 fitting in the tubular channel formed in the walls K14 between the side shielding walls. The tubes K15 of the keys have a longitudinal slot K19 for receiving the conduit tube K20 extending from front to rear under each order row of keys. Below each key is a vertical armature rod K21 having an upper head K22 and a lower head K23. The upper end of each armature rod by means of a dovetailed connection K24, as shown, is secured to the lower end of the corresponding key tube, while from the lower end of each armature extends a contact rod K25 carrying various contact members which will be referred to hereafter.

Separating the order rows of armatures are vertical plates K26 of iron extending from front to rear between the horizontal iron top, bottom and intermediate plates K27, K28 and K29, respectively. The plate K29 in each order has a plurality of openings K30 through which the armature rods may reciprocate. In each row or order along the top of the upper plate K27 are tubular pole piece extensions K31 which may be integral with the plate but the walls of which are of decreasing thickness upwardly, and within the bore of these extensions the heads K22 of the corresponding armature rods may reciprocate. Similar tubular extensions K32 are disposed in each row along the lower plate K28 and within these extensions the lower heads K23 of the corresponding armatures may reciprocate. Two common energizing coils are provided for all the armatures of the digit keys in each order, the upper coil K33 surrounding the upper end of the armature rods and being disposed between the upper and intermediate horizontal walls, while the lower coil K34 surrounds the lower part of the armatures and is disposed between the intermediate and lower horizontal walls, both coils lying between the vertical side walls K26 for the particular order, and these horizontal and vertical walls complete the magnetic paths for the various magnetic circuits.

Normally when the keys are in the upper position the upper armature heads K22 are at the extreme upper end of the upper extensions K31 and the lower armature heads K23 are in the extreme upper end of the lower extensions K32. Surrounding the upper head of each armature is a ring K35 of non-magnetic material and surrounding the lower head of each armature is a similar ring K36. At the lower edge of the upper extensions K31 is secured a magnetic abutment ring K37 having a bushing K38 of non-magnetic material through which the upper part of the armature rod passes. Similarly at the upper edge of the lower extensions K32 are secured magnetic abutment rings K39 lined by bushings K40 of non-magnetic material through which the lower end of the armature rod passes. When the head of an armature is at the base of the tapered tubular pole projection and in engagement with the magnetic abutment ring, the non-magnetic ring surrounding the head is bridged by the magnetic abutment ring and in this position the area for magnetic flux is maximum. On the other hand, if the armature head is at the small end of the tapered extension the non-magnetic band about the head forms a gap, and the section of the extension being very thin at the edge, the area for magnetic flux is minimum. It therefore requires a great deal more current to attract the armature with a given force when the head is at the small end of the extension than when it is at the base thereof. When a key is in its upper position and current flows through both of the coils, the flow through the upper coil may be much greater than that through the lower coil and still the armature be retained in its raised position on account of the greater resistance in the upper magnetic circuit which must include the thin end of the pole extension and the non-magnetic ring surrounding the upper armature head, and normally the current flows are adjusted so that the force of gravity is overcome and the armature and key are held in the upper position. If a key is slightly depressed, however, the armature is moved downwardly and the reluctance of the magnetic circuit through the upper head is immediately decreased, whereas the reluctance through the lower head is immediately increased and the forces become unbalanced, the one of the upper coil overpowering that of the lower coil, thus throwing the armature and key downwardly until the upper head strikes the abutment ring, whereupon the magnetic reluctance through the upper head is minimum and that through the lower head maximum, and the key is held in its lower position. Upon readjustment of the current flow through the coils to give the lower coil the control, the depressed armature and key are restored to their normal position. Upon striking a key there is a slight magnetic stick between the lower armature head and the magnetic ring engaged thereby, but as soon as this is overcome the upper coil quickly draws the armature down. The function of these abutment rings is also to minimize over-actuation of the armature in either direction and to hold it in an exact position either when raised or lowered.

Depression of the keys causes depression of key levers which control the depression of the rack bars J299 which are engaged by the segmental gears to cause rotation of the connected type wheels which are referred to in the description of the journal printing mechanism. A key lever K41 is provided for each row or order of keys, the key levers terminating at their front ends in hubs K42 pivoted on the shaft K43 extending between the side walls K1 and K2 and directly within the upper end of the front wall K4. Each lever extends rearwardly from this pivot shaft alongside of the key tubes in the particular row, and at its end has a slot K44 engaging a pin K45 extending from the upper end of an armature K46. K47 is a rectangular magnetic casing, through the horizontal walls of which the various armatures pass and within this magnetic casing and surrounding the armatures is an energizing coil K48. Secured to the upper end of each armature is one of the rack bars J299 which have already been described in connection with the journal printing mechanism, and each rack bar has an extension K49 engaging the collar K50 at the lower end of the corresponding armature, being thus additionally supported. The coil K48 is normally energized to float the key levers and the rack bars suspended from the armatures and to normally hold them in their upper position.

Extending from the side of each key tube and over the corresponding key lever is a pin K51, and when a key is depressed first primarily and then to its lowermost position by the electromagnetic mechanisms already described, the pin on the key engages its key lever and the corresponding armature and rack bar attached thereto and thus depressed an amount depending upon the digit on the depressed key. Subsequently the locking bar J314, as already described, is swung into locking engagement with the locking teeth on the rack bars to lock them in their depressed position during actuation of the printing type wheels. The relative displacements of the pins K51 with respect to the common key lever are such that the amount of depression of the key lever is inversely proportional to the value of the digit upon the key, as has been previously mentioned. This particular proportional arrangement, however, is not necessary, as any other arrangement would operate.

The conduit members K20, before referred to, serve to carry conductors for supplying current to electric lamps K52 which are mounted on top of these members, one lamp disposed within the tube K15 of each key, and when a key has been depressed and eventually carries out its proper function, its lamp becomes lighted, thereby indicating the proper operation of the keyboard and connected mechanism. As previously stated, the tops of the keys or the digits thereon are transparent or translucent, thus not only showing that the depressed keys are performing their functions but also distinctly showing the number set up. The circuit arrangement and contacts for controlling the current flow through these lamps will be shown when the circuit arrangement for the entire system is later described.

The readjustment of the current flow through the coils K33 and K34 is accomplished upon manipulation of individual restoring or releasing keys K53, one for each order, these keys being disposed in a horizontal line in front of the digit keys. An armature rod K54 extends downwardly from each key and is similar in construction to the armatures of the digit keys, having the upper head K55 and the lower head K56 surrounded, respectively, by the non-magnetic rings K57 and K58. The magnetic circuit for the armatures is similar to that provided for each order row of digit key armatures and comprises a horizontal iron framing surrounding the armatures of all the restoring keys and consisting of the front and rear walls K59 and K60, the upper and lower walls K61 and K62 and the intermediate wall K63 through which the armature rods extend. The tapered tubular pole projections K64 extend upwardly, one about each upper armature head, and the tapered tubular pole projections K65 extend downwardly, one for each lower armature head. A magnetic abutment ring and non-magnetic bushing are also provided at the base of each pole projection and serve the same purpose as those provided for the digit key armatures. Within the magnetic frame above the intermediate wall K63 is the coil K66 surrounding the upper end of all of these armature rods, while the coils K67 and K67' are within the magnetic frame below the intermediate wall and surround the lower end of all the armature rods. Extending from the lower end of each armature is the insulated rod K68 terminating in a contact head K69 which normally connects together the contact sections K70 and K71 mounted in the upper end of an opening K72 extending through the contact supporting plate K73 of insulating material. In the lower end of this opening are supported the contact sections K74 and K75 which are connected together by the contact head when the armature is lowered. The circuit for normally supplying current to the upper coil K33 for each order of digit keys is closed through the contact head K69 and the upper contacts, by the corresponding restoring key, when this key is in its normal upper position. The digit keys of the order are held depressed by virtue of the current flow through the upper coil K33 thereof, but when the order restoring key is depressed the circuit through the upper coil is broken as the contact head K69 leaves the upper contacts, and when the contact head reaches the lower contacts K74 and K75 an additional circuit is closed through the lower coil K34 for this order of digit keys, and upon increased current flow through the lower coil the depressed keys are quickly thrown to their normal upper position.

The operation of the restoring key armatures is controlled in the same manner as that of the digit key armatures, the current flow through the upper and lower coils K66 and K67 being normally so related that the keys will be held normally in the upper position. When a key is primarily slightly depressed, on account of the decreasing reluctance through the upper armature head and increasing reluctance through the lower armature head, the forces immediately become unbalanced and the primarily depressed key is drawn down to its lowermost position to cause restoration of the depressed digit keys in the controlled order as has just been explained. These individual restoring keys are used for restoring the digit keys of single orders, but provision is also made for restoring all the depressed keys in one of the board sections at the same time, and this is accomplished upon depression of the general restoring or erasing keys K76, K76c and K76d controlling the amount, the credit and the debit keyboard sections, respectively, the mechanism for these keys being identical. In each key a vertical rod K77 extends downwardly from the key head and connects at its lower end with an armature K78. The horizontal upper and lower walls K79 and K80, together with the vertical walls K81 and K82 form a common magnetic frame for the armature K78 and for other armatures which will be referred to later, this magnetic frame extending across the keyboard between the side walls K1 and K2.

In the amount keyboard a coil K83 is disposed within the magnetic frame and embraces the armature K78, the armature being cored out as shown in dotted lines, so that the normal current flow through the coil will tend to move and hold the armature and the key K76 in their upper position, and in such position a contact head K84 supported from the lower end of the armature connects together the contact sections K85 and K86, supported in a horizontal plate K87 of insulating material. These contacts control the circuit through the lower coil K67 surrounding the armatures of the individual restoring keys of the amount keyboard, and upon depression of the key these contacts are disconnected, and the current in the upper coil K66 for these armatures then having the balance of power, the restoring keys are automatically depressed and their contact heads K69 carried from the upper contacts and into engagement with the lower contacts, thereby, as before explained, breaking circuit through the upper coils K33 on the d'git keys and increasing the current flow through the lower coils K34 on the digit keys, and all the depressed keys on the amount keyboard are immediately raised into their normal position. After the key has performed its function of opening the circuit through the lower coil of the order restoring keys, the coil K83 restores the armature K78 and the key to their normal position. The armature K78c for the credit board is normally held in its upper position by the coil K83c, and when the key K76c is depressed the contact head K84c opens the contacts K85c and K86c, and the circuit through the lower coil K67c surrounding the individual order restoring keys on the credit board is broken, whereupon these restoration keys are depressed to restore any depressed digit keys on the credit board, the operation being the same as that described for the amount board. In a similar manner are the digit keys in the debit board restored, the reference characters for the similar controlling mechanisms having a subscript d. Means are also provided for automatically restoring the depressed individual restoring keys to their normal position, and this is accomplished in each board upon actuation of an armature K88, these armatures and controlling mechanisms being identical in the boards and each surrounded by a coil K89 disposed between the magnetic frame K79, K80, K81 and K82. The circuit for the coil K89 for each board is controlled by the lower contacts K74 and K75 of the individual restoring keys and when any of these keys is depressed the circuit is closed through the coil and its armature K88 drawn upwardly. The upward movement of each armature, however, is retarded, the upper end thereof being cored out to form a dashpot cylinder K90 in which engages a holow piston head K91 through whose tubular stem K92 extends the valve rod K93 terminating at its upper end in a head K94, these heads being disposed above the key shelf K95 of the boards. The lower end of the valve stem forms a releasing valve for controlling the opening K96 through the lower wall of the piston head and the amount of retardation can be adjusted by turning the adjusting head K94, the upper part of the valve stem having threaded engagement in a supporting lug K97 from which extends the tube terminating in a piston head. From the lower end of each armature extends a rod K98 insulated therefrom and carrying a magnetic contact disk or plate K99 which is loosely mounted on the reduced end K100. Above the contact plate is a set of contact pins K101 and K102, and below the contact plate is a set of contact pins K103 and K104. These contact pins are of magnetic material and are magnetized, the pins K101 and K103 being in electrical connection, but the pins K102 and K104 being insulated from each other and from the other pins. Normally the armatures K88 are in their lower position, but when a coil K89 is energized upon depression of one or more individual restoring keys, the armature is slowly raised and the head K105 at the end of the contact rod reaching the contact plate K99 draws the plate away from the lower contacts, and as the plate enters the magnetic field of the upper contacts it is quickly attracted thereby into engagement therewith. The lower contacts normally control the circuit through the upper coil K66 surrounding the individual order restoring keys of the corresponding board and when the armature is raised this circuit, of course, is broken. The upper contacts form terminals of a circuit including the lower coil K67 for the individual order restoring keys, and when the contact plate engages these contact pins this circuit is closed and the restoring key armatures and their keys are quickly thrown to their upper or restored position. However, when these keys are restored their contact heads K69 disconnect the lower contacts K74 and K75, which, as before stated, control the circuit through the coil K89. This circuit being broken, the armature K88 through the force of gravity moves slowly downwardly and releases the contact plate K99 from the upper contact pins and this plate then comes into normal engagement with the lower contact pins to restore the current flow to the upper coil K66 of the restoring keys, and the armatures of the restoring keys being in their upper position, the normal balanced relations again prevail and the keys are maintained in their normal position.

The restoring mechanisms for the individual restoring keys of the debit and credit boards are represented by the same reference characters as those shown on the amount board, except that in the credit board the subscript c is added and in the debit board the subscript d. When the individual order restoring keys are themselves restored, their contacts again restore the normal circuit conditions through the coils of the digit keys, the entire mechanism then being in its normal condition.

The operator after setting up a number on the key boards may wish to retain it through several operations and for this purpose repeating keys K106, K106c and K106d are provided for the respective boards, any of which may be depressed to prevent erasure of the set-up on the particular board. As shown in the amount board, the stem K107 for the key K106 connects with the armature K108 extending through the magnetic frame K79, K80, K81 and K82 and surrounded by the coil K83 in common with the armature K78. From the lower end of the armature extends a contact pin K109 which, upon depression of the key, connects together contact sections K110 and K111 supported in the plate K87, and when these contacts are connected a circuit, which will be described later, is closed through coil K67' to prevent automatic restoration of any depressed key. The magnetism set up by the coil K83 which is continually energized tends to hold the key in its upper position, but the key may be locked in its depressed position upon engagement of the point of the pawl K112 with the locking wedge K113, this pawl being suspended from the lug K97 through which passes the valve stem K93 and the key will be thus held in its depressed position during any number of operations. To resealse the key a slight tap thereon will throw the ring K114 on the key stem against the pawl to throw the point thereof from the locking wedge and the key will be raised to its normal position by the coil K83. The repeating key arrangements in the debit and credit boards are identical with that shown in the amount board, but the subscript c is added to the characters in the credit board and the subscript d to the characters in the debit board.

After the operator has set up the desired data upon the keyboards it is necessary to start the ledger mechanisms, which in turn check themselves, and immediately thereafter the journal recording mechanism is automatically put in operation. For starting the automatic mechanical operation of the entire system a general starting or operating key K115 is provided, which appears at the right side of the amount keyboard. The stem K116 of this key connects with the upper end of the armature K117 which passes through the magnet frame K79, K80, K81 and K82, and is surrounded by the coil K83 which also includes the armatures K78 and K108, which coil has a tendency to hold the armature and key in the upper position. The contact head K118 extending from the end of the armature is adapted when the armature is lowered to connect together the contact sections K119 and K120 secured in the supporting plate K87. These contacts control the general operating circuit for the ledger mechanisms, and when engaged by the contact head this operating circuit is closed and actuates the magnet M141 on the master machine. The master machine now makes entry of the amount in the ledger accounts (the connected registers), and immediately thereafter automatically sets the journal mechanism in operation. During the first part of the revolution of the main shaft J32 of the journal mechanism the cam wheel J324 engages its cam roller and carries into printing position the type wheels indicative of ledger operations which were nearly all set up by the debit, credit and amount keyboards, and durng the remainder of the revolution of the main shaft the journal mechanism is actuated to print on the journal sheets and on the memorandum sheets the records set up on these type wheels and also those set up on the type wheels indicating the operator's number, the entry number and the date. On the stem of the key is a locking wedge K121, below which are normally disposed the ends of the armatures K122 and K123, controlled by the electromagnets K124 and K125 respectively, whose coils are included in the locking circuits of the entire system and are not energized until all the preliminary manipulations have been performed, whereupon their circuit is automatically closed and they become energized to withdraw their armatures from locking engagement with the locking wedge, and the key may then be depressed to start the system. The upper end of the armature is surrounded by an energizing coil K126, disposed within the magnetic framing K127, the purpose of this coil being to hold the armature and key down when its circuit is closed upon depression of the key. The circuit through this coil K126 is automatically opened upon completion of an operation and the coil K83 again becomes effective to restore the armature to its normal position to withdraw the contact head from its contacts to open the general operating circuit, the locking wedge passing upwardly by the locking armature ends to become again disposed above them and to be locked in such position. The general operating key need not be manually depressed, however, but may be automatically depressed by means of the coil K126', also disposed within the magnetic framing K127. Current through this coil is automatically controlled by contact mechanism K127', associated with one of the sets of order keys of the amount keyboard, preferably the units order, and when a key in this order is depressed these contacts close a circuit through the coil K126' and the general operating key is depressed.

Upon depression of the general operating key, either manually or automatically, a circuit is controlled to connect in the electromagnet M141 to cause the clutch mechanism to operate to connect in the master machine. The keyboard sections are also provided with rheostat keys K128, K128c and K128d, respectively, by means of which rheostat mechanisms K129, K129c and K129d may be adjusted to vary the normal current through the lower coils of the digit keys, thereby regulating the force holding the keys in their normal position, these rheostats being adjusted by turning their key heads. K130, K130c and K130d are conduits for these rheostats through which the wires thereto may be led.

The operating mechanisms of the debit, credit and amount boards have been described, and it now remains to explain how these boards are instrumental in causing the proper registers (ledger accounts) to be automatically connected in service, and how the setting-up pins in the master machine are automatically controlled by the amount board. As appears in the description of the register mechanisms and the master machine mechanism, the connection of the registers in service and the actuation of the setting-up pins are accomplished by electromagnets, and the keys, therefore, of the boards are provided with contacts and contact mechanisms which control proper circuits through these electromagnets. The circuit controlling mechanism for the debit and credit boards is best shown in Figs. K4, K6 and K7. From the lower end of each armature of the digit keys of the debit and credit boards extends a rod K131 and insulated from the armature by the insulated coupling K132 and at the end of each rod is a contact head K133, there being nine of these rods and nine contact heads for each order of keys. Below the contact heads is secured a horizontal plate K134 of insulating material having openings K135 in each of which is secured a contact thimble K136, one below each contact head. Above the plate K134 are horizontal order contact frame sections comprising the upper plates K138 and the lower plates K139, there being openings through these plates through which pass the rods K131 of the keys. In the lower plate for each rod is a pocket K140 containing contact balls K141 which insure good electrical contact between an order frame section and its rods. When a key is depressed, its contact head engages in the corresponding contact thimble and places the contact thimble in electrical connection with its contact frame section, this frame section forming a common terminal for circuits of its order as described later. At the rear end of the plate K134 is supported a contact K142 for each order which is normally in electrical contact with a pin K143 extending through the plates of the upper contact frame sections and provided with balls K144 for insuring good electrical contact with its frame section. A spring K145, encircling the pin between a collar K146 thereon and the contact frame section, tends to hold this pin in contact with its contact K142. Between the contact frames and the insulating couplings K132 a pair of rods K147 and K148 for each order is provided inclosing the contact rods K131 of its particular order. The front ends of these rods are pivoted to an arm K149 pivoted to the post K150 extending from the upper side of the contact frame section. An arm K151 is pivoted between the rear ends of the rods and to the post K152 extending from the contact plate, these arms being of the same length and parallel, whereby upon rotation thereof the rods will remain at all times in a horizontal position. Extending rearwardly from the arm K151 is a forked arm K153 which engages below the head K154 of the contact pin K143. The distance of the rods from the bottom head of the insulating couplings of the keys is such that when a key is depressed the rods will have been carried downwardly when the contact head is within the corresponding contact thimble. The movement of the rods for each key is such as to cause sufficient rotation of the arm K151 to raise the forked end thereof sufficiently to draw the pin K143 from the contact K142. Normally, then, a contact frame section is connected with its contact K142, but upon depression of a key the frame section is disconnected from this contact and is connected through the key contact head with the corresponding contact thimble. These contacts control circuits through energizing coils which in turn control electromagnetic switches for connecting the desired registers for service, this taking place in the automatic selecting switchboard which will eventually be described. The arrangement just described is identical for all orders of keys of the debit and credit boards.

Depression of a key in the amount board primarily causes actuation of contacts which close a circuit through the electromagnet which actuates the corresponding setting-up pin in the master machine. Contacts upon the master machine are provided, which upon actuation of the pin close contacts to check the operation of the setting-up pins and to insure that the set-up in the master machine corresponds to the set-up on the keyboard. The incandescent lamps K52 which are disposed within the keys, as explained, furnish the means indicating to the operator whether or not proper setting-up has been accomplished in the master machine. Thus, when the keyboard is operated and the pins in the master machine are set up, upon energization of the controlling electromagnets, circuits are controlled to connect the lamps representative of these raised pins and thus to display illuminated figures representative of the master machine set-up. These lamps furnish the visual means to the operator for detecting any discrepancies, but there may be some chance of a mistake on the part of the operator in reading the illuminated indication, and if the general operating key is actuated an incorrect entry might be attempted. Automatic means are therefore provided which prevent actuation of the general operating key until the master machine set-up corresponds with the keyboard set-up and until all other necessary operations and functions have been correctly performed.

In Figs. K8, K9 and K10 electrical controlling mechanism is shown. On the rods K25 extending from the armatures of the digit keys in the amount board are carried contact heads K155 for engaging contact thimbles K156 which are insulated from each other and carried in a horizontal supporting plate K73, there being one contact thimble for each contact head. The contact heads are all electrically connected together and to them is connected one side of the circuit. These contacts control circuits through the electromagnets M198 of the reversing pins and the electromagnets M229 for actuating the setting-up pins in the master machine, and upon depression of any key the corresponding setting-up pin is raised. Contact rod sections K159 are secured to but insulated from the rod sections K25 by the insulating couplings K160. The lower ends of these contact rods pass through openings in the contact frame comprising the upper horizontal plate K161 and the lower horizontal plate K162, there being a pocket K163 about each rod containing the contact balls K164. Below the contact frame is a horizontal magnetic frame K165 comprising the upper and lower walls K166 and K167 and the side and intermediate walls K168 and K169. Armatures K170 extend through the upper and lower walls of the magnetic frame and have upper heads K171 and lower heads K172 for limiting the vertical reciprocation thereof, each armature being surrounded by an energizing coil K173 disposed within the magnetic frame. The distance between the contact frame and the magnetic frame is such that when a key is depressed the lower end of its rod K159 moves to a position about half way between these frames and there is no contact between the corresponding armature and this rod until the corresponding coil is energized to throw the armature upwardly into engagement with the rod. For each row of keys there is also provided a set of horizontal bars K174 and K175, pivoted between whose front ends is an arm K176 which is pivoted to the post K177 extending upwardly from the contact frame. A forked extension K178 from this arm engages under the head K179 of the contact pin K180 which extends downwardly through the contact frame and normally into engagement with the contact post K181 extending from the magnetic frame. A spring K182, encircling this pin between a collar K183 thereon and the contact frame, tends to hold the pin against the contact post. Contact balls K184 are also provided for this pin. Between the rear ends of the bars is pivoted an arm K185, whose other end is pivoted to the post K186 extending from the contact frame, this arm being similar to the arm K176, whereby upon rotation of the arms the bars will always be horizontal. The distances between the parts are such that when a key has been depressed to its lowermost position, its coupling will have engaged the bars to rotate the arm K176 to cause the forked arm to raise the contact pin from the contact post K181, and when the corresponding coil is energized its armature will be thrown upwardly to engage the lower contact rod of the depressed key.

The same contacts on the master machine which control the incandescent lamps in the keyboard keys may control the coils K173 by connecting corresponding lamps and coils in the same circuit. Therefore, if upon depression of a key the corresponding setting-up pin is not sufficiently actuated there is no circuit established through the corresponding coil K173, and, consequently, the armature thereof is not raised and there is no connection between the contact frame and the magnetic frame, the normal connection between these frames through the pin K180 and contact post K181 having been broken upon depression of the bars K174 and K175 by the depressed key. As before described, the circuits for unlocking the general operating key include the electromagnets K124 and K125, whose armatures normally lock the key in its normal position, and in order that the checking circuits may be closed there must be proper electrical connection between the sections of the contact and the magnetic frames.

In Fig. K10 is shown the manner in which the contact frames and the magnetic frames are divided into insulated sections. By means of the insulating strips K187 the contact plate is divided into four equal longitudinal sections K188, K189, K190 and K191, and by means of the insulating strips K192 the magnetic frame is divided longitudinally into five sections K193, K194, K195, K196 and K197, respectively, between the first and second, third and fourth, fifth and sixth, and seventh and eighth order rows, while the upper strips are between the second and third, fourth and fifth, and sixth and seventh order rows. The sections K193 and K197 of the magnetic frame form the terminals in this checking mechanism, and normally this checking circuit is completed through the section K197, the pin K180 and the contact post K181 of the eighth order row, the section K191 of the contact plate, the normal contacts in the seventh order row, the section K196, the normal contacts of the sixth order row, the section K190, and so on, including all the normal contacts and sections, to the other end section K193, and thus the circuit of this unlocking or checking mechanism is normally and operatively closed. Upon depression of a key in any order the corresponding normal contact is open, and if the corresponding setting-up pin in the master machine has been properly actuated the proper coil K173 will have been connected in circuit to cause its armature to be thrown upwardly into contact with the contact rod of the depressed key, and this contact is substituted for the broken normal contact, the current at this point then flowing from the contact frame through the contact pin of the depressed key, the raised armature, the magnetic frame section, the normal contacts of the adjacent row, and so on, the normal contacts in any row being replaced by the contacts between the depressed key and the armature contact in said row. All other operations having been properly completed, the checking circuit remains closed to maintain energization of the locking electromagnets K124 and K125 to unlock the general operating key; but if the set-up pins failed to act properly and did not close the circuit through the proper coil K173 the checking circuit would be open and the armatures of the locking electromagnets would prevent actuation of the general operating key. The particular circuit arrangements will be more plainly shown and described in the description of the system circuits. Upon depression of a key in the units order, the head K179 of the pin K180 is engaged with the contact device K127' heretofore referred to, to close the circuit through the coil K126' to cause automatic depression of the general operating key.

*The electromagnetic switchboards and geometric selecting system.*—Each register on the panel board is designated by a number, there being in the system here shown provision for 9,999 registers, numbered from 1 to 9,999. In order to be able to connect the desired registers or ledger accounts for operation by means of striking keys on the debit and credit keyboards representative of the numbers of the particular registers, two switchboards are provided capable of automatically connecting in at one time two registers whose numbers correspond to the numbers set up on the debit and credit keyboards. Having set up the numbers of the registers desired to be operated, no further effort is required from the operator, as this initial effort controls certain automatic switches in the switchboards which continue the proper connections thereby locking in for operation the registers designated on the keyboards. As has been shown in Fig. K6, there are ten contacts for each order of digit keys, and one set of contacts in each order is normally closed. In this figure, the contact plate sections for all orders are normally in electrical engagement with the contacts K142, but upon depression of a key in any order the contact thimble in the same order is put in connection with its contact plate section. The construction of the switchboards is shown in Figs. S1 to S4.

In Fig. S1 is shown the top view of one switchboard panel or section, each section being composed of an upper wall S1, an intermediate wall S2 and a lower wall S3. From the upper wall eleven vertical transverse ribs S4 extend to the intermediate wall, thus dividing the upper part into ten channels. Eleven longitudinal ribs S5 extend from the lower wall to the intermediate wall to form ten channels S6. Holes are bored in each channel in a line running through its center so as to permit the introduction of unit switches S7. In each of the upper channels and embracing the ten switches passing therethrough is an energizing coil S8, and in each of the lower channels and embracing the ten switches passing therethrough is an energizing coil S9, each switch therefore being embraced by one of the upper coils and by one of the lower coils. Each switch section thus has one hundred switches arranged in the form of a square, with ten transverse rows, which are hereinafter called ranks, and ten longitudinal rows, which are hereinafter called files. There is one switch section for each two orders of keys in the debit and credit keyboards, and as four orders are shown for each keyboard there are two switch sections for each keyboard.

The switch section in Fig. S1 is that corresponding to the units and tens orders of a keyboard. The upper coil $S8^0$, spanning the unit switches of the 0 rank, is controlled by the 0 contacts in the units order of one of the keyboards, and the lower coil $S9^0$, spanning the switches of the 0 file, is controlled by the 0 contacts in the tens order, and these 0 contacts being normally closed there normally is current flow through these coils. The coil embracing the switches of the 1 rank is controlled by the contacts $K133_1$ and $K135_1$ for the "1" key of the units order of the keyboard; the coil embracing the switches of the 2 rank is controlled by the contacts $K133_2$ and $K135_2$ for the "2" key of the units order, and so on, up to the coil of the 9 rank, which is controlled by the contacts of the "9" key of the units order. These contacts of the significant keys are normally out of engagement and the upper coils controlled thereby are therefore normally free from energization. In the same manner, the coil embracing the switches of the 10 file is controlled by the contacts of the "1" key of the tens order, and so on, up to the 90 file, whose coil is controlled by the contacts of the "9" key of the tens order, and these contacts also being normally out of engagement the lower coils of the significant keys are normally free from energization.

Upon depression of a key in the units order, for instance, the normal or 0 contacts in this order are disengaged in the manner already described, and the contacts of the depressed key become effective. The circuit for the coil about the 0 rank therefore is open and the current flow is shifted to the coil about the rank corresponding to the depressed key. In a similar manner, upon depression of a key in the tens order the normal or 0 contacts for this order are interrupted to break the current flow through the coil of the 0 file, and the current flow is shifted to the coil embracing the file corresponding to the depressed key, and the unit switch which is at the intersection of the two active coils is magnetically brought into operation to close the circuit through it which controls the current flow to the connecting-in mechanism beyond. For example, if it is desired to connect in service register No. 45, the "4" key of the tens order of the debit or credit keyboard is depressed, whereupon current is shifted from the coil of the 0 file to the coil about the 40 file, and upon depression of the "5" key of the units order current is shifted from the coil about the 0 rank to the coil about the 5 rank, and the switch at the intersection of the two active coils is switch No. 45, which controls the circuit for register No. 45, and the connecting-in mechanism for this register is connected in circuit.

The construction of the unit switches is shown in Fig. S4, the switches being cylindrical to be inserted in the openings through the walls S1, S2 and S3 of the magnetic frame. For each unit switch there is an outer non-magnetic shell or casing S10, lined by a shell S11 of insulating material. Within this inner shell at the lower end is the terminal shell S12 of magnetic material, from which extends the terminal lug S13 on the outside of the switch. At the upper end of this lower terminal is a shelf S14 of non-magnetic material, and in the pocket formed by this shelf in the terminal is held a contact ball S15 of magnetic material. Within the insulating shell at the upper end thereof is the cup-shaped contact frame or shell S16 of magnetic material, and from the end thereof extends the contact lug S17. The upper end of the outer shell forms a head S18 which, however, is insulated from the upper contact frame and contact lug. Between the upper and lower contact frames within the insulating shell is the intermediate cup-shaped contact frame S19 of magnetic material, having within its upper end a shelf S20 of non-magnetic material, supporting the ball S21 of magnetic material. The ends of these frames with their connecting frames are such that if these balls be slightly raised they connect the intermediate terminal with the upper and lower terminal frames, thus closing the circuit through the unit switch. As before stated, the upper part of each unit switch between the upper and intermediate magnetic frames is embraced by one of the energizing coils controlled by the units order keys of the debit or credit keyboard, and the lower end of each switch between the intermediate and lower magnetic frames is embraced by one of the coils controlled by the keys of the tens order on the keyboard. Upon energization of either the upper or the lower coil magnetization is set up to attract either the upper or the lower ball. If both coils about a switch are connected in circuit at the same time both balls are attracted and the terminal frames are electrically connected together to complete the circuit controlled thereby. Thus, in the example above, where register No. 45 is desired to be connected in circuit, the upper and lower coils embracing the unit switch numbered 45 must receive current at the same time. Upon striking the "4" key of the tens order the current flow is shifted from the 0 file to the 40 file, and the 40 file coil being energized the lower ball is raised to connect the lower terminal frame with the intermediate terminal frame. Upon striking the "5" key in the units order the current flow is shifted from the coil of the 0 rank to the coil of the 5 rank, and this rank coil embracing the upper part of the 45 switch the upper ball is attracted to connect the upper terminal frame with the intermediate terminal frame, and the circuit through the switch is complete. Moreover, this switch is the only one through which the circuit is completed, as in each of the other unit switches included by the energized coils only one of the balls is attracted, the circuit remaining open at the other ball. The openings of the No. 0 switch are normally embraced by the 0 rank and 0 file coils, and both balls of that switch are normally attracted. There need, however, be no No. 0 register, and this switch performs another function in the system circuits which will be described later.

Where the debit and credit keyboards have but two orders of keys each, two switch sections suffice, and in this case the terminals of the unit switches connect directly with the connecting-in magnets of the corresponding registers, and when intersecting coils are simultaneously energized the embraced unit switch closes the circuit through the connecting-in magnet controlled thereby and the register is connected in to be mechanically driven by the master machine. In the system shown, however, accommodation is provided for 9,999 registers, and a larger secondary switch section Ss is controlled by each set of two primary 100 unit switch sections. In other words, the debit and credit boards each control the connecting-in of 9,999 registers. Where the number of registers in the system is larger than ninety-nine, but less than 10,000, two primary switch sections are used for each keyboard, one section controlled by the units and tens order keys and the other by the next two orders of keys, and as four orders are shown for each board in this system, this second switch section is controlled by the hundreds and thousands orders. In the same manner that a primary switch section of 100 unit switches is controlled by the co-operation of the units and tens orders of keys, the secondary switch section of 10,000 unit switches is in turn controlled by the co-operation of two unit switches in the two primary switch sections. Each secondary switch section has 10,000 unit switches similar to those described, arranged in 100 ranks and 100 files. The magnetic arrangement for each secondary switch section is substantially the same as that for the primary switch sections, but it contains 100 rank coils and 100 file coils. If the number of the register to be set up has more than two digits, the higher digits (thousands and hundreds) are struck on the keyboard and the unit switch corresponding thereto is actuated in one of the primary switch sections, and then the tens and units digits are struck on the keyboard and the unit switch representative thereof is actuated in the other primary switch section. Each of the unit switches of one primary switch section controls the circuit of one of the rank coils of the secondary switch section, and each of the unit switches of the other primary switch section controls the circuit of one of the file coils of the secondary switch section. Thus, when a unit switch representative of the units and tens digits of a number is actuated on one of the primary switch sections, and another unit switch representative of the hundreds and thousands digits is actuated on the other primary switch section, the two unit switches in the primary sections close the current flow through the corresponding rank and file coils in the secondary section, and at the intersection of these coils is the unit switch controlling and numbered in accordance with the register desired to be connected in. For example, if register No. 2736 is desired to be connected for operation, the operator strikes off this number on the keyboard. The unit switch No. 27 in the primary section controlled by the thousands and hundreds orders of the keyboard is actuated and closes the circuit through the 2700 file coil of the secondary section. The unit switch No. 36 in the primary section controlled by the tens and units orders of the keyboard is actuated and closes the circuit through the 36 rank coil of the secondary section, and in this secondary section unit switch No. 2736 is actuated and the electromagnet of the corresponding register is connected in circuit. In a similar manner the capacity of the system may be extended to any number of unit switches and an equal number (less one) of registers controlled thereby. The 0 switch in the secondary switch section is not connected to a register, but performs another function which will be described later in the system circuits.

*Circuits and operation.*—In the descriptions of the various mechanisms mention has been made and more or less description given of the circuit requirements as especially relating to the particular mechanism, but this description has not been sufficient to adequately indicate the relation which the particular mechanism bears to the system. The circuits of the system embrace not only such circuits as are absolutely necessary for the proper linking together and operation of the different mechanisms, but also include checking and interlocking circuits which indicate and insure the proper operation and relationships of all the parts of the system. The main diagrammatic circuits are spread over four sheets of drawings, comprising Figs. C1 to C4. Fig. C1 shows the circuits, solenoids, switches, interlocking means, etc. required in connection with the journal mechanism. The upper part of Fig. C2 shows similar parts and characteristics of the debit and credit keyboards, and the lower part of this figure diagrammatically shows the automatic mechanism for indicating and controlling the type indicative of the locking-in of the registers and the condition of their balances. The upper part of Fig. C3 diagrammatically shows the arrangement for the master machine mechanism, and the lower part of this figure shows the arrangement for the amount keyboard. The upper part of Fig. C4 diagrammatically illustrates the arrangement for the registers, and the lower part of this figure diagrammatically illustrates the arrangement for the switch sections.

As shown, the operator has under his immediate control four keyboards, namely: the typewriter keyboard T, the debit keyboard Kd, the credit keyboard Kc, and the amount keyboard Ka. These keyboards are all interlocked one with the others so as to require the operator to follow a predetermined succession of operations and a predetermined method in making all entries, but even before any keyboard can be operated the operator must energize (and thereby unlock) the system by means of his special key, as has been explained in the journal mechanism specification. After the system is energized the operation of the typewriter board unlocks the debit board, the operation of the debit board unlocks the credit board, the operation of the credit board unlocks the amount board, and the operation of all of these boards unlocks the general operating key of the system. The depression of this general operating key sets in operation the master machine, which automatically actuates in proper sequence all other parts of the system, thus completing both the journal and the ledger operations.

The main battery for supplying the system is indicated by the reference character C1, its terminals being connected to switch contacts C2, C3, an intermediate point C4 being connected with switch contact C5. Main bus bars C6, C7 extend from switch contacts C8, C9, and an intermediate bus bar C10 extends from switch contact C11. Switch blades C12, C13, C14, are carried on the armature rod C15 controlled by the electromagnet C16, and when this electromagnet is energized battery contacts C2, C3 and C5 are connected respectively with line contacts C8, C9 and C11, this electromagnet, however, being controlled by the operator's special key, through a lock which is shown in Figs. J20–24 and which is described in the journal mechanism specification in association with a general control key through a lock C, which is shown in Fig. C1. One terminal J156 of this lock connects through the coil J212 and through the general control lock with one terminal of the battery, and the stepped frame terminal J210 of the lock connects through the electromagnet C16 with the other terminal of the battery. Assuming the general control key in operative position, when the operator's key is inserted and turned to engage one of the steps of the stepped frame, the circuit is closed through the electromagnet C16, whereupon the battery is connected with the bus bars, as is plainly shown. The operation of the key within the lock causes every entry made by the operator to be designated by his number, which is printed on the journal record, as is described in the journal mechanism specification, and, as has here been shown, the system is not supplied with current until the key is turned in the lock to close the circuit through electromagnet C16.

The operator now proceeds to operate the typewriter mechanism to enter the explanatory details of the entry. Previous to such operation the debit, credit and amount keyboards are locked against operation, current flow to the upper key controlling coil K33d of the debit board being interrupted at the contacts C17, C18, current flow to the upper key controlling coils K33c of the credit board being interrupted at the contacts C19, C20, and current flow to the upper key controlling coil K33 of the amount board being interrupted at the contacts C21, C22. The contacts C17, C18 are controlled by the manual electromagnetic relay C23. The contacts C19, C20 are controlled by the automatic relay C24 which, as will be described later, is actuated to close the circuits upon operation of the debit keyboard, while contacts C21, C22 are closed by the automatic relay C25 upon operation of the credit board. The upper key controlling coils in each board must be energized in order that its keys may be depressed. The lower key controlling coils K34d, K34c and K34 are normally energized and tend to raise the keys, thus preventing any set-up in the absence of current flow through the upper coils, which current flow tends to depress the keys.

The operator, after entry of the explanatory details by means of the typewriting mechanism, causes actuation of the key C23 to close contacts C17, C18, and this key may be placed in any convenient position on the typewriter keyboard. Upon actuation of this key current flows through the upper coil K33d in the debit board through the following circuit: from the bus bar C7, through conductor C26, contacts C18, C17, conductor C27, the common terminal C28d of the upper key controlling coils K33d of the debit board, through these coils and from the other terminals thereof to the contacts K71d, through the contacts K69d of the individual restoring keys, through the contacts K70d, which contacts are connected together, and through conductors C29d and C30d to the bus bar C6.

As has already been described in the keyboard specification, the current circuits and the current strengths in the upper and lower digit key coils in the keyboards are so related that the keys are normally held in their raised position. When the keys on the debit board corresponding to the register to be connected in debitingly are tapped or depressed, the magnetic circuits rearrange themselves in favor of the upper coil and the started keys are thrown to their depressed position. This depression of the keys causes actuation of contact mechanism controlling the circuits through the debit automatic switch sections, as will be described more in detail later. These circuits also include the relay C24 which controls current flow to the credit keyboard, and upon closure of its contacts C19 and C20 current flows through the credit board as follows: from bus bar C7, through conductor C31, contacts C19, C20 and conductor C27c to the common terminal C28c of the upper key controlling coils K33c, through these coils and from the other terminals thereof to the individual contacts K71c, through the contact heads K69c to the contact heads K70c, which are connected together, and through conductors C29c and C30c to the bus bar C6. Current being thus supplied to the upper key controlling coils, the credit board is rendered operative and the operator may set up thereon the number corresponding to the register desired to be connected in creditingly. The contacts controlled by the credit keys, upon depression thereof, connect circuits through the credit automatic switch sections. These circuits also include the relay C25 which controls current flow to the amount keyboard, and upon closure of its contacts C21, C22 current flows through the amount board as follows: from bus bar C7, through conductor C31, contacts C21, C22, and conductor C27 to the common terminal C28 of the upper key controlling coils K33 of the amount board, through these coils and from their other terminals to the individual contacts K71, through the heads K69 to the contacts K70 which are all connected together, and through conductors C29 and C30 to the bus bar C6. The amount board is now operative and the keys may be depressed to set up the pins in the master machine in correspondence with the amount to be entered on the connected-in registers.

The detailed construction and arrangement of the operative parts and contacts of the amount board are shown in Figs. K3, K5, K8, K9 and K10, the contact heads K155 of the digit keys being all grounded to the framing of the keyboard represented on the diagram by K26. The individual contacts K156 connect through individual conductors C32, each with one terminal of the corresponding setting-up pin electromagnet in the master machine, these individual wires passing through the cable C33. The other terminals of the setting-up pin electromagnets connect through conductors C34 with the common conductor C35, terminating in the contact brush M436 which engages the contact wheel M433, which wheel connects through conductor C36 with another contact wheel M430 engaged by the contact brush M432, which connects through conductor C37 with the bus bar C6. The framing K26 connects through conductor C38 with one terminal of electromagnet C39 whose other terminal connects through conductor C40 with the bus bar C7. Thus, upon depression of any key in any row on the amount keyboard, the corresponding contacts K155 and K156 engage to close circuit through the electromagnet of the corresponding setting-up pin in the master machine. As described on pages 59 and 60 in the keyboard specification, and as shown in Figs. K9 and K10, checking mechanism is provided which prevents unlocking of the general operating key unless the setting-up pin electromagnets have been properly actuated upon depression of keys on the amount board. In this checking circuit are included the frames K161—K162 and K166 represented in Fig. C3 by a rectangle. The upper framing K161—162 is in electrical contact with contact ends K159 on the digit keys, while the lower framing K166 is in electrical contact with contact armatures K170 each surrounded by an energizing coil K173. The frames are normally electrically connected by means of the contact pin K180 of the upper framing, and the contact K181 of the lower framing, and, as described in the specification referred to, whenever a key is depressed on the amount board and the corresponding setting-up electromagnet is actuated to properly set up its pin, a substitute connection is completed between the framings for the normal contact, which upon depression of digit keys is broken. The circuits for these coils K173 are controlled by the contact heads M418 and contacts M421 under the setting-up pin electromagnets in the master machine. Current flows from bus bar C6, through conductor C37, conductor C41 and the cable C42 to connect with one terminal of all the electromagnet coils K173, the other terminals of the coils connecting through individual conductors which pass through the cable C42 to the master machine and connect there with individual contacts M421 below the corresponding setting-up electromagnets, the contact heads M418 carried by the setting-up magnet armatures being connected together and through conductors C44 and C45 with bus bar C7. Thus, if the setting-up electromagnets are properly actuated and their contacts connected to close the circuits through the corresponding coils K173, the circuit through the frame sections K188–191 and K193–197 is closed. As before stated, the electromagnet C39 is included in conductor C38 connected with the framing K26, having contact with all the contact heads K155 of the amount board digit keys. Upon depression of a key or keys the circuit including this electromagnet is closed and the contact head C46 carried by the electromagnet armature connects together the contacts C47, C48, and if the setting-up pins have been properly actuated and circuit closed through the checking frame sections, the following circuit is closed: from bus bar C6, through conductor C49, contacts C47, C48, conductor C50, the checking frame sections, conductor C51, the electromagnet K125 and conductor C40 to bus bar C7. The electromagnet K125 therefore becomes active to disengage its armature K123 from the locking cam K121 on the armature rod K116 of the general operating key K115. As will be described later, contacts C52, C53 are closed at this time if the debit and credit boards have been operated to connect in their respective registers, and a circuit is closed as follows: from bus bar C6, through conductor C54, conductor C55, contacts C52, C53, conductor C56, electromagnet K124 and conductor C40 to bus bar C7. The armature K122 of this electromagnet is released from locking engagement with the armature rod K116 of the general operating key, and both the electromagnets K124 and K125 being active when the setting-up pins are properly actuated, the general operating key is free to be depressed either manually by the operator, or automatically in a manner which will be described later. Upon depression of this general operating key current flows from bus bar C6 through conductor C37 to magnet M141, through contactor M382 to brush M386 which is in engagement with said contactor during part of each revolution of master machine driving shaft M8, then through conductor C57, through contact K120 below the general operating key, through contact head K118 carried by the key armature, through contact K119, through the coil K126 surrounding the armature of the general operating key, through conductor C58 and through conductor C40 to bus bar C7. As shown in Fig. K5, energization of this coil K126 holds the key in its depressed position against the effort of the current flowing through the coil K83 tending to raise the key. When the contactor M382 leaves the brush M386, the circuit is broken through the coil K126, and the coil K83 again becomes effective, raising the general operating key to its normal position.

As will be described later, the motor M437 for driving the master machine normally runs continuously, and the contactor M382, of course, rotates to engage the brush M386, and the circuit traced through the coils K126 and M141 is closed. When this circuit is closed the electromagnet M141 becomes active, and, as described in the master machine specification, it actuates the clutching-in mechanism, whereupon the master machine is connected with the driving motor, thus setting it in operation to produce rotary motions which are transmitted to the panelboards and connected-in registers whereby such registers are actuated in correspondence with the amount set up on the amount keyboard. As soon as the contactor and brush become disengaged, the circuit through the coil K126 and the clutch-controlling electromagnet M141 is opened.

If it is desired to have the general operating key depressed automatically after the unlocking thereof, the operator closes the switch C59. Associated with one of the orders of digit keys in the amount board is the contact mechanism K127', this contact mechanism being associated with the order which will be last actuated upon setting up a number, this order being usually the units order. This contact mechanism is adapted to be normally open and to be closed upon depression of a key in the units order, and when such key is depressed the following circuit is closed: from the bus bar C6, through conductors C37 and C60 to brush M391, to contact M393$_0$ corresponding to the rest position of the differential gear in the master machine, through conductors C61$_0$ and C62, contact mechanism K127' and switch C59, thence through winding K126' surrounding the armature of the general operating key and thence through conductors C58 and C40 to bus bar C7. Energization of the coil K126' causes the general operating key armature to be pulled downwardly against the action of the coil K83, and the general operating key is thus automatically depressed after a number has been set up on the amount board. The master machine thereupon becoming active causes rotation of the screw shaft and travel of brush M391 across the contacts M393, as described in the master machine specification, page 85. However, when the brush leaves the contact M393$_0$, the circuit just traced through the coil K126' is thereby broken and the general operating key is restored by the coil K83.

As shown in the description of the master machine mechanism, the pin-locking plates M237 are actuated upon turning of the shaft M119 to lock the pins in their proper positions, and when this mechanical locking of the pins is accomplished, there is no further need of maintaining current flow through the setting-up magnets. To break the circuit through these magnets, therefore, the contact wheel M430 is employed, mounted on the shaft M119 as shown in Figs. M1 and M23. The brush M432 is normally in electrical contact with the contact wheel and the circuit through the electromagnets is closed at this point, but the contact wheel, as shown, is provided with the insulating sector M431 which engages with the brush after the pins have been mechanically locked by the locking plates, the circuits through the setting-up magnets being thereupon opened. The contact wheel is turned to its normal position when the locking plates M237 and M248 unlock the pins and the setting-up electromagnetic circuit is thus again closed at this point. The rock arm M265 controlled from the shaft M122 pulls down the restoring plate M261 when the locking plates are released from the pins, and to insure that the circuits through the setting-up electromagnets are opened at this time, the contact wheel M433 is provided, as shown in Figs. M1 and M23, it being mounted on shaft M122 and normally in electrical engagement with the brush M436. Immediately after the locking plates have unlocked the setting-up and reversing pins this brush is engaged by the insulating sector M435 and the circuits of the setting-up magnets are broken at this point while the restoring plates are actuated to restore the pins.

The journal mechanism, which is shown in Fig. C1, is started immediately after the master machine picking-up mechanism has been operated to carry the set-up amount into the registers. The motor mechanism for driving the journal mechanism and the various circuit controlling arrangements have already been described in connection with the journal mechanism, and the parts are here only diagrammatically shown. After the master machine has completed its movement in the forward direction to operate the differential picking-up mechanism the contacts M415, M416 are closed, as described in the master machine specifications, whereupon a circuit is closed as follows: from bus bar C6, through conductor C37, contacts M416, M417, M415, conductor C63, electromagnet J253 and conductor C64 to bus bar C7.

As shown in the journal mechanism description, the brush J269 is normally in engagement with the insulating section J268, but upon energization of the electromagnet J253 the contact wheel J266 is advanced by means of the pawl and ratchet mechanism J257, J265, and is carried into electrical engagement with the brush J269, thereupon closing the following circuit: from bus bar C6, through conductor C54, electromagnet C65, electromagnet C66, brush J269, contact wheel J266 and conductor C64 to bus bar C7. The armature C67 for the electromagnet C66 carries a contact head C68 which successively engages with the rheostat contacts C69 to allow current flow into the motor J68 through the following circuit: from the supply source C70, through conductor C71, the motor J68, the electromagnet J82, the rheostat and the conductor C72 back to the source C70. On the motor shaft is the brake pulley J80 surrounded by the brake straps J81 which are normally held in braking engagement with the brake wheel by means of spring mechanism which is not shown. However, upon current flow through the electromagnet J82, the brake straps release the brake pulley and the motor can be started. Immediately upon the breaking of the circuit through the motor and the electromagnet J82, the spring again clamps the brake straps to the brake wheel to quickly stop the motor. The pinion J70 driven by the motor engages the gear J71, mounted on the main driving shaft J32, upon which is mounted the wheel J266. With the arrangement shown, the shaft J32 can make but one revolution for each journal entry, as the insulating section J268 engages the brush J269 at the end of each revolution of the shaft J32, at which time the circuit through the electromagnet C66 is broken and the motor circuit opened.

The operation of the ratchet and pawl mechanism which may give a slight angular advancement to the contact wheel J266 to bring the brush J269 into electrical contact therewith, is sufficiently described in the journal mechanism specification and need not here be repeated.

As also shown in the journal mechanism description, there is a time when the journal mechanism must be operated by the motor in the middle of an entry, to properly shift and cut off the journal paper. The contact J193 is automatically closed when the first line of a journal page is in printing position, and when a journal entry is continued from the first to the second line of the journal page, the operator turns the knob J63 of the journal mechanism and thereby closes the contact J192, as explained in the journal mechanism description, and a circuit is thereby closed as follows: from bus bar C6 through conductor C54, electromagnet C73, conductor C74, contacts J192 and J193, conductor C75, contacts C76, C77, contacts C78, C79, conductor C80, contact C81, contact head C82, contact C83 and conductor C40 to bus bar C7. Contacts C76, C77, and C78, C79, are normally closed by the relays C24 and C25, respectively, when there are no set-ups on the debit and credit boards; contact head C82 and electromagnet C39 normally close contacts C81, C83 when there is no set-up on the amount board. Having turned the shift knob J63 to close the circuit just traced, the operator actuates the key C84, which key is especially provided for starting the journal motor when the operator desires to shift from the first to the second line. The armature C85 of the electromagnet C73, included in this circuit, normally engages the locking cam C86 on the stem C87 of this special key, while a spring C88, disposed between the collar C89 on the stem and the frame C90, tends to hold the key in its upper position. When the circuit before traced is closed the electromagnet C73 is energized and its armature withdrawn from the locking cam to permit the depression of the key to connect together the contacts C91, C92 to close the following circuit: from bus bar C6 through conductor C54, contacts C91, C92, conductor C93, electromagnet J180, electromagnet J253 and conductor C64 to bus bar C7. Upon energization of the electromagnet J253 the ratchet and pawl mechanism is actuated, as before described, to advance the contact wheel J266 to electrically engage the brush J269, whereupon circuit is closed from bus bar C6, through conductor C54, electromagnet C65, motor-controlling electromagnet C66, brush J269, contact wheel J266 and conductor C64 to bus bar C7. Immediately upon operation of the motor and rotation of the main journal shaft J32, contacts J192 and J193 are broken, particularly the latter, thus opening the circuit through electromagnet C73. Circuit, however, having previously been closed through the electromagnet C65, the key stem is held in its depressed position to maintain connection between contacts C91, C92, and thus maintain the circuit including the electromagnet J180. This electromagnet J180 is plainly shown in Fig. J7 and described in the journal mechanism specification, and its purpose is to draw the intermittent gear J152 out of the alinement plane of the intermittent gear J160, so that the entry counter will not be actuated when the journal sheet is thus shifted from the first to the second line.

After the main shaft J32 has been rotated one revolution, the circuit through the electromagnets C65 and C66 is again broken and the special key C84 is released, whereupon the circuit through the electromagnet J180 is also broken and the intermittent gear J152 is allowed to return to its active position. This special starting mechanism for the motor comes into operation only when paper is to be shifted from the first line of a page to the second in the middle of an entry, as before this can be accomplished the paper must be cut and the identification legends and page number printed on the new page. However, after the first line has been passed the locking pawl J64 is released from the locking ridge J65 (Fig. J3), whereupon the shift roller J20 may be rotated upon turning the shift knob J63.

The internal circuit arrangements for the debit, credit and amount boards are practically identical. These circuits will therefore be described with reference to the amount board, and like parts in the debit and credit boards will have added to their reference characters the letters $d$ and $c$ respectively.

K51 to K59 represent the operating digit keys of any order, and there may be as many orders as desired. The exact arrangement and construction of the various operative parts have already been described in the keyboard mechanism specification and the parts are here shown only diagrammatically.

K53 represents the individual restoring keys, there being one for each row of digit keys; K76 represents the general erasing key; K115 represents the general operating key, K106 the repeating key and K128 the touch adjusting key. As before stated, the upper digit key coils K33 are all connected together to the common terminal C28, their other terminals passing to the individual contacts K71 of the restoring keys, whose other contact terminals are connected together and with the bus bar C6, the common terminal C28 being connected with the bus bar C7, provided the relay C25 has been actuated to close contacts C21, C22. Normally the restoring keys are in their upper position with their contact heads connected together to the contacts K70, K71, and immediately upon closure of contacts C21, C22 there is current flow through the upper coils K33. Through the lower digit key coils K34 there is always current flow, the resistance of this circuit, however, being variable. Normally current flows from bus bar C6, through conductor C30, conductor C94, rheostat K129 and conductor C95 to the common terminal C96; thence through resistances C97 to one terminal of each of the coils K34, the other terminals of these coils being connected together at C98, and thence through conductor C99 to bus bar C7. The individual ends of the coils K34 are also connected to the individual lower contacts K75 of the restoring keys, the remaining lower contacts K74 of these keys being connected together to conductor C100, which connects with one terminal of the coil K89 whose other terminal connects with conductor C94, which connects with bus bar C6 through conductors C29 and C30. As has been explained in the description of the electromagnetic keyboard, the electromagnetic circuits for the upper and lower coils and the current flows therethrough are so related that the lower coils are normally effective to keep the keys in their raised position. When these keys, however, are started upon the setting-up of a number on the board, the magnetic circuits are changed and those of the upper coils predominate to pull the keys to their lower position to close their respective circuit-controlling contacts. To raise or restore the keys set up in any order the corresponding individual restoring key K53 is actuated, these restoring keys, as has already been explained, being provided with an upper coil K66 and a lower coil K67, which coils operate like the coils K33 and K34 for the digit keys, and therefore if a restoring key is started the upper coil K66 completes its depression. Upon depression of the restoring key the contact head K69 thereof is disconnected from the upper contacts K70, K71, and engages between the lower contacts K74, K75. The circuits through the upper coils K33 of the amount board are therefore broken and these coils deprived of current. At the same time other paths, with small resistances, are offered for the current flow through the lower coils K34 by way of the lower contacts of the depressed restoring keys and the coil K89. The result, then, of depressing a restoring key is to deprive the upper coil of current and to increase the current flow through the lower coil, the depressed digit key being, therefore, quickly thrown back to its normal position and the set-up in that order erased.

The coil K89 referred to is the coil which operates contacts for controlling the current flow through the restoring key controlling coils. As explained in the keyboard specifications and as shown in Figs. K3 and K5, the armature rod K98 for this coil carries a contact plate K99 confined thereon but having lateral movement, as described. In its lower position this contact plate engages the lower contacts K103, K104, while in its upper position it engages the contacts K101, K102. As shown in Fig. K5 the movement of the armature K90 is retarded by the dashpot mechanism. The upper contacts control current flow through the lower coils K67 of the restoring keys, while the lower contacts control the current flow through the upper coils K66 of these keys. Normally the upper coils are energized through the following circuit: from bus bar C6, through conductor C30, lower contact K104 and the contact plate K99 to lower contact K103, thence through conductor C101 to the coil K66 and thence through conductor C99 to bus bar C7. Normally the current flows through the lower coil K67 as follows: from bus bar C6, through conductor C30, conductor C29, conductor C94, rheostat K129, resistance C102, conductor C103, contacts K84, K85 of the general erasing key K76, lower coil K67, conductor C104 and electromagnet C23 to brush J270, and thence through contact wheel J267 and conductor C64 to bus bar C7. One terminal of the lower coil of the restoring keys in the amount board is thus directly connected with the bus bar C7 through conductor C104, but the connection of the corresponding coils in the debit and credit boards with the conductor C104 is controlled by the operation of the switch section and register relay-mechanisms, as will be explained later.

As has been explained and as is shown in Fig. K5, the upper contacts K101, K102 and the lower contacts K103, K104 are magnetized and thus tend to retain the contact plate when engaged thereby. It has also been shown that upon depression of a restoring key current flows through the coil K89. The armature K90 therefore slowly rises, and when the head K105 at the lower end of the armature rod reaches the contact plate this plate is raised and carried toward the upper contacts, and when sufficiently near thereto these upper contacts attract and are engaged by the contact plate. The circuit is therefore broken through the upper coil K66 which was controlled by these lower contacts, and a direct path is offered through the lower coil as follows: from bus bar C6, through conductor C30 and the upper contacts and contact plate engaged thereby, and through conductor C103, contacts K84, K85, coil K67 and conductor C104 to bus bar C7. The upper coil being deprived of current and the current flow through the lower coil being increased, the depressed restoring keys are thrown into normal position. When these keys are restored current again flows through the upper coils K33 of the digit keys and the circuit through the coil K89 is broken, and, the digit keys having been previously raised upon depression of the restoring keys, the electromagnetic and electrical circuits for the digit key coils are again normal. The armature K90, when the current flow through the coil K89 is broken upon restoration of the restoring keys, falls to its normal rest position. The magnetization arrangement of the upper and lower contacts and the dashpot arrangement are resorted to to give the various keys sufficient time to operate to insure proper restoration thereof. Upon interruption of current flow through the coil K89 the armature K90 begins to fall slowly, being limited in speed by its dashpot. If the contact plate were not held by the upper contacts, the circuit through the coils K67 of the restoring keys would immediately be broken, and if this break should come before the last restoring key had reached its raised position, this key might again fall to its lower position; but, owing to the magnetization of the contacts the contact plate is retained thereby and is not carried away therefrom until the shoulder K105' on the armature rod reaches the contact plate, whereupon the plate is released from the upper contacts and falls into engagement with the lower contacts. By means of the adjustable valve rod K94, the vent K96 may be adjusted to control the movement of the armature so that the restoring keys will be given ample time to fully return to their normal position.

Instead of actuating the individual restoring keys to cause restoration of the depressed keys in the various orders, the operator may actuate the general erasing key K76, which controls the contacts K84, K85. As before stated, there is normally a closed circuit through the lower coil K67, which circuit includes the resistance C102, the rheostat K129 and the contacts K84, K85. Upon depression, however, of the general erasing key, these contacts are opened and consequently the lower coil K67 is deprived of current, whereupon the upper coil K66 becomes effective to depress all the restoring keys. As soon as these restoring keys are depressed, the circuit is again closed through the coil K89. However, before the contact plate K99 reaches the upper contacts K101, K102, the contacts K84, K85 will have been closed again, the coil K83, which also surrounds the armature K108 of the general erasing key, having become effective to raise the key to normal position. The current flow through the upper coil K66 of the restoring keys is therefore interrupted, while that through the lower coil K67 is greatly increased and the restoring keys are restored, as before explained, this being followed by the breaking of the circuit through the coil K89 and the return of the armature K90 and the contact mechanisms controlled thereby into normal position. The restoring keys having all been simultaneously depressed, the raised digit keys are simultaneously restored. This restoration of the digit keys may also be accomplished automatically. The conductor C104, as before shown, normally connects with bus bar C7 through the contact wheel J267, and the lower coils K67 of the restoring keys are therefore provided with current. On this contact wheel J267 is a small section J268' of insulating material. As the main journal shaft J32 is rotated, the brush J270 and the contact wheel J267 remain in electrical contact until near the end of a revolution and until all operations controlled by the boards have properly taken place. The brush then engages the insulating section J268' and the conductor C104 is disconnected from the bus bar C7 and current flow through the lower coils K67 of the restoring keys is interrupted, thus permitting all restoring keys to be automatically depressed and the depressed digit keys to be raised. At the end of the revolution of the shaft J32 the brush again electrically engages with the wheel J267 and current is again supplied to the coils K67. The restoring keys upon the performance of their function are themselves restored, as before explained.

It may be desirable at times to retain the set-up of one or more keyboards for more than one entry, and to provide for such retention each board is provided with a repeating key K106, which controls the circuit through an auxiliary lower coil K67'. The contacts K109, K110 for this key are normally disconnected and the circuit through the coil K67' is normally open. When it is desired to retain the set-up in a keyboard the corresponding repeating key K106 is depressed to close the circuit through the auxiliary coil K67' as follows: from bus bar C6, through conductor C30, conductor C29, contacts K110, K109 of the repeating key, the auxiliary coil K67', and conductor C99 to bus bar C7; and although the circuit through the coil K67 is interrupted as the brush K270 engages the insulating section J268' on the wheel J267, the current flow through the auxiliary coil K67' maintains the restoring keys in their raised position. At the keyboards where the repeating key was not depressed, the restoring keys drop, of course, owing to the interruption of current flow through their lower coils K67. As shown in Fig. K5, the repeating keys when depressed are locked in their depressed position by the pawl K112, and a set-up may thus be retained for entry any number of times. A slight tap on the depressed repeating key disengages the pawl therefrom and the key is raised to its normal position through the action of the coil K83 which also surrounds the armature K108 of this key, the circuit through the auxiliary coil K67' being thereupon opened.

The coil K48 shown as bridging the bus bars C6 and C7 is the coil shown in Fig. K3 surrounding the armatures K50, at whose ends the ends of the key levers K41 are pivoted. This coil K48 is always energized and serves to float and tends to hold the key levers in their normal upper position.

The unit switches of the automatic switch sections, and their connections with the registers and the debit and credit keyboards, are diagrammatically shown in Fig. C4. The system may be designed for any number of unit switches and a corresponding number of registers. In the diagrammatic drawing are shown two primary switch sections for each of the two register-connecting-in boards and directly controlled thereby. For each set of primary switch sections there is a secondary switch section each of whose unit switches is directly connected with one of the registers in the panelboard, these registers being shown at the upper part of Fig. C4.

Fig. S1 shows a primary switch section comprising 100 unit switches. As explained in the switchboard specification, there are ten longitudinal rows or files of energizing coils and ten transverse rows or ranks of energizing coils, the unit switches being placed at the intersections of these coils and surrounded thereby. Each unit switch has two contacts, one controlled by the surrounding file coil and the other by the surrounding rank coil. In the diagrammatic drawing for want of room only the 0 file, the 90 file, the 0 rank and the 9 rank are shown, there being thus only four unit switches, but this is sufficient for the purpose of illustration. The rank and file coils in the primary switch section $Sc_1$ are controlled by the units and tens orders of keys in the credit keyboard, while the rank and file coils in the primary switch section $Sc_2$ are controlled by the hundreds and thousands orders in the credit keyboard. The coils in the primary switch section $Sd_1$ are controlled by the units and tens keys in the debit board, while those of the section $Sd_2$ are controlled by the hundreds and thousands keys in the debit board. There being four unit switches S7 for each primary section, the secondary switch section $Sc$ has four ranks and four files, giving a total of sixteen unit switches. The contacts $K136_0$—$K136_9$ are shown displaced from the debit and credit boards shown in Fig. C2, the units and tens orders of contacts of the credit board appearing below the primary switch section $Sc_1$, and the hundreds and thousands orders of contacts for that board appearing below the primary switch section $Sc_2$, while the units and tens orders and the hundreds and thousands orders of contacts of the debit board appear respectively below the switch sections $Sd_1$ and $Sd_2$. In Fig. K7 the exact arrangement of the key contacts is shown. Above the contacts $K136_1$—$K136_9$ are corresponding contact heads $K133_1$—$133_9$, these contact heads being carried with the digit key armatures and being normally disconnected from the contacts K136. The contact heads are always in electrical connection with their order frame sections K138, K139, and the pin K143, extending through these frame sections, is normally in electrical engagement with its contact $K136_0$. In each order of keys in both debit and credit boards the 0 contact is normally in connection, and as has been explained in the keyboard specification, depression of any digit key disconnects this normal contact and connects its contact head with the contact below the key depressed. The 0 contact $K136_0$ in the units order of the credit board connects with one terminal of the upper or 0 rank coil $S8_0$ in the switch section $Sc_1$. The contact $K136_9$ under the "9" key of the units order connects with one terminal of the coil of the upper or 9 rank $S8_9$. The intermediate contacts connect with intermediate coils which, however, are not here shown. The 0 contact in the tens order connects with one terminal of the left or 0 file coil $S9_0$, while the contact under the "9" key connects with one terminal of the right or 90 file coil $S9_{90}$, the intermediate tens order contacts being connected with intermediate file coils, which are not shown. The contacts of the hundreds keys each connect with one terminal of the rank coils in the section $Sc_2$, while the contacts of the thousands keys each connect with one terminal of the file coils of this section, and in the same manner the contacts in the debit keyboard connect with the coils in the switch sections $Sd_1$, $Sd_2$. One terminal of each of the unit switches S7 in the primary section $Sc_1$ connects with one terminal of a rank coil in the secondary section $Sc$, and one terminal of each of the unit switches in the primary section $Sc_2$ connects with one terminal of a file coil in the same secondary section $Sc$. In the same way the unit switches in the primary section $Sd_1$ connect with the rank coils of the secondary section $Sd$, and the unit switches in the primary section $Sd_2$ connect with the file coils of this secondary section $Sd$. One terminal of each of the unit switches in the secondary credit switch section is connected with one terminal of the corresponding unit switch in the secondary debit switch section by a cross-connecting conductor C105, and the two unit switches thus connected together connect by a common conductor C106 with one side of one of the register mechanisms shown at the top of Fig. C4. With four coils in each of the credit primary switch sections there are sixteen unit switches in the credit secondary section, and likewise there are sixteen unit switches in the debit secondary section, and with this arrangement and connection of coils as described, the unit switches in the secondary sections are numbered as shown. For example, one terminal of unit switch 99 in the credit secondary section connects through the cross-connecting conductor $C105_{99}$ with one terminal of the corresponding unit switch 99 in the debit secondary section, and these two unit switches, thus connected, connect by the common conductor $C106_{99}$ with one side of the register numbered 99 at the top of the drawing. There is no number 0 register shown, but the 0 unit switches in the secondary sections are connected together at one terminal of each through the conductor $C105_0$, which conductor includes the coils C107, C108 surrounding the armature C109 of the relay C110, whose function will be presently described.

As before explained, the 0 contacts of the keyboards are normally closed, whereupon the following circuit is completed: from bus bar C6, through conductor C111, the 0 contacts of the units order of the credit keyboard, conductor C112, the 0 rank coil of the units-tens primary section $Sc_1$, the common conductor C113, the 0 file coil of the same section and conductor C114 to the 0 contacts of the tens order; thence through conductor C115, the 0 contacts of the hundreds order, conductor C116, the 0 rank coil of the hundreds-thousands primary section $Sc_2$, the common conductor C117, the 0 file coil of the same section and conductor C118 to the 0 contacts of the thousands order; thence through conductor C119, the 0 contacts of the units order of the debit board, conductor C120, the 0 rank coil of the units-tens primary section $Sd_1$, the common conductor C121, the 0 file coil of the same section and conductor C122 to the 0 contacts of the tens order; thence through conductor C123, the 0 contacts of the hundreds order, conductor C124, the 0 rank coil of the hundreds thousands primary section $Sd_2$, the common conductor C125, the 0 file coil of the same section and conductor C126 to the 0 contacts of the thousands order, and thence through conductor C127 to bus bar C7. Thus the unit switches $S7_0$ at the intersection of these normally energized rank and file coils of the primary sections have their contacts closed, and current flows as follows: from bus bar C6, through conductor C111, conductor C128, the common conductor C129 connecting together one terminal of all the unit switches of the credit primary switch section $Sc_1$, conductor C130, the 0 rank coil of the credit secondary switch section $Sc$, the coil C131 of the relay C25, the common conductor C132, the 0 file coil of the same section, the coil C133 of the relay C25, the 0 unit switch $S7_0$ of the credit primary switch section $Sc_2$, the common conductor C134 and the coil C135 of the relay C25 to conductor C136; thence through coil C137 of the relay C110 and coils C138 and C139 of the relay C140 to conductor C141; thence through the common conductor C142, the 0 unit switch $So_2$, the common conductor C134 unit switch $S7_0$ of the debit primary section $Sd_1$, conductor C143, the 0 rank coil of the debit secondary switch section $Sd$, coil C144 of the relay C24, the common conductor C145, the 0 file coil of the same debit secondary section, coil C146 of relay C24, the 0 unit switch $S7_0$ of the primary switch section $Sd_2$, the common conductor C147, coil C148 of relay C24 and conductor C127 to bus bar C7. The 0 unit switches of the secondary switch sections, being at the intersections of the corresponding rank and file coils, have both contacts closed. As before stated, these unit switches are connected together at one terminal of each through the conductor $C105_0$, which includes the coils C107 and C108 of the relay C110. These 0 secondary unit switches are connected together at their other terminals through the following circuit: from the 0 unit switch in the section $Sc$, through the common conductor C149, conductor C150, coil C151 of relay C110, conductor C152, coil C153 of relay C154, coil C155 surrounding the armature C156 and coil C157 surrounding the armature C158 to the negative terminal of battery C159; thence through this battery to conductor C160, contacts C162 and C163 which are normally connected by the armature C158, conductor C164 and battery C165 to conductor C166, and thence through coil C167 surrounding the armature C158, coil C168 surrounding the armature C169, coil C170 surrounding the armature C169, coil C170 surrounding the armature C154, conductor C171 and the common conductor C172 to the other terminal of the 0 unit switch in the section $Sd$. The other terminal of each register is connected with the common conductor C173. The circuit just traced is normally completed between the other terminals of the 0 unit switches of the secondary sections, but if a register is connected in from the debit board and one from the credit board, the circuit through the 0 unit switches is opened and the circuit is closed through other unit switches corresponding to the numbers of the registers connected in, and the circuit just traced between the common conductors C149 and C172 in the secondary sections is completed through the unit switch in the debit section and through conductor C105 to conductor C106, connecting this switch with one side of the corresponding register; thence through the register, the common conductor C173, the register actuated by the credit board, the conductor C106, the conductor C105 and the corresponding unit switch in the credit section to the common conductor C149. For instance, suppose register number 909 is connected in from the debit board and register number 9090 from the credit board, the circuit before traced between the common conductors C149 and C172 of the secondary sections, including the various relay and signal mechanisms at the lower part of Fig. C2, is closed through the following circuit: from common conductor C172, through unit switch number 909 of section $Sd$, conductor $C105_{909}$, conductor $C106_{909}$, the coils of register 909, common conductor C173, the coils of register 9090, conductor $C106_{9090}$, conductor $C105_{9090}$, and unit switch 9090 of section $Sc$ to the common conductor C149.

For each register mechanism there is the polarized electromagnet R84 controlling the clutching mechanism, this being shown in Fig. R1. An unpolarized electromagnet R59 is also provided for each register mechanism, and these two electromagnets are serially connected between the common conductor and the individual register lead. As has been explained in the description of the register mechanism, the direction of movement of the armature of the polarized relay R84 determines whether the clutch is moved to cause positive rotation of the register numeral wheels, or negative rotation thereof. The registers connected in by the debit board should be rotated in a positive direction, and therefore current flow through the polarized relay R84 should be in such direction that the clutch is thrown in to cause positive rotation. Upon examination of the batteries C165 and C159 which are included serially in the circuit before traced, it is obvious that the current flow through the coils of one register is from its individual lead and to the common conductor, whereas the current flow through the coils of the other register is from the common conductor and to its individual lead, and therefore the current flow through the register connected in by the credit board is always in a direction opposite to that of the current flow through the register connected in by the debit board. In other words, the clutching mechanisms of all registers connected in by the debit board are actuated to cause positive operation of these registers, whereas the clutching mechanisms of all the registers connected in by the credit board are actuated to cause negative operation of these latter registers. The various contacts shown in actual position at the top of Fig. R1 are diagrammatically shown in Fig. C4. The brush R206 carried on the end of arm R81 normally engages the contact R207a. The contact R207b is the one engaged by the brush when the clutch arm is actuated to cause negative rotation of the registers, while the contact R207c is engaged by the brush when the clutch mechanism is actuated to cause positive rotation. The arm R210 normally engages the contact R211a, this being the position when the register is operating on the positive side of zero. The contact R211c is engaged by the arm when the register is operating on the negative side of zero. The intermediate contact R211b, when engaged by the arm R210 may control a circuit which indicates the passage of the register through zero. However, in the circuit system as shown, this contact is not actually used, and the passage of the register through zero is indicated by a change of the indicating mechanism from + to −, or vice versa. Between the lead for each register and the arms R81 and R210 is connected an impedance coil C174, and between the common conductor and the arms R81 and R210 in each register mechanism is a condenser C175. Also connecting contacts R207c with the common conductor is a resistance C176. The contact R207b, however, is connected directly with the common conductor. The relations are such that when current flows from the individual lead through the polarized magnet to the common conductor, the clutch arm R81 is moved into engagement with the contact R207c, which contact connects with the common conductor through the resistance, while if the current flows from the common conductor through the polarizing magnet, the clutch arm is moved into engagement with the contact R207b, which is directly connected with the common conductor, and therefore the circuit through the register connected in to operate positively is of greater resistance than that through the register connected in to operate negatively. The utility of this difference in resistance will be later further explained.

The coils C107, C108 of the relay C110 act cumulatively and their joint resistance is equal at least to that of two registers, and thus normally when no significant numbers are set up in the keyboards, there is no short circuit of the register batteries C159 and C165. The magnetic thrust from these coils upon the armature of relay C110 is toward the left, while the thrust of coil C151 of this armature is toward the right, the latter tending to close the contacts C52, C53, which are included in the circuit controlling the unlocking electromagnet K124. The ampere turns of these coils are so apportioned that until the current is withdrawn from both coils C107, C108 by the setting-up of significant figures upon the debit and credit keyboards, the coil C151 cannot become effective to cause closure of the contacts C52, C53, and thus the general operating key is not unlocked unless two registers are connected in for operation at one time. Through the coil C137 on the armature of relay C110 current continually flows, as it is included in circuit with the digit keys, and the ampere turns of this coil are sufficient to hold the armature in its position to the left away from the contacts C52, C53 only when either or both of the coils C107, C108, are energized.

When significant digits of a number are first set up on the debit board current flows from the register battery C165, through the coils C167, C168 and C170, the conductor C171, the actuated unit switch in the section Sd, the corresponding register lead and register coils, the common conductor C173, coil C107 of relay C110, conductor C105a, the 0 switch on switch section Sc, common conductor C149, conductor C150, coil C151 of relay C110, conductor C152, coils C153, C155 and C157, battery C159 and contacts C162 and C163 to battery C165. Although the coil C108 is disconnected from the circuit upon the actuation of a significant unit switch on the section Sd, the coil C151 is still unable to move the armature to close contacts C52, C53, the coil C107, together with the coil C137, maintaining the armature in its position to the left. As soon, however, as a significant number is set up on the credit board the current from the register connected in by the debit board flows through the common conductor to the register connected in by the credit board, through the corresponding unit switch in the section Sc, the coil C151, and back to the battery C165, the coil C107 being now also removed from the circuit upon opening of the circuit through the 0 unit switch in the credit secondary section. The coil C151 overpowers the coil C137, and now moves the armature of the relay to close the contacts C52, C53, whereupon the unlocking electromagnet K124 is energized to withdraw its armature from locking engagement with the general operating key. In this differential relay, whose action has just been described, is provided a means for demanding of the operator the setting-up of significant figures upon both the debit and the credit keyboard, thus preventing him at any time from making an entry in one register without a similar counterbalancing entry in another register. A conductor C177 connects the common terminal of the coils C107, C108 with the common terminal of the coils C178, C179 surrounding the armature C158, the other terminal of the coil C178 connecting through conductor C164 with the negative side of battery C165, while the other terminal of the coil C179 connects through conductor C160 with the positive terminal of battery C159. The coils C178 and C179 act cumulatively on the armature C158, but under normal conditions the current flow through these coils is small and performs no special function. Upon abnormal conditions taking place, such, for instance, as setting up the same number on the debit and credit boards, the current flow through the secondary switch sections fed by the batteries C159 and C165 becomes excessive, as upon thus setting up like numbers on the debit and credit boards the corresponding switches in the secondary switch sections are actuated, and as before stated, these similar switches are connected directly together. Upon a short circuit causing excessive current flow, the coils C157 and C167 raise the armature C158, and as the armature is raised the contacts C162 and C163 are opened, and a circuit of substantial resistance of the coils C178 and C179 is substituted, which holds the armature C158 in a raised position and thereby reduces the current flow to a safe amount until dissimilar set-ups have been made and the short circuit has been removed. However, as will be described later, automatic means are provided for preventing duplicate set-ups, thus removing the danger of short circuits from this source.

Relays C24 and C25 are shown in Fig. C4 associated with the switch sections to show the connection of their coils with the switch section circuits. In Fig. C2 these relays are again shown to illustrate their relations to the contacts controlled thereby. This arrangement has been chosen in order that the various circuits controlling and controlled by these relays may be more plainly illustrated. As has also been explained, the three coils C131, C133 and C135 for relay C25, and the three coils C144, C146 and C148 for relay C24 are normally serially included in the circuits previously traced, these circuits including the 0 unit switches of the primary switch sections and the 0 rank and file coils of the secondary sections. The upward thrusts of the upper coil C131 and the intermediate coil C133 of the relay C25 are together greater than the downward thrust of the lower coil C135, and consequently the armature of this relay is normally held in a raised position to close the circuit through the contacts C78, C79. The same is true of the similar coils of relay C24, this relay being normally in position to cause closure between the contacts C76, C77. The upward thrust of either the upper or the intermediate coil alone, however, is less than the downward thrust of the lower coil. The lower coils C135 and C148, respectively, of these relays are always included in circuit, being connected with the common conductors of the unit switches of the primary sections $Sc_2$ and $Sd_2$, respectively.

Whenever a significant figure is set up on either the debit or the credit board, the corresponding upper or intermediate coil, or both, are disconnected from circuit and de-energized, thus in either case allowing the lower coil to move the armature to connect together the lower contacts, these lower contacts controlling the unlocking of either the credit or the amount keyboard. Thus when a number is set up on the debit board consisting only of significant units or tens, or both, the upper coil C144 of the relay C24 is disconnected from circuit, while if the number set up consists, in addition thereto, of significant hundreds or thousands, or both, then both coils C144 and C146 are disconnected from circuit, and in either case the relay C24 is actuated by the coil C148 to close contacts C19, C20, whereupon current is supplied from the bus bar C7 to the credit board which then becomes operative. In the same manner, if significant digits are similarly set up on the credit board, either one or both of the coils C131 and C133 of the relay C25 become disconnected from circuit and the relay is actuated to close contacts C21, C22, whereupon current is supplied from bus bar C7 to the amount board, which is thereby unlocked and rendered operative. Upon setting up a number on the amount keyboard, as before explained, the electromagnet C39 becomes energized, opening a circuit normally closed by the contacts C81, C82, C83 and closing the checking circuit at the contacts C46, C47, C48, and upon proper actuation of the checking mechanism before described, the completed manipulation of the keyboards is mechanically recognized by the unlocking circuits through the unlocking electromagnets K124 and K125 being entirely closed, and these electromagnets are energized to cause release of the general operating key.

When two registers are connected in they should be connected in counterbalancingly. The register to receive the positive or debit entry should be connected in by the debit board and such register should be connected in to be operated in a positive direction, while the register to receive the counterbalancing negative or credit entry should be connected in by the credit board and should be connected in to operate in a negative direction. As before explained, however, the resistance through an operating register is greater when the mechanism is operated in a positive direction than when it is operated in a negative direction, on account of the resistance C176. The circuit through the register receiving the debit entry therefore has greater resistance than the circuit through the register receiving the credit entry, these circuits through the registers being established by the intermediate conductor C177 extending from the common conductor C173 to the common terminal of the coils C178 and C179, each of whose other terminals connects with the batteries C159 and C165, as before explained, these battery sections being of like strength. The circuit through the register receiving the positive entry is traced as follows: from the battery C165, through coils C167, C168 and C170, conductor C171, the actuated unit switch in the section Sd, the register lead and its polarized magnet R84 and electromagnet R59, the common conductor C173, the intermediate conductor C177 and coil C178 to the other side of battery C165. The polarized relay R84 of the register included in this circuit is energized and controls the clutch arm to cause positive operation of the register and to engage the contact R207c, thereby including the resistance C176 in the circuit just traced and the register numeral wheels are operated in a positive direction. The circuit through the register receiving the negative entry may be traced from the positive pole of battery C159, through coil C179, intermediate conductor C177, the common conductor C173, electromagnet R59, polarized magnet R84, the register lead, the corresponding unit switch in the section Sc, conductor C150, coil C151, conductor C152 and coils C153, C155 and C157 to the other terminal of battery C159. The polarized relay R84 of the register included in this circuit is energized and controls the clutch arm to cause negative operation of the register and to engage the contact R207b, thereby largely removing the resistance at the register in the circuit just traced, and the register numeral wheels are operated in a negative direction. The resistance of C176 is greater than that of the coil C151, which latter is practically negligible, so that the current flow through the credit circuit is greater than that through the debit circuit, and this difference in resistance is utilized for controlling indicating mechanisms which indicate to the operator the direction of operation of the registers.

The armatures C156 and C169, surrounded respectively by the coils C155 and C168, are connected together by the shaft C180, and thus these armatures are thrown either to the right or left, depending upon which of the coils is more strongly energized. Normally the armatures are thrown to the right because the coil C155 is in the circuit controlling the register operating in a negative direction, which, when the register is connected in, has the smaller resistance; but should the registers be connected in with their normal relations reversed, the armatures would be thrown to the left because the coil C155 would be in the circuit controlling the register then operating in the positive direction, which, when a register is connected in, has the larger resistance. Should the registers be connected in to operate both in the same direction, there will be no difference in resistance in the two circuits, and consequently there will be no transverse movement of the armatures C156 and C169, and the registers might be connected in to operate both in a positive or both in a negative direction. To provide some means which will indicate to the operator this condition, these armatures are adapted for a slight rotary movement which is produced by the armatures C158 and C154. A rack bar C181 extends downwardly from the armature C158, and a rack bar C182 extends upwardly from the armature C154, the ends of these rack bars being adapted for driving engagement with the ratchet wheel C183, which wheel is keyed to the shaft C180 in such manner that it may cause rotation thereof but also allows the shaft to slide freely therethrough. The circuits for the various coils of these armatures have already been traced several times. The teeth on the rack bars are normally out of engagement with the teeth on the ratchet wheel. When two registers are connected in properly the armature C158 remains in its lower position to connect together the contacts C162, C163, but if the two registers are both connected in negatively the resistance of the register circuits is so reduced that excessive current flows through the coils C157 and C167 to raise the armature C158 to open the low resistance path through the contacts C162, C163, thus causing the current to flow through the coils C178 and C179. When the armature C158 is raised the ratchet wheel C183 and the armatures connected therewith are rotated in a clockwise direction, but as the resistances of the two register circuits are equal, there is no translatory motion of the armatures. At the left end of the armature C169 is a contact arm C184 normally disconnected from the contacts C185 and C186, but upon clockwise rotation of the armatures this contact arm engages both the contacts, provided there has been no translatory motion.

If both registers are connected in to run in a positive direction, equal resistances of a moderate amount are included in the two circuits and the current flow is reduced so as to be insufficient to cause actuation of the armature C158 by the coils C157 and C167, but the current is sufficient to cause the armature C154 to be raised by the coils C153 and C170. The ratchet wheel and the armatures connected therewith are consequently rotated in a counterclockwise direction, but there is no translatory movement of the armatures, as the currents in the two circuits are equal. From the right end of the armature C156 extends the contact arm C187 normally disengaged from the contacts C188 and C189, but upon counterclockwise rotation of the armatures this contact arm engages both the contacts, provided there has been no translatory motion. The coils C153, C170 and C157, C167 are always included in circuit and always tend to raise their armatures, but these coils are so proportioned that when two registers are connected in both negatively the effect of the coils C157, C167 overpowers that of the coils C170, C153, and the resultant rotation of the ratchet wheel is in a clockwise direction; while when the registers are both connected in positively, or when they are connected in opposingly, then the current strength is insufficient to actuate the armature C158, but is sufficient to actuate the armature C153, thereby causing counterclockwise rotation of the ratchet wheel and of the mechanism rotated thereby. These different movements of the armatures C169 and C156, corresponding to the direction of operation of the registers, is indicated to the operator on dials C190d and C190c, shown respectively in Figs. C5 and C6 and mounted respectively on the armatures C169 and C156, the representation of this dial-indicating mechanism being diagrammatic and the dials being shown in separate figures for the sake of clearness. These dials are provided with indicating characters +, — and □, the □ indicating the absence of any connecting-in and being normally disposed within the sight openings C191d and C191c. Directly above the □ character is a — character, while directly below the □ character appears a + character on the dial. Dial C190d has a + character at its left and a — character at its right, while dial C190c has the + character at its right and the — character at its left. In this dial arrangement when two registers are both connected in negatively the armatures are rotated in a clockwise direction to move the upper — characters on the dials into the sight openings and the operator knows that both the registers have been connected in negatively.

If both the registers are connected in positively the armatures, as explained, are rotated in a counterclockwise direction and the lower middle + characters are moved into the sight openings. When the registers are connected in opposingly, that is, one positively and the other negatively, there are both rotation and translation of the dials. In such cases, only armatures C156, C169 and C154 are actuated, armature C158 responding only to excessive current flow. If the debit board has caused a register to be connected in positively and the credit board has caused a register to be connected in negatively, the coil C155 receives the greater current flow, and consequently the armatures and the dials thereon are moved toward the right, and the armature C154 upon rising causes counterclockwise rotation of the armatures and dials, and therefore on dial C190d the lower left + character is carried into the sight opening, and on dial C190c the lower — character is carried into the sight opening, indicating to the operator that the registers have been properly connected in. If a register connected in by the debit board should operate negatively, and a register connected in by the credit board should operate positively, then the coil C168 would receive the greater current flow and the dials would be moved to the left and rotated counterclockwisely by the armature C154, and thus in dial C190d the lower — sign would be moved to the sight opening, and on dial C190c the lower right + character would be moved into the sight opening. By this indicating arrangement, whenever during an operation the indications are + on the dial C190d and — on the dial C190c, the operator is informed that the connected-in registers are operating in the proper directions, namely, that the register indicated by the number set up on the debit keyboard is mechanically connected in to receive the entry in a positive direction so that the account will be debited, and that the register indicated by the number set up on the credit keyboard is connected in to receive the entry in the negative direction so that the account will be credited. If the indications should not be as above stated, the operator is informed either that the registers are not connected in at all or that they are not connected in properly. However, as will be disclosed later, automatic mechanical means are provided for preventing an attempted operation of the registers except when they connect in properly.

The different movements of the armatures C156 and C169 are also indicated upon the type wheels J341 and J343, whose movements are respectively controlled by the electromagnets J345 and J347, shown in Figs. J29 and J31, and described in the journal mechanism specification. The electromagnet J345 has the upper and lower coils J345u and J345l, respectively, while the electromagnet J347 has the upper and lower coils J347u and J347l, respectively. At the left of the armature C169 there is also a contact member C192 adapted to be electrically engaged by the armature when in its left position. A contact member C193 is disposed to be engaged by the armature C156 when in its right position. This contact member connects with one terminal of the coil C194 surrounding the armature C195. The other terminal of this coil is connected with the contact C186 through conductor C196, and with one terminal of the coil J347l through conductor C197. The contact member C192 connects with contact C185 and with one terminal of coil J345l through conductor C198. The contact C188 connects with one terminal of the coil J347u through conductor C199, the other terminals of the coils J347u and J347l being connected together and with conductor C200. The contact C189 connects with one terminal of coil J345u through conductor C201, the other terminals of the coils J345u and J345l being connected together and with conductor C202. Conductor C200 connects with the bus bar C6, and conductor C202 connects with bus bar C7.

Armature C195, upon energization of the coil C194, is actuated to close the contacts C203 and C204, which contacts control a special automatic stopping circuit for the master machine motor, as will be described later. As will now be shown, the relay C195 is not actuated until the registers are properly connected in, that is, until the armatures C156 and C169 are moved toward the right and rotated in a counterclockwise direction. When two registers are connected in both negatively, or when the same numbers are set up on the debit and credit boards, the short circuit resulting, as before explained, causes the armature C158 to be raised and the dial armatures to be rotated in a clockwise direction to carry contact C184 into engagement with contacts C185 and C186, and the following circuit is closed: from bus bar C6, through conductor C200, coil J347l, conductor C197, conductor C196, contact C186, contact arm C184, contact C185, conductor C198, coil J345l and conductor C202 to bus bar C7. The lower coils of electromagnets J345 and J347 becoming thus energized, their armatures are drawn down and the indicating wheels of the journal mechanism J341 and J343 are rotated in a clockwise direction to carry the — characters thereon into the line of print, this movement of the type wheels being best shown in Fig. J.

If two registers are connected in to operate positively the result, as before explained, is decreased current flow and actuation only of the armature C154 to cause counterclockwise rotation of the dial armatures, whereupon contacts C188 and C189 are closed by the contact arm C187, and current flows as follows: from bus bar C6, through conductor C200, upper coil J347u, conductor C199, contact C188, contact arm C187, contact C189, conductor C201, upper coil J345u and conductor C202 to the bus bar C7. The upper coils of the electromagnets J345 and J347 becoming thus energized, the type wheels J341 and J343 are rotated in a counterclockwise direction to bring the positive characters thereon into the line of print. If the register connected in by the debit board is connected in to operate negatively and the register connected in by the credit board is connected in to operate positively, there is more current flowing through coil C168 of armature C169 than through coil C155 of armature C156, and these armatures are moved toward the left and into engagement with the contact C192. Armature C154 is also raised to cause counterclockwise rotation of the dial armatures and thereby to cause engagement of contact arm C187 with the contact C188. Armature C158, which is actuated only upon excessive current flow, under this condition is not actuated. Current now flows as follows: from bus bar C6, through conductor C200, upper coil J347u, conductor C199, contact C188, contact arm C187, armature C156, connecting shaft C180, armature C169, contact C192, conductor C198, lower coil J345l and conductor C202 to bus bar C7. The lower and upper coils of the electromagnets J345 and J347 respectively, being thus energized, the type wheels J341 and J343 are rotated respectively in a clockwise and counterclockwise direction and the — character on type wheel J341 is carried into the line of print, while the + character on type wheel J343 is carried into the line of print. If the registers are connected in properly, that is, if the register connected in by the debit board is connected in to operate in a positive direction and the register connected in by the credit board is connected in to operate in a negative direction, the coil C155 receives the greater current flow and the armatures C156 and C169 are carried to the right into engagement with contact C193. Armature C154 is also raised to cause counterclockwise rotation of the dial armatures, whereupon contact arm C187 is brought into engagement with contact C189. Current then flows as follows: from bus bar C6, through conductor C200, lower coil J347l, coil C194 of relay C195, contact C193, armature C156, contact arm C187, contact C189, conductor C201, upper coil J345u and conductor C202 to the bus bar C7. The upper and lower coils of electromagnets J345 and J347, respectively, becoming thus energized, the type wheels J341 and J343, respectively, are rotated in a counterclockwise and clockwise direction, and the + character on type wheel J341 is carried into the line of print and the — character on type wheel J343 is carried into the line of print, this being the arrangement which results from the proper connecting-in of the registers. It is only when this condition prevails that the relay C195 is actuated to control the circuits which allow complete operation of the master machine.

The motor arrangement for driving the master machine mechanism is diagrammatically shown in Fig. C3. The motor M437 connects with the pinion M438 through shaft M439, which pinion engages with the driving gear M440 connected to the main driving shaft M8 on which is mounted the contactor M382 already referred to. On the master machine shaft or sleeve M11 connected with the driven half of the clutch, is a contact wheel M442 normally electrically engaged by the brush M443, the insulating segment M443' being, however, engaged by the brush at the end of half a revolution of the shaft. On shaft M439 is also the brake pulley M444 surrounded by the brake strap members M445, M446 normally held in clamping engagement with the brake pulley by spring or other means, not shown, an electromagnet M447 being adapted upon energization to spread the brake strap members to release the brake pulley. This electromagnet and the motor are connected serially in a circuit which is connected with the supply circuit C205 upon closure of the switch C206. In this motor circuit is the gap C207 adapted to be closed by the armature C208 controlled by the coil C209. One terminal of this coil connects with conductor C210 of the motor circuit, and the other terminal connects with the conductor C211 leading to the brush M443, normally in electrical contact with the wheel M442 which connects through conductors C212 and C213 with conductor C214 of the motor circuit, and when switch C206 is closed current flows through the coil C209 and through the brush and contact wheel, the armature being thereupon actuated to close the motor circuit. Conductor C211 is extended to contact C203 of relay C195, and conductor C212 is extended to contact C204 of this relay. These contacts are therefore in parallel with the contact brush M443 and wheel M442, and therefore if these contacts are closed the contact between the brush and wheel may be opened without opening the circuit through coil C209. When the master machine clutch is connected with the motor driven half of the clutch, and the master machine main driving shaft begins to revolve, it turns with it the contact wheel M442, which, upon making nearly one-half of one complete revolution, brings the insulating sector M443' under the brush M443, thus opening the circuit which normally closes through the coil C209, and if the parallel contacts C203, C204 are opened the coil releases its armature C208, whereupon the motor circuit is opened and the brake pulley immediately engaged by the brake arms to bring the motor to a quick stop. At the completion of the first half of this first revolution of the main shaft of the master machine the registers have been mechanically connected in, and if proper operation of the debit and credit keyboards and of the switch sections has taken place, the circuits previously described will be properly controlled to energize the relay C195 to close contacts C203, C204 and the motor circuit will remain closed and the master machine will continue its operations and actuate the registers to properly receive the amount set up on the amount board.

An arrangement has just been described whereby indications are given showing in which direction the connected-in registers will operate, it having also been shown how the master machine is allowed to continue its operation of actuating the registers providing they have been properly connected in, and an arrangement will now be described whereby indications are made showing the nature of the balance in any particular register during the time that this register is connected in the circuits. These indications are shown by the position of the relay armatures C223 and C225, indicating the nature of the balance in the register electrically connected by the debit board and in the register electrically connected by the credit board, respectively, and they are also shown on the journal by means of the type wheels J342 and J344 and the type levers J385d and J385c. The type wheels have the indicating signs or type characters +, □, and —, the □ character indicating a failure of proper signal, and the + and — signs indicating that the register indicated resultants are respectively positive and negative with respect to zero. The electromagnets J346 and J348 controlling these type wheels each has an upper and a lower coil represented by J346u and J346l and J348u and J348l. One terminal of all these coils is connected to the common conductor C215 which connects through conductor C200 with bus bar C6. The other terminals of the coils J346u and J346l terminate, respectively, in contact pieces C216 and C217, which, with contact piece C216' are arranged in a row as shown. The contact piece C216' connects with one terminal of a coil J392d, whose other terminal connects with the common conductor C215'. The other terminals of the coils J348u and J348l terminate, respectively, in the contact pieces C218 and C219, which, with contact piece C218', are arranged in a row, as shown. The contact piece C218' connects with one terminal of a coil J392c, whose other terminal connects with the common conductor C215'. This common conductor C215' connects through conductor C260, contacts M413, M410 and conductor C37 to bus bar C6, and thus it becomes connected upon the closing by the master machine of the contacts M413, M410, at the time of operation of the register printers. Opposite to the contacts C216, C217 and C216' is the common contact piece C220, and opposite to the contacts C218, C219 and C218' is the common contact piece C221, these common contact pieces being connected together through conductor C222, which connects with conductor C202 leading to bus bar C7. The type levers J385d and J385c, containing the type characters D and C, respectively, are operated by the coils J392d and J392c, respectively, and are associated with the journal mechanism as heretofore described; the former, bearing the D characters, being actuated upon the debitingly-operating register coming to rest at zero, and the latter, bearing the C characters, being actuated upon the creditingly-operating register coming to rest at zero. Upon connecting any one of the individual contacts with one of the common contacts, its coil is energized, thereby actuating the type as indicated above. Associated with the contacts is the armature C223, whose contact head C224 is adapted to connect the common contact member C220 with any one of the contacts C216, C217 and C216', this head being normally out of engagement therewith. Likewise the armature C225 controls the contacts C218, C219 and C218', the contact head C226 being normally out of engagement therewith.

The armatures C223 and C225 are actuated by an alternating current which is superposed on the same circuits which control the dial armatures C156 and C169. One terminal of the coil C227 for the armature C223 connects with conductor C171 through a condenser C228. One terminal of the coil C229 for the armature C225 connects with the conductor C152 through a condenser C230. The other terminals of these coils connect together through conductor C231 and with one terminal of the secondary coil C232, whose other terminal connects through conductor C233 and the intermediate conductor C177 with the common register conductor C173. The secondary coil receives current from the primary coil C234 suitably connected with a source of alternating current supply. The inductance through the coils on the armatures C156, C169, C158 and C154 is sufficiently great so that any alternating current from the transformer will pass through the condensers and through conductors C152 and C171 and through the secondary unit switches to the register mechanisms. In each register mechanism, as explained previously, the arm R210 is shifted to either a front or a rear position and is connected with the shutter mechanism of the particular register. When this arm is in engagement with contact R211c (Fig. C4) the register is operating on the negative side of zero, whereas if this arm is in engagement with contact R211a the register is operating on the positive side of zero. The contact R211c, however, is the only one utilized in the circuit diagram and is connected with the register lead from the switch sections, through the impedance coil C174', whose impedance is less than that of impedance coil C174, and when the arm R210 engages this contact the alternating current encounters a reduced resistance through the register mechanism. However, when the arm is in engagement with the contact R211a, there is included in circuit with the condenser the impedance coil C174, and in parallel therewith the very high impedance coils of the magnets R84 and R59, the resistance to the alternating current being therefore greatest when the register is operating on the positive side of zero. The arm R176 is also connected with the common conductor C173 through condenser C175. The mechanical relation of this arm is shown plainly in Fig. R1, being in engagement with contact R253 when the register rests at zero. This contact R253 is connected directly with a register lead C106 and when engaged by the arm R176, both impedances C174 and C174' are shunted from the alternating current circuit. The various condensers, impedances and inductances shown in these circuits prevent interference between the direct and alternating current circuits.

With this arrangement of controlling apparatus just described, when the balances on the registers are both positive or both negative or both at zero, equal amounts of current flow in the two branches of the alternating current circuit. If these balances are both positive the smallest amount of current flows; if they are both negative a greater amount of current flows, and if they are both at zero the greatest amount of current flows, for the reasons given. However, should the balances be of different natures in the registers, unequal amounts of current will flow in the two branches. The coil C227 is controlled by the register connected in debitingly, while the coil C229 is controlled by the register connected in creditingly. The relative amount of current received by each coil for any set-up depends upon the nature of the balances in the registers, as has been explained. The resistance of the circuits determines the amount of actuation of the armatures in the coils. If a register's balance is positive the resistance is highest and the current flow is sufficient only to raise the particular coil armature to close the first individual contact; if the register's balance is negative more current flows and causes the armature to be raised to close the second individual contact, while if a register is at rest at zero, the greatest amount of current flows and the armature is raised to close the third or upper individual contact. The first and second contacts control circuits including electromagnets which actuate journal type wheels heretofore mentioned. The third contact controls circuits including electromagnets which actuate journal type levers heretofore mentioned. Thus the first and second contacts control electromagnets connected in circuit to cause either clockwise or counterclockwise rotation of the connected type wheel. For example, suppose the balance of each register is positive: alternating current flows from the transformer secondary to one terminal of both coils C227 and C229. One branch flows through condenser C228, conductor C171, the secondary unit switch actuated by the debit board, the corresponding register conductor, the impedance C174 and condenser C175 at the register connected in debitingly, into and through the common conductor C173, through intermediate conductor C177 and conductor C233, to the other terminal of the transformer secondary. The other branch of the alternating current flows through the coil C229, condenser C230, conductor C152, condenser C235 (which is bridged about coil C151 to avoid the impedance thereof), through conductor C150, the secondary unit switch actuated by the credit board, the corresponding register conductor, the impedance C174 and condenser C175 at the register connected in creditingly, into and through the common conductor C173, through the intermediate conductor C177 and the conductor C233 back to the transformer secondary. As the impedance is connected in circuit in both registers, only sufficient current flows to cause the contact heads of the armatures C223 and C225 to be connected with the lower contact members C217 and C219 and with the common contact members C220 and C221, thus allowing current flow through the lower coils J346l and J348l, through the following circuit: from bus bar C7, through conductors C202 and C222 to both common contact members C220 and C221, part of the current flowing thence through contact head C226, contact C219 and lower coil J348l to conductor C215, the remaining current flowing through contact head C224, contact C217 and lower coil J346l to conductor C215, the full current from that point flowing through conductor C200 to bus bar C6. The type wheels J342 and J344 are thereby rotated in a clockwise direction to bring their positive characters into the line of print. If the balance of each register is negative the impedances are reduced and the current flows increased. The armatures C223 and C225 are thereby raised sufficiently to carry their contact heads to connect the middle contacts with the common contact members, and the circuit from the bus bars is traced through the upper coils J346u and J348u, whereupon the type wheels are rotated in a counterclockwise direction to carry the negative characters into the line of print.

If both registers come to rest at zero, their impedances are short circuited, thus causing a maximum alternating current flow, thereby raising the contacts of the armatures C223 and C225 to close the third contacts, which in turn close the circuits of the coils J392d and J392c, thus actuating type mechanisms indicating upon the journal the cleared condition of the registers. These coils J392d and J392c surround the armatures J391d and J391c, respectively, which are connected to the special type levers J385d and J385c, shown in Fig. J6 and described in the journal mechanism description. If, after an entry, the register comes to rest at zero, which is the case when an account is closed, the arm R176 of that register moves to engage contact R253, and the corresponding coil becomes energized to actuate the corresponding type lever to print on the journal page. The type lever controlled by coil J392d carries the type D, while the lever controlled by the coil J392c has the type C. Thus if a register being debited comes to zero position after an entry, coil J392d becomes energized and the type lever is thrown to print D, while if the register being credited comes to zero position after an entry, coil J392c is energized and the type lever is thrown to print C on the journal page.

Further explanation and tracing of the circuits actuating the balance-indicating mechanism is unnecessary, as it is obvious that, whatever the nature of the balance upon a register, its impedance is controlled in accordance therewith, and thus the indicating-relay mechanism is caused to indicate the nature of the balances in the connected registers independently of each other. The operator by watching the position of the armatures C223 and C225 can directly read therefrom the nature of the balance of each register. Instead of this armature arrangement incandescent lamps may be substituted for the coils of the armatures, which will be dimly lighted when the balance indicated is positive, more brightly lighted when the balance is negative, and brilliantly lighted when the register comes to rest at zero. Both the lamps and the armature arrangement may be used, in which case the lamps may be included serially in circuit with the coils. To ascertain at any time the nature of the balance in any register, it is only necessary to strike the number of that register upon one of the boards and to note the indication produced by the armature C223 or C225, the debit board being unlocked (more directly for this purpose) by actuating the electromagnetic key C23, this causing connection of contacts C17, C18 to close the supply circuit through the debit board.

It may happen that after setting up a number on the debit keyboard the operator will inadvertently strike the same account number on the credit keyboard. From an accounting standpoint this would be an errer, since no account should both be debited and credited in the same entry, and mechanism for automatically causing erasure of this erroneous set-up on the credit keyboard will now be described. The coils C138 and C139, which have already been mentioned in tracing previous circuits, surround the armature C236, which, when moved to the left, connects together contacts C237, C238, and when in a position to the right connects together contacts C239, C240, this armature, however, being normally in a neutral position with respect to these contacts. Leading from the conductor C104 is the conductor C241 which connects with the time relay armature C242 surrounded by the coil C243. This armature normally connects together contacts C244 and C245 included in conductor C246, which connects together one terminal of each of the restoring key coils K67d and K67c in the debit and credit boards, respectively. The conductor C104, as has been explained, connects one terminal of the restoring key coil K67 of the amount board through the coil of magnet C92 with the bus bar C7, but the connection of the restoring coils of the debit and credit boards with this conductor C104 is normally through the contacts C244, C245 and conductor C241. The armature C242 is provided with dashpot mechanism C247 for suitably retarding its operation, and, as shown in the drawing, is so connected with the member closing the circuit between the contacts C244, C245 as to permit it to rise some distance before breaking the circuit between these contacts, thus forming a time relay. The coil C243 connects through conductors C248 and C249 with the inner terminals of the register batteries C165 and C159, respectively. As before explained, these inside terminals of the batteries normally connect directly through contacts C162, C163 and the armature C158, the coil C243 being thus normally short circuited. However, when the same register number is set up on both debit and credit boards similar unit switches in the secondary switch sections Sc and Sd are connected in; and, as before stated, similar unit switches in these boards are directly connected together, resulting in a short circuit about the batteries and excessive current flow, which, as has been explained, results in raising the armature C158 by the coils C157 and C167. Contacts C162, C163 thus become disconnected to open the short circuit about the coil C243, this coil being then connected in parallel with the coils C179 and C178 on armatures C158, and sufficient current flows through this coil to cause raising of the armature C242, which results in disconnection of the restoring coil K67c from conductor C104 and the interruption of current flow therefrom, the result being the dropping of the restoring keys in the credit board and erasure of the number set up. Unless provision were made to the contrary, the restoring coil K67d of the debit board would also be disconnected from the conductor C104 and current flow therethrough interrupted, which would result in erasure of the set-up on the debit board. This, however, is prevented by the operation of the armature C236 by its coils C138 and C139, as will now be described. In the previous description and tracing of circuits, these coils are shown to be normally in series in the circuit, which serially includes the unit switches of the primary switch sections and the rank and file coils of the secondary switch sections. The common terminal of these coils connects through conductor C250 with the contact C11, which connects with the middle terminal C4 of the main battery C1. In this connection it is obvious that the right half of the general battery tends to energize the solenoids of the debit secondary unit switch section and at the same time to energize the coil C139, while the left half of the general battery tends to energize the solenoids of the credit secondary unit switch section and at the same time to energize the coil C138. These coils act differentially, C139 tending to move the armature C236 toward the left into engagement with contacts C237, C238, while C138 tends to move the armature toward the right to connect together contacts C239, C240.

Contacts C238 and C240 connect together and with the armature C242, and thus when the armature C236 is at the left and armature C242 is raised, there is no current flowing through the restoring coil K67c of the credit board. Current, however, flows to the restoring coil K67d of the debit board from conductor C104, through conductor C241, armature C242, contact C238, armature C236, contact C237 and conductor C246d to coil K67d. As stated, armature C236 is normally in a neutral position, the coils thereon being differential. If, now, a number is set up on the debit board, the unit switches of the primary switch sections are actuated, rearranging the connections of the unit switches therein and for a moment opening the circuit which just previously contained the solenoids in series. However, during this break in the circuit through the debit switch section, the circuit through the conductor C250 is substituted and the coil C138 therefore momentarily alone energized, the result being movement of armature C236 to the right to close contacts C239, C240, thereby supplying a circuit from conductor C104 through conductor C241, the armature C242, the contacts C240, C239 and conductor C246'c to conductor C246c, in parallel with the normally-closed gap between contact C245 and armature C242. The armature C236 then remains in its extreme position to the right until current is cut off from coil C138 upon manipulation of the credit board and rearrangement of the unit switches actuated thereby. Coil C139 is then momentarily alone energized and thrusts its armature to the left. Thus previous to manipulation of the credit board and its connected switching system, the contacts C239, C240 are closed and are opened only upon manipulation of the credit board and its switching system, which results in the movement of armature C236 toward the left to close contacts C237, C238. With armature C236 in its normal position both these contact sets are open, and if armature C242 were raised both keyboards would be erased, as there would be no current flow through the lower restoring key coils K67c and K67d. If the contacts C237, C238 are closed and the armature C242 is raised, then the debit board restoring key circuits receive current, but those in the credit board do not. In the same way, if the contacts C239, C240 are closed and the armature C242 is raised, then the credit board restoring key circuits receive current but those of the debit board do not, and it is this arrangement which is utilized to cause erasure of the second board, if the number set up thereon duplicates that set up on the first board. As has been explained, when the credit board is manipulated after manipulation of the debit board, the armature C236 closes contacts C237, C238. If the number set up on the credit board is different from that set up on the debit board and the registers have been connected in counterbalancingly, current flow through the coils C157 and C167 about armature C158 remains normal and the short circuit about the coil C243 is maintained. If, however, the number set up on the credit board is the same as that set up on the debit board then there is a short circuit directly between the secondary switch sections and excessive current flows, resulting, as before shown, in the raising of armature C158 and inclusion in circuit of the coils C178, C179 and C243 thereby raising the armature C242. Connection between conductor C104 and conductor C246c is therefore broken upon disengagement of armature C242 from contact C245, the result being that there is no current flow through the restoring key coil K67c, which causes the restoring keys to drop, whereupon the digit keys set up on the credit board are restored and the set-up erased, and so long as the same number is struck on the credit board erasure thereof always follows. The set-up on the debit board, however, is maintained, as the restoring key coil thereof is supplied with current from conductor C104, through conductor C241, the armature C242, contacts C238, C237, and conductor C246'd, this current flow maintaining the restoring keys in their upper position. If a number were set up on the credit board and then duplicated on the debit board, contacts C239, C240 would be closed to maintain current supply to the credit board, while there would be no current flow to the restoring key coil of the debit board. Thus it is impossible to duplicate on one board a number previously set up on the other board. The armature C242 of the time relay is retarded by the dashpot mechanism to provide against erasure of a partial set-up on the second board, which at a certain time in the manipulation of the keys might duplicate the set-up already on the first board; as, for instance, where two register numbers of four digits each had the first three digits alike. In this case if the armature C242 were raised instantaneously the second board would be erased before the last or differentiating digit could be set up thereon, and the dashpot arrangement is therefore provided and adjusted so that ample time is provided for the complete set-up on the second board and so that the automatic erasing process will neither be too fast for the operator nor too slow to work before he passes to the amount keyboard. This automatic erasing mechanism just described is operative irrespective of the order of the manipulation of the boards, but, of course, the one erased is the one last set up. However, the interlocking system here shown and already described permits only the debit board to be set up first, to be followed then by the credit board, and thus the credit board is always the duplicating one and the one to be automatically erased.

To automatically erase the debit, credit and amount keyboards after any entry, the contact wheel J267 is provided, as shown on Fig. C1. It operates in conjunction with the journal mechanism, being mounted on the main journal shaft J32 engaging the brush J270 and normally in electrical contact to connect conductor C104 with bus bar C7. During the last part of the revolution of the shaft J32 the insulating sector J268' insulates the brush J270 from the contact wheel, thus opening the supply circuit to conductor C104 and to the restoring key circuits of the keyboards, the result being the dropping of all the restoring keys and the consequent erasure of the set up on all keyboards in the manner already described. The contact wheel J267 connects with bus bar C7 through conductor C64, and the restoring key circuits through the boards, as already traced, the latter being from conductor C104 directly to one terminal of the restoring key coil K67 in the amount board, and to one terminal of similar coils in the debit and credit boards, through the conductor C241 and contacts previously mentioned, the other terminals of the restoring key coils connecting through the corresponding contacts K84, K85 of the general erasing keys, through conductors C103, resistances C102, rheostats K129, and conductors C30 to bus bar C6. This circuit, which is normally closed, includes electromagnet of the key C23, and when the armature C252 of this key is depressed, the electromagnet becomes effective to hold this armature in its lower position to maintain connection between contacts C17, C18, thereby maintaining current flow through the upper digit key coils K33$d$ in the debit board. Upon a general erasure the debit, credit and amount boards, together with the general operating key, are automatically locked against manipulation, as heretofore mentioned and as now more fully explained. When the brush J270 engages the insulating section J268' at the end of a revolution of the shaft J32, the circuit is opened and the electromagnet C92 is deënergized to allow its armature C252 to be raised to its normal position by the spring C253, whereupon the circuit is opened through the coils K33$d$, thus rendering the debit board inoperative. Upon erasure of the debit board the current flow through the switch sections is shifted to the O unit switches in the primary sections and the O rank and file coils in the secondary sections, whereupon both coils C144 and C146 of relay C24 are again included in circuit, and as their combined strength is greater than that of coil C148, this relay armature is raised to disconnect contacts C19, C20, and the current supply to the upper digit key coils K33$c$ of the credit board is withdrawn, thus rendering this board inoperative. Upon erasure of the credit board the current in the switch sections is shifted and the circuit therethrough includes both coils C131 and C133 of relay C25, and the armature of this relay is raised to disconnect contacts C21, C22 to withdraw current flow from the upper coils K33 of the amount board, thus rendering this board inoperative. As soon as the debit and credit boards are erased the coils C108 and C107 of relay C110 are included in their normal circuits and the armature C109 is moved to the left to disconnect contacts C52, C53, thereby opening the locking circuit previously traced from bus bar C6, through conductors C54 and C55, contacts C52, C53, conductor C56, locking electromagnet K124 and conductor C40 to bus bar C7. As soon as the amount board becomes erased circuit through relay C39 is opened, this circuit having been closed upon depression of the amount board keys. When the armature of this relay returns to its normal position the contact head C46 is withdrawn, thus opening contacts C47, C48 in the checking circuit before traced from bus bar C6, through conductor C49, contacts C47, C46 and C48, conductor C50, the checking mechanism, conductor C51, locking electromagnet K125 and conductor C40 to bus bar C7. As has already been explained, the circuits through the coils K126 and K126' of the general operating key were opened upon the starting of the master machine, and its armature was returned to its normal position. When locking electromagnets K124 and K125 are deënergized their armatures again move into locking engagement with the locking wedges of the general operating key, thus rendering this key inoperative.

When electromagnet C39 is deënergized its contact head C82 engages the normal contacts C81, C83, and if relays C24 and C25 are in their normal position to close contacts C76, C77 and C78, C79, the system is in condition to permit actuation of the special journal operating key C84. As already explained, this key is actuated when a typewritten entry extends from the first to the second line of a journal page, and when the first line is in position to receive printing and the shift knob J63 is manually rotated, the contacts J192 are thereby closed, and as in this position the contacts J193 are automatically closed the circuit already traced, including these contacts, electromagnet C73 and the normal contacts of relays C24, C25 and C39, is closed, and thus such shifting can take place only when the debit, credit and amount boards are erased. Depression of this special journal operating key causes the journal mechanism to be started, whereupon contacts J192 and J193 immediately become disengaged to open this circuit, and at the end of the revolution of the journal shaft the motor-controlling circuit is opened, and as has been explained, the electromagnet C65, which is included in this circuit, becomes deënergized and releases the special journal operating key. In the circuit which includes the locking electromagnet K124 and the contacts C52, C53 controlled by the relay C110, there are also included the contacts C254, C255 normally engaged by the contact device J389 before referred to in the journal mechanism specification and shown in Fig. J3. When the paper spools in the journal mechanism become empty the arm J395 is swung to engage the contact device J398 to open the circuit at this point and electromagnet K124 therefore cannot be energized to unlock the general operating key until the spool is again supplied with paper.

At the operating boards are also provided means for indicating to the operator the progress in the operation of the master machine. The brush M391 passes over the contacts M393 and is normally in engagement with the normal contact M393$_0$, while the other contacts M393$_1$ to M393$_8$ correspond, respectively, to the units to tens-of-millions orders of setting-up pins. Extending from these contacts are the individual conductors $C61_0$ to $C61_8$, in which conductors are included the signaling devices $C256_0$ to $C256_8$, the other terminals of these conductors all connecting through the common conductor C257, which terminates in brush M404, engaging the circuit-breaking wheel M401, connected through conductor C258 with conductor C45, which leads to bus bar C7. The brush M391 connects through conductors C60 and C37 with the bus bar C6, thus closing the circuit. As before explained, brush M391 and the normal contact $M393_0$ are included in circuit with the actuating coil K126' of the general operating key, and the automatic keyboard contact mechanism K127' which is closed upon depression of a key in the units order of the amount keyboard. Thus, normally a circuit is traced from bus bar C6, through conductors C37 and C60, brush M391, normal contact $M393_0$, conductor $C61_0$, indicating device $C256_0$, conductor C257, brush M404, contact wheel M401 and conductors C258 and C45 to bus bar C7. Thus when signal $C256_0$ is active the operator knows that the master machine pick-up mechanism is in its normal rest position. When the master machine begins to operate, brush M391 is carried across the row of contacts and the circuit just traced through the general operating key automatic actuating coil is opened to release the general operating key. When the brush engages contact $M393_1$, which corresponds to the units order of setting-up pins, the indicating device $C256_1$ at the operating boards becomes active and indicates that the differential pick-up mechanism is operating in this order, and as the brush successively travels over the contacts the signals are successively actuated and the operator at all times is informed as to which order is under operation. The mechanical arrangement of the brush and contacts is plainly shown in the drawings of the master machine and explained in the description thereof. The circuit-breaking mechanism M401–M404 is also described in the master machine specification, the contact wheel having ten contact segments corresponding to the ten digits on the numeral wheels of the register. During the first half revolution of the main driving shaft of the master machine the screw shaft is rotated one revolution, this screw shaft causing the brush M391 to be moved from normal position into engagement with contact $M393_1$ corresponding to the units order, and signal $C256_1$ indicates to the operator this condition. During the second half of the revolution of the main driving shaft of the master machine the screw shaft and the brush remain stationary and the differential pick-up mechanism is operated to cause rotation of the proper shaft to eventually cause rotation of the connected-in registers and with this shaft the contact wheel M401 rotates, the rotation being in unison with the rotation of the units numeral wheel of the connected-in registers. Thus the circuit through the indicating device $C256_1$ is broken as many times as there are units in the digit which is carried into the units numeral wheel, and therefore from this arrangement the operator can tell which numeral wheel of the connected-in registers is being rotated and the amount of such rotation. When during the next revolution of the screw shaft the brush engages the next contact $M393_2$, corresponding to the tens numeral wheel, the circuit including the indicating device $C256_2$ is broken as many times as there are units in the digit which is carried into the connected registers, and so on. The indicating devices C256 may be of any design. They may, for instance, be miniature incandescent lamps, and then the operator by watching the number of flashes of an illuminated lamp may tell which numeral wheel of the registers is being rotated and what number is being carried therein. In the conductor C257 may also be included a telegraph sounder or other sound-producing instrument which will enable the operator at any time to hear what number is being carried into the particular numeral wheel being at that moment rotated. It is obvious that such crude devices may readily be superseded by others more highly developed.

In the master machine specification contacts M410, M413 are described as being connected together at the end of a master machine operation, and these contacts, as mentioned there, close the circuits to cause operation of the connected-in printer recording mechanisms associated with the registers. In Figs. C7 and C8 are shown two modifications of circuit arrangements for controlling the operation of the printer mechanism. Only such printer mechanism should operate as is associated with the registers just operated, and to provide such selective connection a relay contact mechanism is attached to each register so that every time any register is operated the selective contact thereof is thrown in by the operation of the register and maintains this connection in its printer circuit until the printers have been operated by means of the closing and opening of contacts M413 at the end of the master machine operation. The printer actuating magnets P10 are connected in parallel circuits between main conductors C258 and C259. Conductor C258 is connected with bus bar C6 through conductor C260, contacts M410, M413 and conductor C37, while conductor C259 connects with bus bar C7 through conductor C45. In each of these circuits is included selective relay contact mechanism operated by the corresponding register mechanism.

In Fig. C7, R261 is a dashpot cylinder containing a piston attached to a piston rod R262 passing through the guide R263. Upon the rod between R263 and the piston is a spring R264 which tends to force the piston into the cylinder. At the outer end of the piston rod is the link R265 which engages a pin R266 extending from the foot-shaped lever R70 of the register mechanism, and this pin may be a rear extension of the pin R133 extending forwardly from said foot-shaped lever. On the piston rod is also a contact member R267 adapted for engagement with the contact springs R268, R269 when the piston rod is pulled out. When the register is first thrown into gear, lever R70 is rotated in the manner as described in the register mechanism specification, and pin R266 pulls the piston rod out of the cylinder, at the same time causing the contact member R267 to engage between the contacts R268, R269, and this position is maintained until the register is again thrown out of gear, when the link R265 is released from the pin R266 and the spring R264 slowly returns the piston into the cylinder, a suitable vent means being provided. The circuit closer R267 does not leave the contact springs until the piston has traveled almost to its rest position, and in the meantime this contact mechanism is closing the circuit through the electromagnet P10 of the attached printer mechanism, during which time the printer mechanism is operated by the master machine actuating the contacts M410, M413 to print the register indication on the record sheets. Before another entry can be made these contacts have again completely regained their normal position and opened their circuit to the printer mechanism.

In Fig. C8 is shown a modified arrangement which may be used for connecting in the register printers. Here electromagnet R270 is included in each printer magnet circuit. The armature R271 of each electromagnet is held in the outward position normally by means of a spring R272, and at the end of the armature rod is the link R273 which engages the pin R274 extending from the end of a rod R275 which terminates at its other end in a link R276, which link engages the pin R266 on lever R70 of the register mechanisms. Upon the armature R271 is the contact member R277 adapted to engage between contact springs R278, R279 when the armature is moved inwardly. On the rod R275 is the contact member R280 adapted to engage between contact springs R281, R282 when the armature moves outwardly. Pin R274 normally is disposed at the rear end of link R273, and upon operation of the register the pin R266 draws the rod R275 forwardly to carry the pin R274 to the front end of link R273 and contact member R280 is brought into the contacts R281, R282, thereby closing circuit as follows: from conductor C259, through conductor C261, electromagnet R270, conductor C262, contact R281, contact member R280, contact R282, conductor C263 and electromagnet P10 to conductor C258. When contacts M410, M413 are now closed at the end of the master machine operation, circuit is closed from the battery through electromagnets R270 and P10, electromagnet P10 causing operation of the connected printer mechanism to record the register indication. When electromagnet R270 becomes energized its armature R271 is drawn in, which in turn draws the rod R275 to disconnect contact member R280 from contacts R281, R282, but at the same time contact member R277 engages in contacts R278, R279, and circuit through the electromagnet P10 remains closed through conductor C264 and contacts R277—278—279, instead of through contacts R280—281—282 and conductor C262. When the circuit is again broken by the master machine, electromagnet R270 becomes deënergized and spring R272 restores the mechanism to the normal position with both contacts open, and thus the printer circuit is closed only through the proper printers and at the proper time. The construction of the printer mechanism and its connection with the registers has been already described in connection with Figs. P1 to P4.

In Fig. C9 are shown the circuit arrangements between the amount keyboard keys and the setting-up pin and reversing pin electromagnets in the master machine, while in Fig. C10 are shown the circuit arrangements between the setting-up and reversing pin contacts and the amount keyboard lamps and checking coils. Upon the amount keyboard are eight order rows, each having nine significant-figure keys controlling the corresponding setting-up pins in corresponding orders in the master machine. In the units order the keys are designated by K5$a$1, K5$a$2, etc. to K5$a$9, the tens order by K5$b$1, K5$b$2, etc. to K5$b$9, and so on up to the eighth order, in which the keys are designated by K5$h$1 to K5$h$9. The setting-up pin electromagnets corresponding to the keys in the units order are designated by M229$a$1 to M229$a$9. The electromagnets corresponding to the keys in the tens order are designated by M229$b$1 to M229$b$9, and so on to the eighth order, in which the electromagnets are designated by M229$h$1 to M229$h$9. There are no 0 keys for the keyboard, but with each order of significant pins is a 0 pin which is normally raised, and for each 0 pin is provided an electromagnet. In the units order this electromagnet is designated as M229a0; in the tens order the 0 pin electromagnet is designated by M229b0; and so on to the eighth row, in which the 0 pin electromagnet is designated by M229h0. Corresponding to each order of setting-up pins there is also a reversing pin, and an electromagnet for the reversing pin designated by M198. The reversing pin electromagnet corresponding to the units order is represented by M198a; that corresponding to the tens order is represented by M198b, and so on to the electromagnet corresponding to the eighth order, which is represented by M198h. As has been described in the master machine description, all the reversing pins in advance of the order in which is set up the pin corresponding to the highest digit of a number, must be depressed and the reversing pin in front of this order must remain raised so that when the reversing tooth reaches this order it will engage with the corresponding raised reversing tooth to cause rotation of the reversing-pin case and the reversing mechanism. In other words, the distance of transverse travel of the differential pick-up mechanism is controlled by the lowest order having a raised reversing pin, and the pick-up mechanism may pass to and pick up the set-up in each order up to and including the lowest order having a raised reversing pin. As there are no 0 keys provided for the keyboard, only those keys are struck which are representative of the significant figures in the number to be set up, and the normally-raised 0 pins which represent the zeros in a number remain in their normal raised position. In order to depress all the reversing pins to the right of the highest significant figure in the number, all reversing-pin electromagnets below any order are connected to the source of current in series with respect to such order. Thus upon energizing the magnets controlling the pin representative of the highest significant figure in the number, all reversing-pin electromagnets below that order become energized to cause depression of all reversing pins up to such order. In Fig. C9 this arrangement is shown, the reversing-pin electromagnet controlled by any order being placed to control the reversing pin which is in alinement with the preceding order. That is, reversing-pin electromagnet M198b is in alinement with the units order, electromagnet M198c is in alinement with the tens order, and so on, electromagnet M198h is in alinement with the seventh order, there being no reversing-pin electromagnet in alinement with the eighth order, as such pin is permanently raised and fixed. Electromagnet M198a is disposed to the right of the units order, as shown. As here shown and as already explained, the contacts K155 of the keys K5 are already connected together through framing K26 and to the common conductor C38, which includes relay C39 and connects with bus bar C7. The individual contacts K156 connect through individual conductors C32 with one terminal of the corresponding setting-up pin electromagnets. The other terminals of the setting-up pin magnets in each order connect through the common conductor C265, which conductor includes the 0 setting-up pin electromagnet of the order and connects with the common conductor C35, which serially includes the reversing-pin electromagnets and which connects with bus bar C6. The individual conductors C32 all pass through the cable C33 as shown in Fig. C3.

The arrangement of the orders in the drawings of Figs. C8 and C9 is from right to left, that is, beginning at the right the orders or rows are units, tens, hundreds, thousands, etc., being designated by the characters $a$, $b$, $c$, $d$, etc. In the master machine drawings, however, the arrangement of the orders of setting-up pins is from left to right, the units order being at the left. The particular arrangement in the master machine is of no consequence, however, as the operation there is entirely mechanical, the setting-up pins being controlled entirely mechanically by the setting-up keys on the amount board.

In Fig. C10 are shown the contacts controlled by the various electromagnets, and the circuits controlled by said contacts which in turn control the operation of the indicating and checking mechanisms, as has been described in the keyboard description. As here shown, the indicating mechanism consists of incandescent lamps, generally designated by K52, placed within the keys. In the units order of keys the lamps are designated by K52a1 to K52a9; in the tens order by K52b1 to K52b9, and so on to the last or eighth order, in which the lamps are designated by K52h1 to K52h9. There is also a lamp in each of the restoring keys, the lamp in the units order restoring key being designated by K52a, the lamp in the tens order by K52b, and so on, to the lamp K52h in the eighth order. Under each of the pin-actuating electromagnets there are contacts, as has been described in the master machine specification. The contacts under the significant pins in the units order are represented by M422a1, M423a1, to M422a9, M423a9. In the tens order these contacts have the character $b$, and so on to the eighth order, where they have the character $h$. The contacts under the various 0 pins are represented by M422a0, M423a0, to M422h0, M423h0. The contacts under the various reversing-pin magnets are designated as M424a, M425a, to M424h, M425h. In each order one terminal of each lamp connects with a common conductor, designated in general by C266, these common conductors C266a, C266b, etc., all connecting with the common conductor C267, which connects with the bus bar C7. The other terminals of the lamps connect through individual conductors, designated in general by C269, with the corresponding contact members, designated in general by M423, as shown. The other contact members M422 in each order connect to the common conductor C270. The individual conductor leading from lamp K52 in the restoring key of each particular order connects with contact M424 of the reversing-pin electromagnet corresponding to that order, the other contact member M425 of the reversing-pin electromagnet connecting with the common conductor C271, which connects with the other bus bar C6. Included in each of the individual conductors, extending between the lamps in the digit keys and the contact members under the setting-up electromagnets, are the checking coils, designated generally by K173, whose function has been already explained. In this circuit arrangement when any digit key is depressed on the amount board a circuit is closed which serially includes the corresponding setting-up pin electromagnet in the master machine, the 0 pin electromagnet of that order and all the reversing-pin electromagnets below that order. Suppose that the number 5000 is to be set up: the operator merely depresses key "5" in the thousands order, which key is here designated as K5d5 (Fig. C9); current flows from bus bar C6, through conductor C35, serially through reversing-pin electromagnets M198a, M198b, M198c, M198d, through 0 pin electromagnet M229d0, common conductor C265d, setting-up pin electromagnet M229d5, individual conductor C32d5, contacts K156d5, K155d5 of key K5d5, common conductor K26d, common conductor C38, and coil C39 to bus bar C7. Thus all reversing pins up to that of the thousands order are depressed and the master machine will not be reversed until the reversing tooth engages the raised reversing pin in alinement with the thousands order. Upon energization of these various electromagnets, the corresponding contacts M423d5, M422d5, M422d0, M423d0, M424d, M425d; M424c, M425c; M424b, M425b, and M424a, M425a are closed. Closure of these contacts will cause closure of the following circuits: from bus bar C6, through common conductor C271, contacts M425d, M424d, contacts M423d0, M422d0, common conductor C270d, contacts M422d5, M423d5, individual conductor C269d5, coil K173d5, lamp K52d5, common conductor C266d and common conductor C267 to bus bar C7. The lamp in key "5" of the thousands row therefore illuminates and the checking coil is energized to raise its contact armature to complete the circuit through the checking mechanism of the amount keyboard and through the unlocking electromagnet K125 of the general operating key. A circuit is closed from the bus bar C6, through common conductor C271, contacts M425d, M424d, conductor C269d, lamp K52d in the thousands order restoring key, conductor C266d and common conductor C267 to bus bar C7. Similar circuits may be traced through the lamps in the restoring keys of the hundreds, tens and units orders, thus indicating to the operator that the reversing pins up to the thousands order have been properly depressed. The actuated setting-up pins representative of significant figures illuminate the lamps in their corresponding digit keys upon the keyboard. The actuated reversing pins illuminate the lamps in their corresponding orders of the order restoring keys upon the keyboard. The color of illumination of the restoring key lamps may be the same or different from that of the digit key lamps, as desired. This system of indication just described not only serves to indicate to the operator the set-up in the master machine, but the operator can also more readily read on the keyboard by means of the illuminated keys whether the number set up is the one desired. The lamps in the keys of the debit and credit boards may be connected in circuit with their switching sections, and thus carry out similar functions.

In Figs. C11 to C15 are shown various ways of connecting the registers in circuit, the registers shown in the circuit system just described being connected in according to the arrangement shown in Fig. C14. In this arrangement, as has already been described, the electromagnets R84 are polarized, one terminal of each register electromagnet being connected with the common conductor C173, the other terminal of the register electromagnets connecting with individual conductors adapted for connection with the exterior terminals of the register batteries C159, C165, upon proper operation of the keyboards and switch sections. When two registers are connected in counterbalancingly one terminal of one register electromagnet is connected to one side of the battery, and one terminal of the other register electromagnets is connected to the other side of the battery, thus causing current to flow through the two registers in series, as has been described. Instead of this arrangement, that shown in Figs. C11, C12 and C13 may be employed. In Fig. C11 the registers have both of their terminals led to their point of connection and when out of operation are entirely free electrically from each other. The connecting-in magnets are polarized, and thus by sending the current in one direction the register is mechanically connected to the panel shaft to operate in one direction, while if the current is passed in the other direction the register is mechanically connected to the panel shaft to operate in the opposite direction. As shown, two registers Ra and Rb are connected in to operate counterbalancingly, the left terminal of the register Ra being connected to one terminal of the battery circuit, and its right terminal to the other battery terminals in a manner directly opposite. The registers connected in as shown are, of course, in multiple and a poor connection in one prevents its connecting-in for operation, while a good connection in the other would cause the latter to operate. Thus it is evident that in this circuit arrangement there is nothing to insure the current passing through both of the registers at the same time.

In Fig. C12 is shown a slightly improved arrangement over that shown in Fig. C11, registers Ra and Rb being shown connected in series, thus causing current to flow through both or neither of them at the same time. As plainly shown, the current flows through the two registers in opposite directions, thus causing them to connect to the panel shaft oppositely and counterbalancingly. The current flows from the battery terminal into the right terminal of register Ra, out of its left terminal into the left terminal of register Rb, through it and out of its right terminal to the other terminal of the battery. In this arrangement it is obvious that there will be no current through either of the connected-in registers, or there will be current flow through them at the same time to cause counterbalancing operation thereof.

In both arrangements of Figs. C11 and C12 the magnets in the registers must be polarized to secure the opposite connecting-in thereof. In Fig. C13 is shown means for connecting the registers in oppositely without using polarized magnets. Here two separate magnets or coils are used in each register, one terminal of each connecting to a common conductor connecting with one terminal of the battery. The two free terminals of the coils of each register are led to individual contacts and to these contacts is connected the other terminal of the battery. If it is desired to operate a register in one direction, one of these terminals is connected in circuit, but if the register is to operate in the other direction the other terminal is connected in circuit. As shown in this figure, the left free terminal of register Ra is connected to the battery lead, while the right free terminal of register Rb connects with the battery lead. Thus two parallel circuits are closed through different coils in the registers, causing them to be connected in to operate in opposite or counterbalancing directions. This circuit arrangement has the disadvantages of that shown in Fig. C11 in the use of multiple register connection. It is obvious, however, that series connections upon this plan, similar to that shown in Fig. C12, could be secured by disconnecting the common conductor from one battery terminal and connecting this terminal to one side of one of the connected-in registers, while the other battery lead would remain in connection through the other side of the other connected-in register. This latter arrangement would secure all the advantage of the series register connection, as shown in Fig. C12, without the use of polarized electromagnets, incurring, however, the disadvantage of having a double coil in each register.

In Fig. C14, which illustrates the arrangement utilized in the system described, is shown a series operating connection of the registers, and in this arrangement is secured practically all the advantages of the other arrangements, together with the additional advantage of only one connecting terminal leading from each register.

In Fig. C15 is shown an arrangement of circuits as disclosed in Fig. C14, with additional features. The left half of the drawing shows both specific and generic registers connected in to receive a common entry simultaneously. All registers having a free terminal for connection with the battery are specific registers, that is to say, they are connected in directly from the keyboards, while all other registers are generic, and any current flow through a generic register must first pass through a specific register. Thus each generic register makes a summation of all entries made in the specific registers whose electrical circuits pass on up through that particular generic register. The arrangement of registers shown in the left half of this figure corresponds in general to the arrangement shown in parts II and III of Fig. O2. The right half of the figure shows connections for a plurality of generic classifications on diverse bases from specific entries, the arrangement of the registers being similar to the arrangement shown in Fig. O3. It is obvious that such plurality of classifications is secured by simply superposing a parallel network of circuits and registers upon the first, each set of generic registers receiving its entries from a different combination of specific registers. As herein shown the registers are arranged for generic classification on two bases, but it is, of course, plain that by additional elaboration additional bases may be employed. For each specific register adapted for multiple classification contact mechanism Rc is provided for connecting in superposed classification circuits. Tracing the circuits through this figure, current flows from the battery through the specific register Ra, generic registers Rc, Rd, Re, Rf, Rg, and specific register R$b$ to the other terminal of the battery. When the specific register R$b$ is energized it actuates the contact mechanism R$c$ which closes the parallel circuit through the generic registers R$h$, R$i$, in parallel, respectively, with the two generic registers R$g$ and R$f$, and having thus all of the registers herein mentioned connected in for operation, entries are simultaneously made therein.

If instead of the specific register R$b$ being connected to the battery, the specific register R$j$ were connected the contact mechanism for this register would be actuated and current would pass through generic register R$k$ instead of R$h$, and then through all other registers as before. It is thus seen that in each case generic register R$g$ in the one classification receives the entry, while the determination of which of the generic registers R$h$ or R$k$ in the other classification receives it is dependent upon which of the two specific registers R$b$ or R$j$ is connected. It is thus obvious that the entries in the specific registers R$b$ and R$j$ are combined in the generic register R$g$ on one basis of classification and are received, respectively, in the generic registers R$h$ and R$k$ on another basis. Current for connecting in the registers of the fundamental classification passes through the normally closed circuits and the entries are combined in the highest generic register R$f$ of that classification, while current for connecting in the other registers passes through the superposed circuit and their entries are combined in the highest generic register R$i$ of the other classification. Consequently, the readings of these two highest generic registers are equal and one of the registers could be omitted, but for practical purposes inclusion of both is desirable, as their identical readings will prove perfect operation of the two classifications. The readings of the other generic registers connected with the same specific registers would not ordinarily be equal but would in almost all cases be different.

To operate the indicating mechanism and journal printing mechanism disclosing the nature of the balance in any specific register, circuit and indicating mechanisms may be provided similar to those described in connection with the main circuit system. All conductors which commonly connect together several specific registers are themselves connected together through condensers in multiple with the common intermediate conductor conveying the alternating current employed for actuating the signals indicative of the nature of the balance in the two specific registers in operation, but the connections and circuits for securing such signals are not here fully shown as their arrangement and operation is evident.

The various circuit arrangements just described are by no means all that could be employed in this system. Other arrangements will merely be expansions or combinations of the circuits here shown.

| 1728. (Machine.) | | 1906. (Year.) | Adams & Buchanan, Chicago. (Name of firm.) | | (Special.) | (Dr.) | (Cr.) | 1. (Page.) |
|---|---|---|---|---|---|---|---|---|
| (Opr.) | (Entry.) | (Date.) | (Explanatory details of entry.) | | | | | (Amount.) |
| 1 | 1 | 6032 | John Q. Adams and James Buchanan, this 1st day of February, 1906, enter into partnership as Adams & Buchanan, for the purpose of conducting a general grocery business, sharing gains and losses equally. Mr. Adams (ledger account No. 1) invests cash (5)... | | | 5 D | 1 C | 12,000 |
| 1 | 2 | 6032 | and 10 shares of exchange bank stock (6) | | | 6 D | 1 C | 990 |
| 1 | 3 | 6032 | Mr. Buchanan (2) invests cash | | | 5 D | 2 C | 13,000 |
| 2 | 4 | 6033 | Buy of Monroe (101), 30d, 100 bbls. flour @ $5.00 | | | 51 D | 101 C | 500 |
| 2 | 5 | 6034 | Buy for cash 200 bbls. flour @ $4.50 | | | 51 D | 5 D | 900 |
| 3 | 6 | 6036 | Sell to Madison, on his note (bills receivable 30) at 90 days, 300 bbls. flour @ $6.00 | | | 30 D | 51 C | 1,800 |
| 3 | 7 | 6036 | Sell bank stock | | C | 5 D | 6 D | 990 |
| 1 | 8 | 6037 | Advance to Monroe, on account | | | 101 D | 5 D | 600 |
| 2 | 9 | 6038 | Insurance (10) one year, XYZ Co., Policy 123,456 | | * | 10 D | 5 D | 250 |
| 1 | 10 | 6038 | Mr. Adams withdraws cash | | | 1 C | 5 D | 100 |

1—John Q. Adams.

| 6032 | 000 | 001 | C | 1 2 | 0 0 0 | 0 0 |
| 6032 | 0 | 2 | C | 1 2 | 9 9 0 | 0 0 |
| 6038 | 1 | 2 | C | 1 2 | 8 9 0 | 0 0 |

2—James Buchanan.

| 6032 | 0 | 1 | C | 1 3 | 0 0 0 | 0 0 |

5—Cash.

| 6032 | 1 | 0 | D | 1 2 | 0 0 0 | 0 0 |
| 6032 | 2 | 0 | D | 2 5 | 0 0 0 | 0 0 |
| 6034 | 2 | 1 | D | 2 4 | 1 0 0 | 0 0 |
| 6036 | 3 | 1 | D | 2 5 | 0 9 0 | 0 0 |
| 6037 | 3 | 2 | D | 2 4 | 4 9 0 | 0 0 |
| 6038 | 3 | 3 | D | 2 4 | 2 4 0 | 0 0 |
| 6038 | 3 | 4 | D | 2 4 | 1 4 0 | 0 0 |

6—Exchange Bank Stock.

| 6032 | 1 | 0 | D | 9 9 0 | 0 0 |
| 6036 | 0 | 0 | D | 0 0 0 | 0 0 |

10—Insurance.

| 6038 | 1 | 0 | D | 2 5 0 | 0 0 |

30—Bills Receivable.

| 6036 | 1 | 0 | D | 1 8 0 0 | 0 0 |

51—Flour.

| 6033 | 1 | 0 | D | 5 0 0 | 0 0 |
| 6036 | 0 | 0 | D | 0 0 0 | 0 0 |
| 6036 | 2 | 1 | C | 4 0 0 | 0 0 |

101—Monroe.

| 6033 | 0 | 1 | C | 5 0 0 | 0 0 |
|---|---|---|---|---|---|
| 6037 | 1 | 1 | D | 1 0 0 | 0 0 |

*Results and Functions.*

It is neither desirable nor practicable to attempt in this application to disclose in detail all results and functions involved in the general principles of this system, some of which are reserved for extended development. Many such functions and results have been mentioned in the preceding write-up, but the following seem worthy of special description.

*The journal.*—On page 88 are exhibited the essential features of a journal produced by the methods herein set forth. The matter in parentheses will not appear on the journal pages in actual practice but are here inserted merely for explanatory purposes. The page heading legends are printed in a line at the top of each page by means of type set in the barrel J83 shown in Figs. J1 and J6. The legend indicating the number of the machine is permanent; the legends indicating the year and the name of the firm and address are changeable, while the type wheels J84 disposed at the right end of the barrel J83 are automatically shifted to number the pages consecutively. These several notations identify the interrupted succession of the journal record and offer a guaranty against the substitution of pages, especially in connection with the automatically-consecutive numbering of the entries and the preservation of the carbon-made record in roll form with pages indicated by spacings and heading legends but not separated into sheets as is the ribbon-made record.

After the page heading legends the journal proper follows, beginning with the explanatory details of entry. As shown, the preliminary statement usually requires several lines, and as has already been sufficiently described in detail, the operator cannot advance the journal sheet to the second line until the motor has been started and the page heading legends entered and the page cut from the roll. After this is done he may manually advance the journal page through any number of lines until the explanatory details have all been printed by the typewriting machine. The explanatory details extend in a column down the center of the journal page, as shown. To the left of this column and arranged in three rows are printed characters which indicate what operator makes the entries, the number of the entries and the date thereof, these characters being set up on and printed by the type wheels shown in Figs. J7 and J8. The operator's number is automatically set on these type wheels upon insertion of the operator's key in the lock and turning thereof to unlock the system. The entry number type wheels are automatically advanced as the page is advanced, while the date type wheels are set manually by the operator by turning the knob J197.

At the right of the explanatory details column appear the various characters printed by the journal printing mechanism, including the number of the register receiving the debit entry, the number of the register receiving the credit entry, the amount entered on these registers and the characters representing the nature of the balance in the registers after each entry, and also characters representing the direction of operation of the registers, these characters being all printed by the seven sets of type wheels shown in Figs. J27, J29 and J31 and described in detail in the journal printing mechanism specification. Between the entry column and these characters are three columns for special characters printed by means of the special key *t* described in connection with Figs. G1 and G2.

Entries numbered 1 and 2 illustrate the method of handling compound transactions, where, for example, several items are chargeable to separate accounts and creditable to one account, in which case the set-up on the credit keyboard may be retained until the set of entries is completed. This is especially desirable in cash entries, where several consecutive transactions are to be charged or credited to cash.

Entry No. 6 illustrates the treatment of an entry occupying more than one line, and it will be noticed that the data printed by the type wheels are entered on the last line of the typewritten explanation. This entry also illustrates the automatically-secured record of the shifting of the balance of an account from its original to what may be called its abnormal side. In the preceding entries, each of the accounts has had its balance on the original side, but in this entry the balance in flour account (No. 51) shifts from the debit to the credit side, indicating that the amount of sales has exceeded the amount of purchases, and as long as this condition continues the journal will automatically exhibit the fact, irrespective of whether the account is debited or credited; but should a subsequent heavy purchase overbalance the present credit excess, the return of the balance to its original side will be indicated by the letter D.

Entry No. 8 illustrates the same principle, except that here the balance in Monroe's account is normally a credit and the letter D after the number 101 indicates to the intelligent inspector that for some reason the balance in this account is in an abnormal condition. This latter is perhaps the more valuable use of the device. With it a bank teller may unhesitatingly pay any check which is proper in form, etc., without carrying balances in his head or referring to a list of balances, merely taking, in cases of doubt, the precaution of entering the check in the account prior to paying the money. If the account of the drawer is thereby overdrawn, the teller has instant audible and visible notice at the keyboard, and the journal also records the fact. Should the overdraft be such that it cannot be allowed to stand, he simply declines to honor the check and reverses the entry. Thus is also secured a desirable record of all attempted overdrafts, as well as of those which are permitted to be consummated.

The D's in the Dr. column do not indicate that the respective accounts are debited, though such is the fact, but rather that after the entries are made the balances are debit or "positive" balances. So the C's in the Cr. column indicate the credit nature of the respective balances rather than the credit or "negative" nature of the particular entries. In the majority of cases the account debited has a debit balance and the account credited has a credit balance, but there are frequent exceptions to this general rule which are illustrated in entries numbered 5, 7, 8, 9 and 10 in each of which the account credited has a debit balance as is indicated by the D in the Cr. column.

Entry No. 7 illustrates, under the heading "Special", one use of the special keys $t$ shown on the typewriter keyboard. In making this entry the operator observes that the Bank Stock account will be balanced, and he records this understanding by striking the special key which prints the small letter $c$ in the third of the special columns, indicating that the account to be credited in that entry is thereby to be brought to zero. The operator thereupon locks the credit keyboard to retain register No. 5 in operative connection until the register and journal mechanisms have completed their usual operations for the entry, including the shifting of the journal paper to the position for the following entry and including, providing such proves to be the case, the return of register No. 5 to zero position, and if the register does come to rest at zero as anticipated, the electromagnet J392$c$ becomes energized to throw the key J385$c$ to print a large C about the small $c$ printed by the operator, thus automatically indicating that the operator's understanding is correct and that the account credited by that entry is actually closed out and stands at zero. If the account had been debited he would have struck the special key to print a small $d$ in the first special column, and if the register comes to rest at zero as anticipated, electromagnet J392$d$ will become energized to throw its type lever J385$d$ to print a large D about the small $d$. The star in the middle one of the special columns calls attention to the unusual or special character of the transaction in entry No. 8, and reference to the operator's column shows who made the entry. Other characters may be printed in this middle column, by means of suitable special keys in the typewriter keyboard.

The date entries as shown indicate the 32nd to 38th days of the year (nineteen hundred and) six. Provision may easily be made for more wheels, permitting the full indication of the year in each entry; or, if preferred, the two wheels at the right may record the day of the month and the two at the left the number of the month, in which case the legend at the top of the page may be relied on for the year.

Provision is made herein for two original printed journal records, one being made by means of an inked ribbon and the other by means of carbon paper. Other original carbon records may easily be made, and the usual impression copies may be taken of the ribbon-made record. While in other parts of this specification the carbon-made records may have been designated "duplicate" or a term of similar import, such designation is not intended to contravene in any degree the real fact that each of the journal records made as herein set forth is an original.

*The ledger-accounts.*—On page 88 is shown a grouping of the printed ledger accounts embodying the transactions set forth in the journal. These ledger accounts set up in the registers are printed by the register printing mechanism. In Figs. R1, R2, R3, R23 and R27 are shown the various mechanisms which operate in conjunction with the journal printing mechanism to put these various transactions in print. At the left in each account is the date, followed by the number of debit and credit entries, respectively, in that account to date. The next column records by D or C the nature of the balance, and the final column shows the amount of the balance. This printed register-record is not directly a record of individual entries, so much as it is a record of successive balances, but by comparing any two balances the amount and nature of the intermediate entry may be infallibly deduced. The register printing mechanism herein shown for making the printed record of the successive ledger indications is capable of making several records thereof, each of which is an original.

Attention is called to the fact that in this system the basic portions of the entries are made by means of one set of keyboards, from which, with equal directness, are controlled the indications and records of such entries, in both the journal and the ledger mechanisms. Resulting from these basic entries passing through the calculating ledger-mechanisms, and controlled thereby, certain facts are established, which are indicated in both the ledger and the journal. It is thus necessary and obvious that the indications upon both ledger and journal mechanisms are original, and that the printed records therefrom must also be such.

*The memorandum and invoice.*—The memorandum-making mechanism already described in detail in the journal mechanism description is primarily intended for indorsing the essential portions of an entry on the document which ordinarily forms the entry-basis, such as a check, note or invoice. By this means the set-up on the debit, credit and amount keyboards (with or without the date, entry-number, etc., for reference purposes) is indorsed on the basic document, not only indicating that such document has been "entered," but also constituting a high degree of evidence of just what the actual entries are. This memorandum record is original, equally with that of the corresponding journal and ledger entries, and is so placed with respect to the data for the entry as to afford an excellent opportunity for checking its accuracy. If the transaction is not embodied in a document which can be conveniently used for this purpose, the memorandum may be made on a slip of paper which may be later attached to the document, or it may be filed in lieu thereof. In such case, all of the entries in the journal (and ledger) would be represented by corresponding memoranda, automatically harmonious, which, temporarily arranged in numerical order for inspection and checking, would afford unique facility for a complete check on the volitional portion of the essential entries in the journal and ledger, all without an inspection of the journal or ledger portions of these multiple entries.

In addition to entering on a slip of paper, as above stated, a memorandum of the essential elements of a transaction, by means of the type wheels and levers above mentioned, it is obvious that the explanatory details may also be entered, by means of typewriter mechanism adapted to print from a common keyboard both on the journal page and on the memorandum slip, concurrently, in whole or in part, as desired. This permits the typewriting on the memorandum paper (with or without carbon-made duplicates) of any desired matter, such as the details of a bill of goods sold,—the rollers J141' and J142' providing for the shifting of the paper, which, thus typewritten upon, may constitute an original invoice. By this means, in connection with those hereinbefore described, are secured the making of an invoice; a full or condensed record of the details thereof in the journal; the entry of the amount thereof in the journal and the ledger, to the debit and credit of appropriate accounts, and the indorsement on the invoice of such journal and ledger entries,—the several entries and records being mechanically-harmonious and being secured by one set of volitional operations free from volitional duplications. These automatic indorsements on the invoice afford a valuable check upon sales-accounting.

Various modifications of the conventional forms of invoice will readily suggest themselves to the accountant which will permit the entry of desirable details, such as the purchaser, address, terms, etc., in a common form suitable for the invoice and for, say, a one- or two-line abstract in the journal, if it is not desirable to enter the full details in the latter. It is obvious that other original documents, such as checks, notes, etc., may be prepared and automatically accounted by means of this so-called memorandum- or invoice-making mechanism. A modification of the same is in preparation for a separate co-pending application, embodying improved construction, but the adequacy for such general purpose of the means herein set forth is hereby recognized and claimed. Thus it is seen that the system herein presented is not only automatically double-entry, in the recognized sense of that term, but is triple- and quadruple-entry in the novel sense that three or four separate, original entries of a given transaction are made from the one volitional set-up, all necessarily harmonious and including all the principal routine entries in the art.

*Universal summation.*—In lieu of vertical-footing and cross-footing, which presuppose uniform arrangement of the items to be footed in columns or lines, and in lieu of simple consecutive summation, which is ordinarily secured by adding machines, this system also presents means for unlimitedly-selective summation, either permanently or temporarily prearranged, wholly or partially independent of the control of the operator at the keyboard, or entirely under such control. This is accomplished by the use of an unlimited number of summing mechanisms or registers, capable of simultaneous operation from a common amount-keyboard, the selection of the registers to be operated being governed by switchboards which are controlled by digit keys, plugs or other suitable means, under the immediate control of the operator for temporary or variable connections, while for more or less permanent employment the registers may be connected up in any desired relations with the desired degree of permanence. As these connections are preferably electrical the location of the registers, either as a whole or with reference to each other, is practically immaterial, as is also the sequence of the items.

For economy and convenience the registers are preferably arranged as shown in horizontal rows and perpendicular columns, in series of ten or twenty-five or their multiples, and systematically numbered, but to illustrate the possibilities of what may be called the principle of selective synthesis, there is shown in Fig. O1 a diagrammatic arrangement of thirty-six registers, in which Nos. 1 to 25, inclusive (together with 47, 93, and others not shown here), are devoted to counterbalancing accounts, showing primary or specific accounts, and as such are the only ones now under discussion in which primary entries can be made directly by means of the Dr. and Cr. keyboards. All others mentioned in this connection are for secondary or generic results, merely duplicating the entries made in the primaries, synthesizing them in any desired combinations, as for example the following: Entries in Nos. 1, 2 and 3 are synthesized in No. 26, Nos. 2, 3, 5 and 22 in No. 28, Nos. 4, 7 and 17 in No. 30, while Nos. 1, 3, 5, 7, 17, 15, 13 and 10, together with Nos. 47 and 93 (the latter being in another section, say in the manager's private office), are synthesized both in No. 27 and in No. 100, which latter may be in a separate room or in another building, in which latter place also No. 101 shows the grand total of all entries made in the machine, as does No. 36 also. These latter two are permanently set, while all the other synthesizings mentioned are merely prearranged for a convenient period by the chief accountant, and Nos. 29, 31, 32, 33, 34 and 35 are entirely under the operator's control for his convenience in summating temporary series of entries, either consecutive or otherwise. All of these various synthetic relations are possible as a mere matter of electrical, pneumatic or other connection, with in some cases the employment of supplemental master machines. The printed record in each register may be simply a consecutive showing of the totals, as elsewhere explained, or may be in the conventional itemized form commonly shown in listing machines. In the journal all entries are recorded in the order of making, and refer only to the primary registers.

*Concurrent specific and generic results.*—Fig. O2 represents diagrammatically the concurrent exhibition of specific and generic results, using as a concrete example substantially the figures given by the Interstate Commerce Commission as the totals of the accounts of the railroads of the country for the year ended June 30, 1903. Except as noted, the numbers used in this drawing as reference figures to designate the accounts also indicate the respective approximate balances therein (in millions of dollars). The accounts on the left of the dotted line $x-x$ have debit balances and those on the right credit balances. Generic accounts are distinguished by the letter g affixed to the number, all others being specific, subject to the modification noted below.

There are three distinct sets of accounts shown in this drawing which may be designated as I. Operating, at the bottom; II. Income, in the middle, and III. Balance sheet, at the top, the first corresponding to the trading statement in a mercantile set of books and the second to the revenue statement. $99g$ and $643g$ are the points of division between these sets, and the accounts at these points are specific with respect to the generic accounts above and at the same time generic with respect to their component accounts below. This dual nature of accounts normally generic applies, of course, to all intermediate generic accounts.

I. Dr. At the lower left corner are accounts numbered $1a$–$53a$, in which the figures used to designate the accounts do not represent the balances. These are the fifty-three operating-expense accounts prescribed by the Commission, and the full details are omitted for want of space.

$1a$ is maintenance of roadway and $10a$ is other (way and structure) expenses. The total of these and the intermediate accounts is $266g$, maintenance of way and structures. $11a$ is superintendence (equipment), $19a$ is other (equipment) expenses, and the total $240g$, is maintenance of equipment. $20a$ is superintendence (transportation), $46a$ is other (transportation) expenses, and the total, $703g$, is conducting transportation. $47a$ is salaries of general officers, $53a$ is other (general) expenses, and the total, $48g$, is general expenses. The total of these four generic accounts, $1257g$, is total operating expenses.

I. Cr. At the lower right corner: 421 is passenger revenue, 42 is mail earnings, 38 is express earnings, 10 is other passenger earnings, and the total, $511g$, is total passenger earnings. 1338 is freight revenue, 4 is other freight earnings, and the total, $1342g$, is total freight earnings. 14 is car mileage earnings, etc., 33 is telegraph earnings, etc., and the total, $47g$, is total other earnings from operation. The total of these three generic accounts, $1900g$, is total earnings from operation.

$643g$ is the credit balance of income from operation, made up by crediting the 1900 earnings and debiting the 1257 expenses pertaining to operation.

II. Cr. Taking up now the second or income division: To the 643, credit balance of income from operation, is added $206g$, income from other sources, which is made up of the four specific accounts: 110, lease of road; 40, income from stocks; 18, income from bonds; and $38b$, miscellaneous, making $849g$, total income (less operating expenses), which goes as a credit into $523g$, profit and loss, along with the debit of 326, next mentioned.

II. Dr. 284 is interest on funded debt, and 42b is permanent improvements, making a total of 326g, deductions from income, leaving the profit and loss balance 523. This profit and loss, 523, goes as a credit into surplus, 99g, and against it is debited 424g, distribution of profit and loss, made up of the following specific accounts: 152, dividends; 45, interest on preferred stock; 1, maintenance of organization; 9, interest on current liabilities; 112, rents for lease of road; 58, taxes; and 47, other deductions.

III. Cr. This surplus, 99, forms the balance between the liabilities and the assets. The former, 14636g, is made up of the following specific credit balances: 6270, capital stock; 6805, funded debt; 860, current liabilities; 43, interest accrued on funded debt, and 658, miscellaneous (which includes surplus from prior years).

III. Dr. Assets, 14735g, is made up of the following specific debit balances: 10274, cost of road; 700, cost of equipment; 1673, stocks owned; 513, bonds owned; 767, cash and current assets; 148, material and other supplies; 125, sinking fund and sundries; and 535, miscellaneous. The item miscellaneous, as given by the Commission (959), includes the seven balances aggregating 424, shown in the drawing as distribution of profit and loss, and this same amount, 424, is included in the Commission's total of assets (15159).

The concurrent effect of a specific entry in the successive generic accounts may be illustrated as follows: Suppose an issue of $1,000,000 worth of rails for renewal purposes. The specific entries which would appear on the journal would be, 1st, a credit to material, which would reduce that balance from 148, as shown, to 147, with a corresponding automatic reduction of its generic account, assets, from 14735 to 14734; and, a charge to 2a, renewals of rails, which would automatically increase maintenance of way and structures from 266 to 267, and operating expenses from 1257 to 1258. This would also automatically reduce the credit balances in the following successive generic accounts: Income from operation, from 643 to 642; total income, from 849 to 848; profit and loss, from 523 to 522, and surplus, from 99 to 98, which latter amount added to liabilities, 14636, would equal assets, 14734, as shown above. Or, taking the balances as shown in the drawing, suppose the receipt of $2,000,000 on account of freight revenue. This would be charged to cash, increasing its balance from 767 to 769, and automatically increasing the generic account, assets, from 14735 to 14737, while the credit, specifically entered to freight revenue, would increase that account from 1338 to 1340 and would automatically increase the following generic credit balances: freight earnings, from 1342 to 1344; earnings from operation, from 1900 to 1902; income from operation, from 643 to 645; total income, from 849 to 851; profit and loss, from 523 to 525, and surplus from 99 to 101. Again, the payment of $3,000,000 for taxes would specifically and directly decrease cash from 767 to 764, and increase taxes from 58 to 61, and automatically increase distribution of profit and loss from 424 to 427, decrease assets from 14735 to 14732, and correspondingly decrease surplus from 99 to 96.

Fig. O2 is not intended to exhibit the mechanical relations of accounts, but the accounting relations. Mechanically, the several accounts in which concurrent entries are made are not connected so that one register receives the entry from another register, but each receives it from the keyboard, mechanically independent of the others. From an accounting standpoint, however, these concurrent entries in specific and generic accounts are equivalent to an entry in the specific account and a carrying of the item from such account to the generic account without withdrawing it from the former. The outcome is that all specific accounts are currently closed into their generic accounts for generic purposes and at the same time they remain open for specific purposes.

At the close of the year, when it is desired to close the year's accounts, the actual closing of the specific accounts automatically closes the generic accounts also. For example, referring to Fig. O2, the surplus, 99, for 1903, is to be closed into miscellaneous (liabilities) 658, which includes the surplus of preceding years. Since the current surplus is composed of all specific credits in divisions I and II, less all specific debits in the same divisions, the general closing entries would comprise a debit to each credit balance of the amount necessary to close it, crediting the same to 658, and a credit to each debit balance of the amount necessary to close it, debiting it to 658. This would directly close each specific account and automatically close all the generic accounts composed of such specific accounts, and as the credit balances exceed the debit balances by 99, that amount would be added, net, to miscellaneous (liabilities), 658, making it 757, and increasing liabilities to 14735, to agree with assets. Thus the closing of the seventy-four specific accounts would also close the sixteen generic accounts, leaving surplus and all component accounts at zero, ready to receive the entries for the next year. The journal would automatically register the number and amount of each specific account as closed, and by explanatory typewriting, if desired, it could also exhibit the successive generic balances as closed.

In practice many of the accounts here shown as specific would be generic, and accountants would probably disagree as to the desirability of the precise form adopted for the second division. A great variety of form is obviously easily secured. The purpose of the drawing is merely to present graphically the concurrent keeping of specific and generic accounts and to demonstrate to accountants this method of automatically securing continuous trading, revenue and financial statements.

*Diverse-base synthesization.*—Railroad accounting also furnishes data for illustrating a method for securing what may be called simultaneous, concurrent, or automatic syntheses of common data on a plurality of bases. In the operating-expense accounts, e. g., it is desired not only to apportion the expenses to the proper accounts according to the nature of the item itself, for financial purposes, but also to distinguish between the sources or causes of such expense, that is to say, to apportion the expense between freight and passenger traffic, which may be called a statistical purpose. Some of the items are chargeable directly and wholly to either freight or passenger traffic, but others pertain to both kinds of traffic jointly, and are usually apportioned on a mileage or other suitable basis, more or less in bulk. In order to secure this statistical analysis of these expenses in the prior method, many of the items have to be handled the second time, and they must of course be balanced with the same items classified in the regular accounts, while this method avoids the repeated handling of the items, secures the totals automatically and insures the balancing of the two sets of syntheses. Fig. O3 shows this graphically from an accounting standpoint. In this figure let A, B and N represent appropriate financial accounts, with O as their synthetic or generic total, while F, P and C represent, respectively, the statistical freight, passenger and common classes into which it is desired to summate the items which are also to be classified in the financial accounts, these accounts being all indicated on registers suitably connected in circuit on the cross-connecting board. It will be seen that A, B and N, as well as F, P and C, are generic accounts with respect to the specific accounts *af, ap, ac, bf, bp, bc,* and *nf, np, nc,* in which the entries are directly made upon operation of the keyboards.

It requires no more labor to enter an item in *af, ap* or *ac* than it would to enter it in A direct, if A were a specific account; but when so entered, it has not only gone into A, but also into F, P or C, as the case may be, and necessarily at the same value, so that the statistical and financial summations must balance. Similarly with *bf, bp, bc,* and the corresponding *n*-accounts.

Assuming the entry in each specific account (*af,* —*nc*) of the number shown in the drawing, it is evident that upon making the nine entries there indicated, the amounts would be synthesized in A, B or N, and simultaneously in F, P or C, with results as indicated in the generic accounts, on two entirely distinct bases, with only one handling of each number.

F(12), P(15) and C(18) are the generic statistical results, which might be further summated to agree with O(45), as are A(6), B(15) and N(24); but as this would afford no additional information they may preferably be directly connected without passing through a register, as indicated by the arrow. The indicated connections having been made, it is obviously merely a matter of electrical connection to secure the total of F and P (FP27) if desired, before combining them with C, or of A and B (AB21) before combining them with N(24) to obtain O(45), or to make any other desirable combination of these primary genera into supergenera, as AN, BN, or FC, PC, or even AF, BP, CN, if such synthesis would have any value.

Having thus described the purpose, objects and operation of my invention and its uses and adaptabilities, I desire to secure by Letters Patent the following claims:—

1. In combination, three or more registers differentially responsive to positive and negative registrations, mechanism for controlling the magnitude of a given registration, and means for contemporaneously effecting the selective and counterbalancing connection of any two of said registers with said controlling mechanism.

2. In combination, three or more registers each differentially responsive to positive and to negative registrations and each assigned to a ledger account, mechanism for controlling the magnitude of a given registration in any register or registers, and means for selecting any two of said registers and simultaneously connecting them counterbalancingly with said controlling mechanism.

3. In combination, a plurality of registers differentially responsive to positive and negative registrations, means associated with each register for separately recording the operation of the register individual thereto, mechanism for controlling the magnitude of a given registration in any one or more registers, and means for effecting the selective and counterbalancing connection of any two of said registers with said controlling mechanism.

4. In combination, a plurality of registers each differentially responsive to credit and to debit registrations and each assigned to a particular ledger account, means associated with each register for recording automatically the individual operation of the associated register, mechanism for controlling the magnitude of a given registration in any register, and means for counterbalancingly connecting any two of said registers with said controlling mechanism.

5. In combination, three or more registers differentially responsive to positive and negative registration, a device for receiving and preserving journal entries, mechanism for controlling the magnitude of each entry and for controlling the registration in any register to correspond with the magnitude of the registration in said journal-receiving and preserving device, and means for contemporaneously effecting a counterbalanced connection of any two of said registers with said controlling mechanism.

6. In combination, three or more registers each differentially responsive to debit and to credit registrations and each assigned to a particular ledger account, mechanism for controlling quantitatively the entries on a journal record and correspondingly the registrations in any of said registers and means for contemporaneously connecting any two of said registers counterbalancingly with said controlling mechanism, whereby the operation of the two connected registers is effected by a single actuation of the controlling mechanism.

7. In combination, a plurality of registers each differentially responsive to debit and to credit registrations and each assigned to a particular ledger account, a journalizing mechanism for controlling quantitatively the entries on a journal record and correspondingly the registrations in any of said registers, means for counterbalancingly connecting any two of said registers with said controlling mechanism, and automatic means for recording in association with each journal entry the designation of the registers selectively connected with the controlling mechanism when determining the amount of said entry.

8. In combination, a plurality of registers each differentially responsive to debit and to credit registrations and each assigned to a particular ledger account, means for selecting any two of said registers, means for entering upon a suitable record blank the explanatory details of the registrations, mechanism for controlling the associated numerical entries on said record blank, means for correspondingly controlling the magnitude of the registrations in the selected registers, and means for counterbalancingly actuating the selected registers.

9. In combination, a plurality of registers each differentially responsive to debit and to credit registrations and each assigned to a particular ledger account, means for selecting any two of said registers, means for entering the explanatory details of the registrations to form a suitable record thereof, mechanism for controlling the associated numerical entries, means for correspondingly controlling the magnitude of the registrations in the selected registers, means for automatically indicating on said record the designation of the registers under the influence of said controlling mechanism at the time of each entry in said record, and means for counterbalancingly actuating the selected registers.

10. In combination, a plurality of registers each differentially responsive to debit and to credit registrations and each assigned to a particular ledger account, means for selecting any two of said registers, means for recording the explanatory details of the registrations, mechanism for controlling the associated numerical entries, means for correspondingly controlling the magnitude of the registrations in the selected registers, means for automatically indicating on said record the designation of the registers under the influence of said controlling mechanism at the time of each entry in said record, means for automatically indicating on said record the nature of the registration in each register under the influence of said controlling mechanism at the time of each entry in said record, and means for counterbalancingly actuating the selected registers.

11. In combination, three or more entry-receiving devices, mechanism for controlling the entry in any operatively connected entry-receiving device, and means for connecting any two of said entry-receiving devices with said controlling mechanism to maintain automatically a given condition relative to that of equilibrium in the three or more receiving devices.

12. In combination, three or more entry-receiving devices, mechanism for controlling the amount of the entry in any of said entry-receiving devices, means for operatively connecting any two of the entry-receiving devices with the mechanism for controlling the amount of the entries, and means for automatically effecting a counterbalanced relation between any two of the entry-receiving devices connected with the controlling mechanism during the registration of a given transaction.

13. In combination, three or more integrating devices, mechanism for actuating any two of the integrating devices, the quantitative identity of the two actuations being automatically effected, means whereby the operator may control the magnitude of a given actuation of such mechanism, and means for differentially connecting any two of said integrating devices with said actuating mechanism.

14. In combination, three or more adding and subtracting mechanisms, means for actuating any two contemporaneously connected adding and subtracting mechanisms, the quantitative identity of the two actuations being automatically effected, means for determining the amount of said actuations, means for operatively connecting any one of said adding and subtracting mechanisms with the actuating means, and means for connecting reversely any other of the adding and subtracting mechanisms.

15. In combination, three or more entry-receiving devices, mechanism for controlling the entry in any operatively connected entry-receiving device, means for connecting any two of said entry-receiving devices with said controlling mechanism to maintain automatically a given condition relative to that of equilibrium in the three or more entry-receiving devices, and means for recording automatically in consecutive order the entries made in all of the entry-receiving devices.

16. In combination, three or more entry-receiving devices, mechanism for controlling the entry in any operatively connected entry-receiving device, means for connecting any two of said entry-receiving devices with said controlling mechanism to maintain automatically a given condition relative to that of equilibrium in the three or more entry-receiving devices, and means for recording automatically in consecutive order the designation of the entry receiving devices in which entries are made.

17. In combination, three or more entry-receiving devices, mechanism for controlling the entry in any operatively connected entry-receiving device, means for connecting any two of said entry-receiving devices with said controlling mechanism to maintain automatically a given condition relative to that of equilibrium in the three or more entry-receiving devices, and means for automatically recording in consecutive order the entries made in all of the entry-receiving devices and in conjunction therewith the designation of the entry-receiving devices in which entries are made.

18. In combination, a plurality of entry-receiving devices, mechanism for controlling the entry in any operatively connected entry-receiving device, means for counterbalancingly connecting any two of said entry-receiving devices with said controlling mechanism, and means for recording automatically in consecutive order the entries made in the entry-receiving devices and in conjunction therewith the designation of the entry-receiving devices in which entries are made.

19. In combination, a plurality of entry-receiving devices, mechanism for controlling the entry in any operatively connected entry-receiving device, means for counterbalancingly connecting any two of said entry-receiving devices with said controlling mechanism, and means for recording automatically in consecutive order the designation of the entry-receiving devices in which entries are made.

20. In combination, a plurality of entry-receiving devices, an indicating device independent of the entry-receiving devices for indicating the nature of the resultant in any entry-receiving device connected therewith, and means for connecting said indicating device with any of said entry-receiving devices.

21. In combination, a series of keys, mechanisms the operation of which is controlled by the keys, and devices actuated by the keys for selecting certain of said mechanisms to cause their operation equal amounts in opposite directions.

22. In combination, a plurality of registers comprising figure wheels and tens carrying mechanisms, a master machine for actuating any two of the registers which may be connected with the master machine, any one actuation of the master machine serving to move the two connected registers equal amounts, and a geometrically operating connector for connecting any selected register with the master machine for operation in one direction and for connecting any other selected register with the master machine for simultaneous operation in the reverse direction.

23. In combination, a plurality of adding and subtracting mechanisms, means for actuating any two contemporaneously connected adding and subtracting mechanisms, the quantitative identity of the two actuations being automatically attained, means for determining the amount of said actuations, and connecting mechanism operating on a geometric principle for operatively connecting any one of said adding and subtracting mechanisms with the actuating means and geometric connecting mechanism for operatively connecting reversely any other of the adding and subtracting mechanisms.

24. In combination, a common controlling mechanism, a plurality of entry-receiving devices adapted for connection with said controlling mechanism, means for placing any selected combination of the entry receiving devices in predetermined, fixed relations, and means for effecting harmonious differential numerical entries in the selected entry receiving devices.

25. In combination, a writing machine, mechanism serving normally to lock said machine against operation, a plurality of unlike operator's keys for opening the locking mechanism to permit the operation of the writing machine, any of said keys adapted to be inserted in a common keyhole affording access to the locking mechanism, and means for recording automatically the designation of the operator's key which serves to open the locking mechanism.

26. In combination, a writing machine, mechanism for locking said machine against operation, a plurality of unlike operator's keys adapted for insertion in a common opening for unlocking the locking mechanism to permit the operation of the writing machine, and means for recording automatically in conjunction with the writing the designation of the operator's key by which the locking mechanism is opened during the operation of the writing machine.

27. In combination, a writing machine, mechanism for locking said machine against operation, a master control key and an operator's key for opening the locking mechanism to permit the operation of the writing machine, the opening of the locking mechanism being primarily controlled by the master key and controlled by the operator's key only when opened by the master key.

28. In combination, a writing machine, mechanism serving normally to lock said machine against operation, a master control key and a plurality of unlike operator's keys for opening the locking mechanism to permit the operation of the writing machine, the opening of the locking mechanism being primarily controlled by the master control key and secondarily controlled by any one of the unlike operator's keys, and means for recording the designation of the particular operator's key upon the use of which in opening the locking mechanism, a given operation of the writing machine is dependent.

29. In combination, three or more registers whose indications when taken together constitute a ledger, and means for causing any two of the registers to receive an entry counterbalancingly.

30. In combination, three or more registers whose indications when taken together constitute a ledger, and means for causing any two of the registers to receive an entry counterbalancingly, each register indicating always the net balance of the account represented thereby.

31. In combination, three or more registers whose indications, when taken together, constitute a ledger, and means for operating the registers so that the algebraic summation of the indications of all the registers at any time will automatically be made zero for any actuation of the keys.

32. In combination, three or more registers whose indications when taken together constitute a ledger, means for operating the registers, and means for preventing operation of any register in one direction without causing operation of another register in the opposite direction.

33. In combination, three or more registers whose indications when taken together constitute a ledger, and means for at any time insuring the operation of two of the registers.

34. In combination, three or more registers whose indications when taken together constitute a ledger, and means for at any time insuring the operation of at least two of the registers.

35. In combination, three or more registers whose indications when taken together constitute a ledger, and means for at any time insuring the counterbalancing operation of two of the registers.

36. The combination with three or more registers, of means for connecting any of said registers for actuation, and means for insuring at any one time the connection of at least two of said registers.

37. The combination with three or more registers, of means for connecting any of said registers for actuation, means for insuring at any one time the connection of two of said registers, and means for causing the operation of the two connected registers to receive an entry counterbalancingly.

38. In combination, three or more registers whose indications when taken as a whole represent a ledger, means for connecting any two of the registers for actuation, means for causing operation of the connected registers, and means for causing the registers to be connected for actuation in such manner that their subsequent operation will be counterbalancingly effected.

39. In combination, three or more registers whose indications constitute a ledger, means for operating any of said registers forwardly or backwardly, and automatic means for insuring the backward operation of some register whenever any other register is operated forwardly.

40. In combination, a plurality of registers each differentially responsive to debit and to credit registrations and each assigned to a particular ledger account, journalizing mechanism for controlling the designations of value on a journal record and correspondingly the registrations in any of said registers, means for counterbalancingly connecting any two of said registers with said controlling mechanism, automatic means for recording in association with each journal entry the designation of the registers selectively connected with the controlling mechanism when determining the amount of said entry, and automatic means for numbering the journal entries.

41. In combination, a plurality of integrating devices each assigned to a particular ledger account, means for controlling the magnitude of the actuations of the integrating devices, mechanism for connecting any two selected integrating devices for reverse actuations with said means for controlling the magnitude of the actuations, recording mechanism, automatic means for operating the recording mechanism to record the numerical value of each actuation of the integrating devices, means for operating the recording mechanism to record the explanatory details for each actuation of the integrating devices, and numbering mechanism for automatically numbering the entries made by the recording mechanism.

42. In combination, a plurality of registers each differentially responsive to debit and to credit actuations and each assigned to a particular ledger account, means for controlling the magnitude of the actuations of any registers selected and connected for actuation, means for counterbalancingly connecting any two selected registers with the means for controlling the magnitude of the actuations of the registers, recording mechanism, means for recording the explanatory details of the transactions whose numerical values are entered in the registers, means for automatically controlling the associated numerical entries made by the recording mechanism to correspond with the magnitude of the actuations of the registers, means for automatically indicating on the record produced by the recording mechanism the designation of the registers under the influence of the controlling mechanism at the time of each entry on said record, and mechanism controlled by the operation of the means for recording the explanatory details to number automatically a certain class of operation of said recording mechanism.

43. In combination, three or more registers each differentially responsive to debit and to credit registrations and each assigned to a particular ledger account, mechanism for controlling the numerical entries of value on a journal record and correspondingly the registrations in any of said registers connected therewith, means for contemporaneously connecting any two of said registers counterbalancingly with said controlling mechanism whereby the operation of the two connected registers is effected by a single actuation of the controlling mechanism, and mechanism for automatically dating on said journal all operations of a certain character.

44. In combination, a plurality of registers each differentially responsive to debit and to credit registrations and each assigned to a particular ledger account, means for selecting any two of said registers, means for recording the explanatory details connected with the actuations of said registers, said recording means having a characteristic designation, mechanism for controlling the associated entries in said record, means for correspondingly controlling the magnitude of the registrations in the selected registers, means for counterbalancingly actuating the selected registers, and mechanism for recording automatically upon the record the characteristic designation of the recording means in which the record is made.

45. In combination, a plurality of registers each differentially responsive to debit and to credit registrations and each assigned to a particular ledger account, means for selecting any two of said registers, means for recording upon suitable record sheets the explanatory details of the registrations, mechanism for controlling the associated numerical entries of quantity or value on said record sheets, means for correspondingly controlling the magnitude of the registrations in the selected registers, means for automatically indicating on said record sheets the designation of the registers under the influence of said controlling mechanism at the time of each entry on said record sheets, means for counterbalancingly actuating the selected registers and automatic mechanism coöperatively associated with the recording means and controlled by the operation thereof to record on each sheet passing through the recording means a predetermined legend.

46. In combination, three or more registers whose indications when taken together constitute a ledger, means for causing any two of the registers to receive a common entry counterbalancingly, and automatic means for preventing any but a counterbalancing operation of said registers.

47. In combination, three or more registers whose indications when taken together constitute a ledger, means for operating the registers, the algebraic sum of the indications of all of the registers at any time being zero, and automatic means for preventing any actuation which will cause said algebraic sum to differ from zero.

48. In combination, three or more registers each differentially responsive to positive and to negative registrations, mechanism for controlling the magnitude of a given registration, means for contemporaneously effecting the counterbalanced connection of any two selected registers with said controlling mechanism, and means for preventing the actuation of any register except upon the counterbalancing actuation of some other register.

49. In combination, three or more entry-receiving devices, a master machine, and means for selectively connecting any two of said entry-receiving devices with said master machine, said machine adapted to simultaneously actuate said selected entry-receiving devices in opposite directions.

50. In combination, three or more series of keys, a master machine, a plurality of entry-receiving devices, and means for selectively connecting one of said devices with the master machine on actuation of a key of one of said series, means for selectively connecting a second of said devices with the master machine on actuation of a key of the second of said series, and means for simultaneously actuating said entry-receiving devices in opposite directions on actuation of a key of the third of said series.

51. In combination, three or more entry-receiving devices, a master machine, and means for selectively connecting any two of said entry-receiving devices with said master machine, said machine adapted to simultaneously actuate said selected entry-receiving devices, so that the algebraic sum of the numerical value of the actuations will be zero.

52. In combination, a plurality of series of keys, a master machine, a plurality of entry-receiving devices and means for selectively connecting one of said devices with the master machine on actuation of a key of one of said series, means for selectively connecting a second of said devices with the master machine on actuation of the key of the second of said series, and means for simultaneously actuating said entry-receiving devices in opposite directions a predetermined amount.

53. In combination, a plurality of registers, and means requiring the operation of the registers in pairs to maintain the algebraic sum of their indications at all times equal to a constant value.

54. In combination, a plurality of registers, and means for concurrently operating such registers to maintain the sum of their indications equal to a constant value.

55. In combination, three or more registers constituting a ledger and means requiring the operation of the registers in opposite direction to constantly maintain a balanced condition of the registers.

56. In combination, a plurality of registering mechanisms comprising a main class registering mechanism, a plurality of subclass registering mechanisms connected with the main class registering mechanism so that actuation of any subclass registering mechanism actuates the main class registering mechanism, a plurality of individual registering mechanisms for each subclass registering mechanism connected therewith so that the operation of any individual registering mechanism operates the corresponding subclass registering mechanism, additional registering mechanisms, and devices for connecting a desired one of the individual registering mechanisms with a desired one of the additional registering mechanisms so that the readings of the individual and additional registering mechanisms maintain a counterbalanced relation at all times, the operation of each individual registering mechanism serving to actuate its corresponding subclass mechanism and the main class registering mechanism.

57. In combination, a plurality of registering mechanisms comprising a main class registering mechanism, a plurality of subclass registering mechanisms connected with the main class registering mechanism so that actuation of any subclass registering mechanism actuates the main class registering mechanism, a plurality of individual registering mechanisms for each subclass registering mechanism connected therewith so that the operation of any individual registering mechanism operates the corresponding subclass registering mechanism, and devices for actuating any desired one of the individual registering mechanisms and its corresponding subclass registering mechanism and the main registering mechanism by the act of selecting and actuating the individual registering mechanism.

58. In combination, a plurality of registering systems, each comprising a main registering mechanism, a plurality of subclass registering mechanisms each connected with the main registering mechanism to actuate said main registering mechanism when said subclass registering mechanism is actuated, and a plurality of individual registering mechanisms for each subclass registering mechanism so that the actuation of each individual registering mechanism actuates the corresponding subclass registering mechanism, and devices for connecting two of said registering systems together and actuating the same so that the selected individual registering mechanism, the corresponding subclass registering mechanism and the main class registering mechanism of one system are actuated in one direction and the selected individual registering mechanism, the subclass registering mechanism and the main class registering mechanism of the other system are actuated in the opposite direction.

59. In combination, a plurality of registering systems, each comprising a main registering mechanism, a plurality of subclass registering mechanisms each connected with the main registering mechanism to actuate said main registering mechanism when said subclass registering mechanism is actuated, and a plurality of individual registering mechanisms for each subclass registering mechanism so that the actuation of each individual registering mechanism actuates the corresponding subclass registering mechanism, and devices for connecting two of said registering systems together and actuating the same so that the selected individual registering mechanism, the corresponding subclass registering mechanism and the main class registering mechanism of one system are actuated in one direction and the selected individual registering mechanism, the subclass registering mechanism and the main class registering mechanism of the other system are simultaneously actuated in the opposite direction an equal amount.

60. In combination, a plurality of registering mechanisms comprising a first main class of registering mechanisms, a second main class of registering mechanisms, and a plurality of groups of registering mechanisms, operating connections between the first one of the registering mechanisms of each group and a first one of the registering mechanisms of the second main class, operating connections between the second one of each group of registering mechanisms and a second registering mechanism of the second main class, the remaining registering mechanisms of the groups being correspondingly connected with the second main class registering mechanisms, and actuating devices for operating a selected one of any group of registering mechanisms of the first and second main classes.

61. In combination, a plurality of totalizing registers arranged in two classes, a plurality of individual registers arranged in groups, and connections extending from the individual registers to the totalizing registers so that the totalizing registers of one class totalize the group actuations of the individual registers, while the totalizing registers of the second class totalize the actuations of corresponding ones of the several groups.

62. In combination, a plurality of totalizing registers arranged in two classes, a plurality of individual registers, and connections extending between the individual and the totalizing registers so that the total registers of one class totalize the actuations of the individual registers upon one basis of classification and the totalizing registers of the other class totalize the actuations of the individual registers upon a second basis of classification.

In witness whereof, I hereunto subscribe my name this 18th day of August, A. D., 1906.

CHARLES H. TALLMADGE.

Witnesses:
WILLIAM J. CRUMPTON,
LYNN A. WILLIAMS.